US012805507B1

(12) United States Patent
Zhong et al.

(10) Patent No.: US 12,805,507 B1
(45) **Date of Patent: *Nov. 24, 2026**

(54) SOLAR MOSQUITO KILLER

(71) Applicants: SHENZHEN ANDELIAN TECHNOLOGY CO., LTD., Shenzhen (CN); ZHONGSHAN YONGQI ELECTRONIC TECHNOLOGY CO., LTD., Zhongshan (CN)

(72) Inventors: Shaohua Zhong, Shenzhen (CN); Shaoqi Ji, Zhongshan (CN); Dan Zhao, Zhongshan (CN)

(73) Assignees: SHENZHEN ANDELIAN TECHNOLOGY CO., LTD., Shenzhen (CN); ZHONGSHAN YONGQL ELECTRONIC TECHNOLOGYCO., LTD., Zhongshan (CN)

( * ) Notice: Subject to any disclaimer, the term of this patent is extended or adjusted under 35 U.S.C. 154(b) by 15 days.

This patent is subject to a terminal disclaimer.

(21) Appl. No.: 19/332,440

(22) Filed: Sep. 18, 2025

(30) Foreign Application Priority Data

Aug. 28, 2025 (CN) ......................... 202521848178.1
Aug. 28, 2025 (CN) ......................... 202521851099.6
Aug. 28, 2025 (CN) ......................... 202521865762.8

(51) Int. Cl.
*A01M 1/22* (2006.01)
*A01M 1/04* (2006.01)
*H01H 9/04* (2006.01)

(52) U.S. Cl.
CPC .............. *A01M 1/223* (2013.01); *A01M 1/04* (2013.01); *H01H 9/04* (2013.01); *H01H 2221/076* (2013.01)

(58) Field of Classification Search
CPC .......... A01M 1/223; A01M 1/22; A01M 1/04; H01H 9/04; H01H 2221/076
USPC .................................... 43/112, 113; 200/333
See application file for complete search history.

(56) References Cited

U.S. PATENT DOCUMENTS 2,177,846 A * 10/1939 Swangren ............... A01M 1/04 43/112
2,197,178 A * 4/1940 Gates ...................... A47L 19/00 392/382
2,592,654 A * 4/1952 Canfield ............. A01M 21/046 43/132.1
2,912,787 A * 11/1959 Partridge .............. A01M 1/223 43/112

(Continued)

FOREIGN PATENT DOCUMENTS

CN 200953801 Y * 10/2007
CN 203692266 U * 7/2014

(Continued)

*Primary Examiner* — Darren W Ark
(74) *Attorney, Agent, or Firm* — HOWARD M COHN and Associates, LLC

(57) ABSTRACT

A solar mosquito killer includes a plurality of mosquito killing modules, at least one solar module, and an installation structure. The at least one solar module is electrically connected to the plurality of mosquito killing modules to power the plurality of mosquito killing modules. The installation structure is configured for connecting the plurality of mosquito killing modules as a whole.

13 Claims, 137 Drawing Sheets

(56) References Cited

U.S. PATENT DOCUMENTS

| | | | | |
|---|---|---|---|---|
| 2,941,328 | A * | 6/1960 | Streat | A01M 1/223 43/112 |
| 3,188,438 | A * | 6/1965 | Lovasco | H01H 23/146 200/333 |
| 3,346,988 | A * | 10/1967 | Pickering | A01M 1/223 43/112 |
| 3,464,144 | A * | 9/1969 | Kannett | A01M 1/223 43/112 |
| 3,471,158 | A * | 10/1969 | Solins | F16J 15/00 200/333 |
| 3,487,577 | A * | 1/1970 | Sexton | A01M 1/2044 239/289 |
| 3,789,537 | A * | 2/1974 | Rule | A01M 1/223 43/112 |
| 3,928,742 | A * | 12/1975 | Rule | H01H 9/04 277/637 |
| 4,057,794 | A * | 11/1977 | Grossfield | G08B 21/04 174/67 |
| 4,366,643 | A * | 1/1983 | Boaz | A01M 1/2016 43/113 |
| 4,603,505 | A * | 8/1986 | Millard | A01M 1/04 362/179 |
| 4,907,365 | A * | 3/1990 | Conigliaro, Jr. | A01M 1/223 29/610.1 |
| 6,401,383 | B1 * | 6/2002 | Meade | A01M 1/2016 43/112 |
| 6,474,014 | B1 * | 11/2002 | Yu | A01M 1/06 43/119 |
| 6,818,845 | B2 * | 11/2004 | Portmann | H01H 23/06 200/339 |
| 7,024,815 | B1 * | 4/2006 | Visagie | A01M 1/02 43/107 |
| 8,424,239 | B1 * | 4/2013 | Gallo | A01M 1/223 43/112 |
| 8,875,437 | B1 * | 11/2014 | Xie | A01M 1/223 43/112 |
| 8,916,789 | B2 * | 12/2014 | Woodburn | E05F 1/12 200/333 |
| 10,271,536 | B2 * | 4/2019 | Lee | H05C 1/02 |
| 10,772,314 | B1 * | 9/2020 | Caba | A01M 1/145 |
| 10,986,828 | B1 * | 4/2021 | Studer | F21K 9/278 |
| D963,786 | S * | 9/2022 | Zhou | D22/123 |
| 11,603,970 | B1 * | 3/2023 | Rajasekaran | A01M 1/04 |
| 11,864,547 | B2 * | 1/2024 | Chang | A01M 1/023 |
| D1,045,010 | S * | 10/2024 | Qian | D22/123 |
| 12,274,254 | B2 * | 4/2025 | Li | A01M 1/04 |
| 12,364,257 | B1 * | 7/2025 | Liu | A01M 1/04 |
| D1,094,828 | S * | 9/2025 | Zhao | D22/123 |
| 2005/0172542 | A1 * | 8/2005 | Rose, Sr. | A01M 1/145 43/113 |
| 2006/0053683 | A1 * | 3/2006 | Lau | A01M 1/02 43/112 |
| 2007/0107298 | A1 * | 5/2007 | Miao | A01M 1/145 43/113 |
| 2008/0010896 | A1 * | 1/2008 | Lin | A01M 1/04 43/113 |
| 2008/0090189 | A1 * | 4/2008 | Lin | A01M 1/04 431/137 |
| 2008/0302644 | A1 * | 12/2008 | Thorp | H01H 9/287 200/333 |
| 2009/0038207 | A1 * | 2/2009 | Lin | A01M 1/04 43/112 |
| 2010/0188178 | A1 * | 7/2010 | Chen | H01H 36/02 335/205 |
| 2011/0030266 | A1 * | 2/2011 | Roy | A01M 1/08 43/113 |
| 2014/0165452 | A1 * | 6/2014 | Rocha | A01M 1/08 43/139 |
| 2014/0268679 | A1 * | 9/2014 | Huang | A01M 1/04 362/101 |
| 2014/0291132 | A1 * | 10/2014 | Todd | H01H 9/287 200/333 |
| 2015/0144713 | A1 * | 5/2015 | Formico | A01M 1/2044 239/289 |
| 2015/0344736 | A1 * | 12/2015 | Shin | F21K 9/27 524/413 |
| 2017/0006847 | A1 * | 1/2017 | McGowan | A01M 1/223 |
| 2017/0094960 | A1 * | 4/2017 | Sasaki | H02S 40/38 |
| 2018/0213763 | A1 * | 8/2018 | Lee | F21V 23/00 |
| 2019/0133106 | A1 * | 5/2019 | Eom | A01M 1/08 |
| 2019/0350184 | A1 * | 11/2019 | Chang | A61L 9/20 |
| 2020/0340638 | A1 * | 10/2020 | Rubel | F21S 10/04 |
| 2021/0204535 | A1 * | 7/2021 | Studer | F21S 4/28 |
| 2022/0022442 | A1 * | 1/2022 | Studer | A01M 1/04 |
| 2022/0110308 | A1 * | 4/2022 | Sabic | A01M 1/223 |
| 2022/0386586 | A1 * | 12/2022 | Cran | A01M 1/04 |
| 2023/0104986 | A1 * | 4/2023 | Perlman | A01M 1/04 43/107 |
| 2023/0284605 | A1 * | 9/2023 | Rubel | A01M 1/226 |
| 2023/0284606 | A1 * | 9/2023 | Koehler | A01M 1/04 |
| 2023/0309538 | A1 * | 10/2023 | Marcucci | A01M 1/223 43/114 |
| 2024/0008458 | A1 * | 1/2024 | McIntosh | A01M 1/026 |
| 2024/0032524 | A1 * | 2/2024 | Kurzinski | A01M 1/223 |
| 2024/0342934 | A1 * | 10/2024 | Muraki | B26B 19/04 |
| 2025/0000058 | A1 * | 1/2025 | Huber | A01K 15/029 |
| 2025/0049017 | A1 * | 2/2025 | Li | A01M 1/04 |
| 2025/0049019 | A1 * | 2/2025 | Li | A01M 1/04 |
| 2025/0212862 | A1 * | 7/2025 | Zhang | A01M 1/04 |
| 2025/0212864 | A1 * | 7/2025 | Ko | A01M 1/223 |

FOREIGN PATENT DOCUMENTS

| | | | | |
|---|---|---|---|---|
| CN | 204616842 | U * | 9/2015 | |
| CN | 205547081 | U | 9/2016 | |
| CN | 205878014 | U * | 1/2017 | |
| CN | 206408973 | U * | 8/2017 | |
| CN | 206533978 | U * | 10/2017 | |
| CN | 206682830 | U * | 11/2017 | |
| CN | 206803000 | U * | 12/2017 | |
| CN | 207907099 | U * | 9/2018 | |
| CN | 208504213 | U * | 2/2019 | |
| CN | 109892302 | A * | 6/2019 | |
| CN | 208997923 | U * | 6/2019 | |
| CN | 209130712 | U * | 7/2019 | |
| CN | 209498320 | U * | 10/2019 | |
| CN | 110645530 | A * | 1/2020 | F21V 33/00 |
| CN | 210979643 | U * | 7/2020 | |
| CN | 211129503 | U * | 7/2020 | |
| CN | 211289881 | U * | 8/2020 | |
| CN | 211353644 | U * | 8/2020 | |
| CN | 211667726 | U * | 10/2020 | |
| CN | 211780768 | U * | 10/2020 | |
| CN | 111895341 | A * | 11/2020 | B01D 46/62 |
| CN | 211983388 | U * | 11/2020 | |
| CN | 212108195 | U * | 12/2020 | |
| CN | 212204323 | U | 12/2020 | |
| CN | 212279563 | U * | 1/2021 | |
| CN | 212319597 | U * | 1/2021 | |
| CN | 112344280 | A * | 2/2021 | F21S 9/035 |
| CN | 213074157 | U * | 4/2021 | |
| CN | 213237330 | U * | 5/2021 | |
| CN | 213334033 | U * | 6/2021 | |
| CN | 213334140 | U * | 6/2021 | |
| CN | 213639391 | U * | 7/2021 | |
| CN | 213686616 | U * | 7/2021 | |
| CN | 214047221 | U * | 8/2021 | |
| CN | 214091323 | U * | 8/2021 | |
| CN | 214229140 | U * | 9/2021 | |
| CN | 214709816 | U * | 11/2021 | |
| CN | 113757608 | A * | 12/2021 | F21V 21/10 |
| CN | 215174712 | U * | 12/2021 | |
| CN | 215259550 | U * | 12/2021 | |
| CN | 216315002 | U * | 4/2022 | |
| CN | 216345874 | U * | 4/2022 | |
| CN | 216716065 | U * | 6/2022 | |
| CN | 216844464 | U * | 6/2022 | |
| KR | 200444855 | Y1 * | 6/2009 | A01M 1/223 |

(56) References Cited

FOREIGN PATENT DOCUMENTS

| | | | | | | |
|---|---|---|---|---|---|---|
| KR | 101623314 | B1 | * | 5/2016 | ............ | A01M 1/223 |
| WO | WO-2013014760 | A1 | * | 1/2013 | .............. | A01M 1/04 |
| WO | WO-2021196072 | A1 | * | 10/2021 | .............. | A01M 1/02 |

* cited by examiner

| | |
|---|---|
| first peak wavelength range | 369nm-372nm |
| second peak wavelength range | 395nm-400nm |
| third peak wavelength range | 397nm-400nm |
| fourth peak wavelength range | 400nm-403nm |

SOLAR MOSQUITO KILLER

CROSS-REFERENCE TO RELATED APPLICATIONS

The application claims priorities of Chinese Patent Application No. 202521848178.1, filed on Aug. 28, 2025, Chinese Patent Application No. 202521865762.8, filed on Aug. 28, 2025, and Chinese Patent Application No. 202521851099.6, filed on Aug. 28, 2025, the entire contents of which are incorporated herein by reference.

TECHNICAL FIELD

The present application relates to the field of outdoor mosquito killer technology, particularly to a solar mosquito killer.

BACKGROUND

Solar mosquito killers are specialized equipment used to capture, kill, or drive away mosquitoes and insects, they are widely used in homes, public places (such as parks, restaurants, hospitals), and outdoor environments, aiming to reduce the number of mosquitoes and improve the comfort of living environments. However, due to its own structural design, the solar mosquito killer in related technologies has a small mosquito killing range, resulting in poor mosquito killing effect. Therefore, how to effectively expand the mosquito killing range of solar mosquito killers to improve their mosquito killing effect has become an urgent problem to be solved.

SUMMARY

The present embodiment provides a solar mosquito killer that can solve the problem of poor mosquito killing effect caused by the small mosquito killing range of solar mosquito killer in related technologies due to their own structural design.

A solar mosquito killer includes a plurality of mosquito killing modules, at least one solar module, and an installation structure. The at least one solar module is electrically connected to the plurality of mosquito killing modules to power the plurality of mosquito killing modules. The installation structure is configured for connecting the plurality of mosquito killing modules as a whole.

Based on the embodiments of the present application, the solar mosquito killer can effectively increase its mosquito killing range by designing an installation structure and multiple mosquito killing modules, the installation structure assembles the multiple mosquito killing modules into a whole; by designing solar modules, they are suitable for converting solar energy into electrical energy to provide the mosquito killing module with the necessary power for operation, solar energy is a green energy source that can save resources and reduce pollution; multiple mosquito killing modules are independent of each other, and users can choose the number of mosquito killing modules they need to activate according to their actual environment, which can further reduce resource waste.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

FIG. 119 shows an enlarged view of the J part of FIG. 118.

FIG. 120 is a partially exploded view showing the solar mosquito killer of FIG. 118 changes to be a folded state.

FIG. 121 is a fifth schematic view of the solar mosquito killer in an unfolded state according to a second embodiment of present application.

FIG. 122 shows an enlarged view of the K part of FIG. 121.

FIG. 123 is a partially exploded view showing the solar mosquito killer of FIG. 121 changes to be a folded state.

FIG. 124 is a sixth schematic view of the solar mosquito killer in an unfolded state according to a second embodiment of present application.

FIG. 125 shows an enlarged view of the L part of FIG. 124.

FIG. 126 is a partially exploded view showing the solar mosquito killer of FIG. 124 changes to be a folded state.

FIG. 127 is a first schematic view of the solar mosquito killer according to a third embodiment of present application.

FIG. 128 is a second schematic view of the solar mosquito killer according to a third embodiment of present application.

FIG. 129 is a third schematic view of the solar mosquito killer according to a third embodiment of present application.

FIG. 130 is a fourth schematic view of the solar mosquito killer according to a third embodiment of present application.

Figure 131:
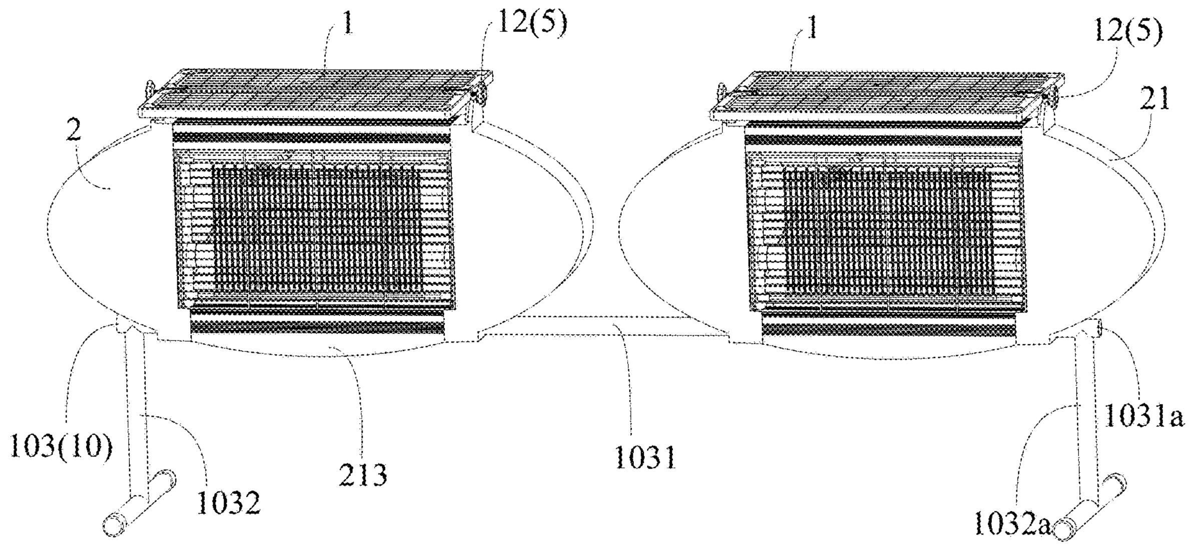

FIG. 131 is a fifth schematic view of the solar mosquito killer according to a third embodiment of present application.

Figure 132:
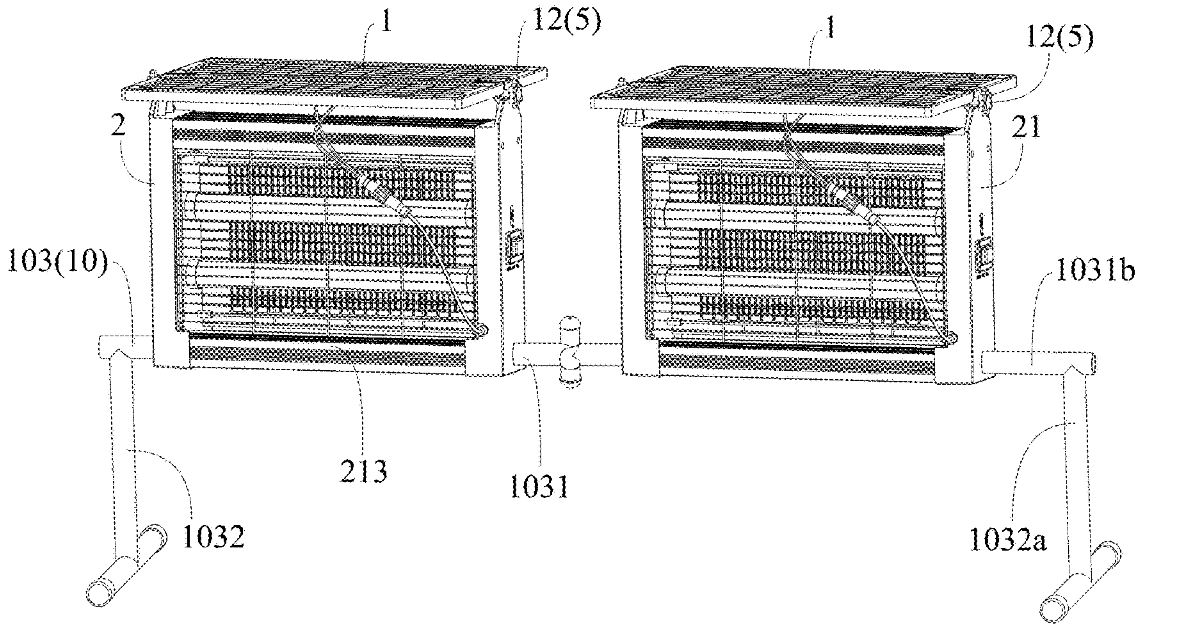

FIG. 132 is a schematic view of the solar mosquito killer according to a fourth embodiment of present application.

Figure 133:
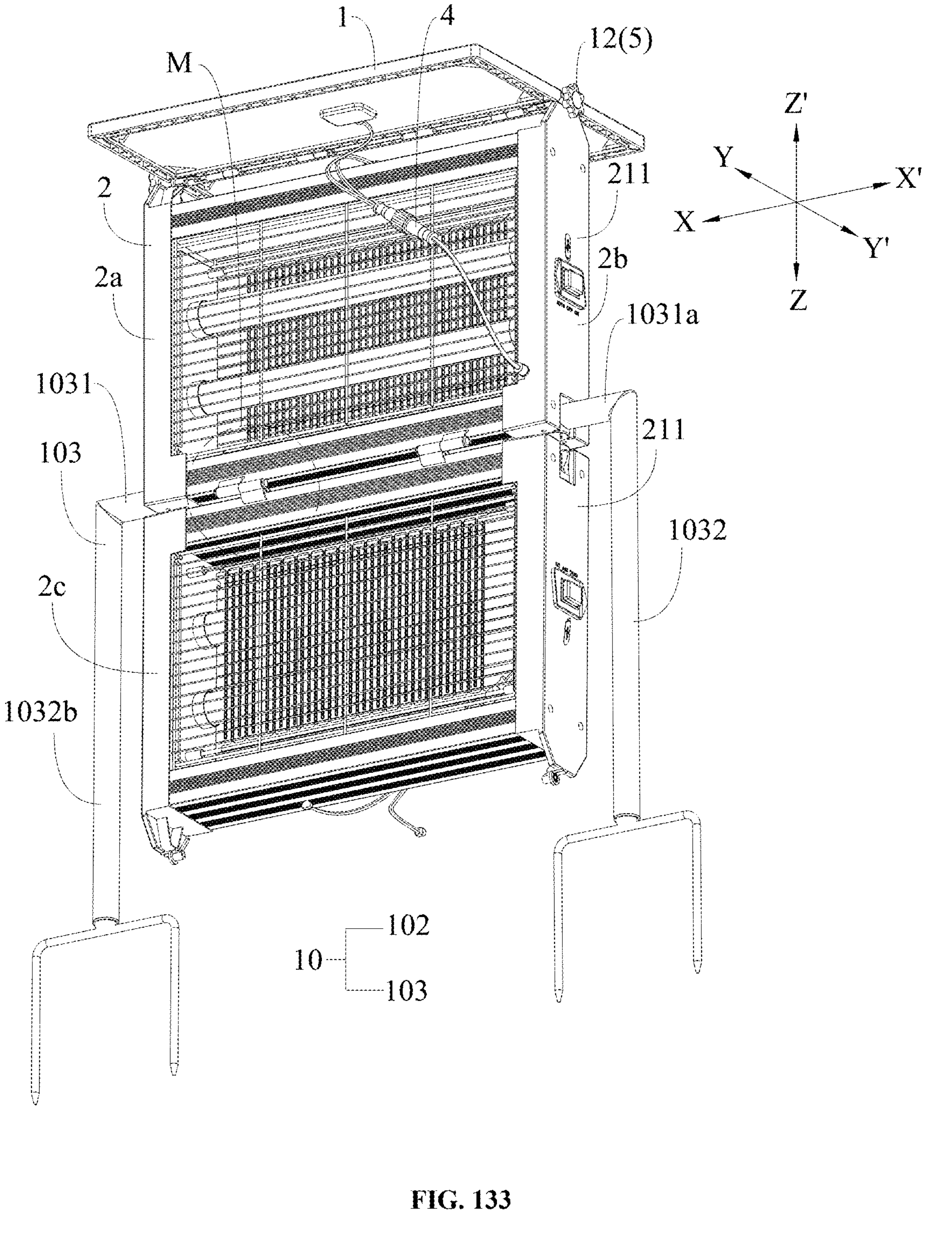

FIG. 133 is a first schematic view of the solar mosquito killer in an unfolded state according to a fifth embodiment of present application.

Figure 134:
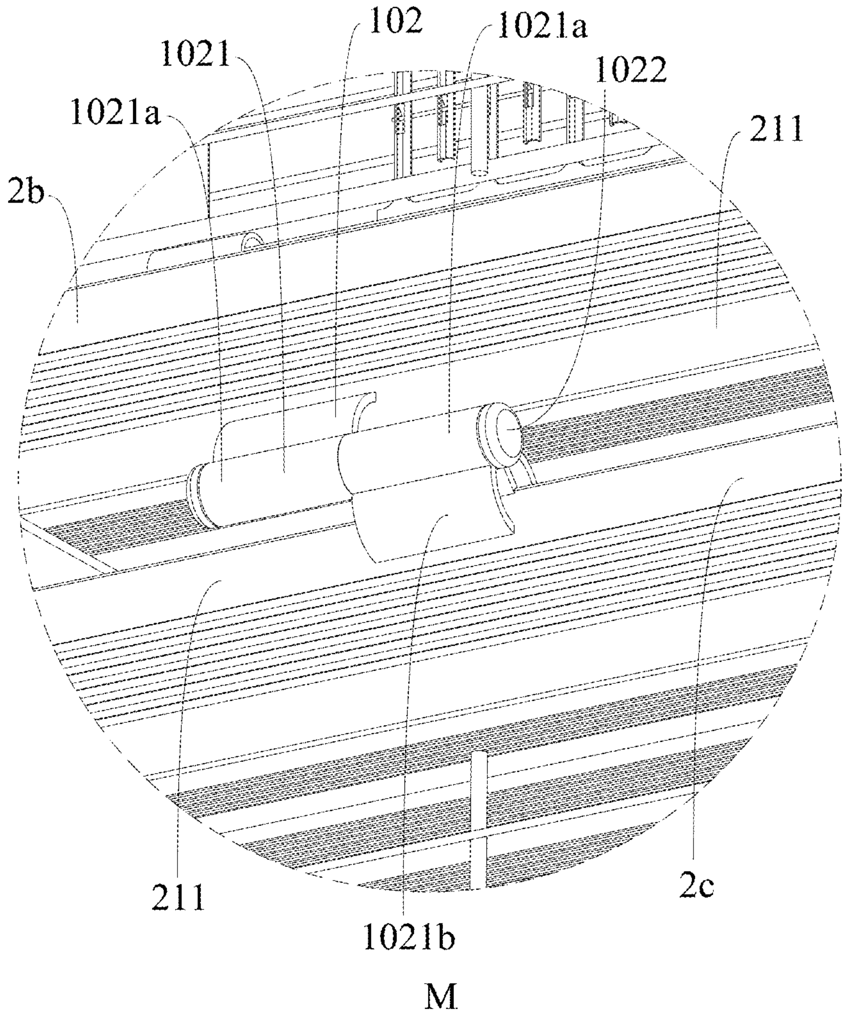

FIG. 134 shows an enlarged view of the M part of FIG. 133.

Figure 135:
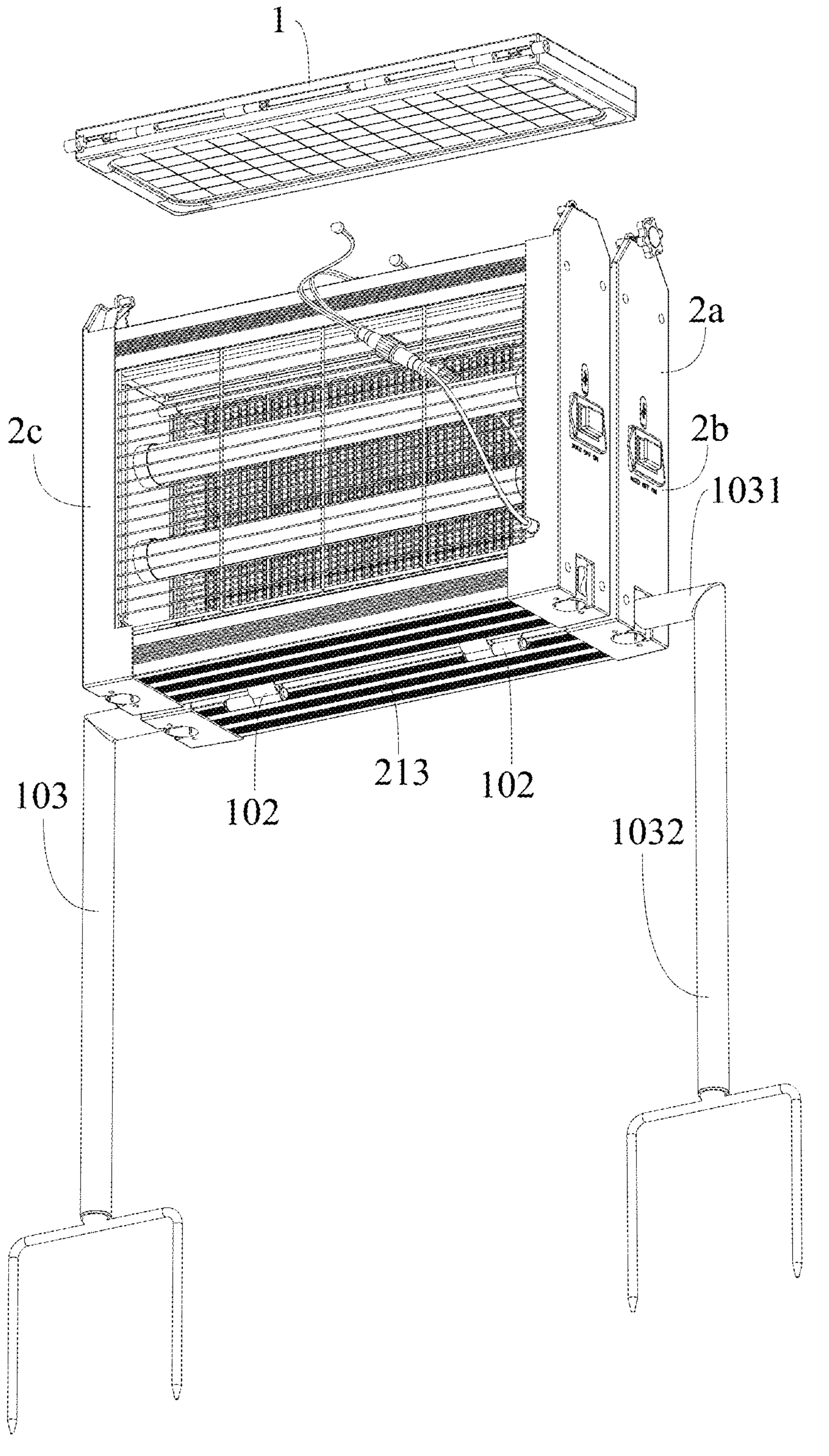

FIG. 135 is a partially exploded view showing the solar mosquito killer of FIG. 133 changes to be a folded state.

Figure 136:
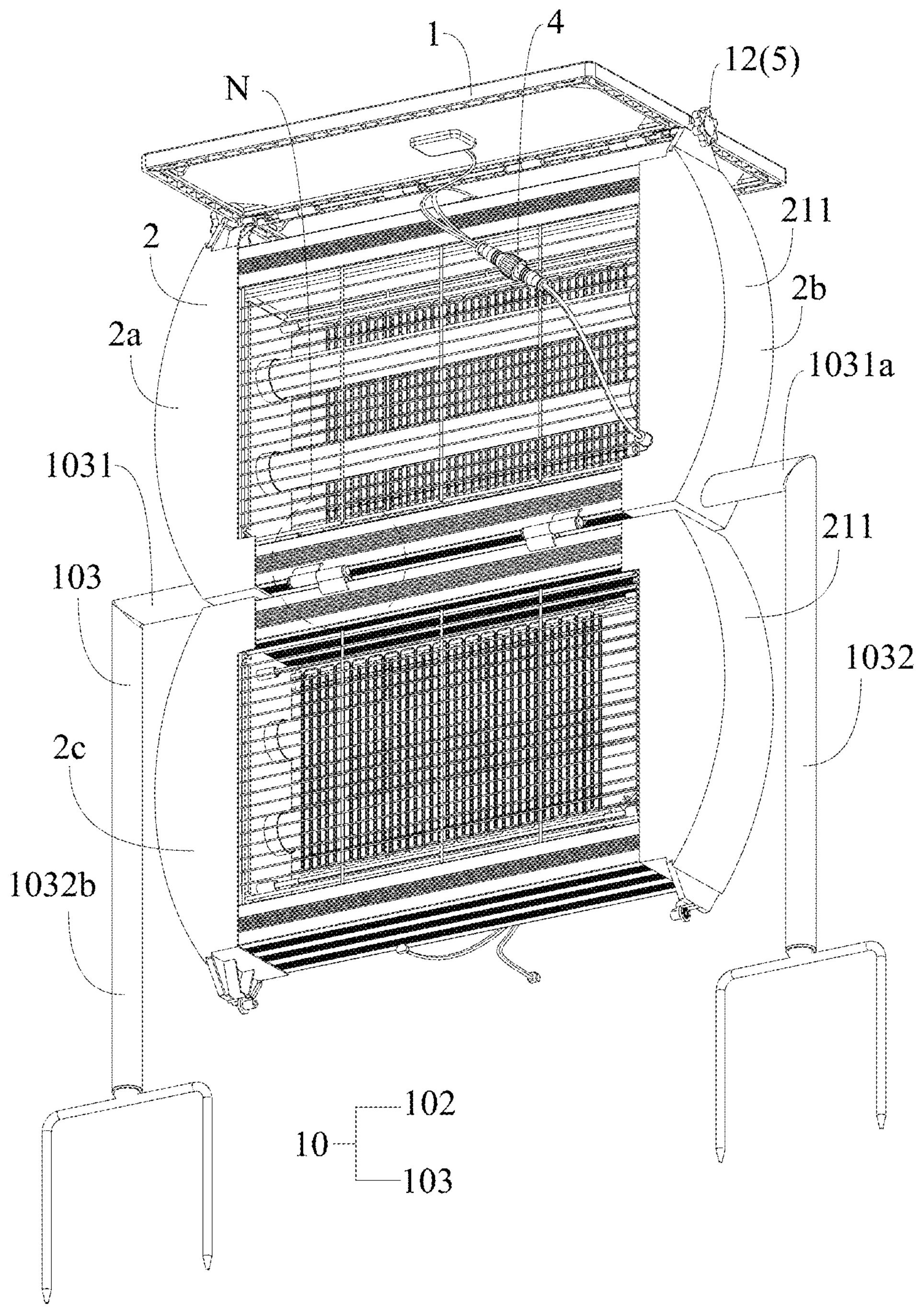

FIG. 136 is a second schematic view of the solar mosquito killer in an unfolded state according to a fifth embodiment of present application.

Figure 137:
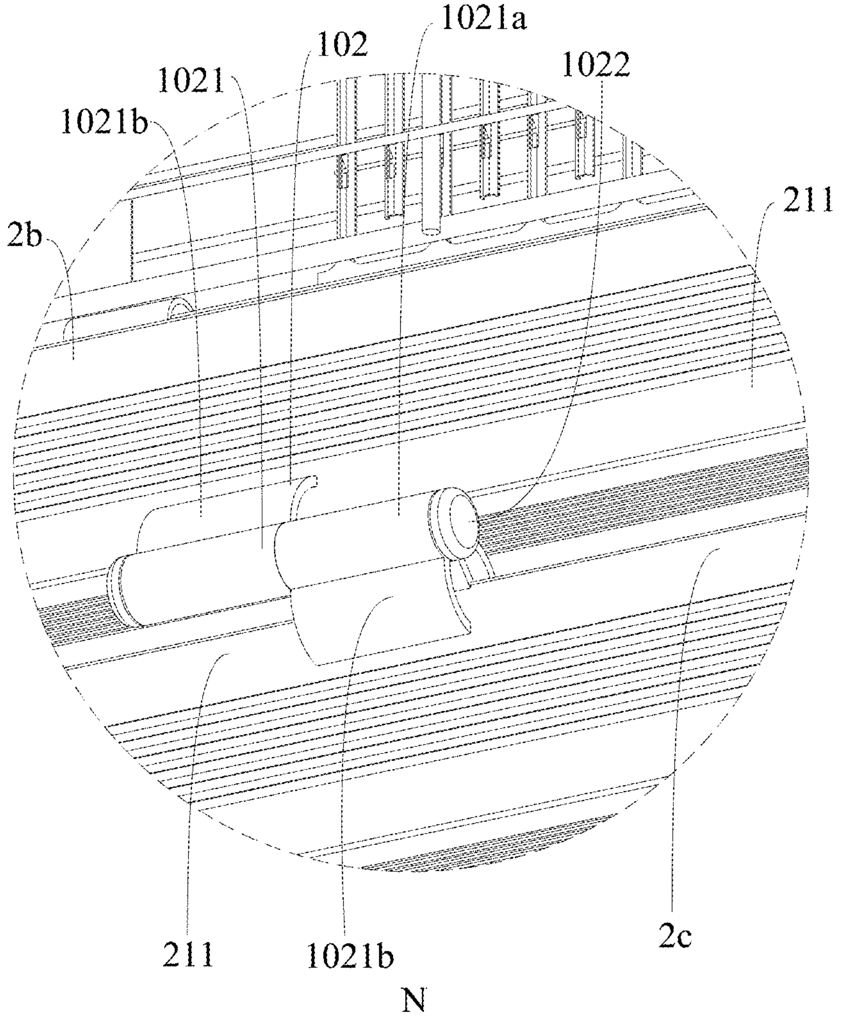

FIG. 137 shows an enlarged view of the N part of FIG. 136.

Figure 138:
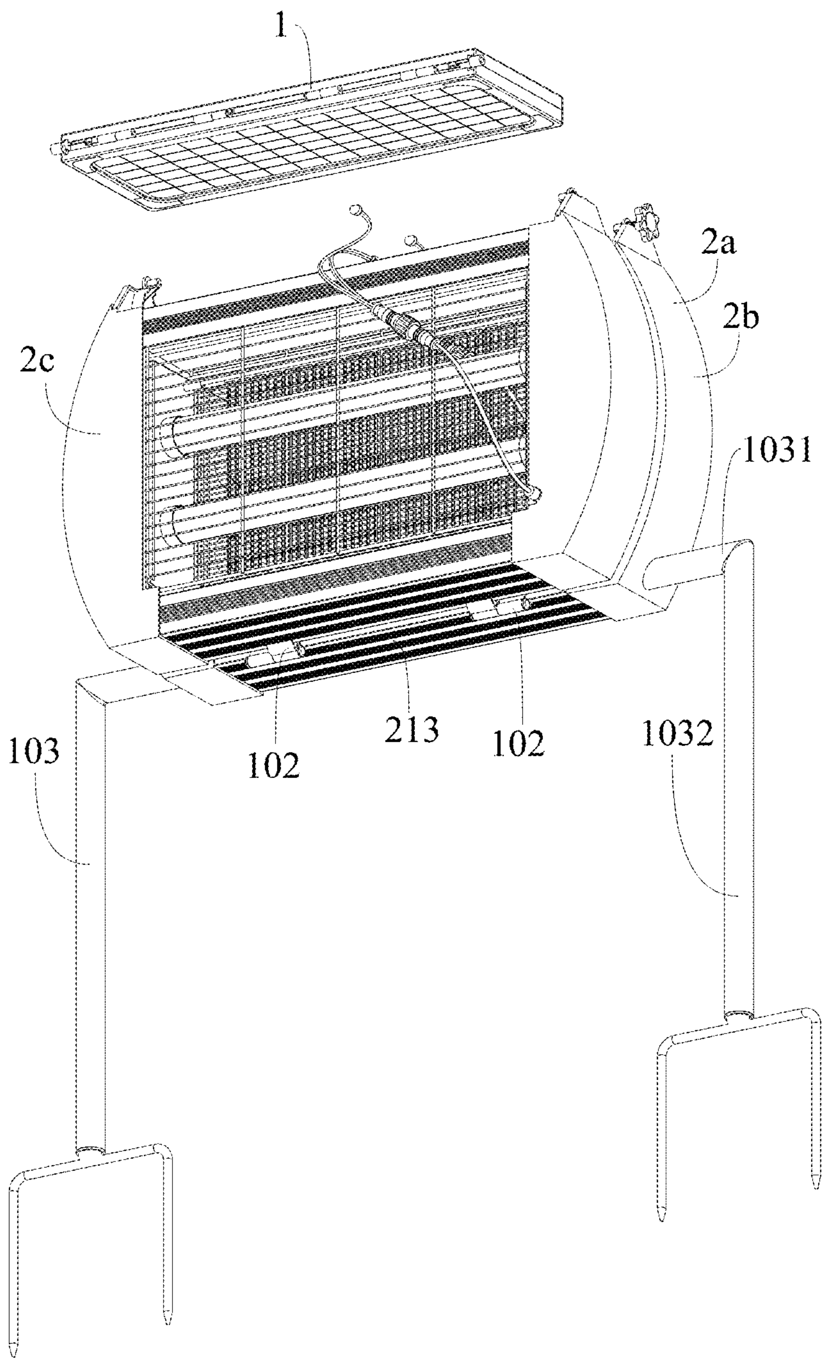

FIG. 138 is a partially exploded view showing the solar mosquito killer of FIG. 136 changes to be a folded state.

Figure 139:
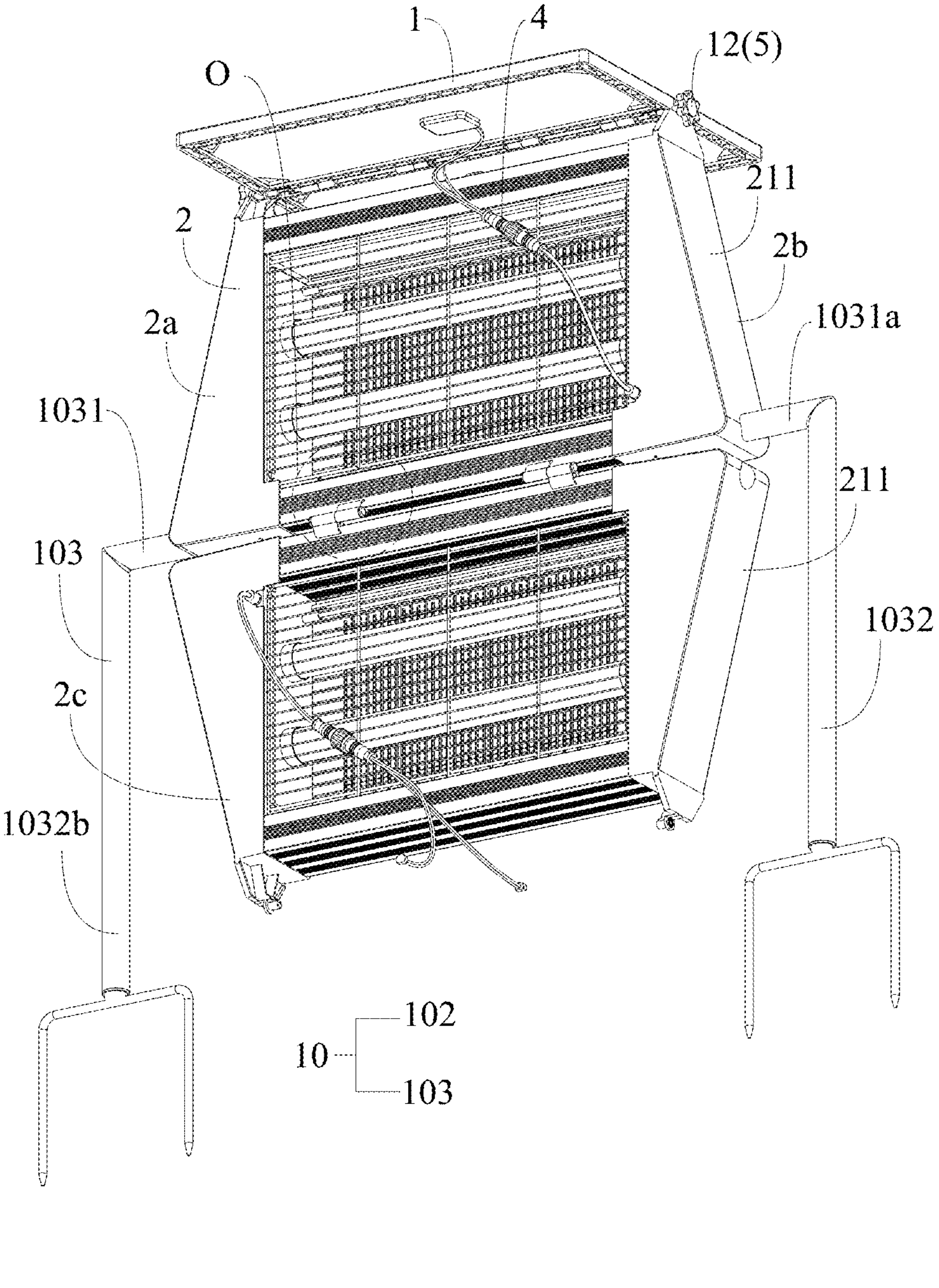

FIG. 139 is a third schematic view of the solar mosquito killer in an unfolded state according to a fifth embodiment of present application.

Figure 140:
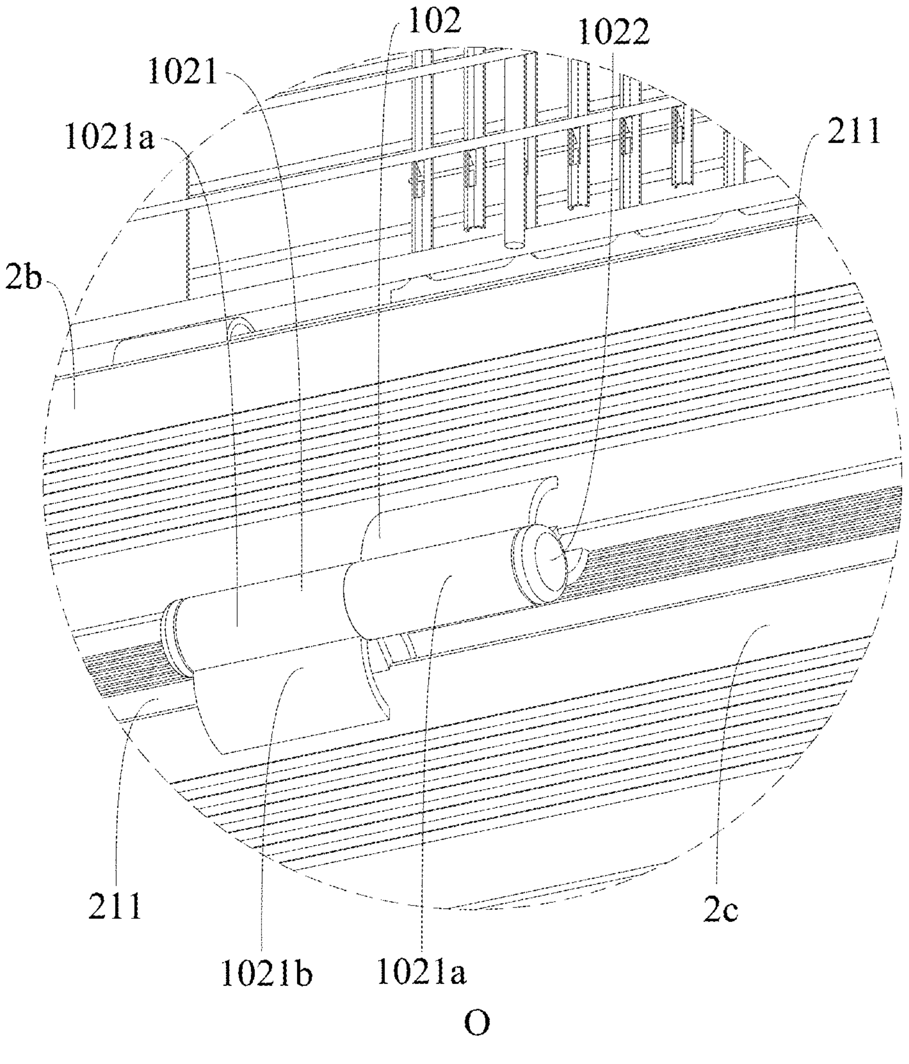

FIG. 140 shows an enlarged view of the O part of FIG. 139.

Figure 141:
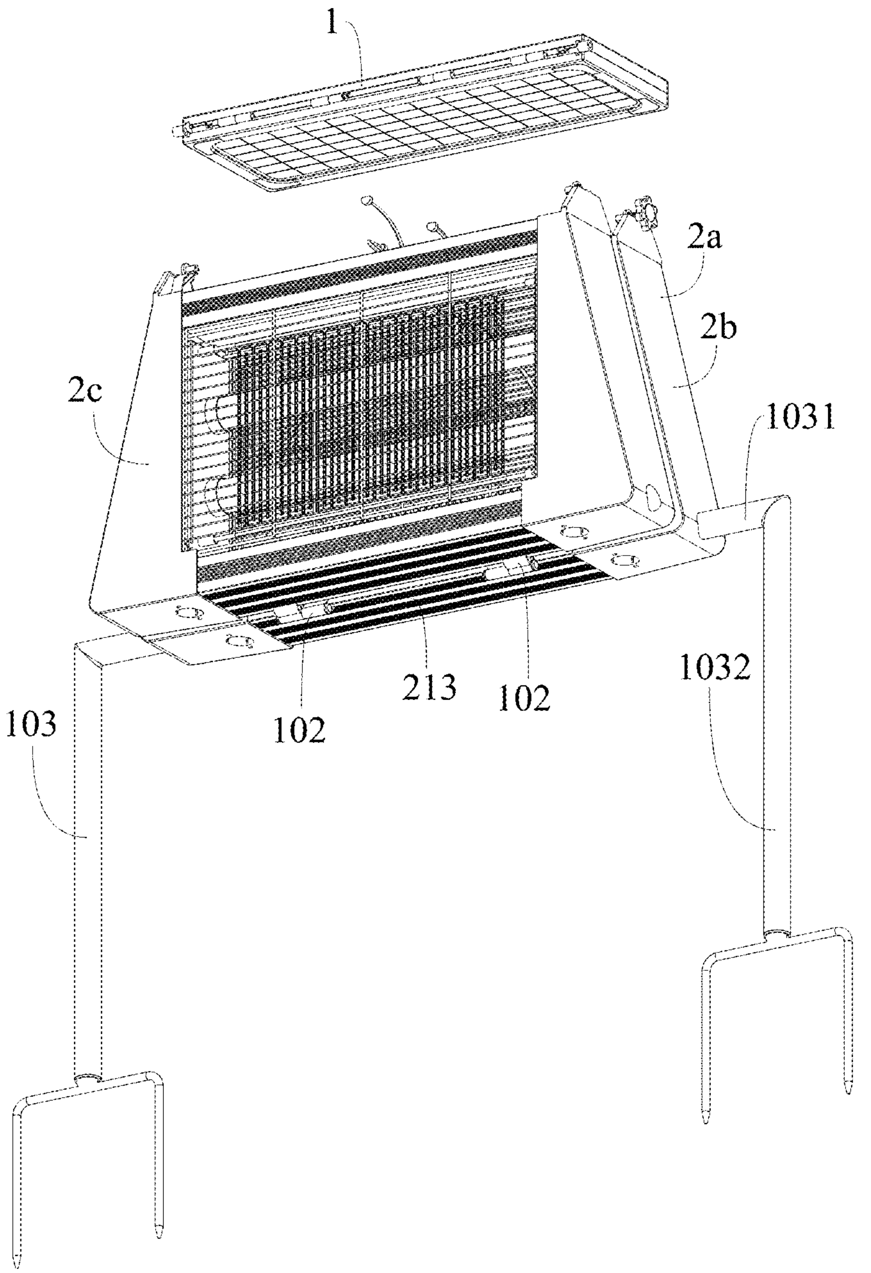

FIG. 141 is a partially exploded view showing the solar mosquito killer of FIG. 139 changes to be a folded state.

Figure 142:
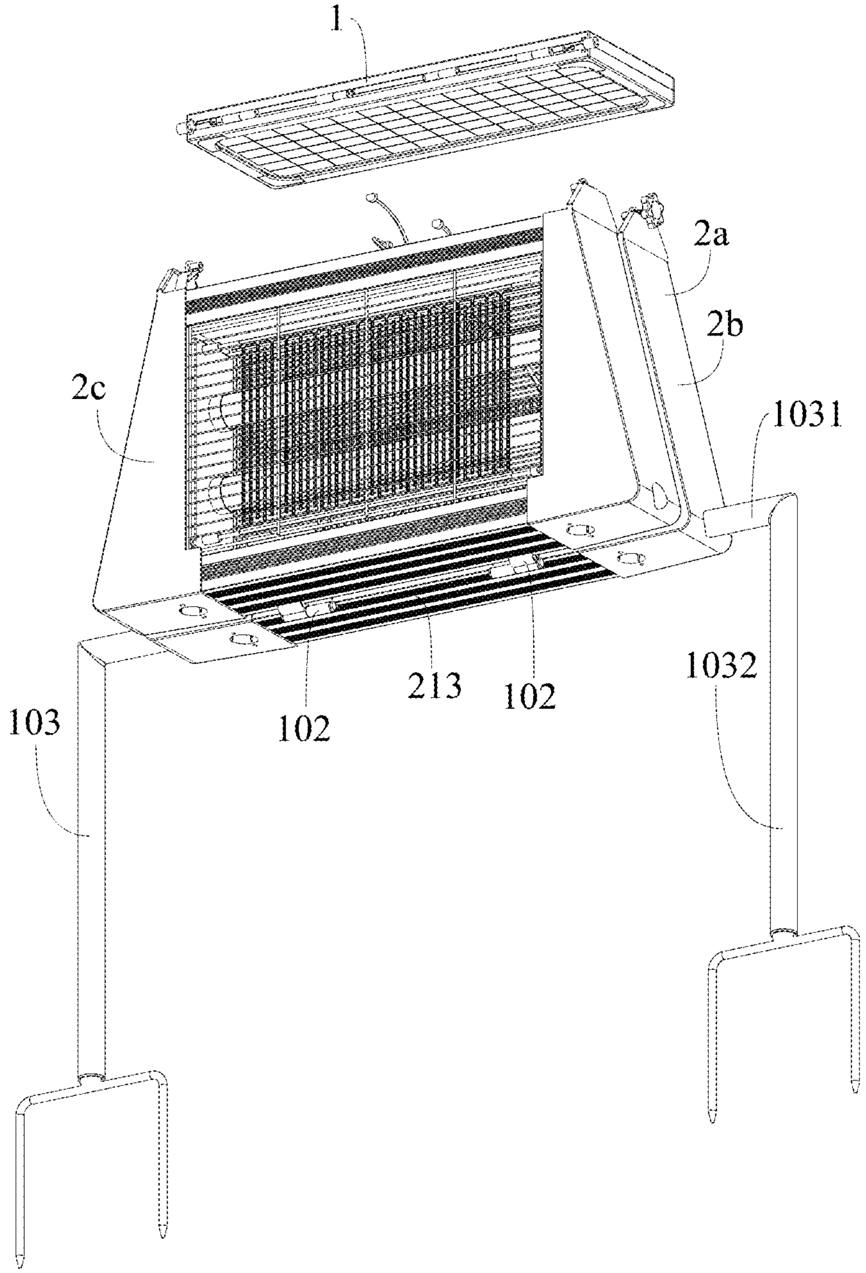

FIG. 142 is a fourth schematic view of the solar mosquito killer in an unfolded state according to a fifth embodiment of present application.

Figure 143:
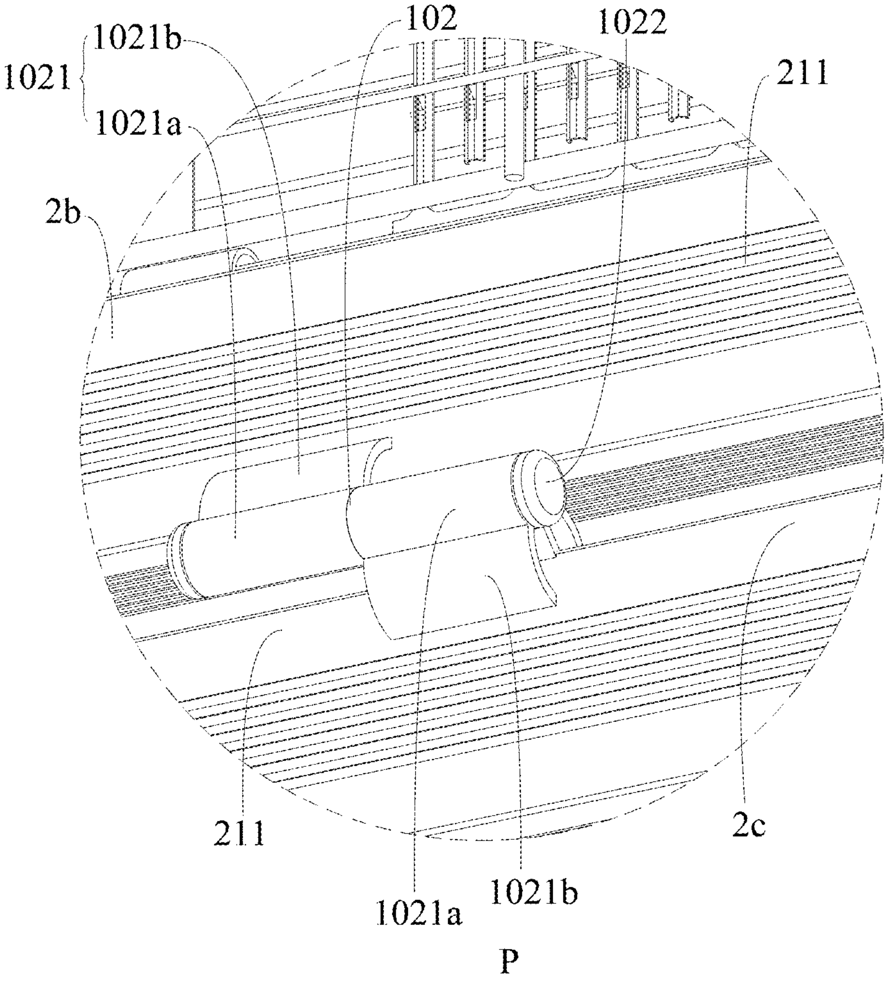

FIG. 143 shows an enlarged view of the P part of FIG. 142.

Figure 144:
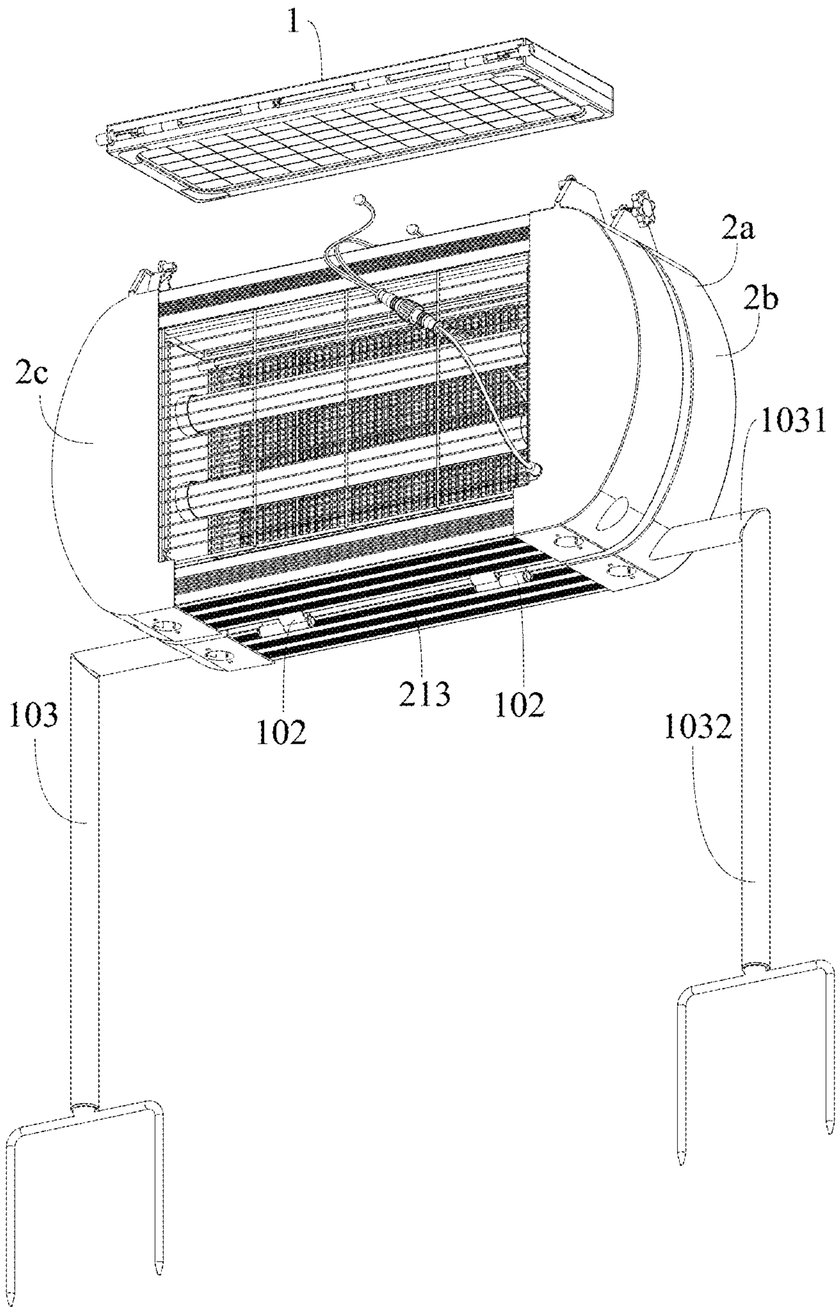

FIG. 144 is a partially exploded view showing the solar mosquito killer of FIG. 142 changes to be a folded state.

Figure 145:
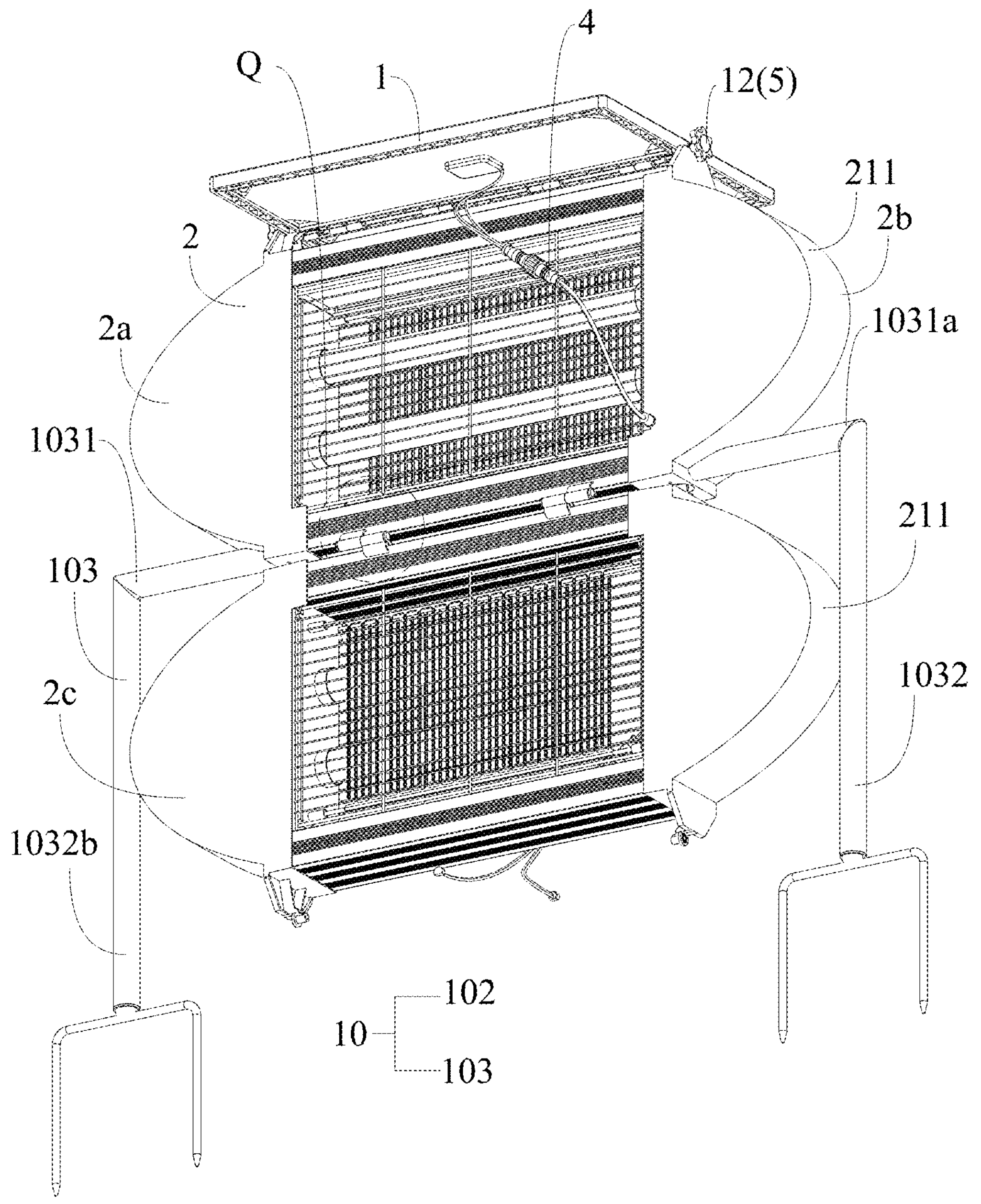

FIG. 145 is a fifth schematic view of the solar mosquito killer in an unfolded state according to a fifth embodiment of present application.

Figure 146:
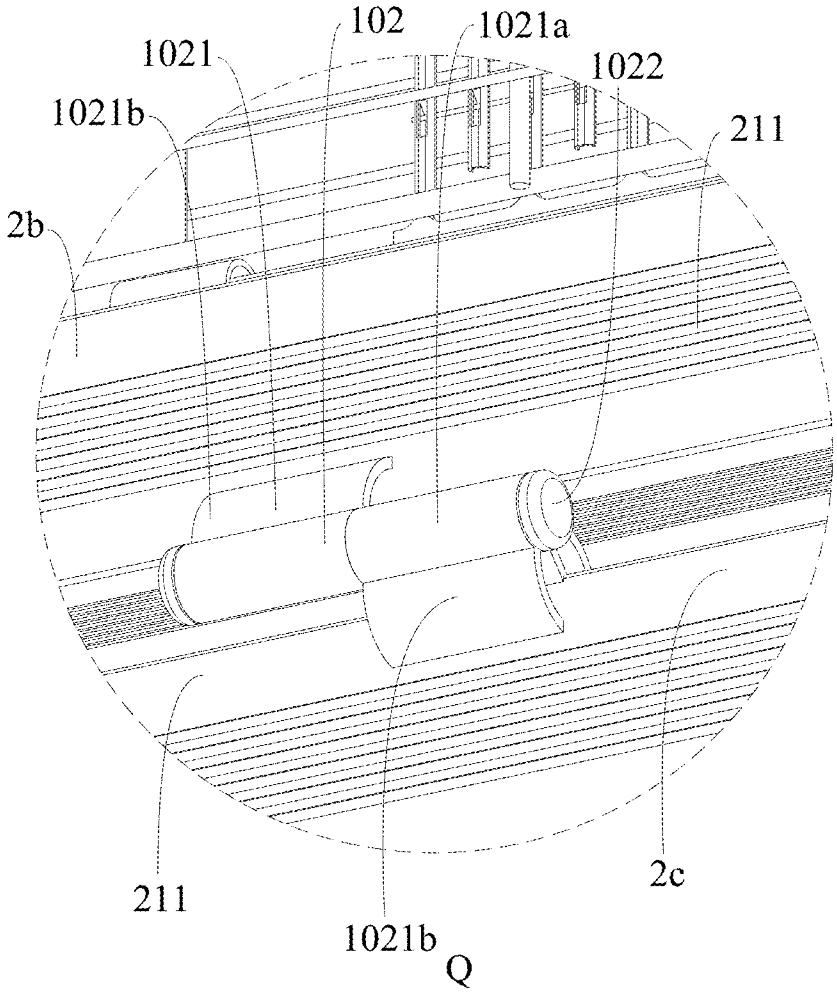

FIG. 146 shows an enlarged view of the P part of FIG. 145.

Figure 147:
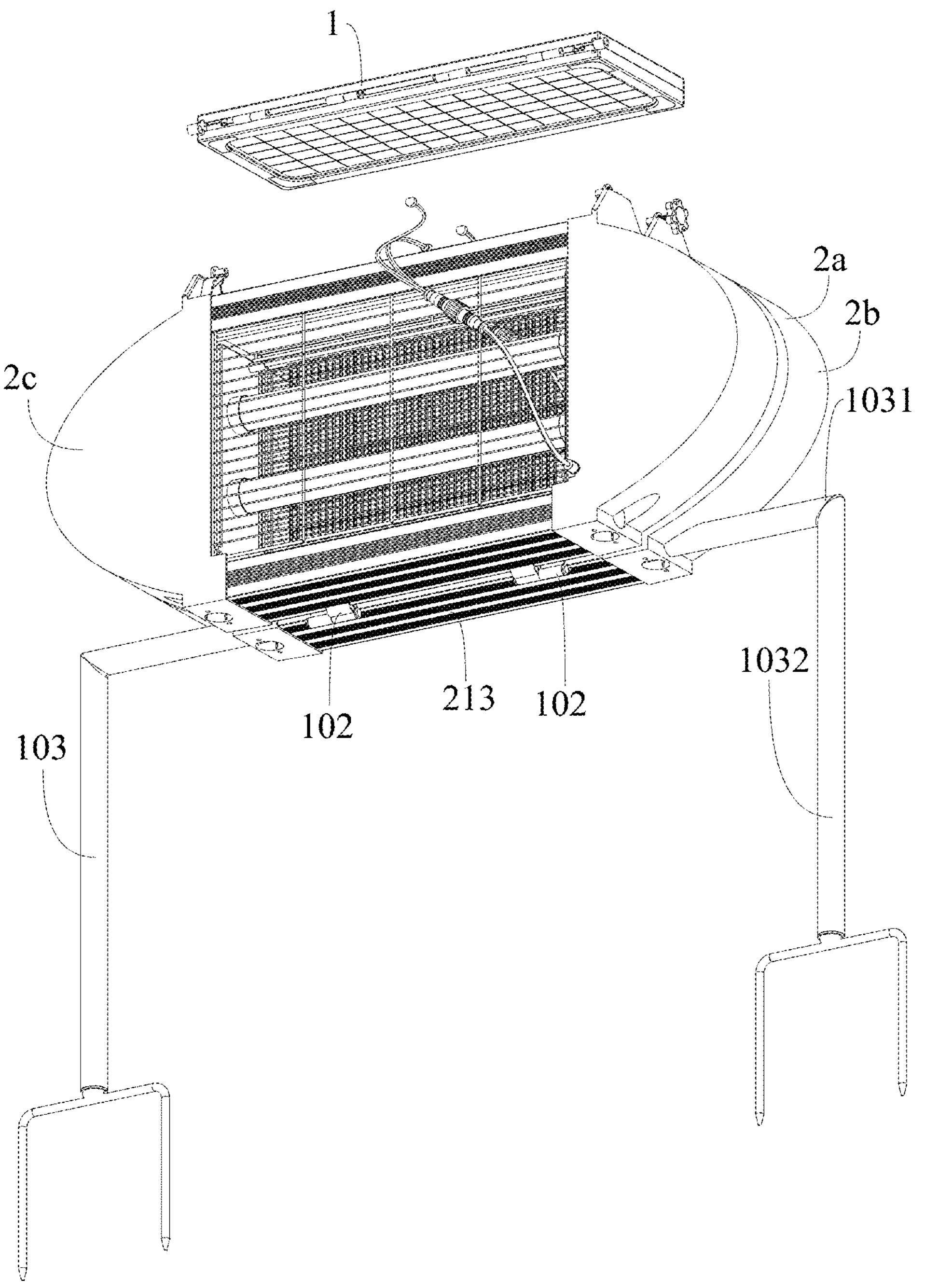

FIG. 147 is a partially exploded view showing the solar mosquito killer of FIG. 145 changes to be a folded state.

Figure 148:
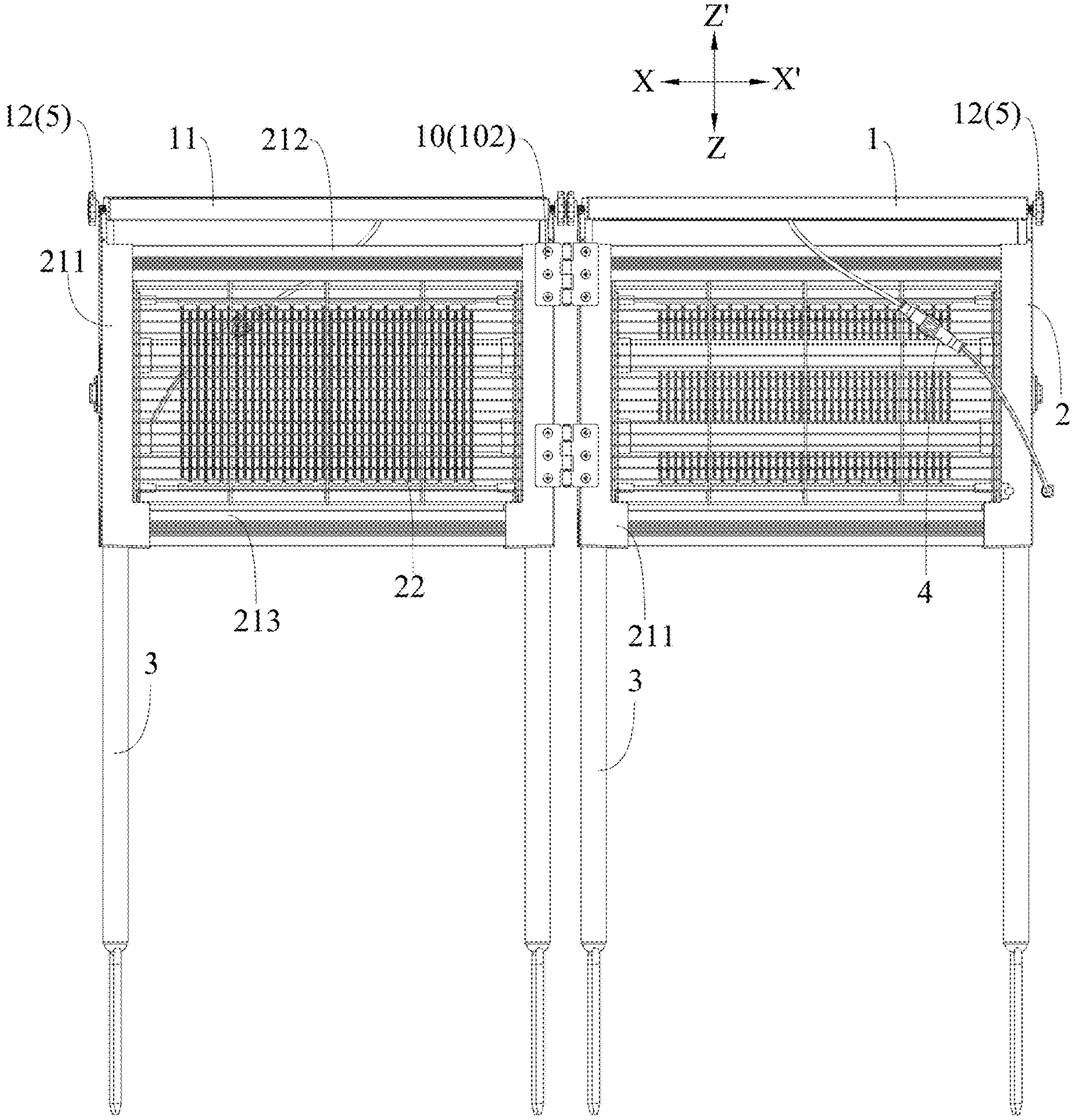

FIG. 148 is a first schematic view of the solar mosquito killer in an unfolded state according to a sixth embodiment of present application.

Figure 149:
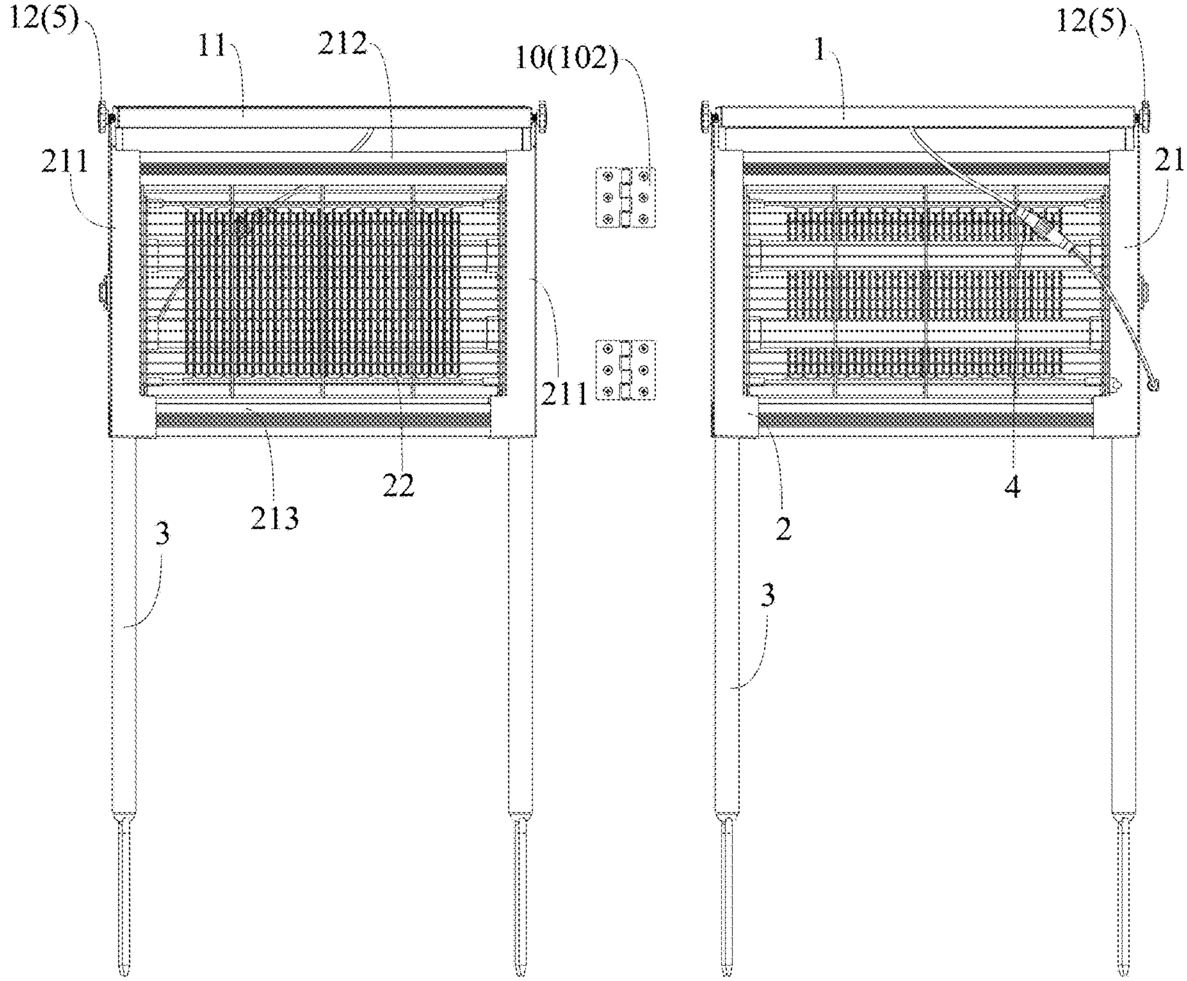

FIG. 149 is an exploded view of the solar mosquito killer of FIG. 148.

Figure 150:
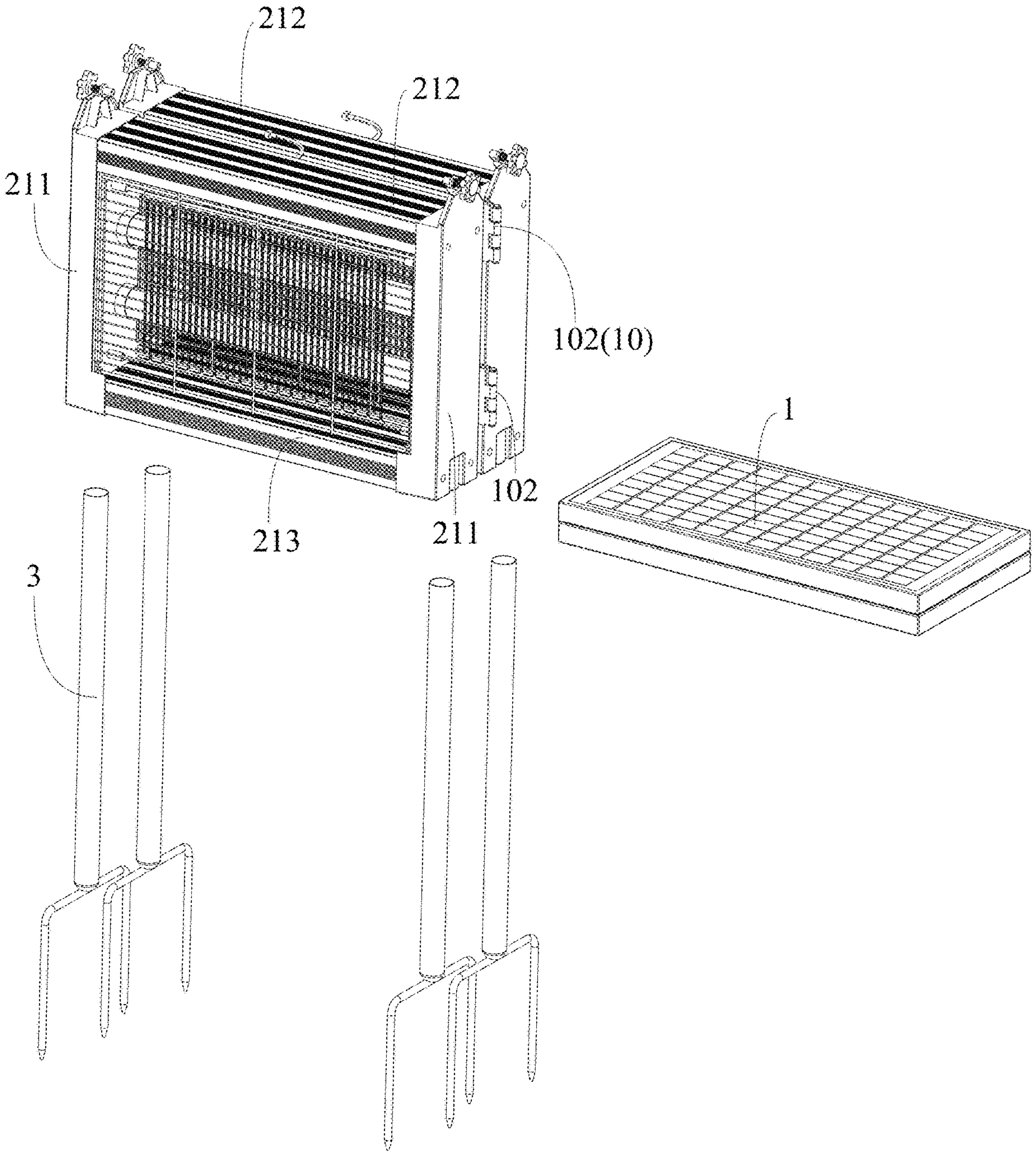

FIG. 150 is a partially exploded view showing the solar mosquito killer of FIG. 148 changes to be a folded state.

Figure 151:
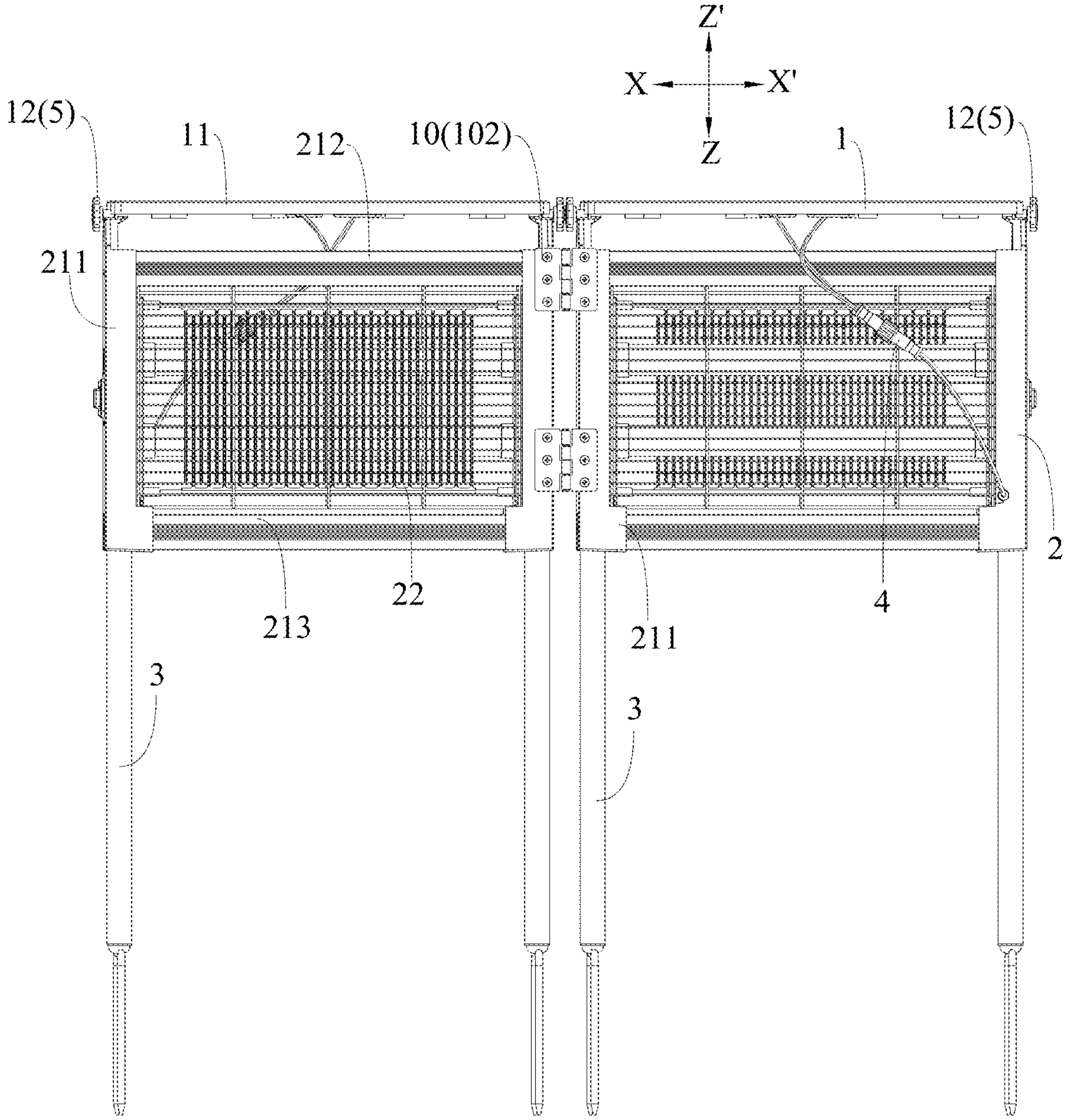

FIG. 151 is a second schematic view of the solar mosquito killer in an unfolded state according to a sixth embodiment of present application.

Figure 152:
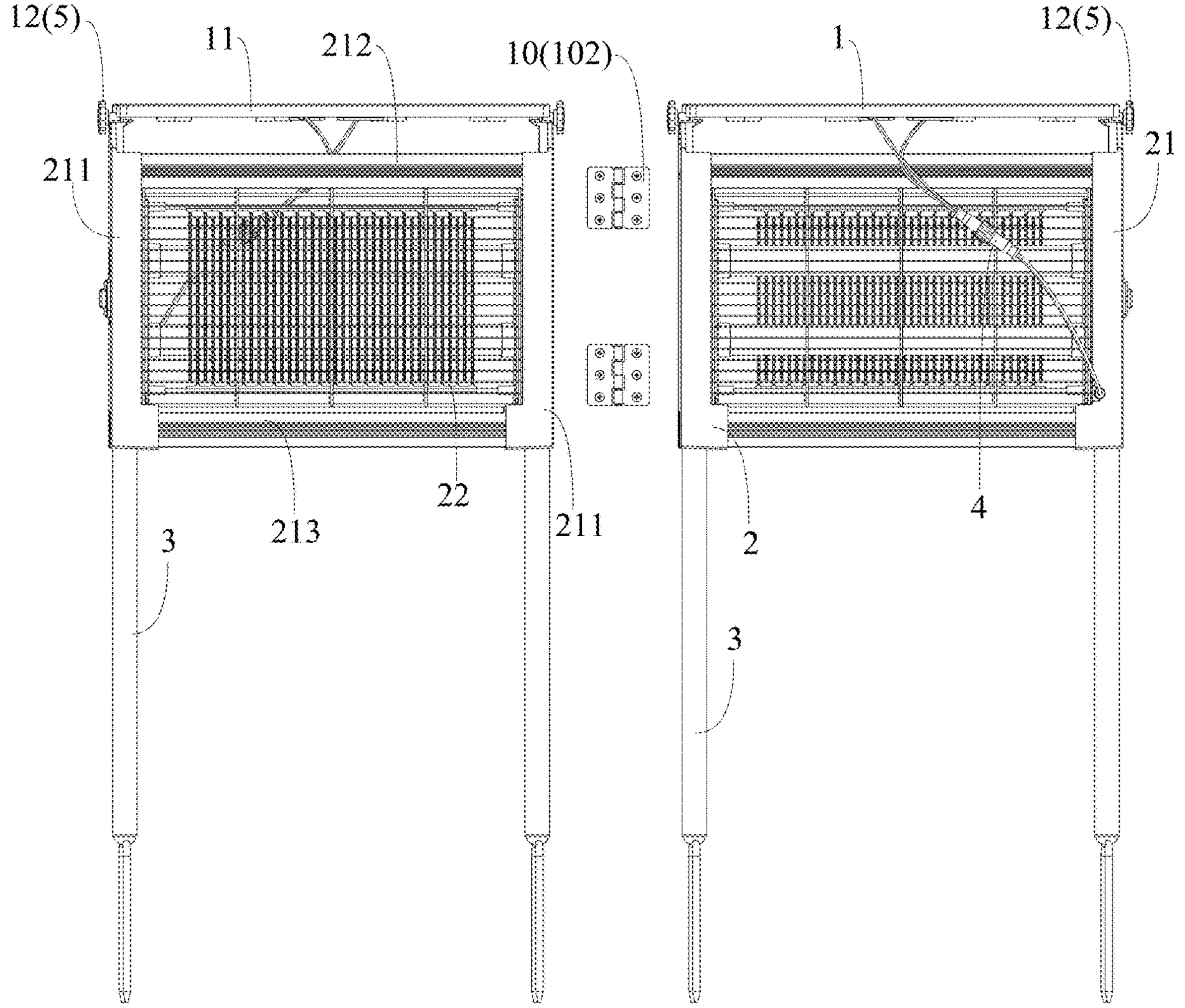

FIG. 152 is an exploded view of the solar mosquito killer of FIG. 151.

Figure 153:
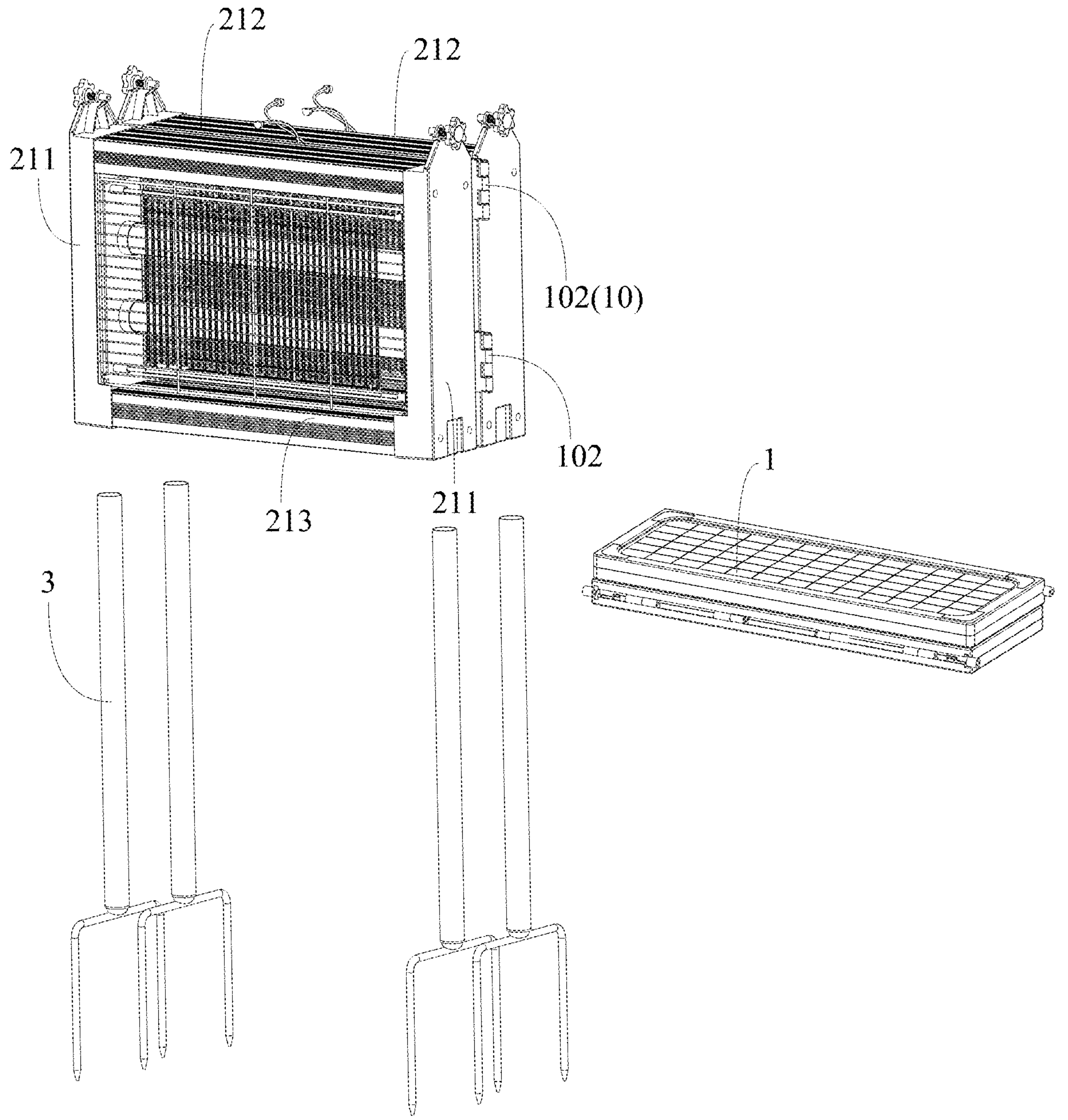

FIG. 153 is a partially exploded view showing the solar mosquito killer of FIG. 151 changes to be a folded state.

Figure 154:
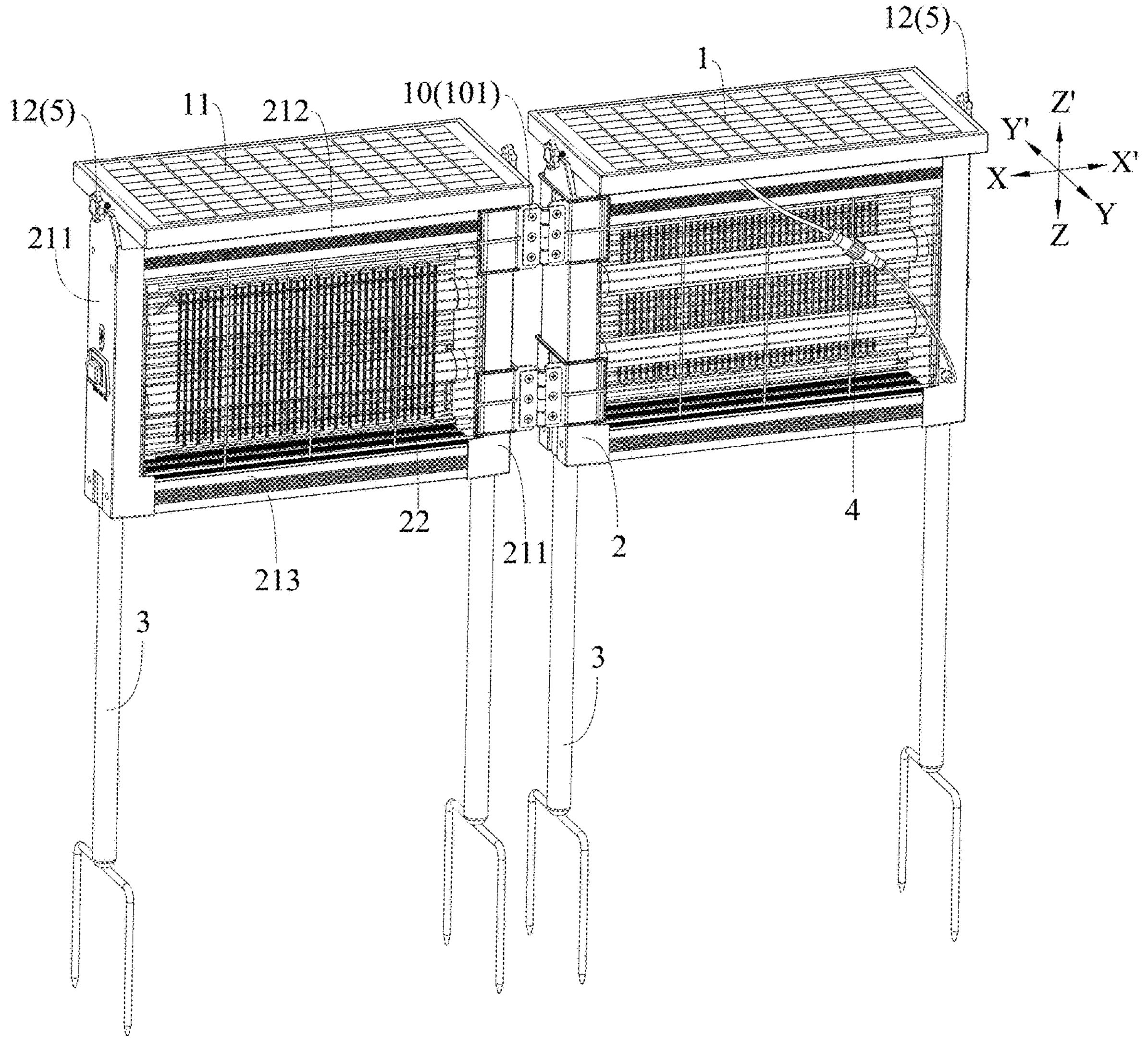

FIG. 154 is a first schematic view of the solar mosquito killer in an unfolded state according to a seventh embodiment of present application.

Figure 155:
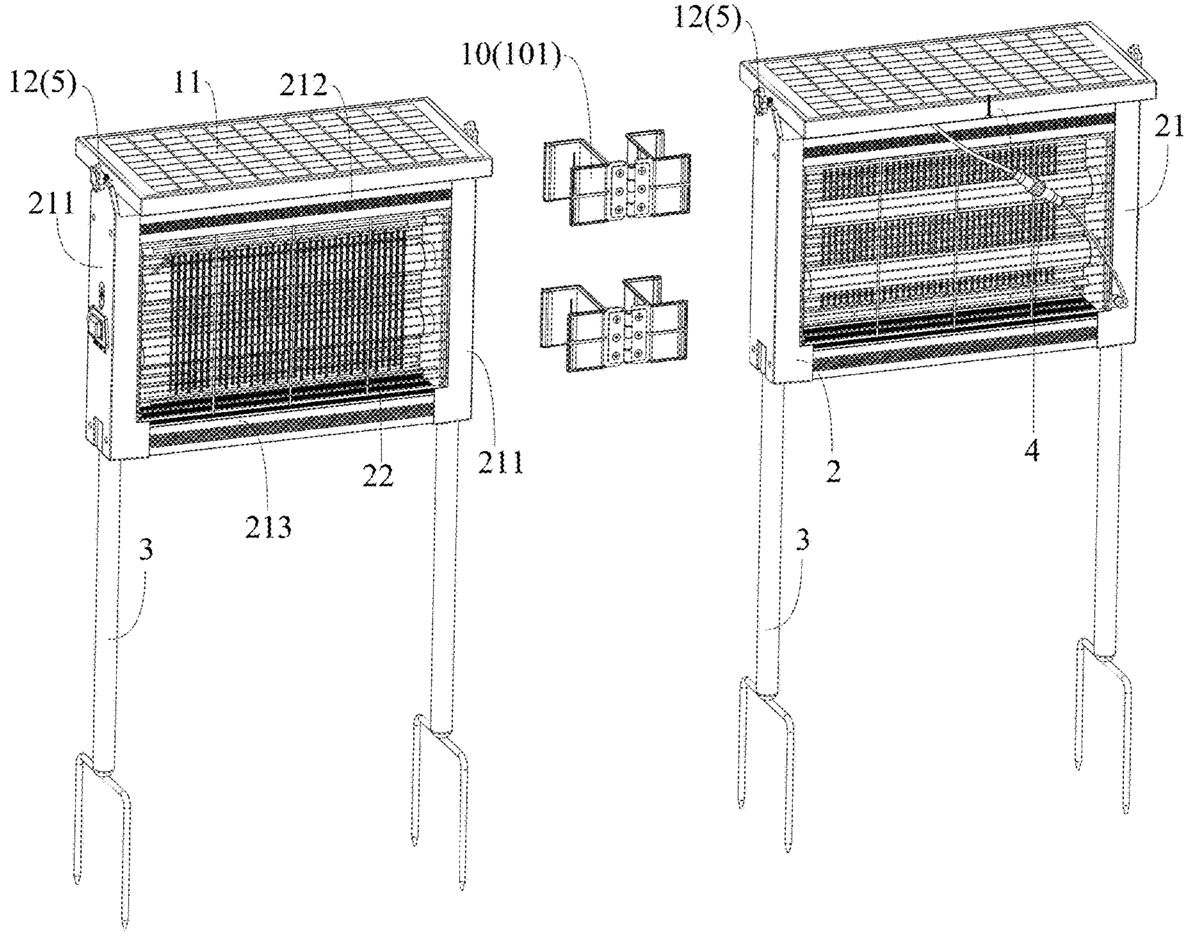

FIG. 155 is an exploded view of the solar mosquito killer of FIG. 154.

Figure 156:
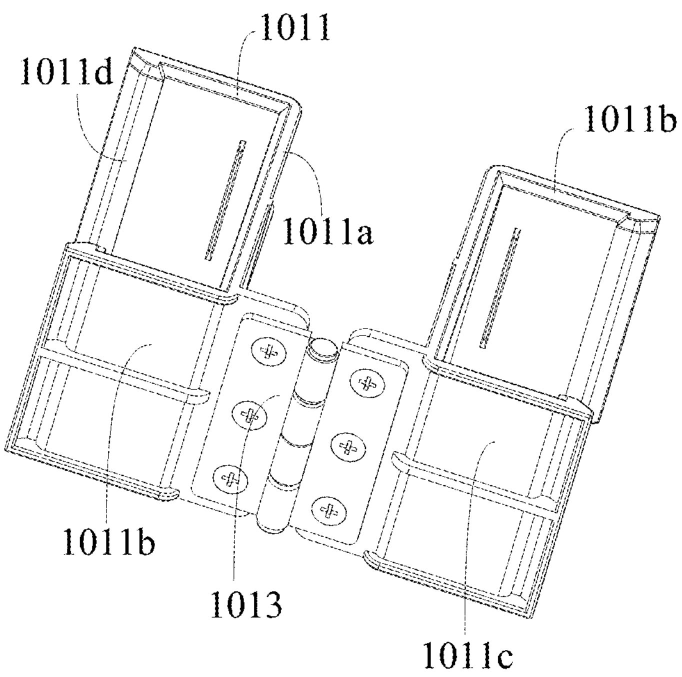

FIG. 156 is a perspective view of the installation component of FIG. 154.

Figure 157:
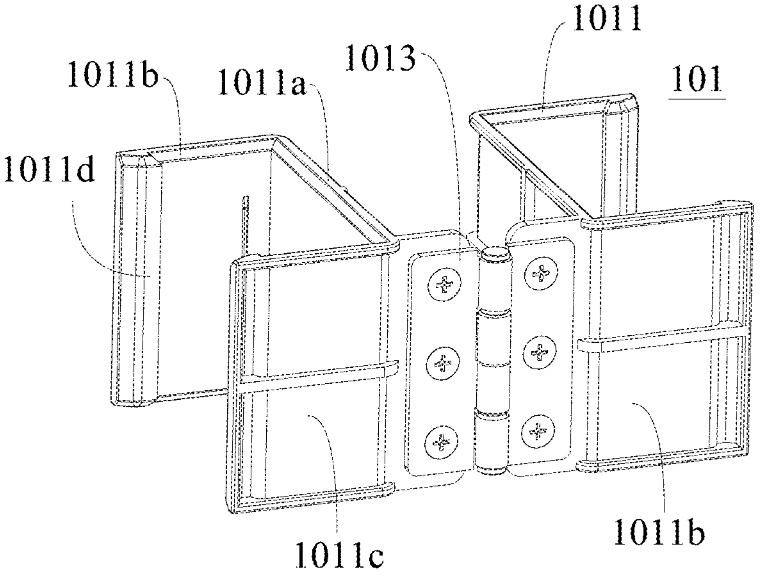

FIG. 157 is another perspective view of the installation component of FIG. 156.

Figure 158:
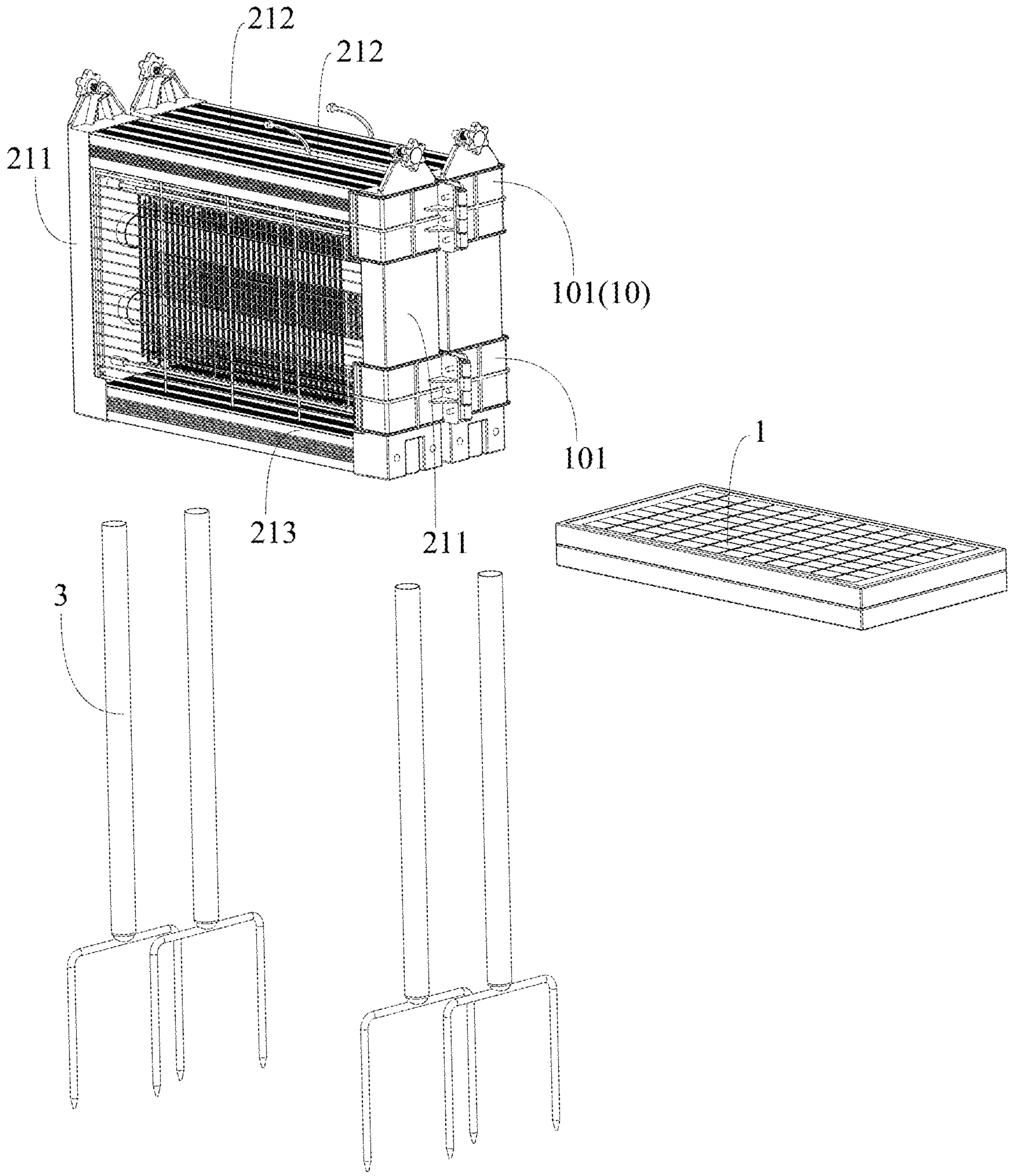

FIG. 158 is a partially exploded view showing the solar mosquito killer of FIG. 154 changes to be a folded state.

Figure 159:
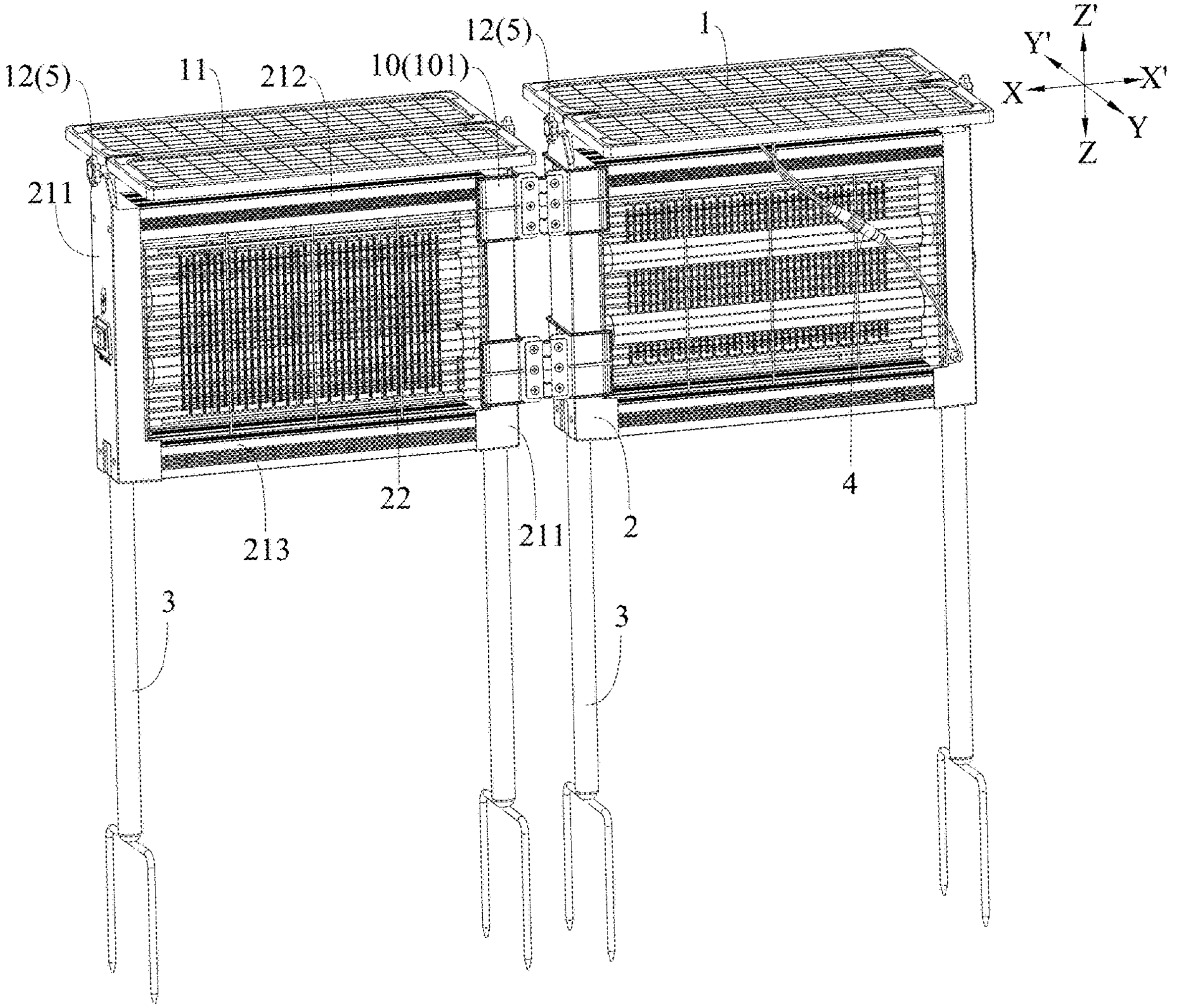

FIG. 159 is a second schematic view of the solar mosquito killer in an unfolded state according to a seventh embodiment of present application.

Figure 160:
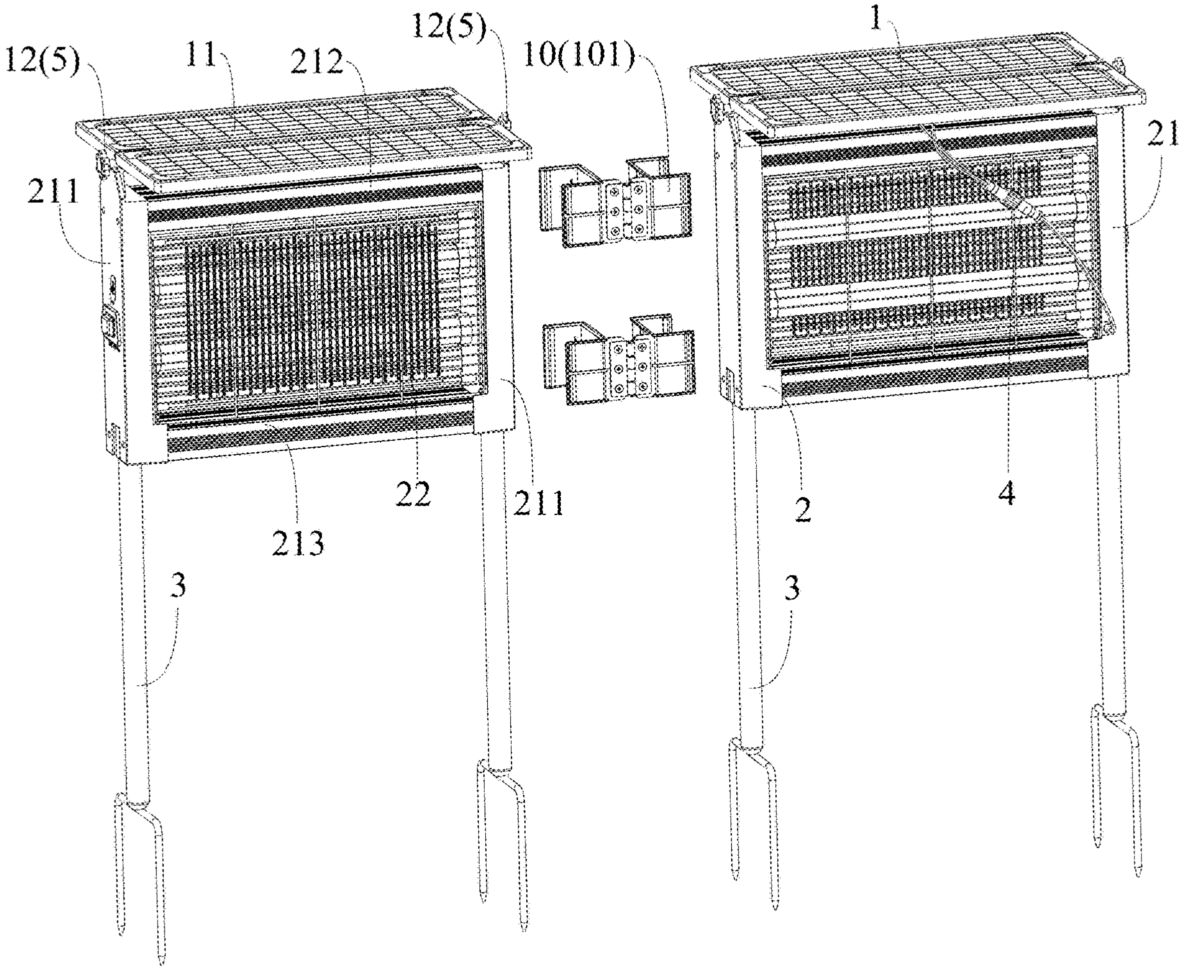

FIG. 160 is an exploded view of the solar mosquito killer of FIG. 159.

Figure 161:
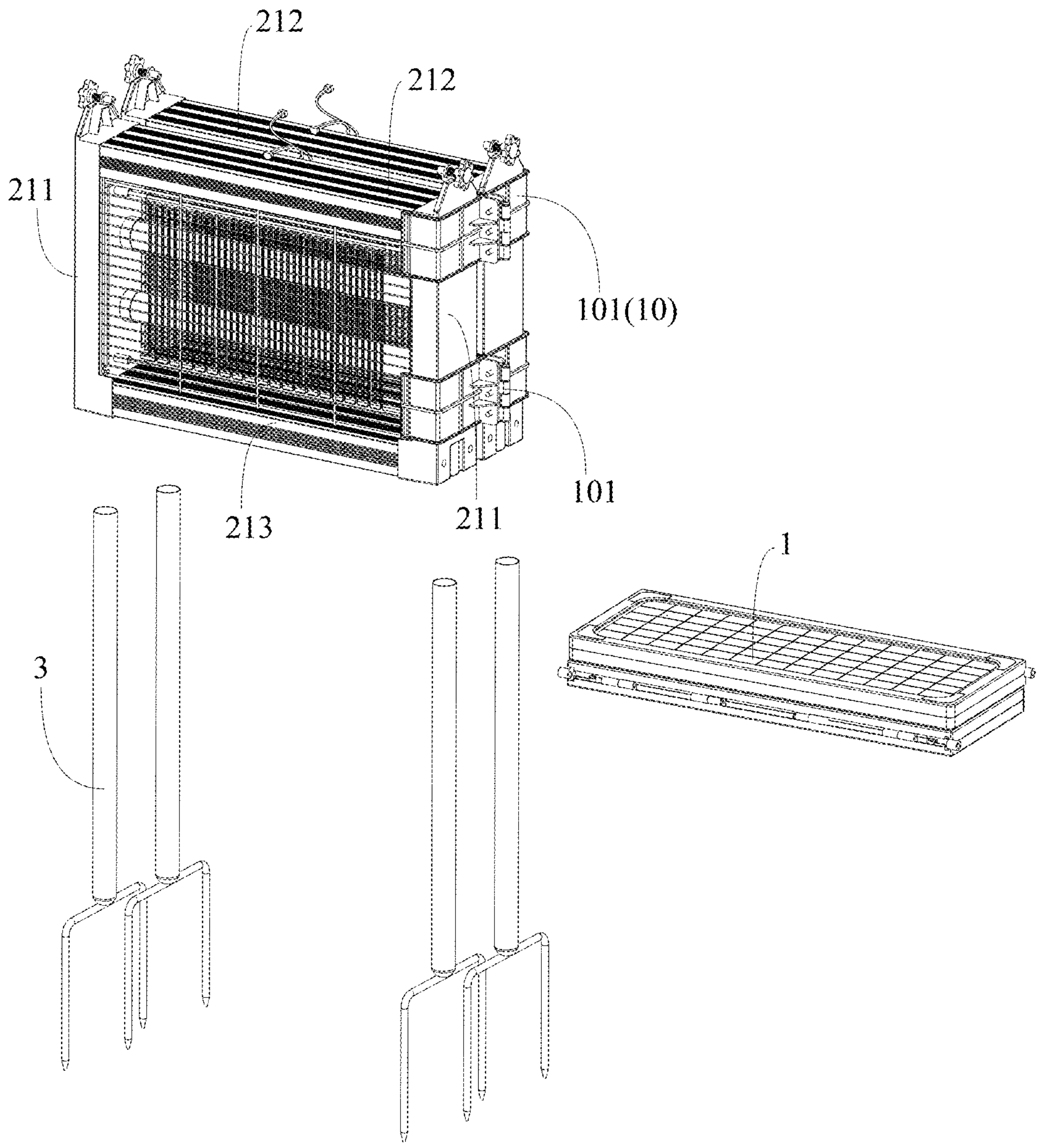

FIG. 161 is a partially exploded view showing the solar mosquito killer of FIG. 159 changes to be a folded state.

Drawing references: solar module 1; solar panel 11; main body 111; base 112; seat body 1121; through hole 1121*a*; rectangular groove 1121*b*; avoidance slot 1121*c*; receiving slot 1121*d*; rotating member 1122; rotating cylinder 1122*a*; rotating shaft 1122*b*; fixing piece 1123; second fixing hole 1123*a*; pressing buckle 113; pressing part 1131; clamping part 1132; connecting piece 12; mosquito killing module 2; mosquito killing unit 2*a*; first mosquito killing module 2*b*; second mosquito killing module 2*c*; frame component 21; circular groove 21*a*; socket 21*b*; mounting hole 210; mounting columns 211; conical end 211*a*; first surface 211*b*; fourth surface 211*c*; fifth surface 211*d*; sixth surface 211*e*; box body 201; cover 202; first insertion holes 2111; second insertion holes 2112; fixing slot 2113; top beam 212; second surface 212*a*; bottom beam 213; third surface 213*a*; first placement slot 2131; protective net 214; frame body 215; first outer side surface 215*a*; second outer side surface 215*b*; connecting member 216; electric grid 22; positive electrode component 221; positive electrode connecting part 2211; positive electrode strip 2212; first hook 2213; negative electrode component 222; negative electrode connecting part 2221; negative electrode strip 2222; second hook 2223; connecting strip 223; control component 23; switch control circuit 232; button 24; flexible waterproof cover 25; main body portion 251; connecting portion 252; connecting head 253; mosquito trap lamp 26; lampshade 261; shade body 2611; fixing portion 2612; circuit board assembly 262; circuit board 2621; light emitting element 2622; first light emitting element 2622*a*; second light emitting element 2622*b*; light emitting chip 2622*c*; convex lens structure 2622*d*; main circuit board 28; power supply interface component 29; protective cap 291; another opening 292; supporting module 3; insert component 31; supporting column 310; opening 310*a*; ground plug 311; grounding structure 3111; U-shaped structure 3111*a*; grounding strip 3111*b*; connecting column 3112; electrical connection component 4; first electrical connector 41; first wire 41*a*; second electrical connector 42; second wire 42*a*; hole end connector 401; limiting protrusion 4011; hole 4012; guide groove 4013; pin end connector 402; external threads 4021; pin 4022; surrounding wall 4023; guide shaft 4024; waterproof sealing ring 43; connecting cover 44; internal threads 441; buckle structure 45; buckle 451; hook 452; bolt 5; cap body 51; bolt body 52; installation member 6; electrical connection installation part 61; the other electrical connection installation part 62; hanging chain 7; hanging chain connector 71; battery 8; operating part 254; convex platform structure 21*d*; annular convex edge 21*c*; first sub-groove 210*a*; second sub-groove 210*b*; first step portion 210*c*; second step portion 210*d*; annular protrusion 252*a*; first receiving portion 251*a*; second receiving portion 251*b*; third receiving portion 251*c*; installation structure 10; installation component 101; installation part 1011; first surrounding wall 1011*a*; second surrounding walls 1011*b*; clamping structure 1011*c*; limiting flange 1011*d*; connection part 1012; first connecting wall 1012*a*; second connecting wall 1012*b*; third connecting wall 1012*d*; hollow area 1012*e*; hollow hole 1012*f*; second hinge 1013; adapter 102; adapter part 1021; rotating shaft 1022; hinge 1023; installation frame 103; installation body 1031; installation foot 1032; installation rod 1031*a*; installation sub-rods 1031*b*; T-shaped supporting rods 1032*a*; U-shaped ground plug 1032*b*; lengthwise direction XX'; width direction YY'; height direction ZZ'.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

In order to make the above objectives, features, and advantages of the present application more obvious and understandable, the following will provide further detailed explanations of the present application in conjunction with the accompanying drawings and specific implementation methods.

Embodiment 1

Figure 1:
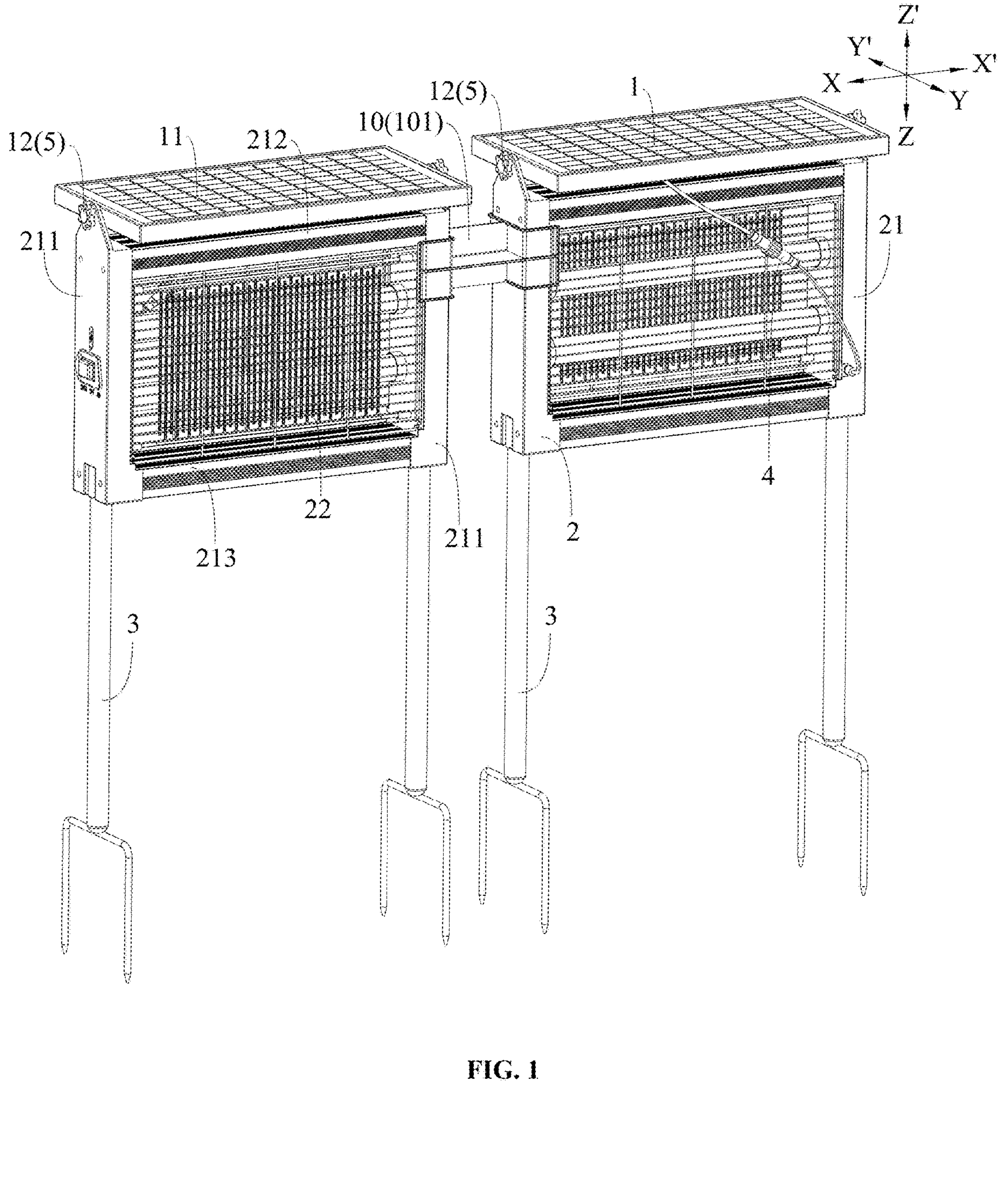
FIG. 1 is a first schematic view of a solar mosquito killer according to a first embodiment of the present disclosure.
Figure 2:
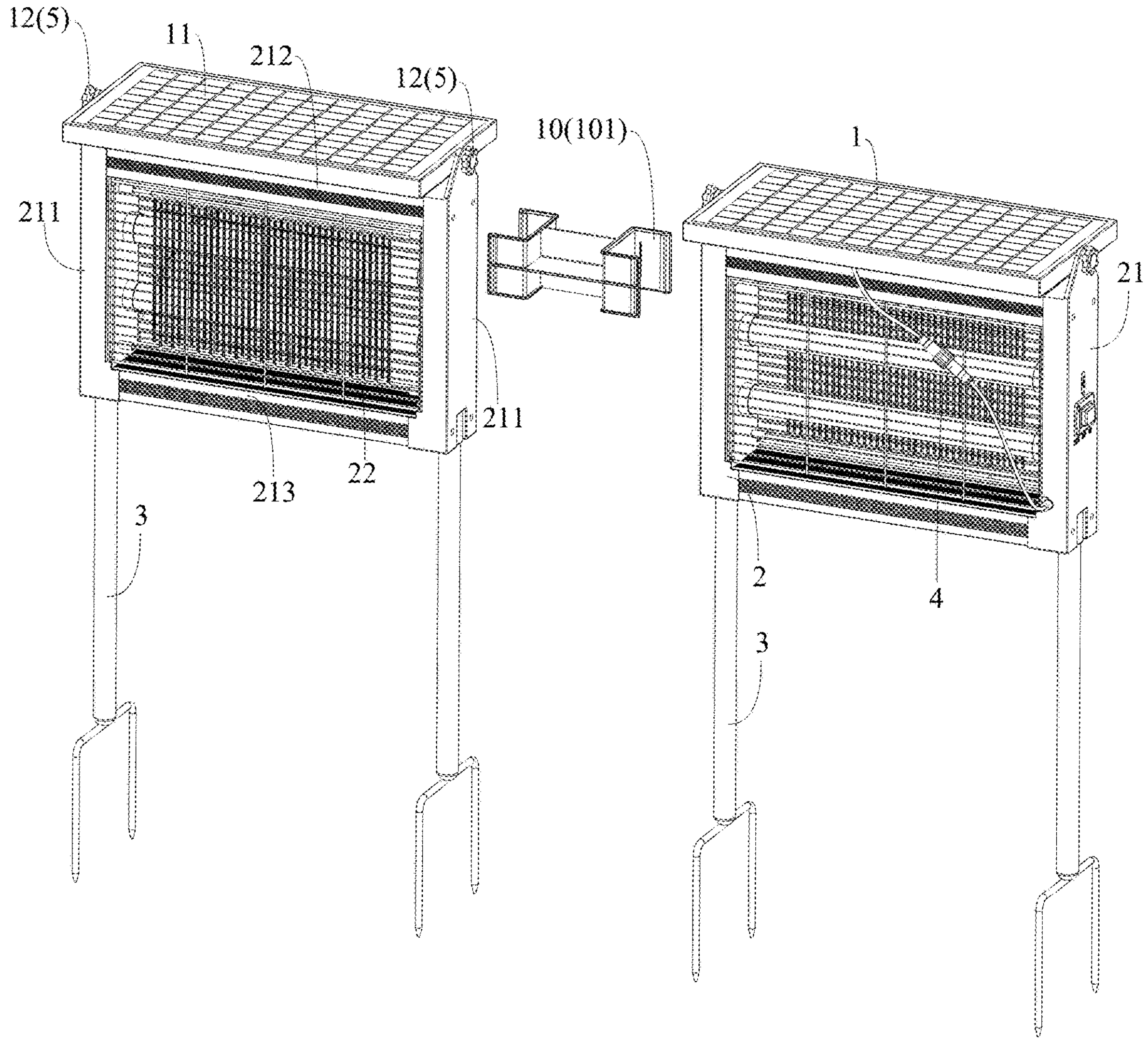
FIG. 2 shows the mosquito killing modules of the solar mosquito killer of FIG. 1 are separated.

Please refer to FIGS. 1 to 2, the first embodiment of the present application provides a solar mosquito killer, which includes a plurality of mosquito killing modules 2, at least one solar module 1, and a installation structure 10. The at least one solar module 1 is electrically connected to the plurality of mosquito killing modules 2 to power the plurality of mosquito killing modules 2. The installation structure 10 is configured for connecting the plurality of mosquito killing modules 2 as a whole. Due to the installation structure 10, the plurality of mosquito killing modules 2 form one device which can effectively increase the mosquito killing range of the solar mosquito killer. By designing the solar module 1, it is suitable for converting solar energy into electrical energy to provide the necessary electricity for mosquito killing module 2 during operation, solar energy is a green energy source that can save resources and reduce pollution. Multiple mosquito killing modules 2 are independent of each other, and users can choose the number of mosquito killing modules 2 they need to activate according to their actual environment, which can further reduce resource waste.

The number of solar modules 1 can be one or multiple (two or more); for example, when the number of solar modules 1 is one, this one solar module 1 is used to electrically connect with all mosquito killing modules 2, in order to supply power to all mosquito killing modules 2. In other situations, when there are multiple solar modules 1, each solar module 1 is electrically connected to at least one mosquito killing module 2 to provide power to at least one mosquito killing module 2.

For each solar module 1, the solar module 1 includes a solar panel 11 and a connecting piece 12. The solar panel 11 is used to convert solar energy into electrical energy, and the connecting piece 12 is used to detachably connect the solar panel 11 to a frame component 21 (as described below) of the mosquito killing module 2. Among them, the number of solar panels 11 can also be one or multiple, and the angle of the solar panel 11 relative to the plane where the window of the frame component 21 is located can be adjusted. In this way, the angle of the solar panel 11 relative to the plane where the window of the frame component 21 is located can be adjusted according to the orientation of the sun at different time periods, so that the light receiving surface of the solar panel 11 faces the sun as much as possible, in order to improve the power generation efficiency of the solar panel 11.

For each mosquito killing module 2, the mosquito killing module 2 includes a frame component 21 and an electric grid 22 set in the frame component 21. The solar module 1 is located on one side of the mosquito killing module 2 and connected to the frame component 21 of the mosquito killing module 2. Among them, the frame component 21 serves as the framework of the mosquito killing module 2, providing support for components such as the electric grid 22 which is used to kill mosquitoes. Mosquitoes fly into the frame component 21 and come into contact with the electric grid 22 under the action of the mosquito trap lamp 26 (described below) of the mosquito killing module 2. Mosquitoes form a conductive circuit with the electric grid 22, and current flows through the conductive circuit to electrocute mosquitoes.

Figure 3:
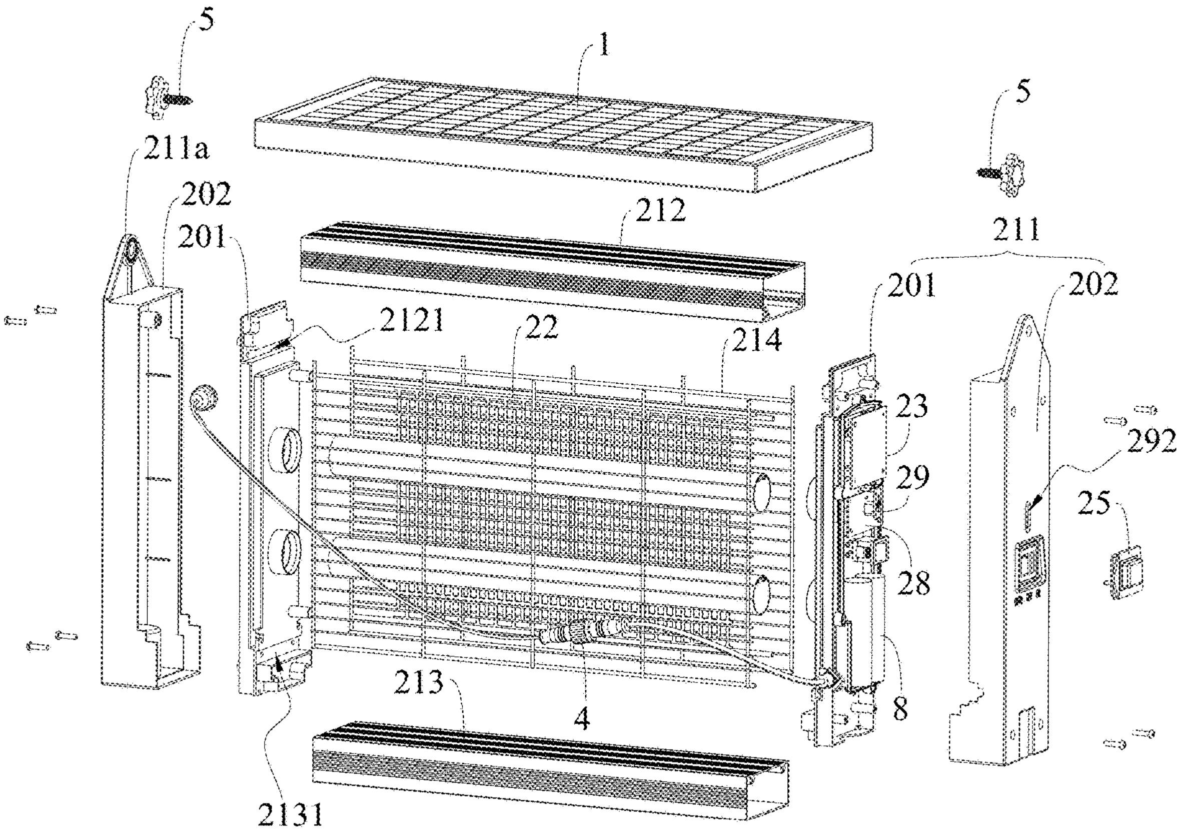
FIG. 3 is a first exploded view of the mosquito killing modules.
Figure 4:
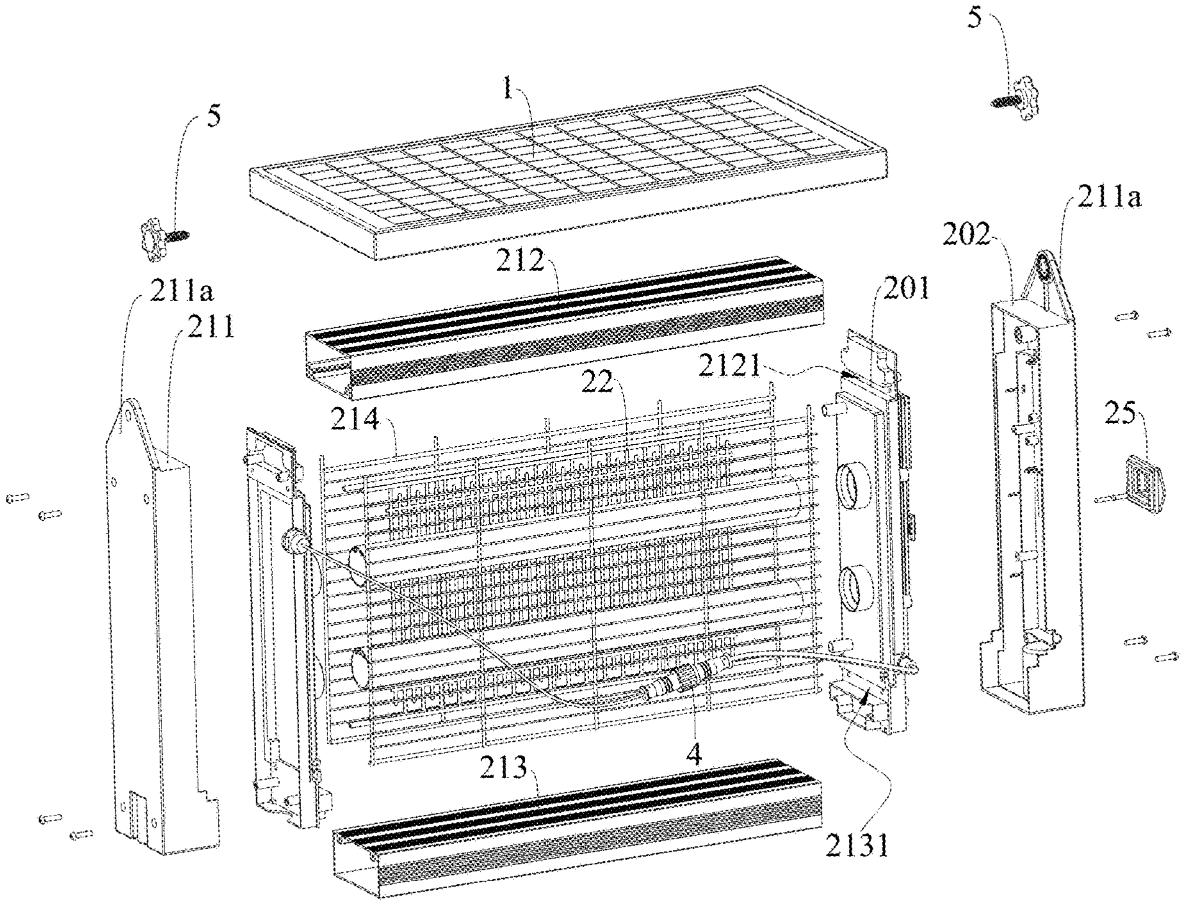
FIG. 4 is a second exploded view of the mosquito killing modules.
Figure 5:
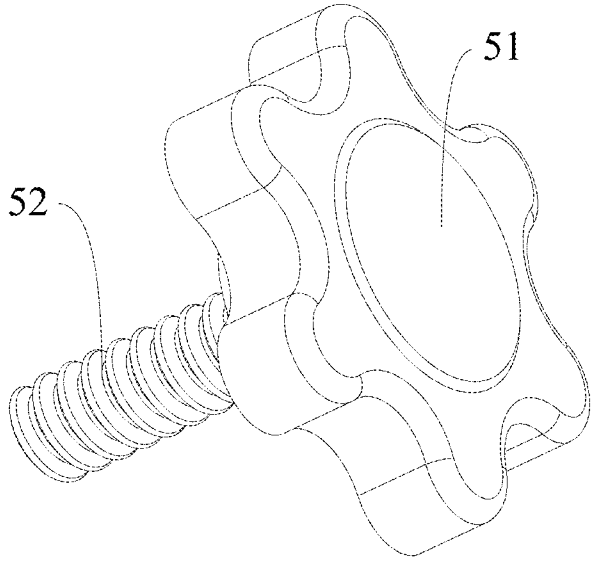
FIG. 5 is a schematic view of a first bolt of the solar mosquito killer according to a first embodiment of present application.
Figure 6:
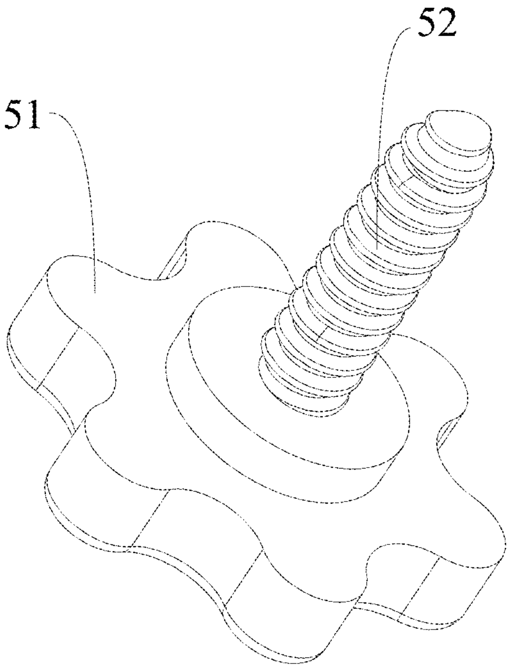
FIG. 6 shows another view of the first bolt of FIG. 5.
Figure 7:
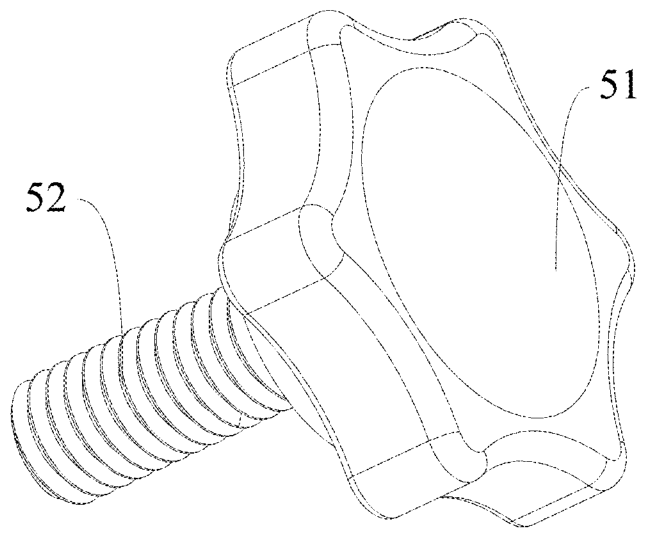
FIG. 7 is a schematic view of a second bolt of the solar mosquito killer according to a first embodiment of present application.
Figure 8:
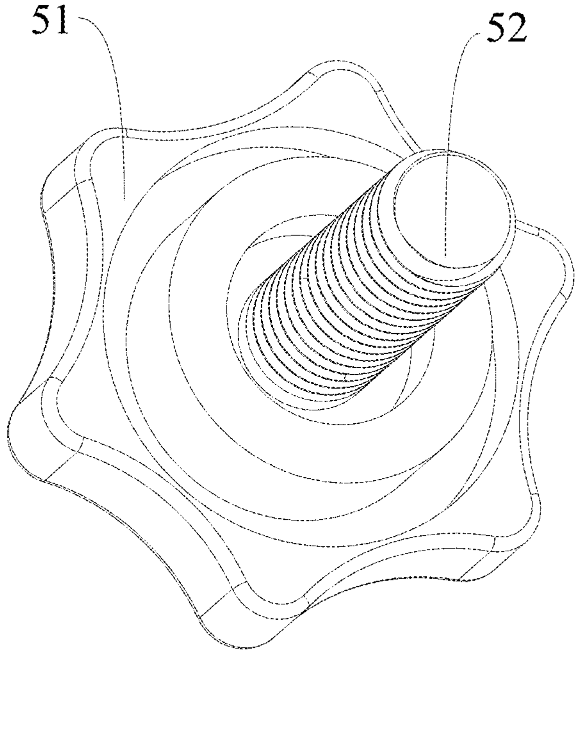
FIG. 8 shows another view of the second bolt of FIG. 7.
Figure 9:
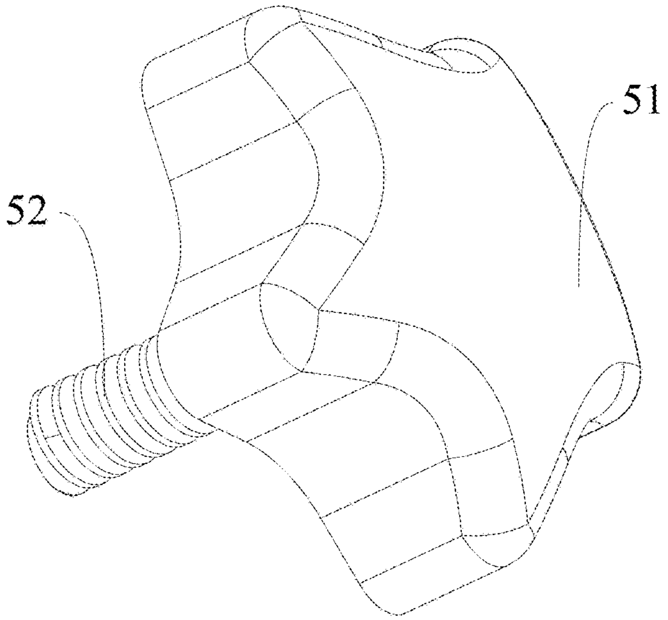
FIG. 9 is a schematic view of a third bolt of the solar mosquito killer according to a first embodiment of present application.
Figure 10:
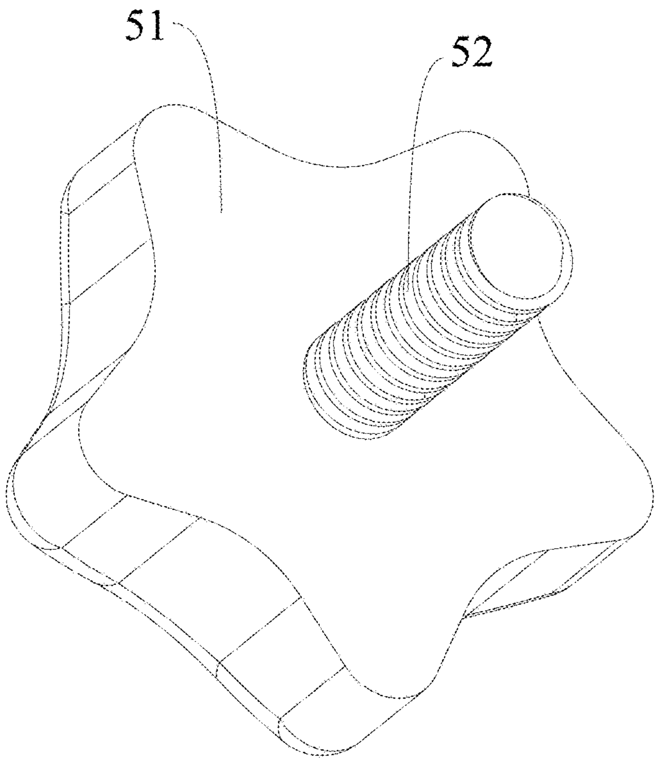
FIG. 10 shows another view of the third bolt of FIG. 9.
Figure 11:
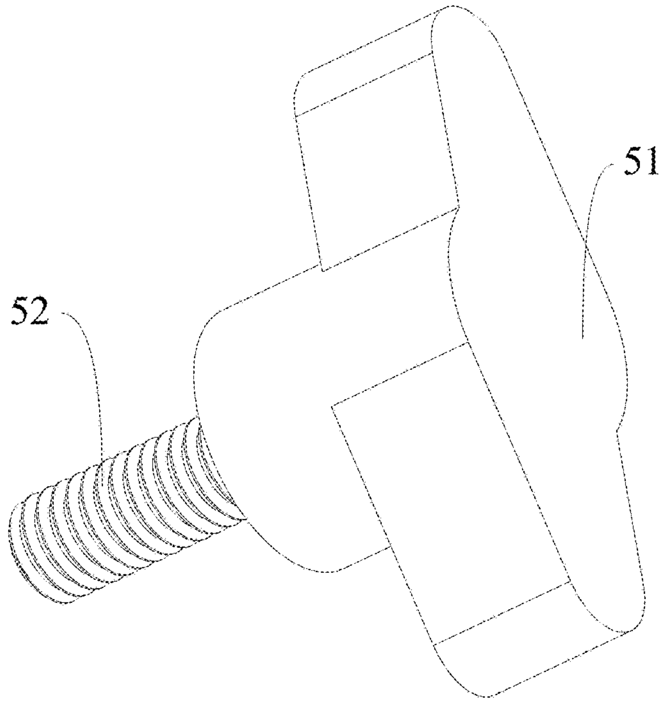
FIG. 11 is a schematic view of a fourth bolt of the solar mosquito killer according to a first embodiment of present application.
Figure 12:
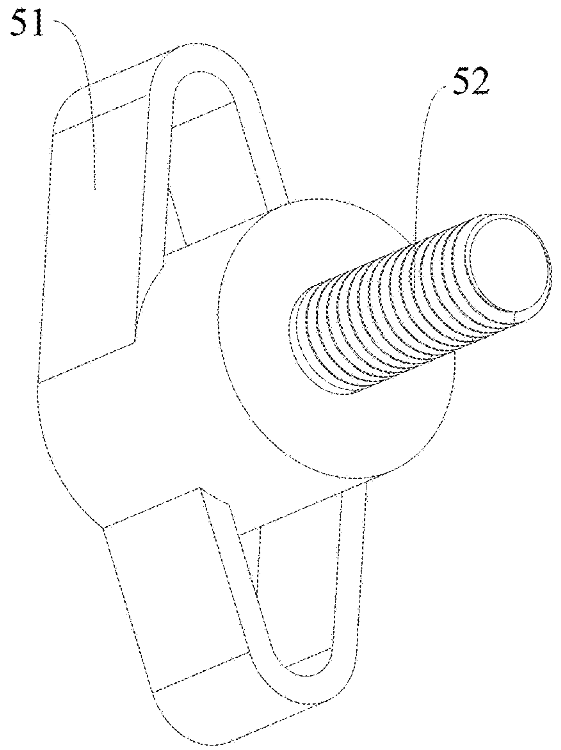
FIG. 12 shows another view of the fourth bolt of FIG. 11.
Figure 13:
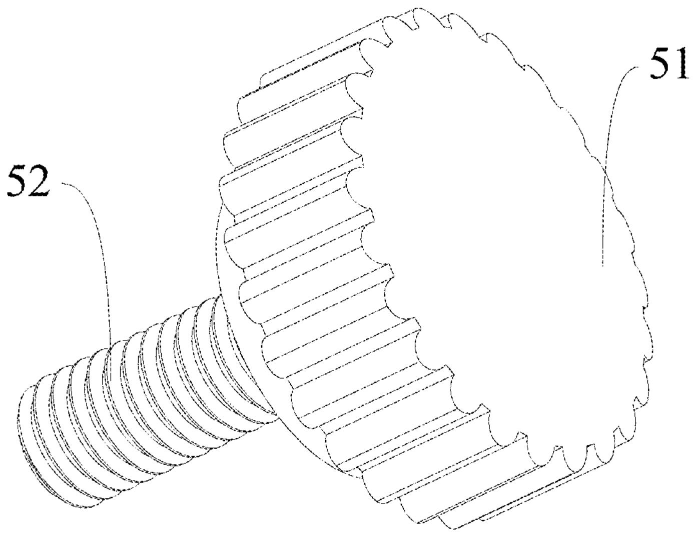
FIG. 13 is a schematic view of a fifth bolt of the solar mosquito killer according to a first embodiment of present application.
Figure 14:
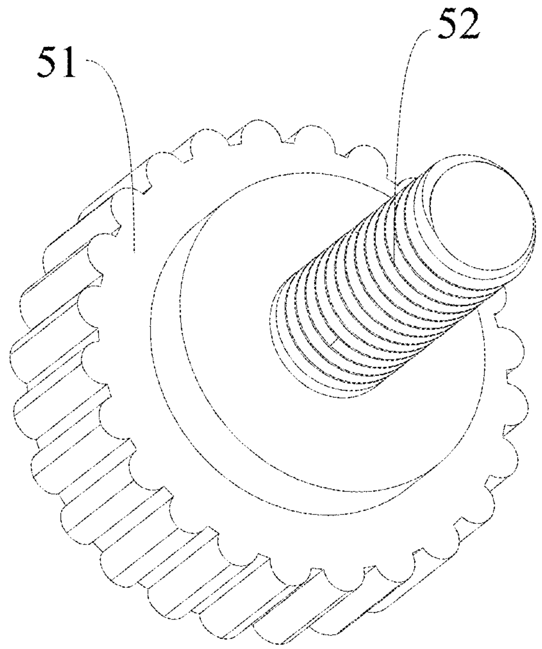
FIG. 14 shows another view of the fifth bolt of FIG. 13.
Figure 15:
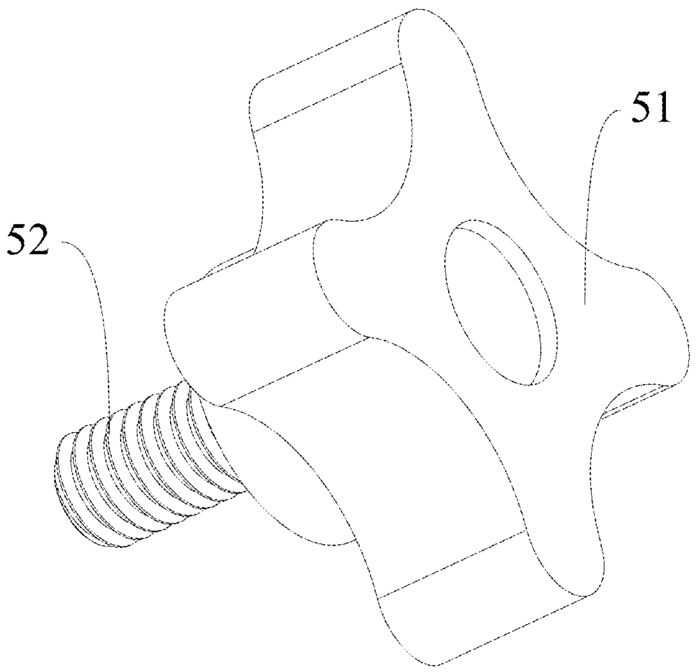
FIG. 15 is a schematic view of a sixth bolt of the solar mosquito killer according to a first embodiment of present application.
Figure 16:
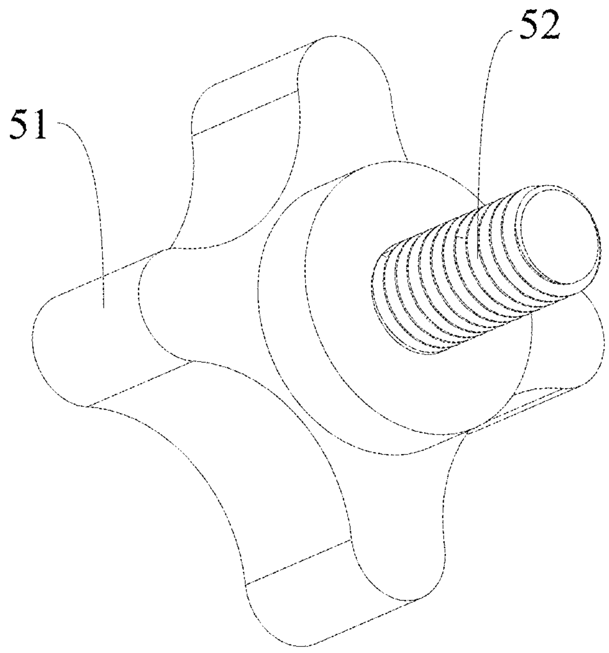
FIG. 16 shows another view of the sixth bolt of FIG. 15.

Specially, as shown in FIGS. 3 and 4, the frame component 21 includes two mounting columns 211, a top beam 212, and a bottom beam 213, the two mounting columns 211 are arranged opposite to each other, and the top beam 212 is arranged opposite to the bottom beam 213, the two mounting columns 211, the top beam 212, and the bottom beam 213 are connected to jointly enclose and form the above-mentioned window.

The top ends of the two mounting columns 211 are tapered to form a tapered end 211*a*, and the connecting piece 12 is used to detachably connect the solar panel 11 to the tapered end 211*a* of the mounting column 211. The connecting piece 12 is bolt 5, which is a hand tightened bolt 5, and bolt 5 includes a cap body 51 and a screw body 52 fixedly connected to cap body 51. A user can hold cap body 51 and rotates it to drive the screw body 52 to rotate, so that the screw body 52 of bolt 5 is threaded with the tapered end 211*a* of the mounting column 211, thereby achieving the installation between the solar panel 11 and the tapered ends 211*a* of the two mounting columns 211, or separating the screw body 52 of bolt 5 from the tapered ends 211*a* of the two mounting columns 211, thereby achieving the disassembly between the solar panel 11 and the tapered ends 211*a* of the two mounting columns 211. As shown in FIGS. 5 to 16, the first embodiment of the present application illustrates several bolts 5 with different structures of the cap body 51, designers can choose at least one bolt 5 with a cap body 51 structure according to actual needs to install and remove the solar panel 11.

Figure 17:
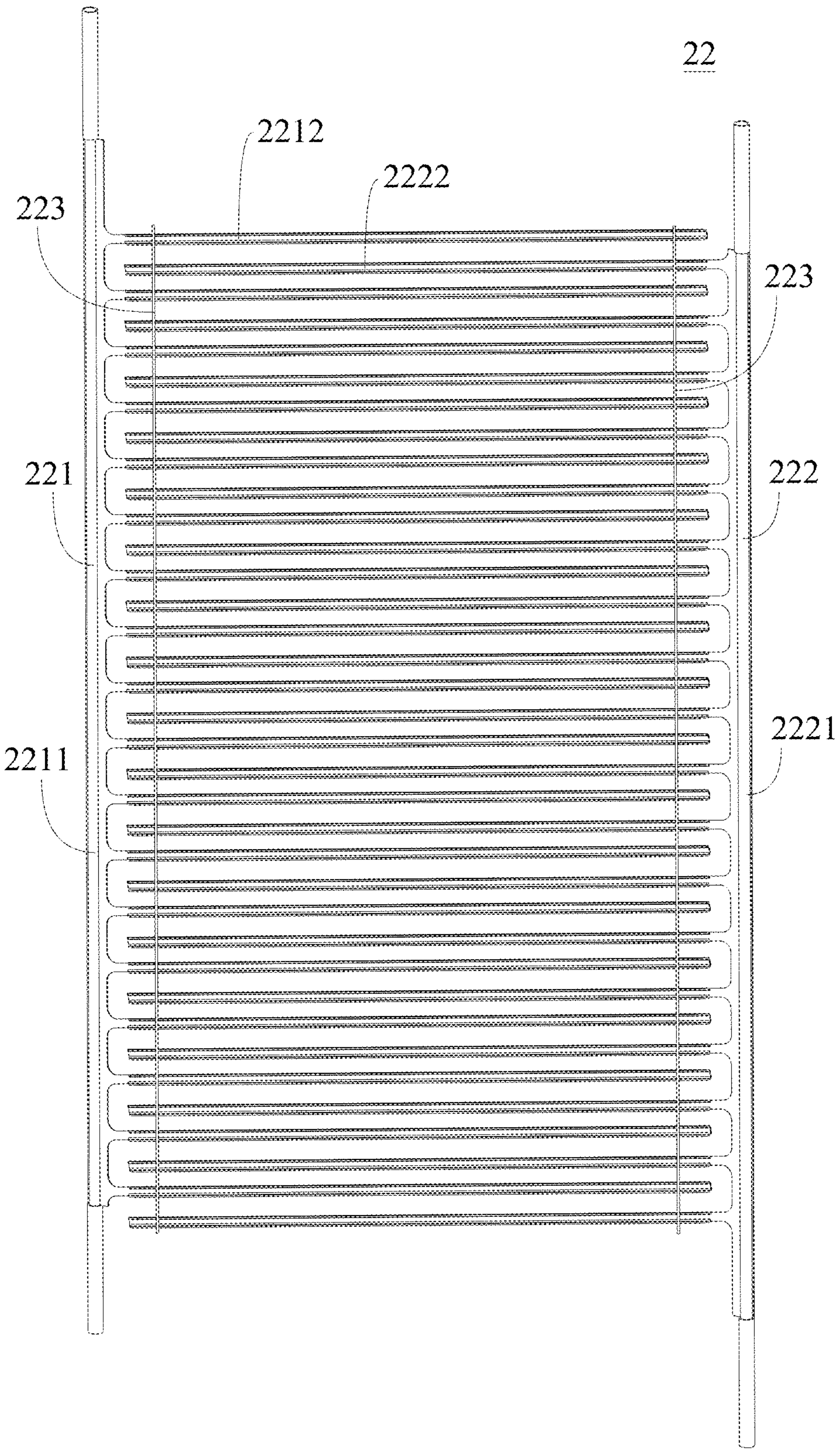
FIG. 17 is a first schematic view of the electric grid of the solar mosquito killer according to a first embodiment of present application.
Figure 18:
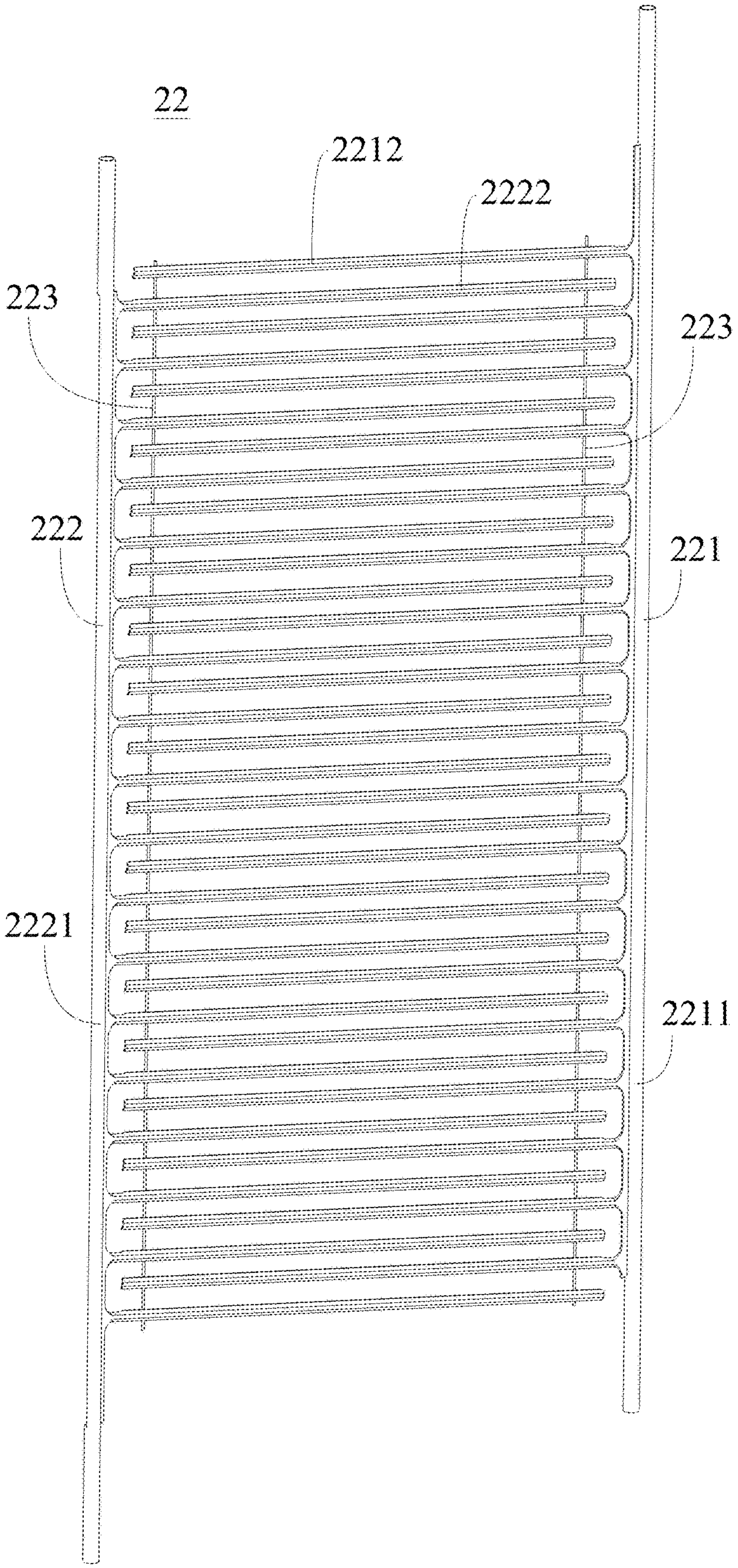
FIG. 18 shows another view of the electric grid of FIG. 17.

Referring to FIG. 17-18, the electric grid 22 includes a positive electrode component 221, a negative electrode component 222, and at least one connecting strip 223; the positive electrode component 221 includes a positive electrode connecting part 2211 and multiple positive electrode strips 2212 sequentially connected to the positive electrode connecting part 2211; the negative electrode component 222 includes a negative electrode connecting part 2221 and multiple negative electrode strips 2222 sequentially connected to the negative electrode connecting part 2221. Multiple positive electrode strips 2212 and multiple negative electrode strips 2222 are alternately arranged at intervals and located between the positive electrode connecting part 2211 and the negative electrode connecting part 2221; and at least one connecting strip 223 integrates multiple positive electrode strips 2212 and multiple negative electrode strips 2222 as a whole. The connecting strip 223 plays a role in fixing and connecting multiple positive electrode strips 2212 and multiple negative electrode strips 2222 together, and also serves as insulation between the positive and negative electrodes. The setting of the structure of this electric grid 22 is mainly to kill mosquitoes and insects through the positive and negative pole structures. When mosquitoes and insects land on the electric grid 22, they come into contact with the adjacent positive electrode strip 2212 and negative electrode strip 2222 to form a conductive circuit, and current flows through the conductive circuit to electrocute the mosquitoes and insects. As the insulating and fixing function of the connecting strip 223, which is located in the middle of the entire frame component 21, and the multiple positive electrode strips 2212 and multiple negative electrode strips 2222 are alternated, therefore, in order to make the structure clearer, it is preferred to use transparent material for the connecting strip 223.

The at least one connecting strip 223 includes two connecting strips 223, one connecting strip 223 is located near the positive electrode connecting part 2211, and the other connecting strip 223 is located near the negative electrode connecting part 2221. Setting two connecting strips 223 can not only achieve the function of fixed insulation, but also save processes, improve production efficiency, and save materials. It is best to set the two connecting strips 223 parallel to each other to make the appearance neater, the texture higher, and also facilitate the clear division and installation of the structure.

At least one connecting strip 223 is made of transparent material, and it is preferred that all connecting strips 223 are made of transparent material to facilitate clear division and installation of the structure. Multiple positive electrode strips 2212 and multiple negative electrode strips 2222 are parallel to each other, and the at least one connecting strip 223 is perpendicular to multiple positive electrode strips 2212 and multiple negative electrode strips 2222, this structure makes the appearance of the solar mosquito killer more neat, orderly, and clearly structured, improving the user experience.

Figure 19:
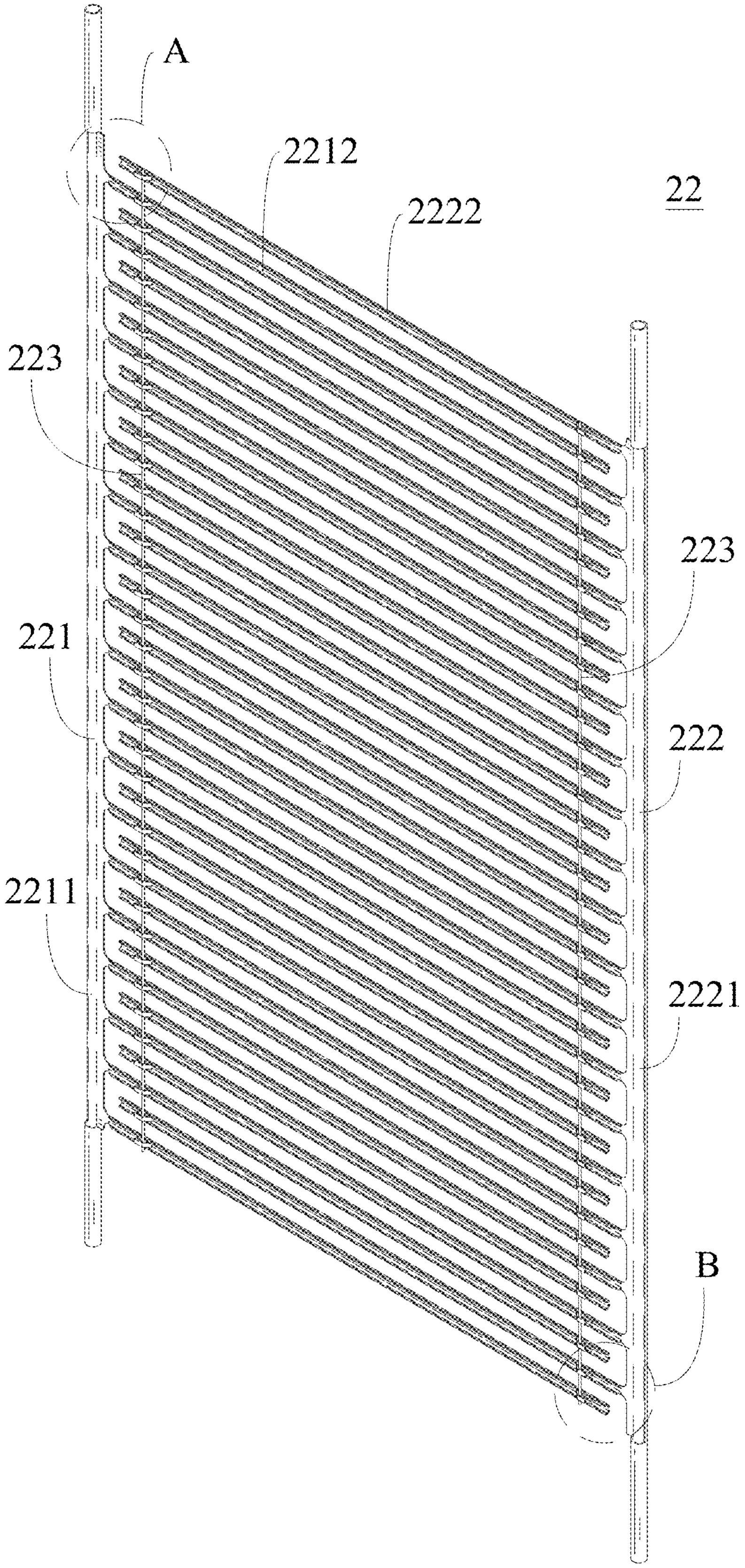
FIG. 19 is a second schematic view of the electric grid of the solar mosquito killer according to a first embodiment of present application.
Figure 20:
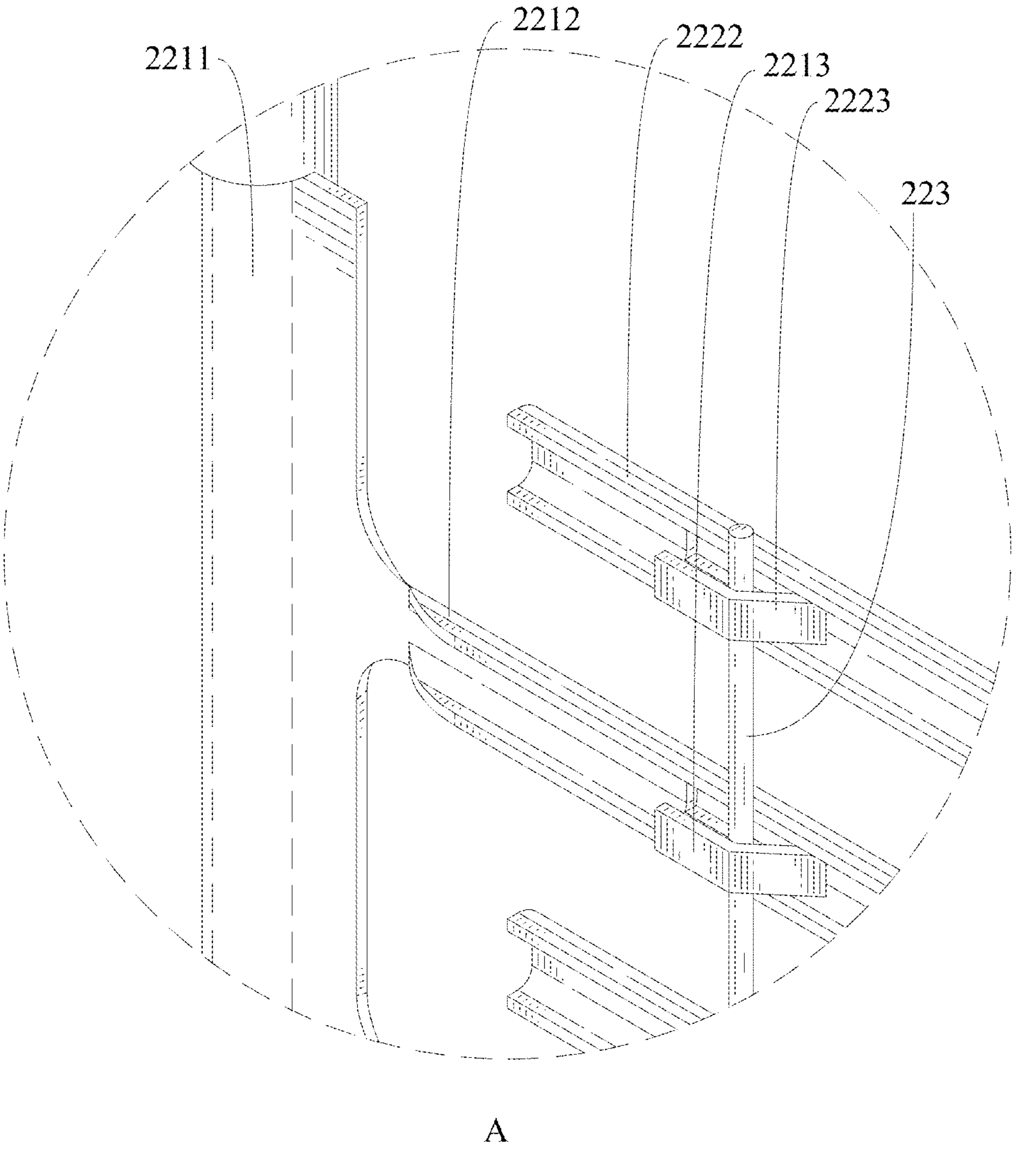
FIG. 20 shows an enlarged view of A part of FIG. 19.
Figure 21:
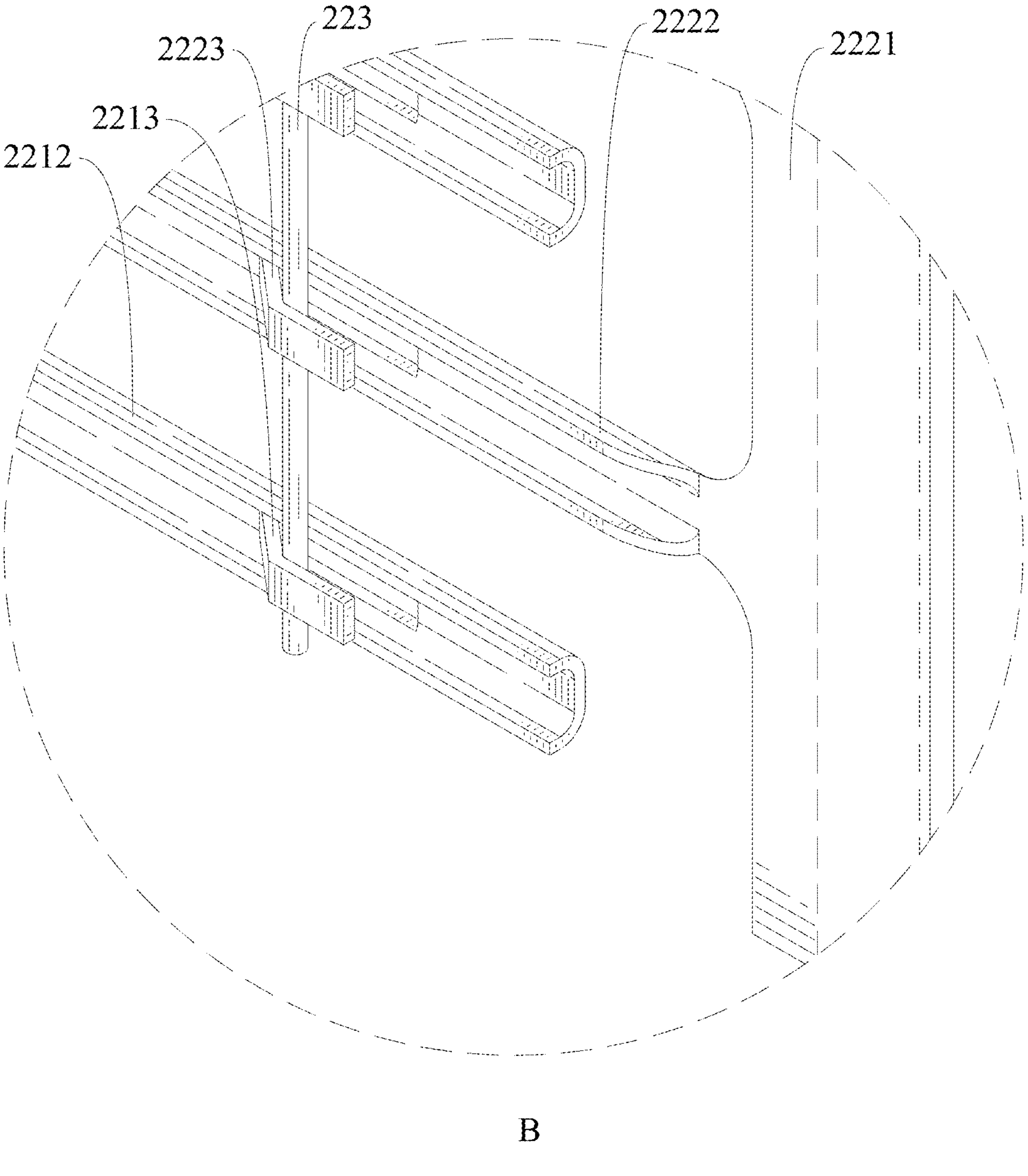
FIG. 21 shows an enlarged view of B part of FIG. 19.
Figure 22:
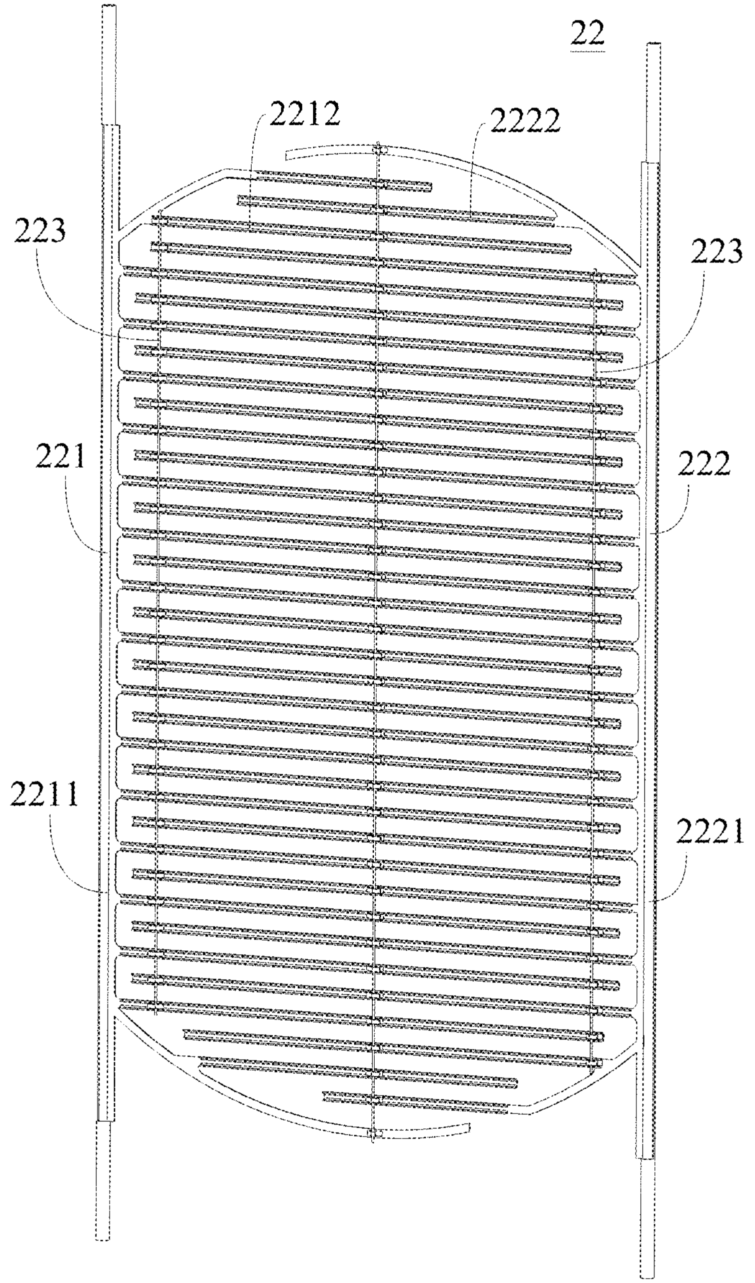
FIG. 22 is a third schematic view of the electric grid of the solar mosquito killer according to a first embodiment of present application.
Figure 23:
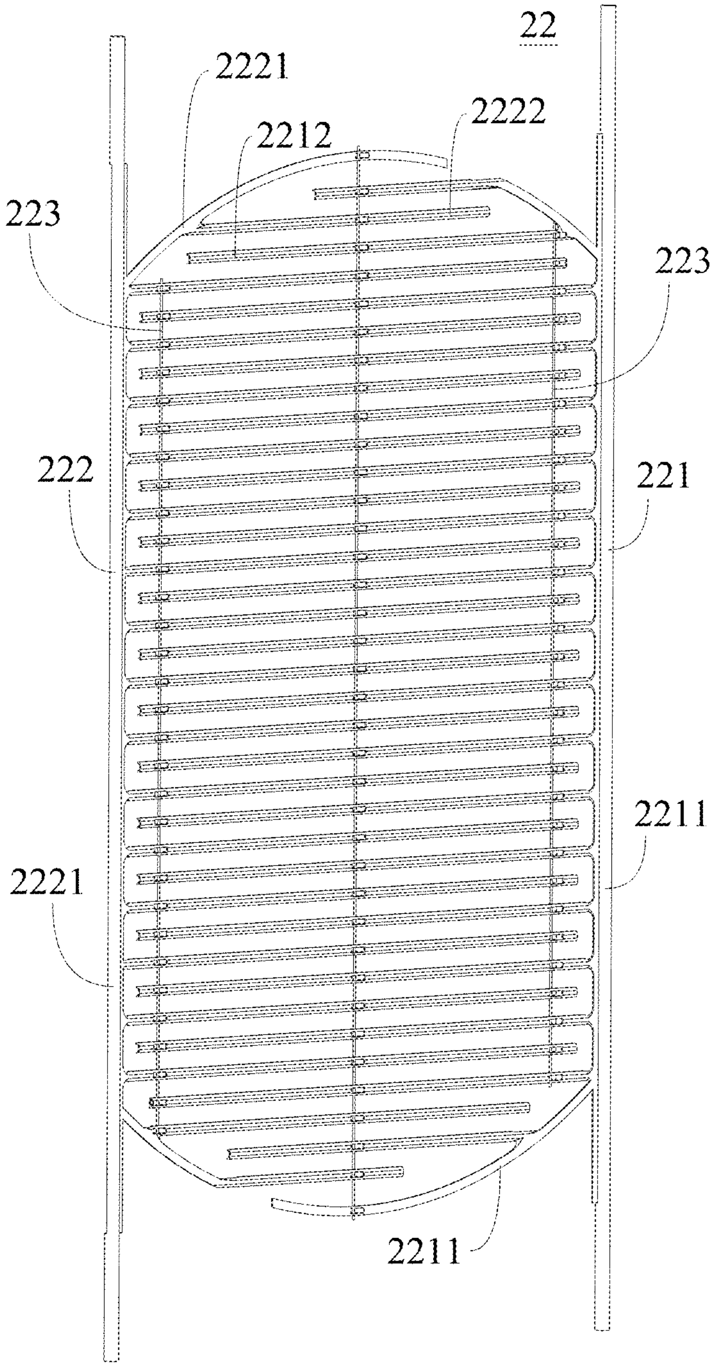
FIG. 23 shows another view of the electric grid of FIG. 22.
Figure 24:
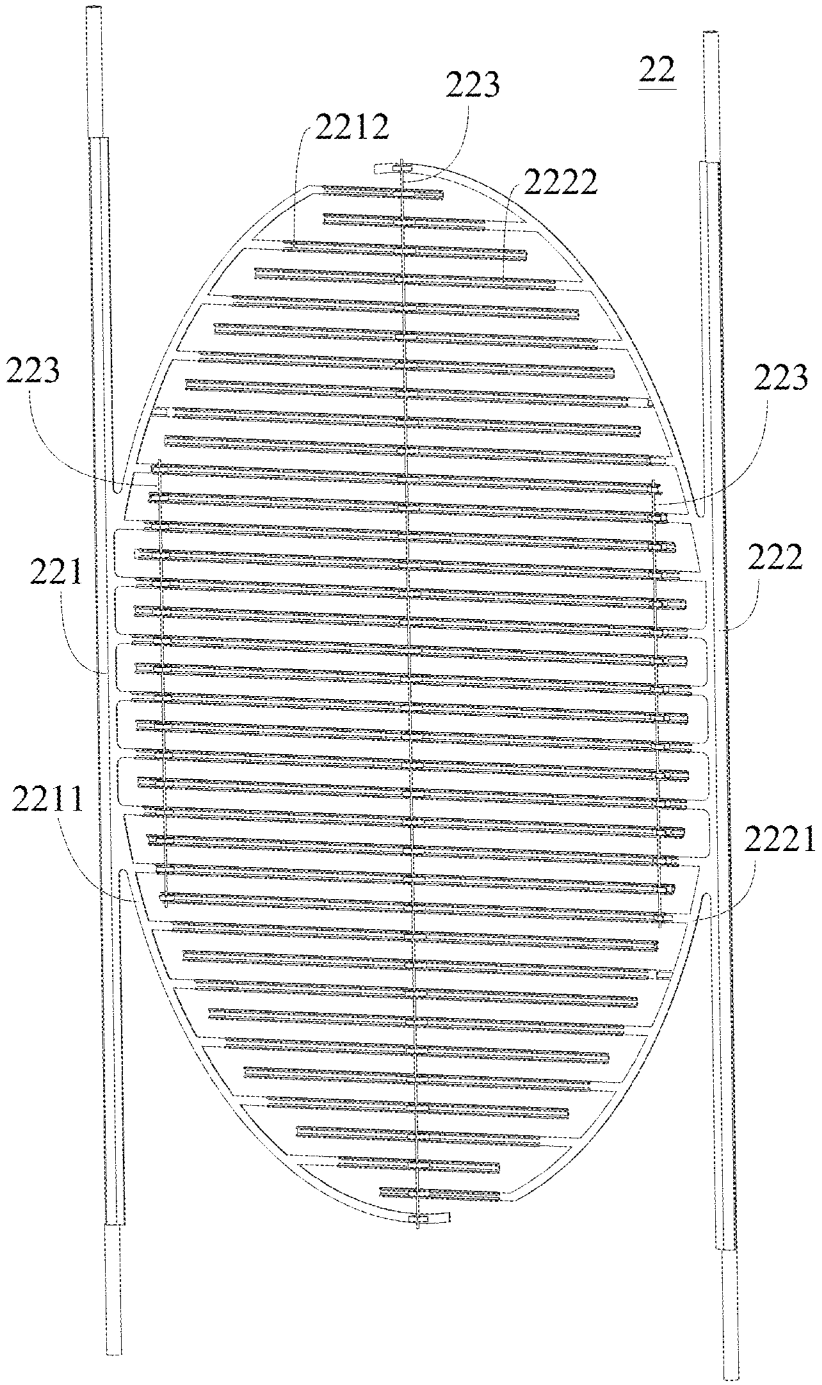
FIG. 24 is a fourth schematic view of the electric grid of the solar mosquito killer according to a first embodiment of present application.
Figure 25:
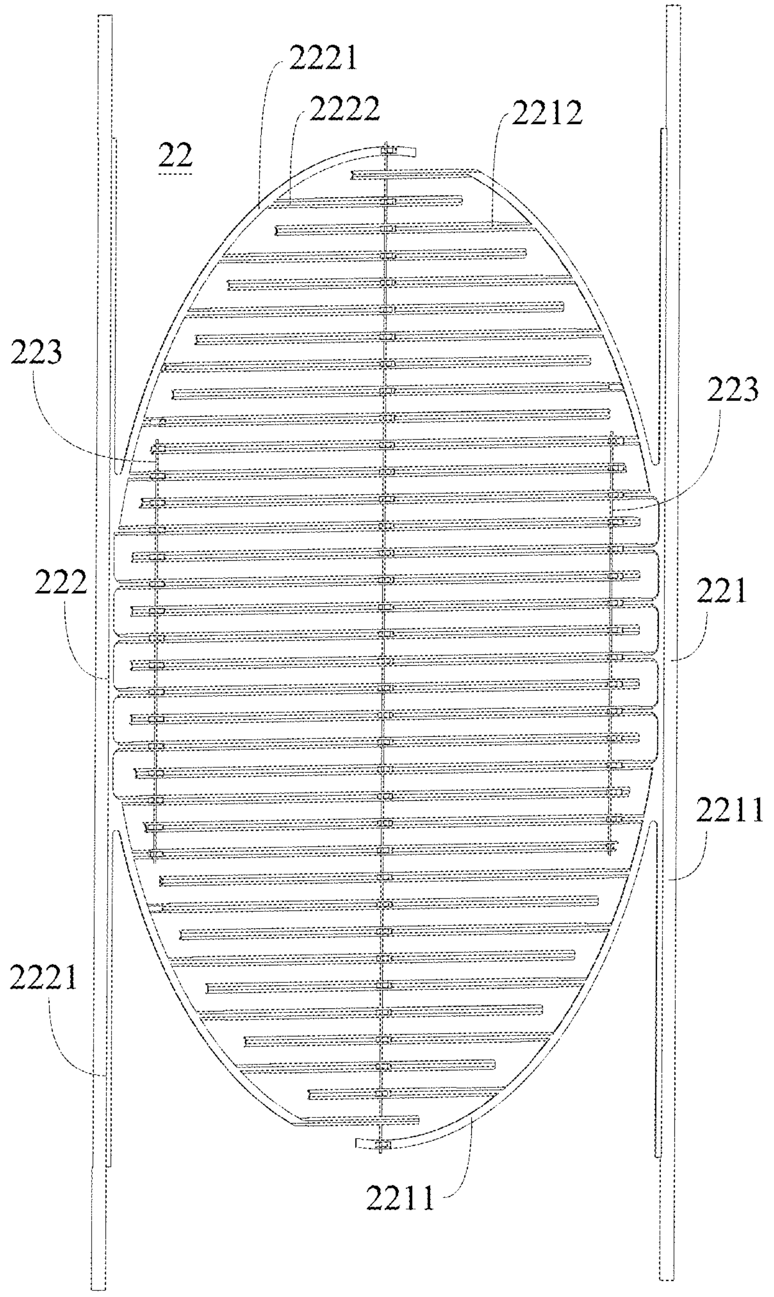
FIG. 25 shows another view of the electric grid of FIG. 24.
Figure 26:
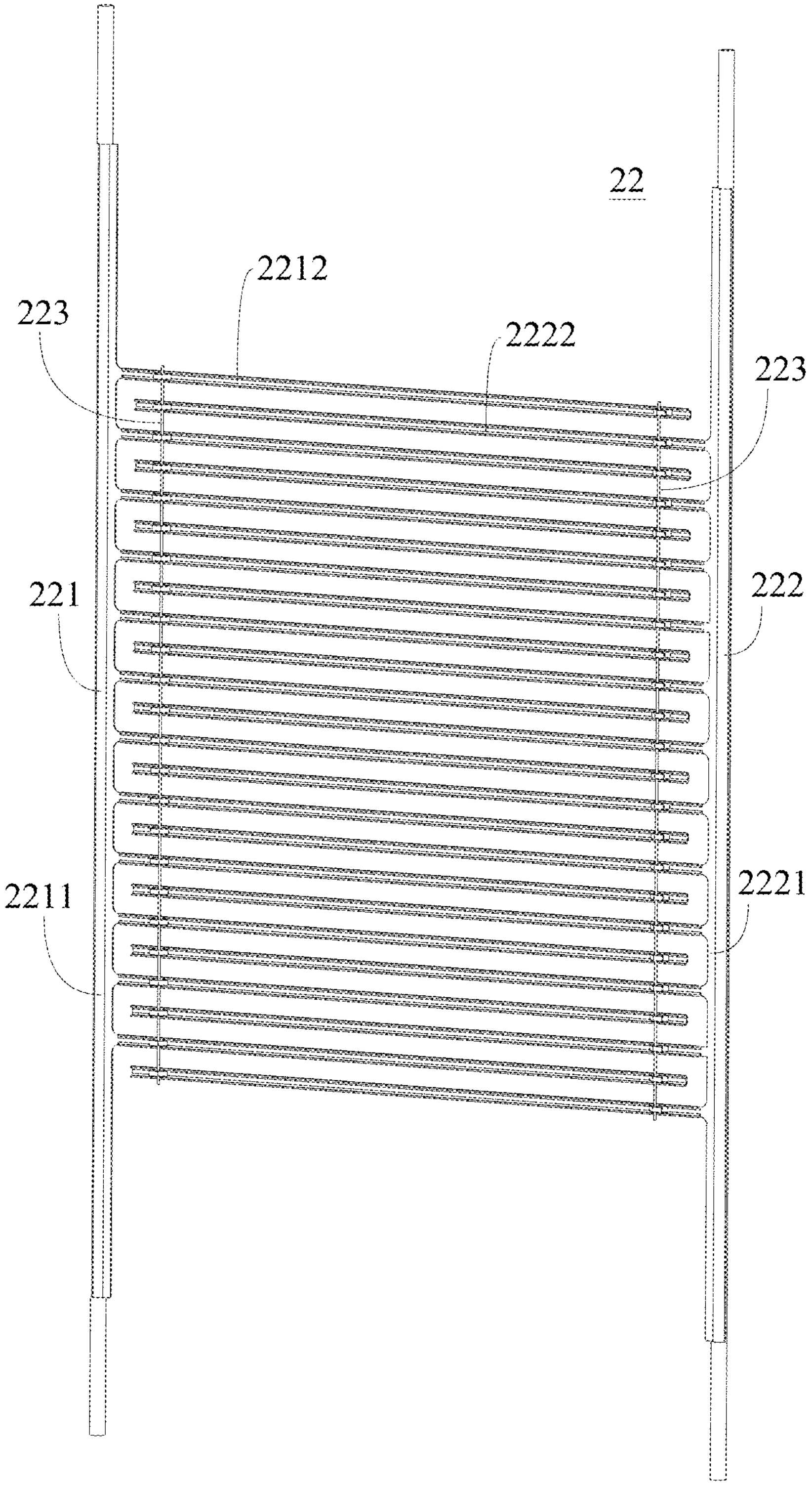
FIG. 26 is a fifth schematic view of the electric grid of the solar mosquito killer according to a first embodiment of present application.
Figure 27:
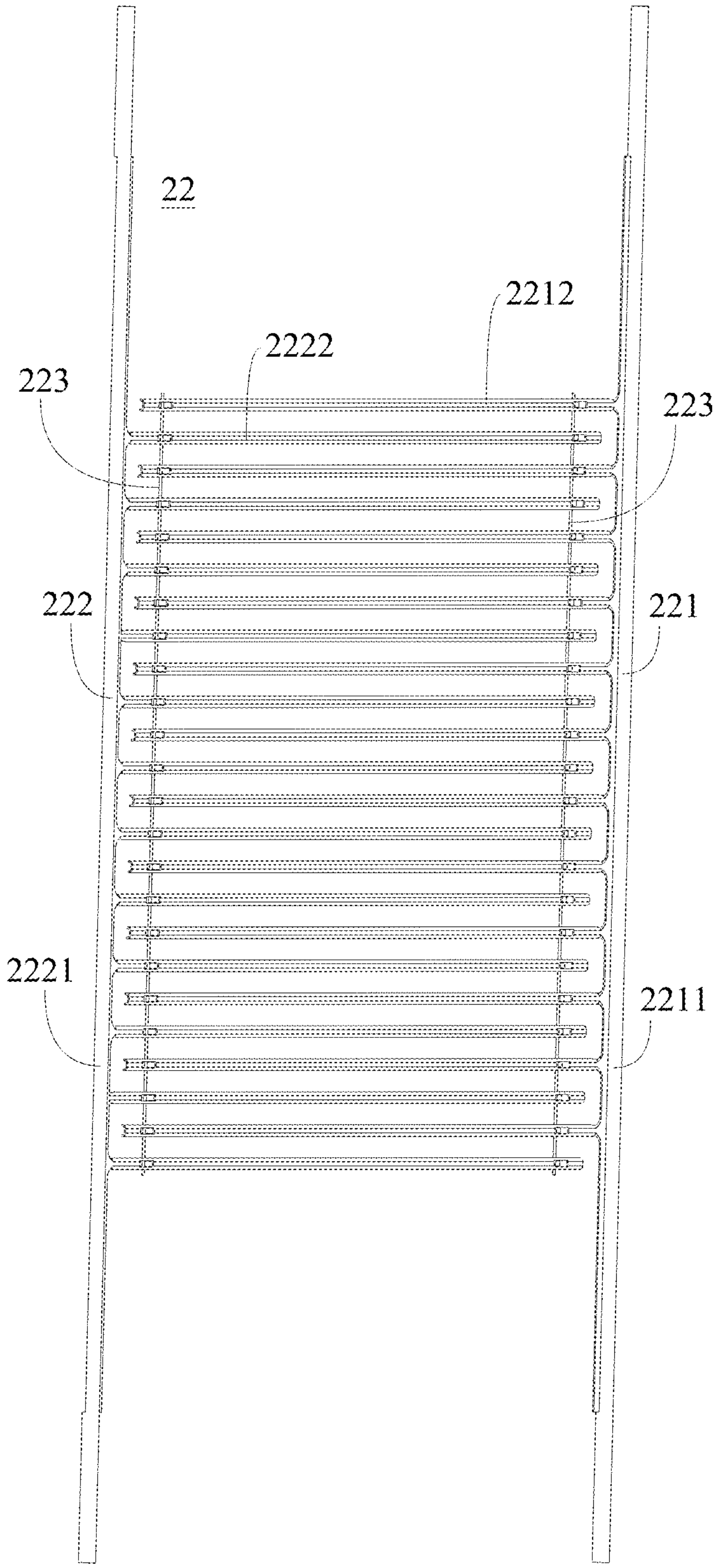
FIG. 27 shows another view of the electric grid of FIG. 26.
Figure 28:
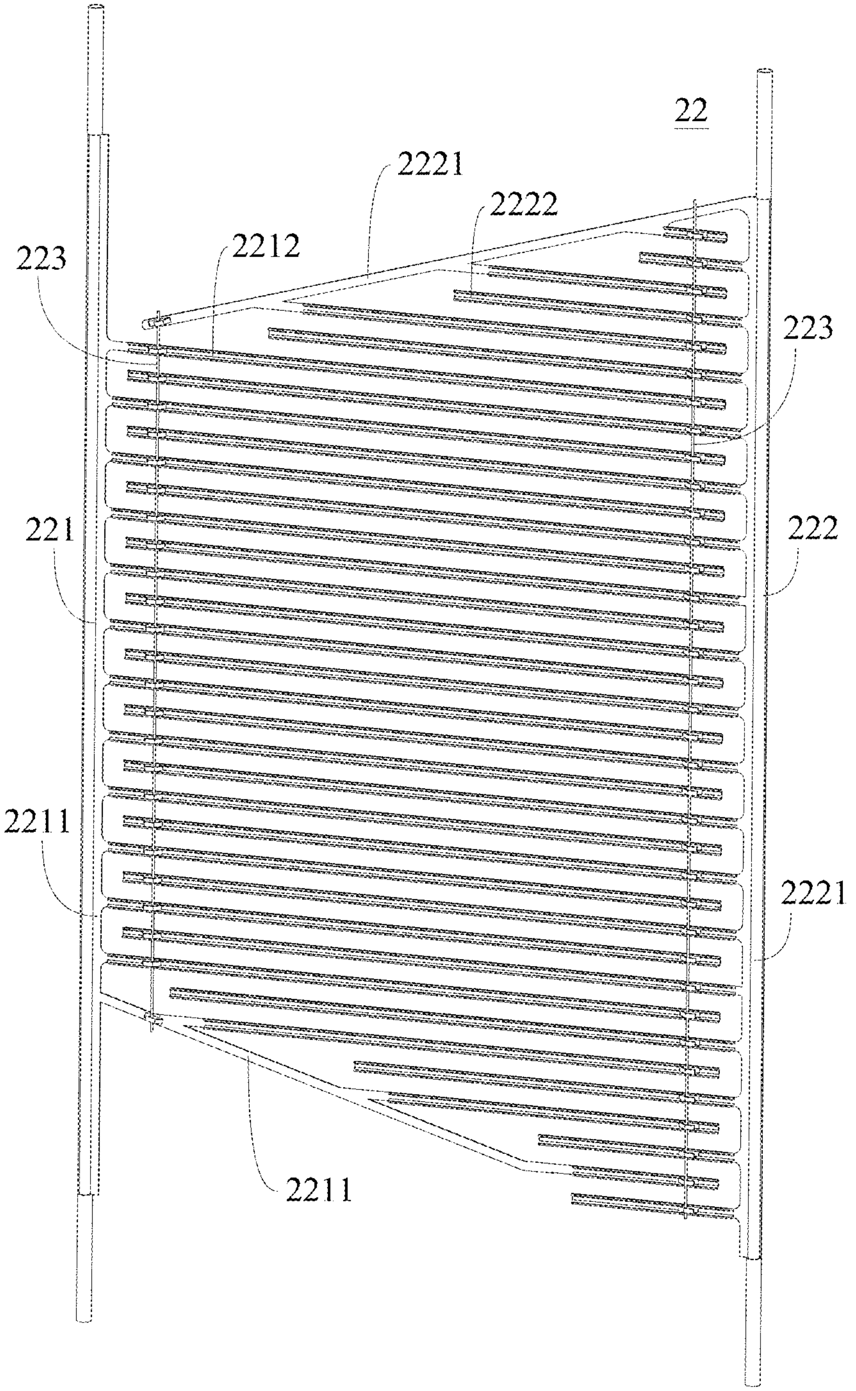
FIG. 28 is a sixth schematic view of the electric grid of the solar mosquito killer according to a first embodiment of present application.
Figure 29:
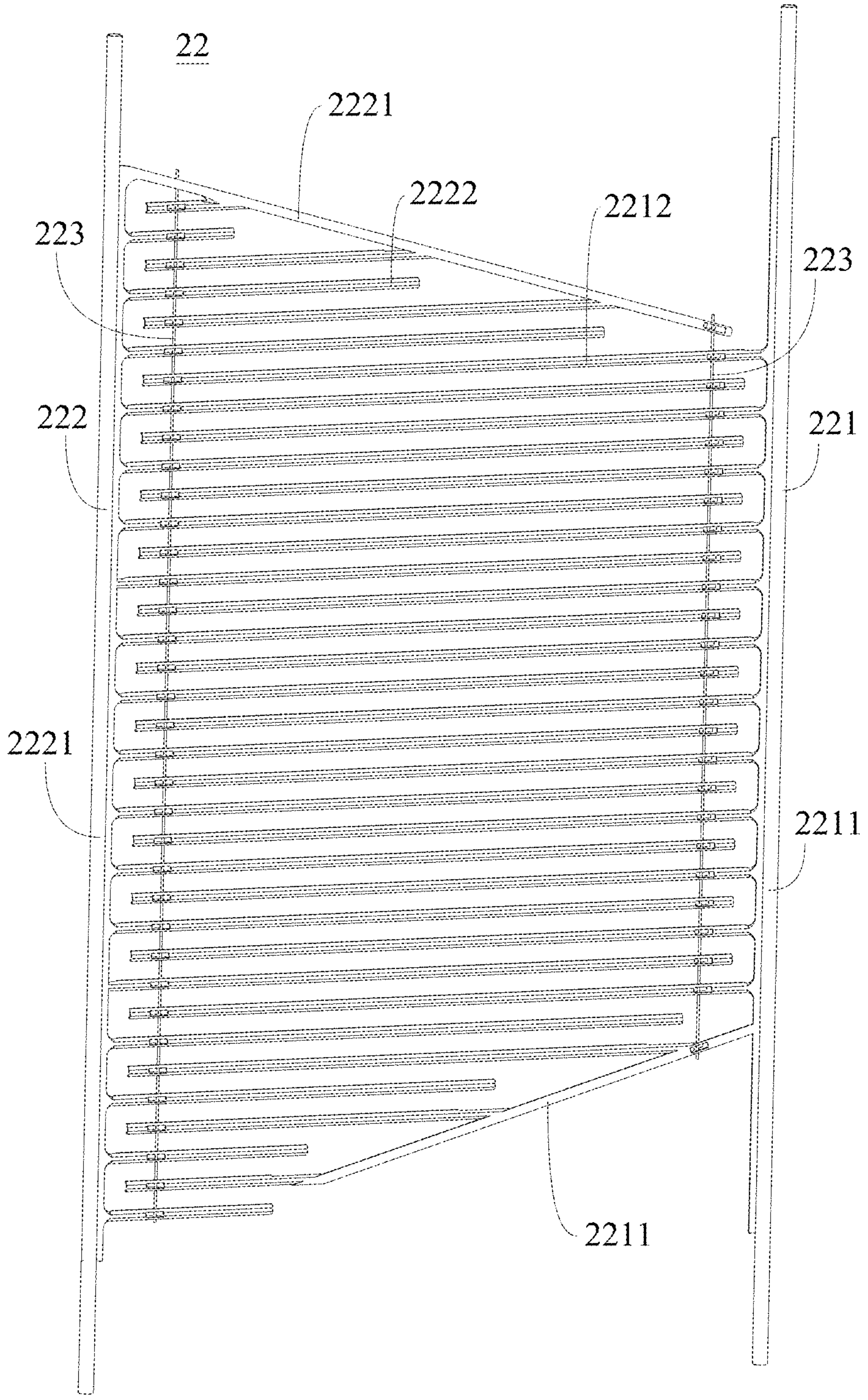
FIG. 29 shows another view of the electric grid of FIG. 28.
Figure 30:
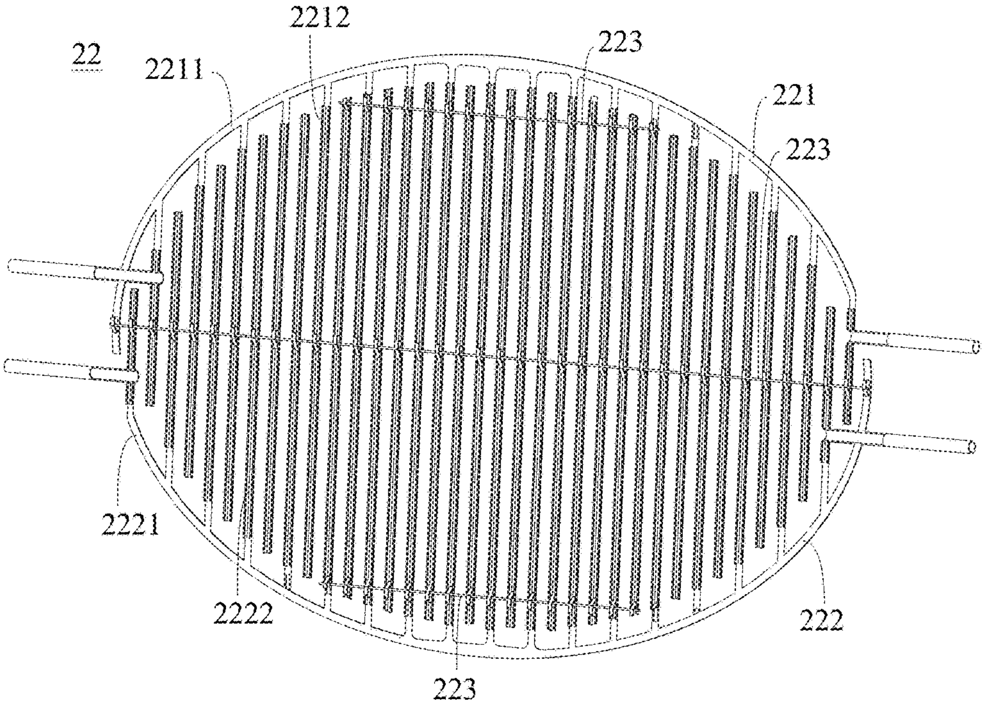
FIG. 30 is a seventh schematic view of the electric grid of the solar mosquito killer according to a first embodiment of present application.

As shown in FIG. 19-21, in order to achieve the connection between the connecting strip 223 and multiple positive electrode strips 2212 as well as multiple negative electrode connecting strips 2222, at least one first hook 2213 will be formed on each positive electrode strip 2212 during the manufacturing process of the positive electrode component 221, and at least one second hook 2223 will be formed on each negative electrode strip 2222 during the manufacturing process of the negative electrode component 222. The connecting strip 223 is fixed on the first hook 2213 and the second hook 2223, so that multiple positive electrode strips 2212 and multiple negative electrode strips 2222 can be connected together through the connecting strip 223, making the overall structure of the electric grid 22 more stable and effective, avoiding the phenomenon of bending caused by the arbitrary swinging of multiple positive electrode strips 2212 and multiple negative electrode strips 2222 under external forces such as wind.

It should be noted that the specific structure of the electric grid 22 in the first embodiment of the present application is not limited to the structures shown in FIGS. 17 to 21, for example, FIGS. 22 to 35 are perspective views of several other structural forms of the electric grid 22, designers can choose the appropriate structure of the electric grid 22 to install inside the frame component 21 according to actual needs, and from FIG. 14 to FIG. 27, it can be seen that there are differences in the shapes of the positive electrode connecting part 2211 and the positive electrode strip 2212 of the positive electrode component 221 for different structures of the electric grid 22, and there are differences in the shapes of the negative electrode connecting part 2221 and the negative electrode strip part 2222 of the negative electrode component 222.

In this embodiment, as shown in FIGS. 1, 2, 36, and 37, the installation structure 10 includes at least one installation component 101, and the two frame components 21 of adjacent mosquito killing modules 2 are fixedly connected by at least one installation component 101. Among them, the assembly between two adjacent mosquito killing modules 2 can be achieved through one installation component 101, or the assembly between two adjacent mosquito killing modules 2 can be achieved through multiple installation components 101. By designing installation component 101, it is used to assemble two adjacent mosquito killing modules 2, so that multiple mosquito killing modules 2 can be assembled together through installation component 101, which can effectively improve the mosquito killing range of the solar mosquito killing device.

Each installation component 101 includes two installation parts 1011 arranged at intervals of XX' along the length direction of the mosquito killing module 2, and a connection part 1012 connected between the two installation parts 1011, the two installation parts 1011 of each installation component 101 are used to fixedly connect with the two frame components 21 of adjacent two mosquito killing modules 2 in a one-to-one correspondence.

At least one of the two installation parts 1011 of each installation component 101 is connected to the frame component 21 of the corresponding mosquito control module 2 through interlocking, for example, one of the two installation parts 1011 of each installation component 101 can be connected to the frame component 21 of the corresponding mosquito killing module 2 by snap fit, and the other installation part 1011 of the two installation parts 101 can be threaded or plug-in the frame component 21 of the corresponding mosquito killing module 2. In another situation, both installation parts 1011 of each mounting component 101 can be connected to the corresponding frame component 21 of the mosquito killing module 2 through snap fit. By connecting at least one end of each installation component 101 to the corresponding frame component 21 of the mosquito killing module 2 through snap fit, the operation is simple and easy to assemble multiple mosquito killing modules 2 as a whole, resulting in high assembly efficiency.

The installation part 1011 includes a first surrounding wall 1011*a* and two second surrounding walls 1011*b*, the two second surrounding walls 1011*b* are spaced apart along the width direction YY' of the mosquito killing module 2 and connected to the edge of the first surrounding wall 1011*a*. The two second surrounding walls 1011*b* and the first surrounding wall 1011*a* jointly enclose to form a clamp structure 1011*c* with one side opening. The opening of the clamp structure 1011*c* is set towards the corresponding frame component 21 of the mosquito killing module 2, and the clamp structure 1011*c* is used to clamp the corresponding frame component 21 of the mosquito killing module 2 (specifically the mounting column 211 introduced above). Among them, the first surrounding wall 1011*a* and the two second surrounding walls 1011*b* can be formed as an integrated structure through but not limited to injection molding or 3D printing. The first surrounding wall 1011*a* and two second surrounding walls 1011*b* enclose to form a clamp structure 1011*c* with one side opening. When the clamp structure 1011*c* clamps the corresponding frame component 21 of the mosquito killing module 2, the two second surrounding walls 1011*b* undergo elastic deformation, causing the installation part 1011 to clamp the corresponding frame component 21 of the mosquito killing module 2 under the action of the elastic recovery force corresponding to the elastic deformation. In this way, the clamping connection between the installation part 1011 and the corresponding frame component 21 of the mosquito killing module 2 can be achieved, this structure is simple and easy to implement.

The installation part 1011 also includes a limiting flange 1011*d*, which is located on one side of the two second surrounding walls 1011*b* away from the first surrounding wall 1011*a*. When the clamping structure 1011*c* clamps the frame component 21 of the corresponding mosquito killing module 2, the limiting flange 1011*d* contacts the surface of the side of the frame component 21 facing away from the first surrounding wall 1011*a*. Among them, the limiting flange 1011*d* can be integrated with the second surrounding wall 1011*b* through but is not limited to injection molding or 3D printing. The limiting flange 1011*d* can be an elongated strip flange extending along the height direction ZZ' of the mosquito killing module 2. By designing the limiting flange 1011*d*, when the clamping structure 1011*c* clamps the corresponding frame component 21 of the mosquito killing module 2, the surface of the frame component 21 facing away from the first surrounding wall 1011*a* acts as a limiting flange 1011*d*, which can restrict the clamping structure 1011*c* from detaching from the frame component 21, this can enhance the stability of the connection between the installation part 1011 and the corresponding frame component 21 of the mosquito killing module 2.

The connection part 1012 in each installation component 101 is used to connect two installation parts 1011. Among them, the connecting part 1012 can be fixedly connected to the two installation parts 1011 in a detachable manner through at least one of screw connection, snap fit connection, or plug-in connection, and the connecting part 1012 can also be fixedly connected to the two installation parts 1011 in a non detachable manner through injection molding, 3D printing, or riveting. The specific manifestations of the connection part 1012 can include, but are not limited to, the following situations.

Figure 36:
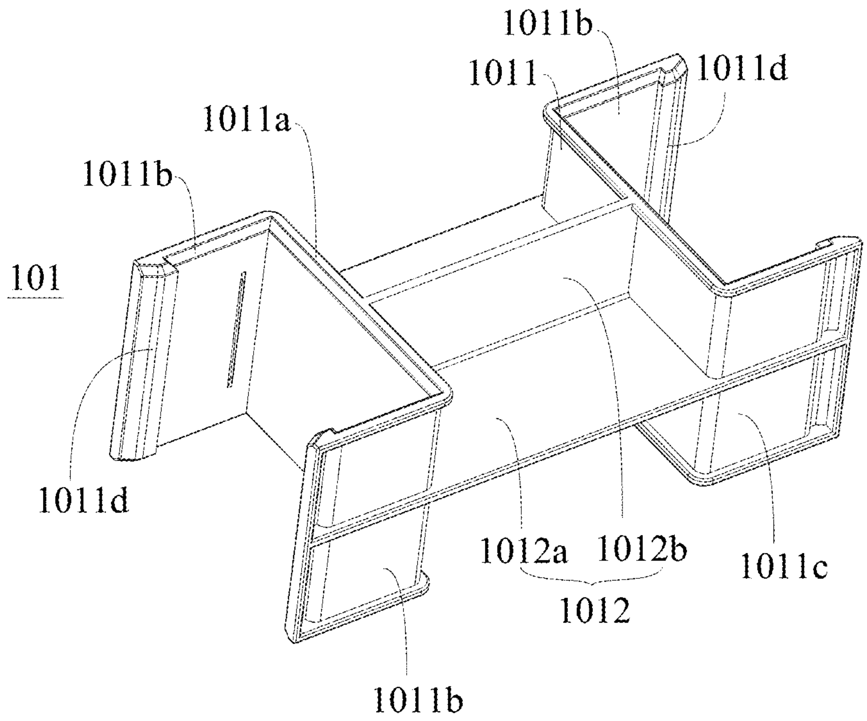
FIG. 36 is a perspective view of the installation component of FIG. 1.
Figure 37:
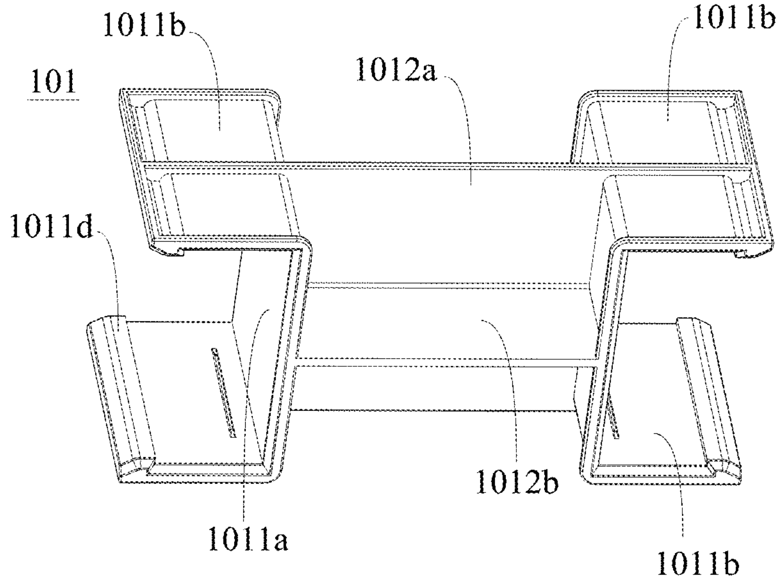
FIG. 37 is another perspective view of the installation component of FIG. 36.
Figure 38:
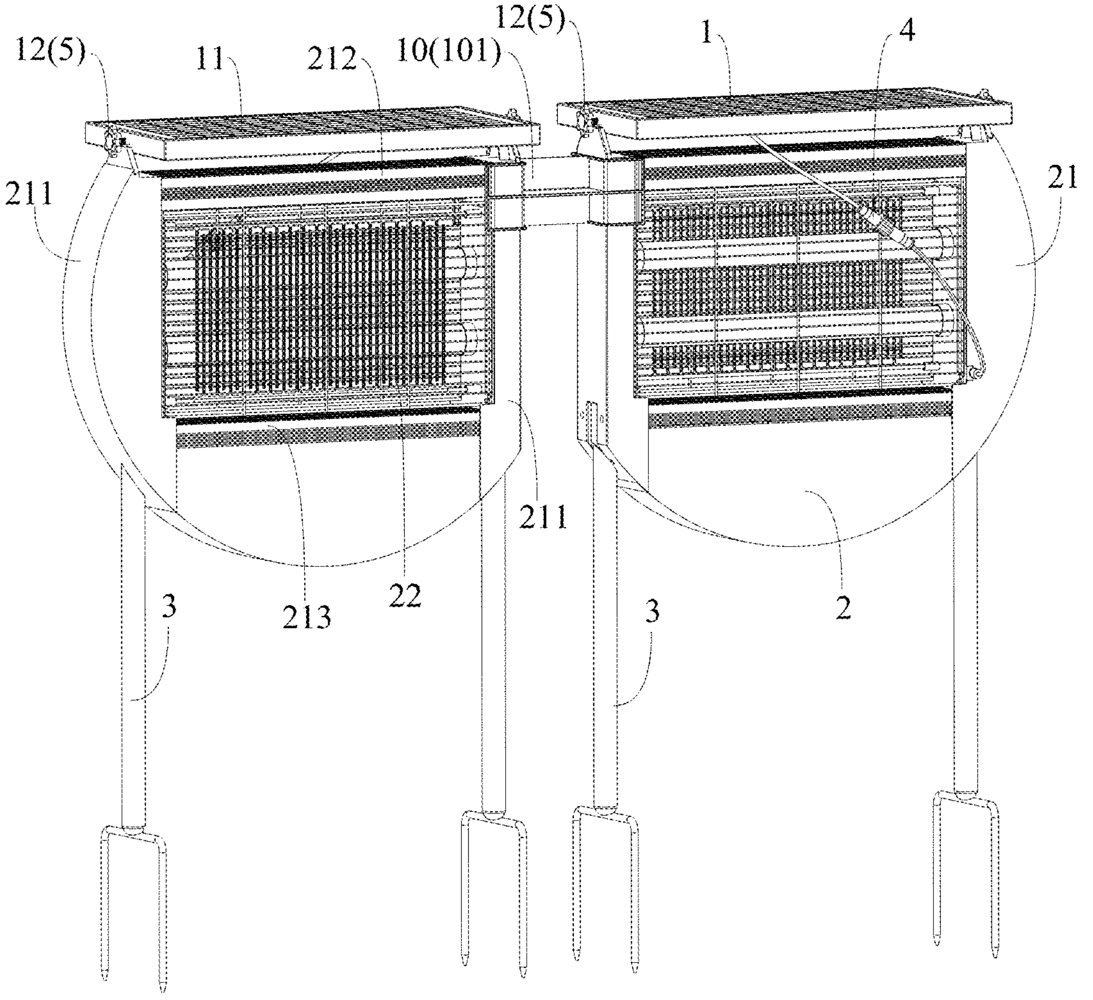
FIG. 38 is a second schematic view of the solar mosquito killer according to a first embodiment of present application.
Figure 39:
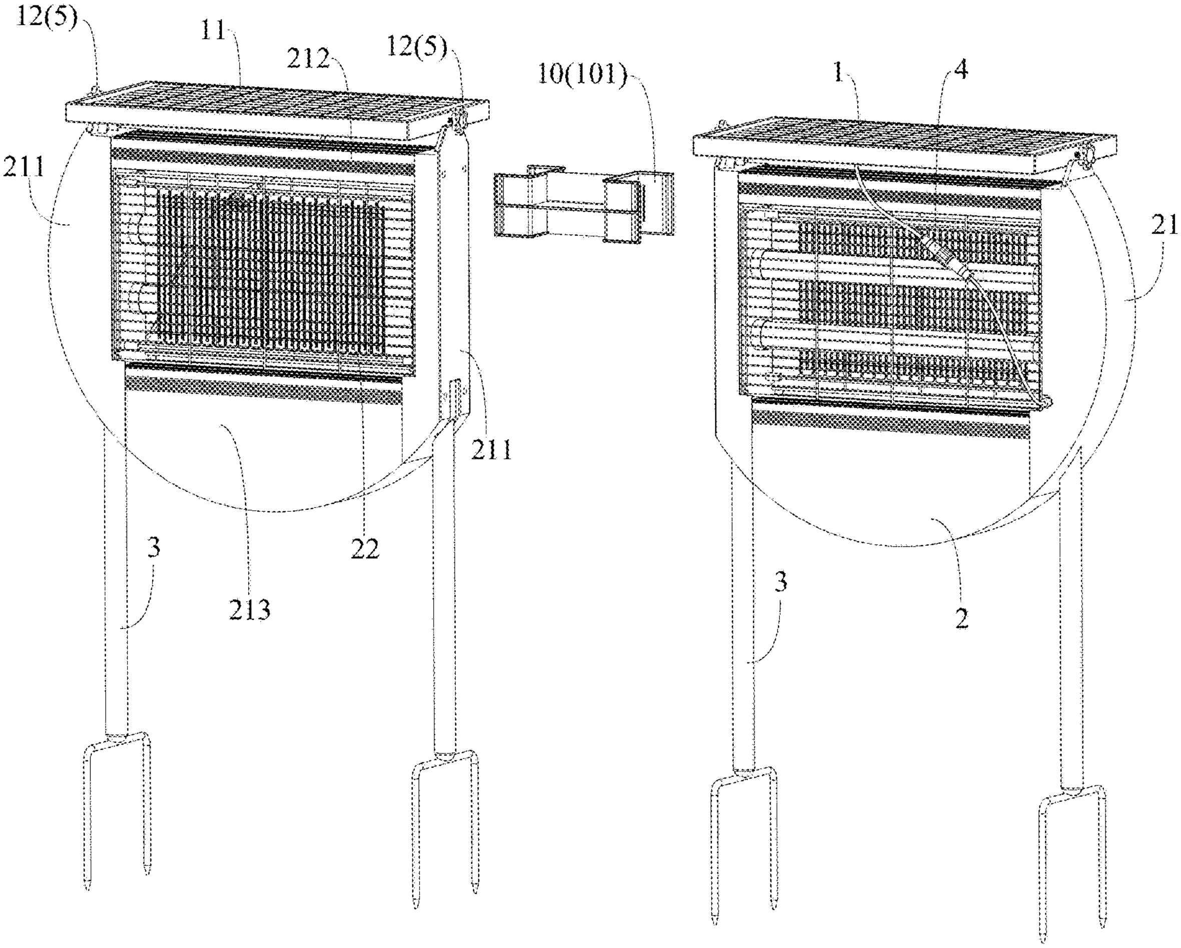
FIG. 39 is an exploded view of the solar mosquito killer of FIG. 38.
Figure 40:
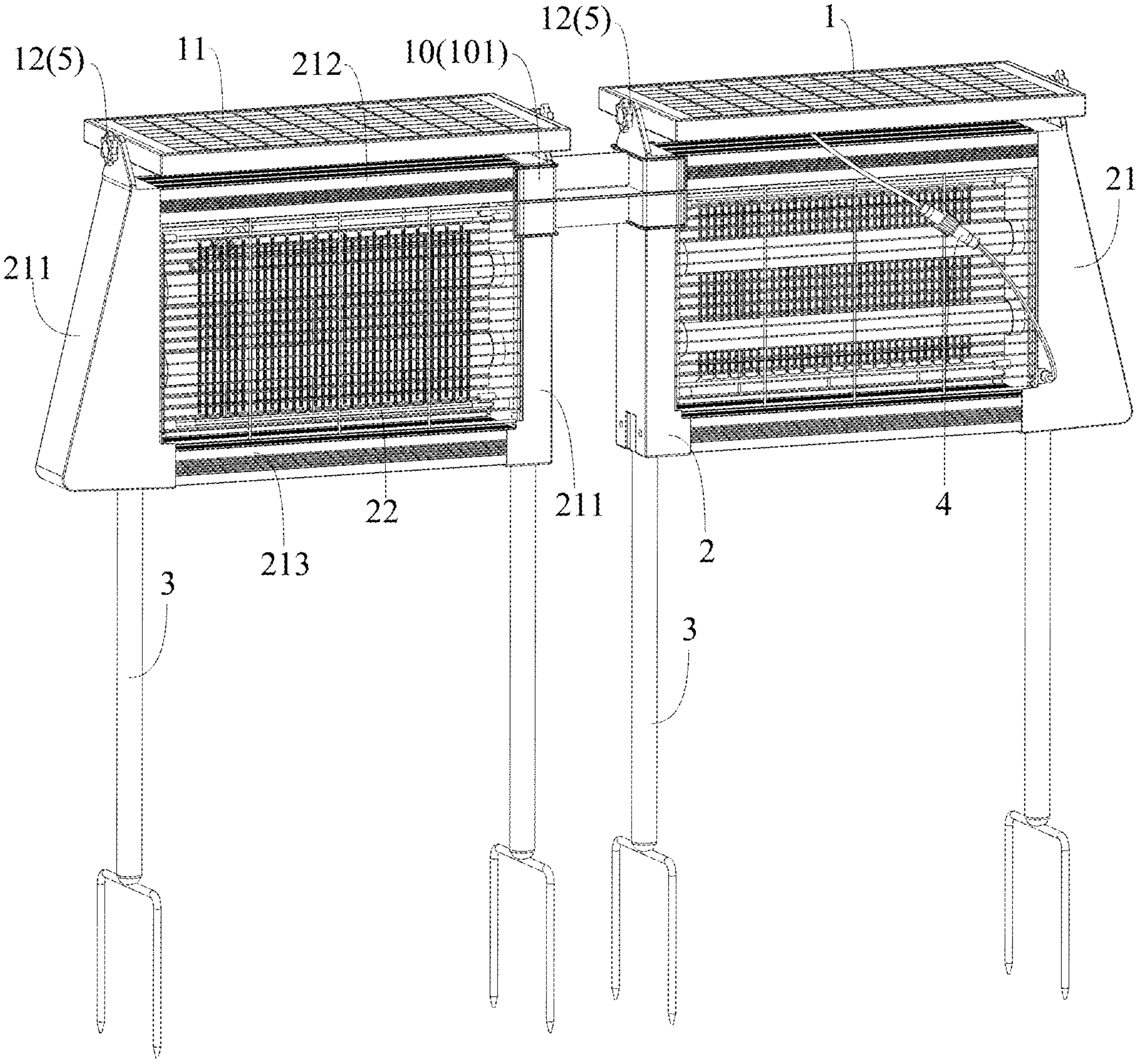
FIG. 40 is a third schematic view of the solar mosquito killer according to a first embodiment of present application.
Figure 41:
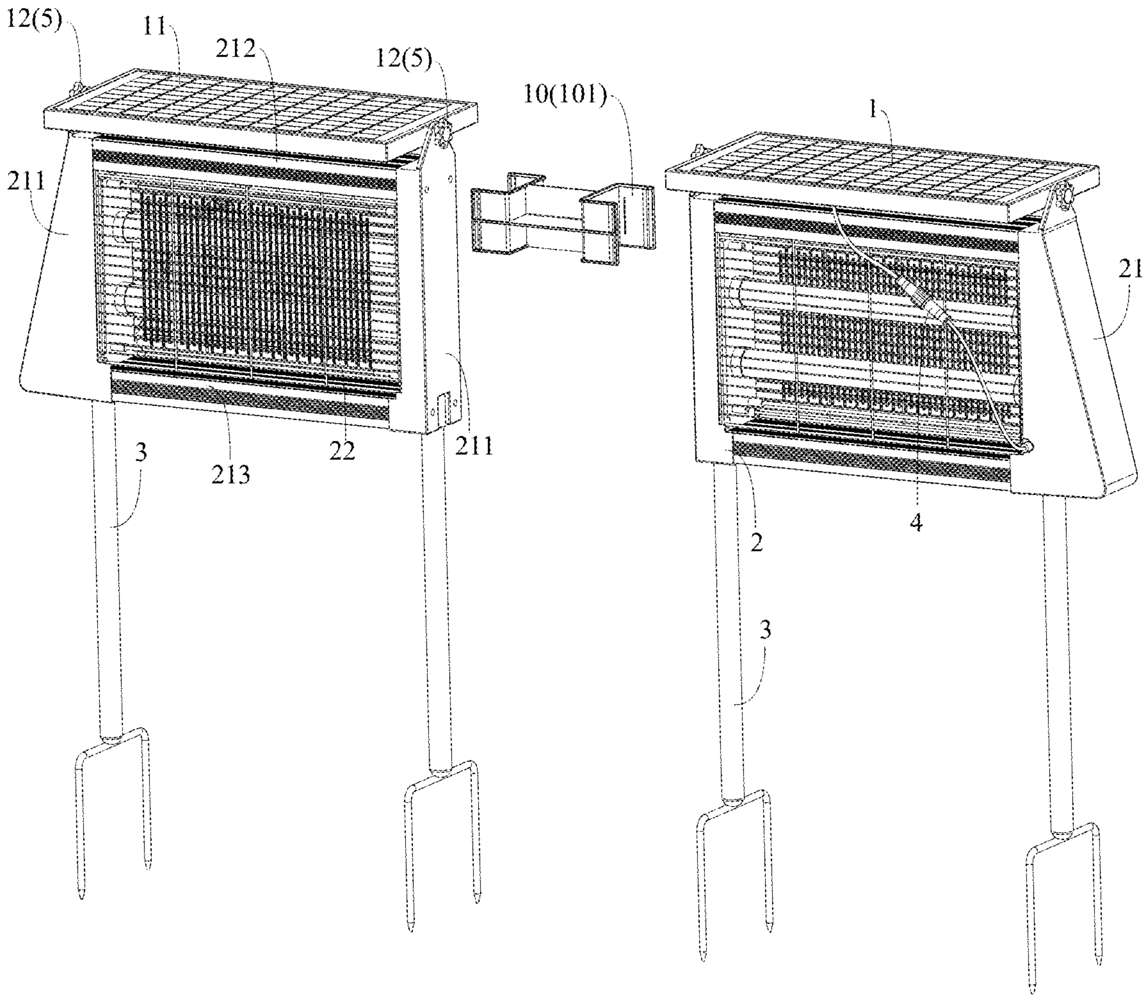
FIG. 41 is an exploded view of the solar mosquito killer of FIG. 40.
Figure 42:
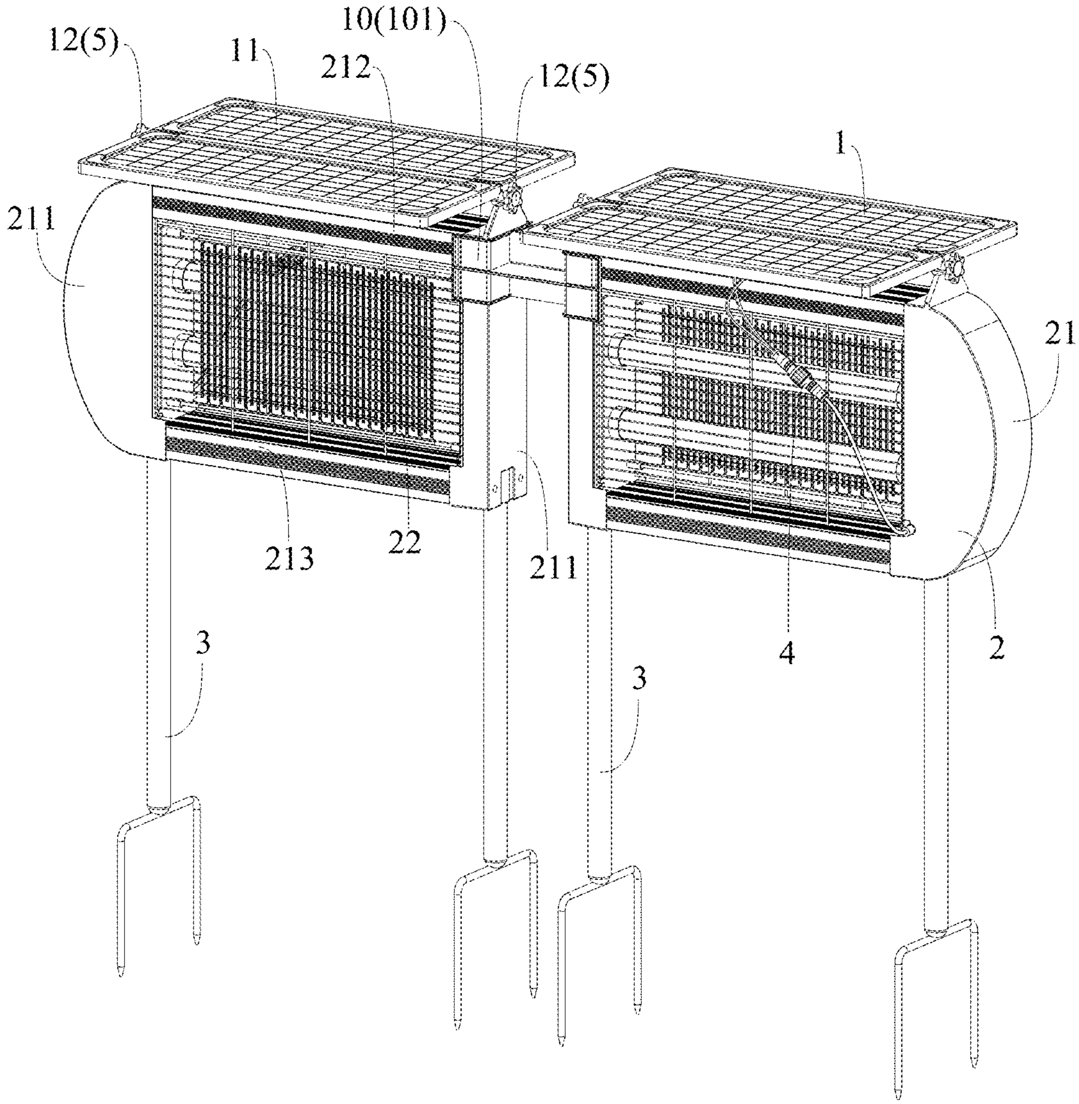
FIG. 42 is a fourth schematic view of the solar mosquito killer according to a first embodiment of present application.
Figure 43:
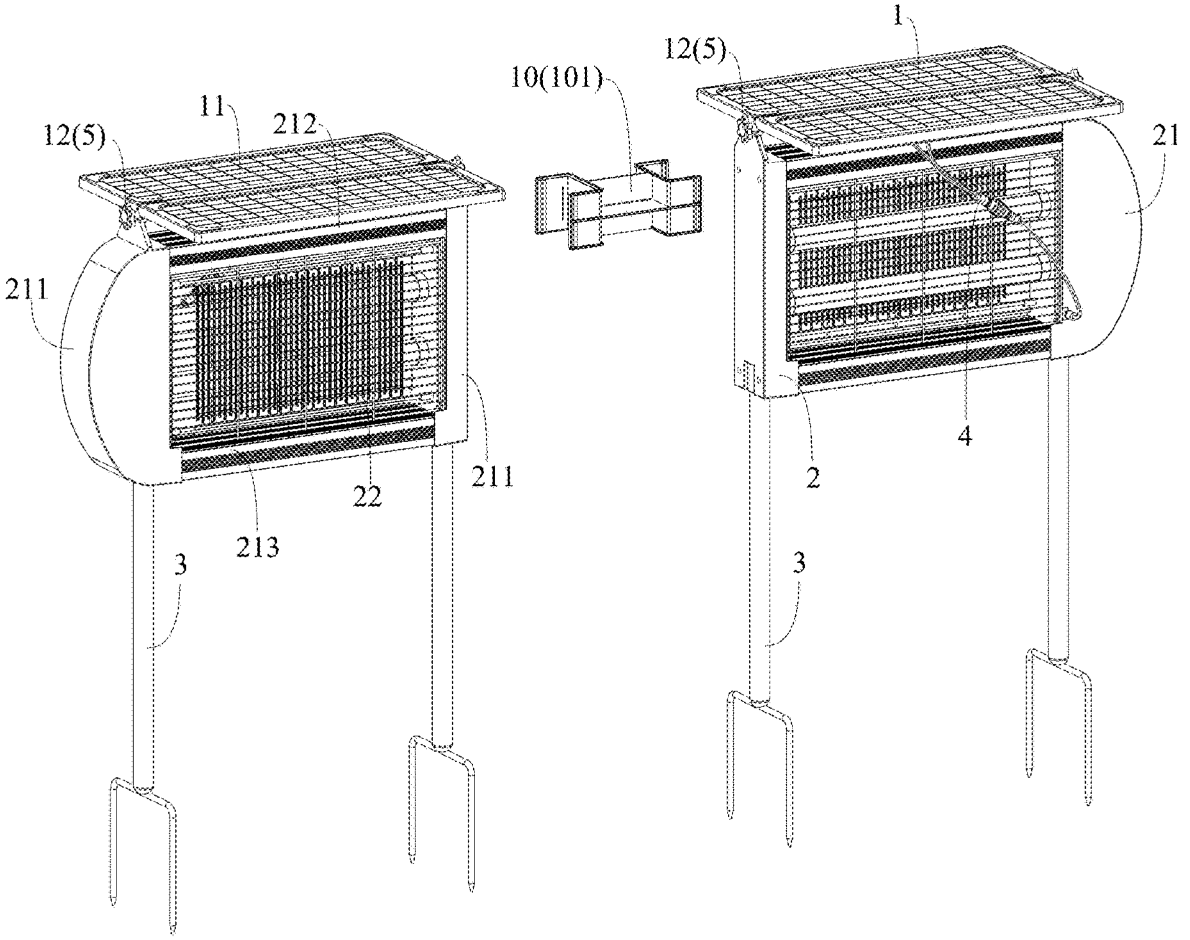
FIG. 43 is an exploded view of the solar mosquito killer of FIG. 42.
Figure 44:
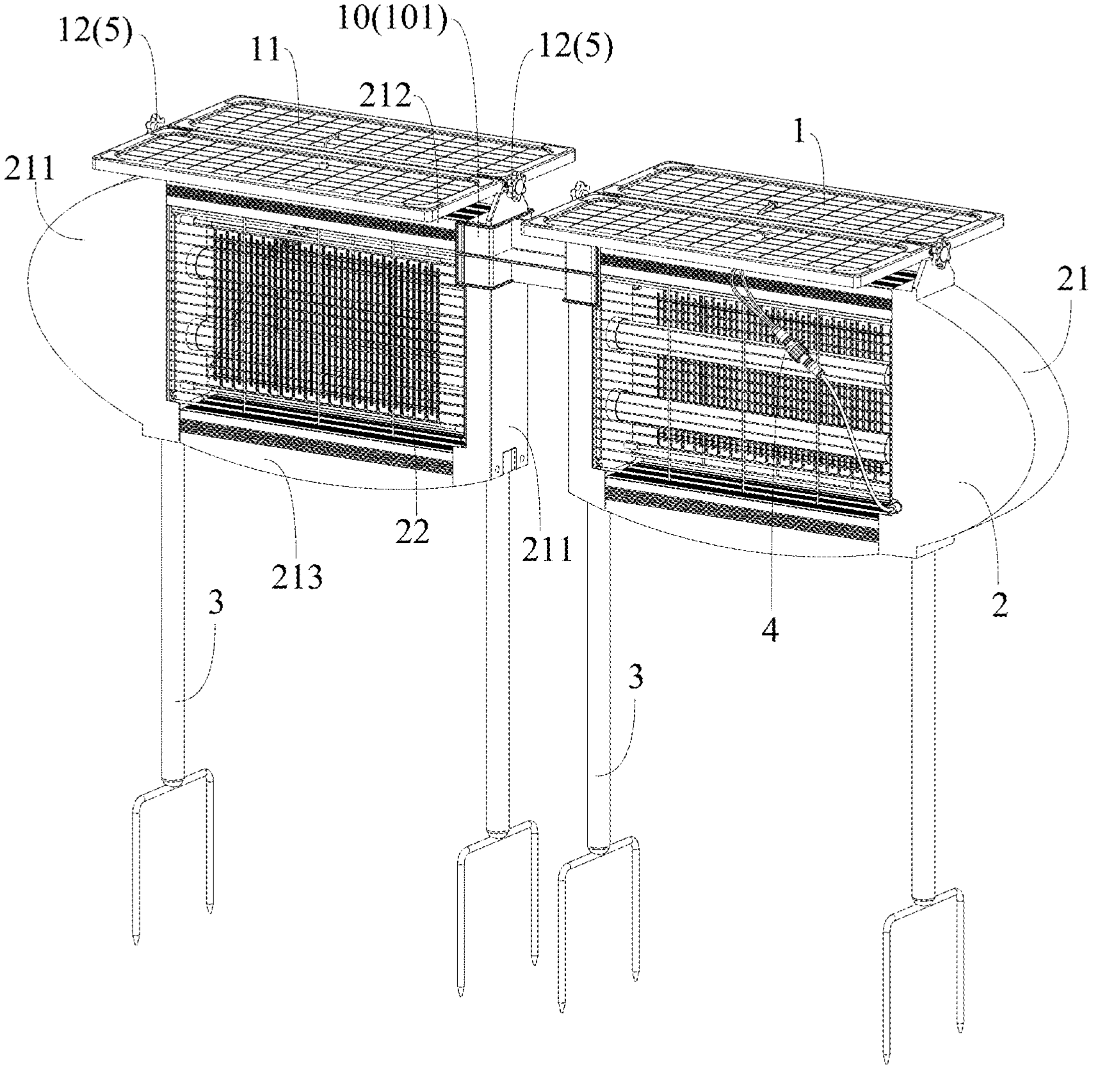
FIG. 44 is a fifth schematic view of the solar mosquito killer according to a first embodiment of present application.
Figure 45:
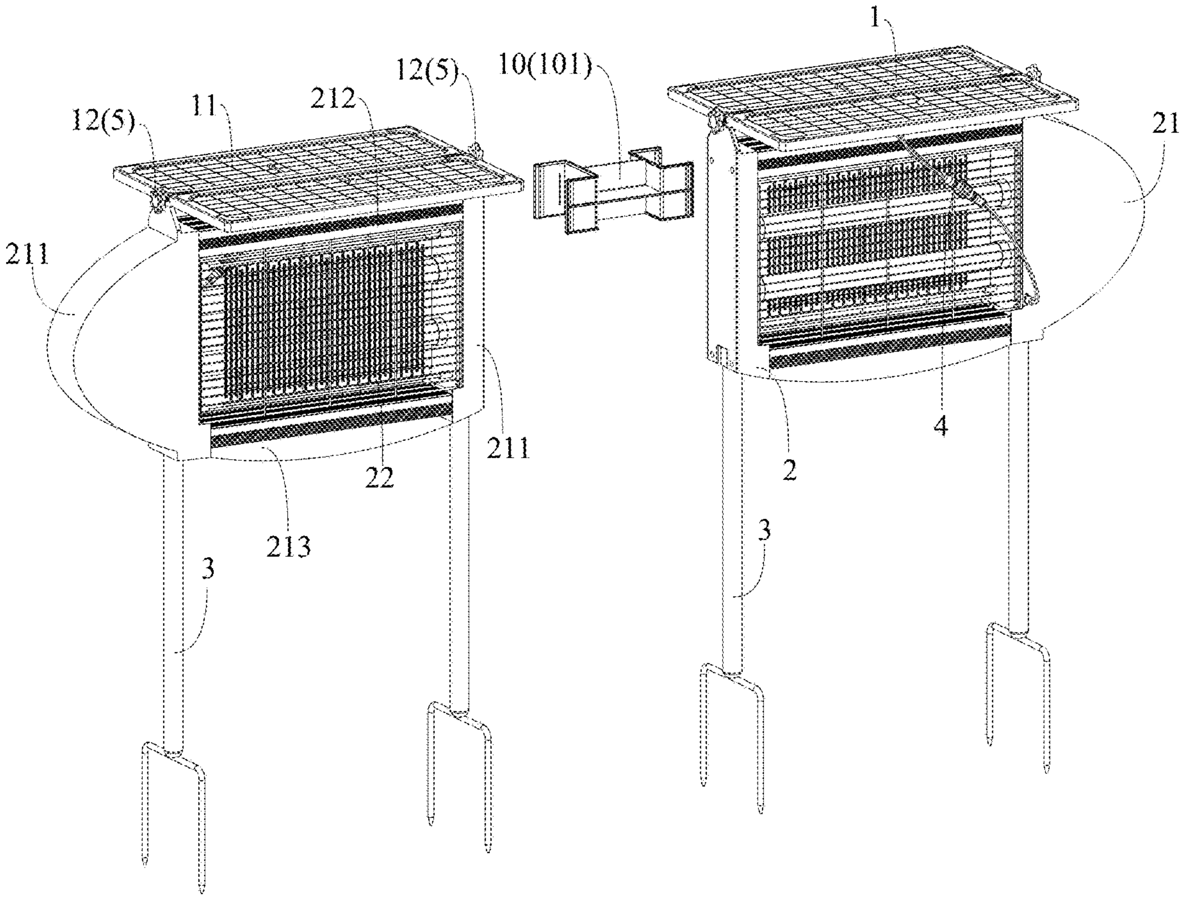
FIG. 45 is an exploded view of the solar mosquito killer of FIG. 44.
Figure 46:
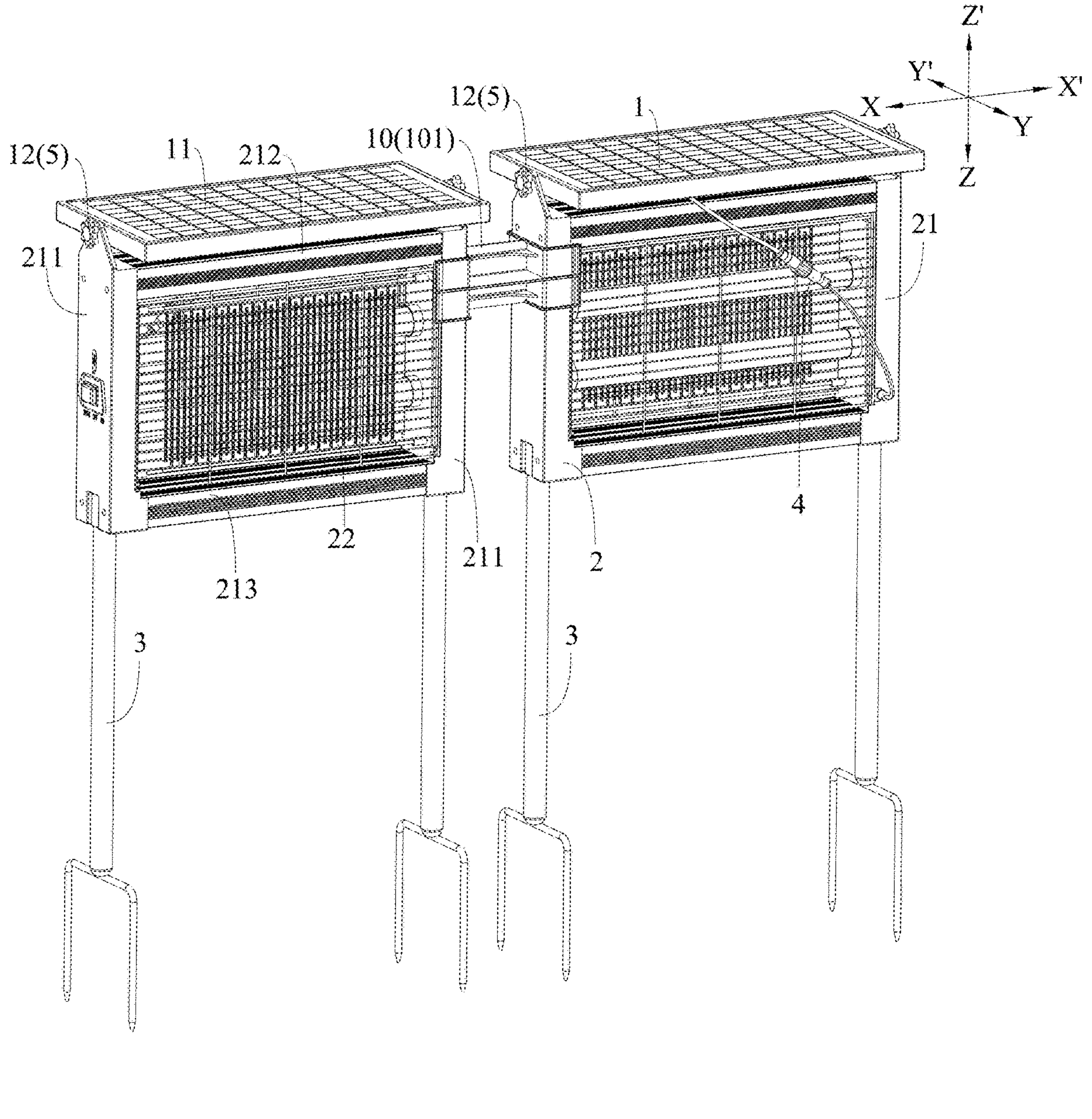
FIG. 46 is a sixth schematic view of the solar mosquito killer according to a first embodiment of present application.
Figure 47:
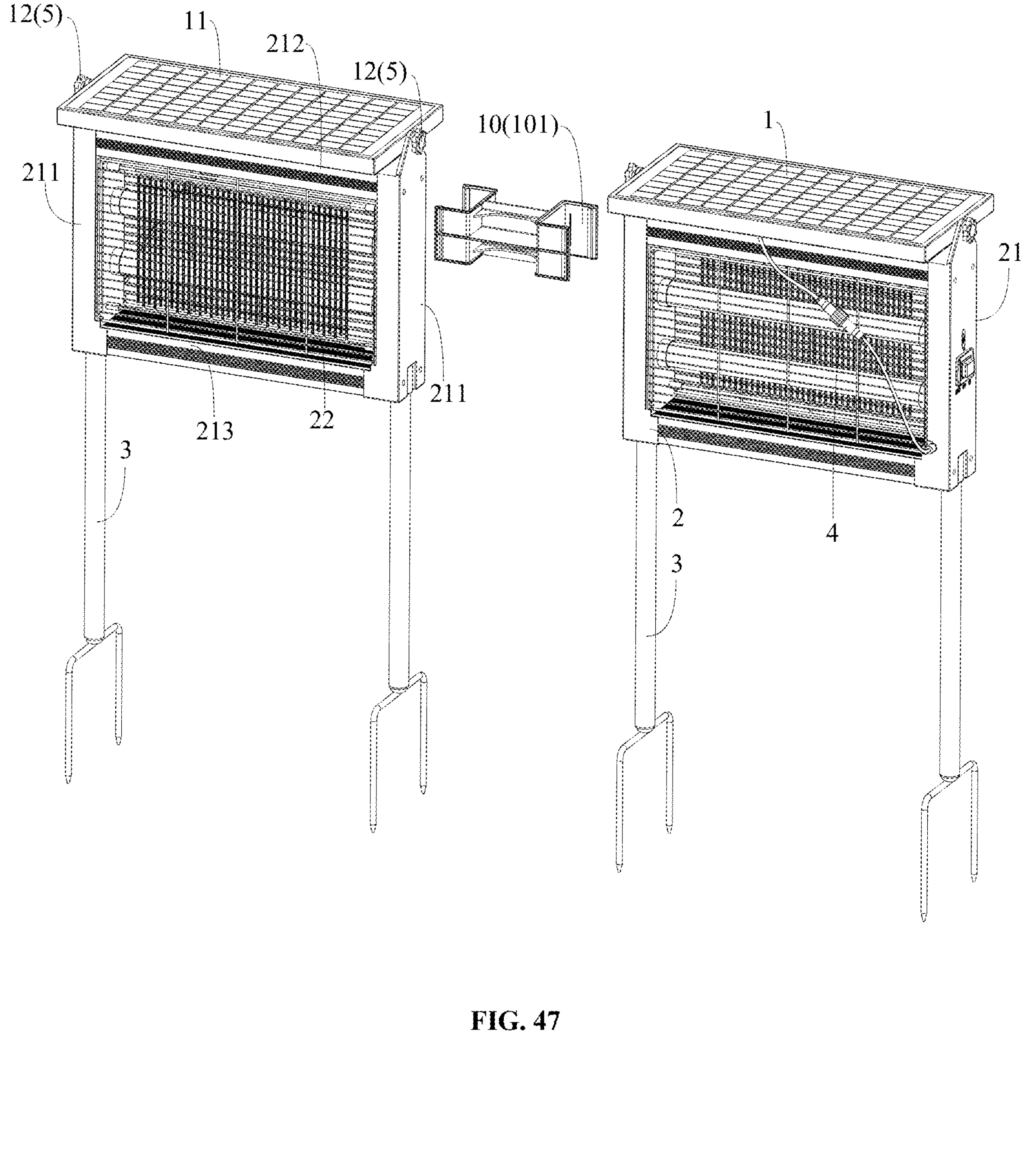
FIG. 47 is an exploded view of the solar mosquito killer of FIG. 46.

In the first scenario, as shown in FIGS. 36 and 37, the connection part 1012 includes a first connecting wall 1012*a* and a second connecting wall 1012*b* arranged in a cross manner. The first connecting wall 1012*a* and the second connection part 1012 are fixedly connected to the two first surrounding walls 1011*a* of the two mounting portions 1011 on both sides along the length direction XX' of the mosquito killing module 2. Among them, the first connecting wall 1012*a* and the second connecting wall 1012*b* can be integrated with the two mounting parts 1011 through injection molding or 3D printing, but are not limited to. The first connecting wall 1012*a* and the second connecting wall 1012*b* arranged in a cross manner are used to connect the two dispersed installation parts 1011 into a whole, simplifying the structure of the installation component 101 and facilitating its processing. It should be noted that, as shown in FIGS. 38 to 45, multiple mosquito killing modules 2 are assembled together through mounting components 101 as shown in FIGS. 36 and 37. It can be understood that the frame component 21 of the mosquito killing module 2 shown in FIGS. 38 to 45 only differs on the outer contour line of the frame formed by the connection of two mounting columns 211, a top beam 212, and a bottom beam 213.

Figure 48:
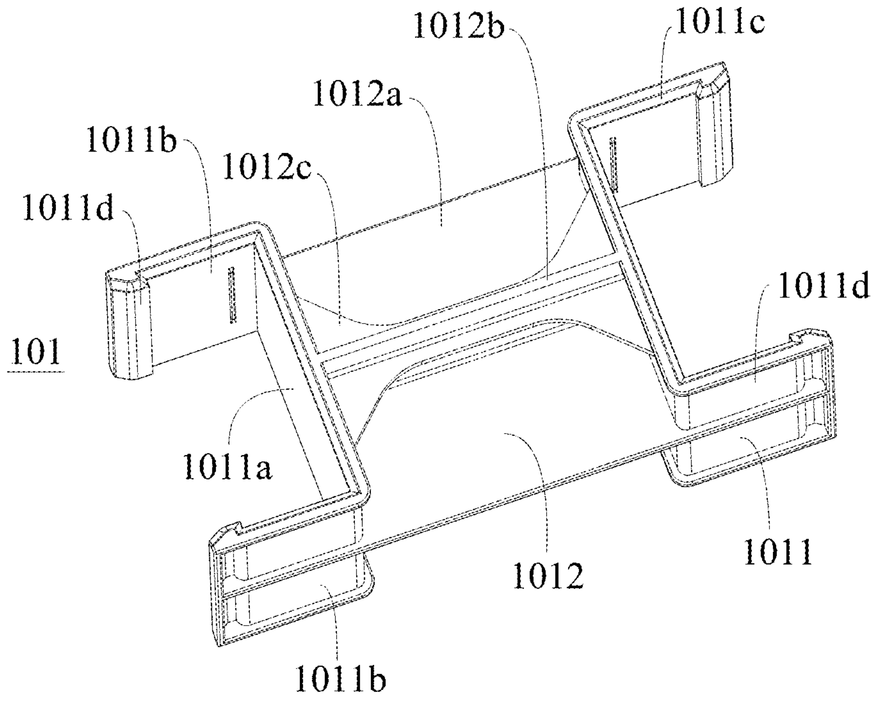
FIG. 48 is a perspective view of the installation component of FIG. 46.
Figure 49:
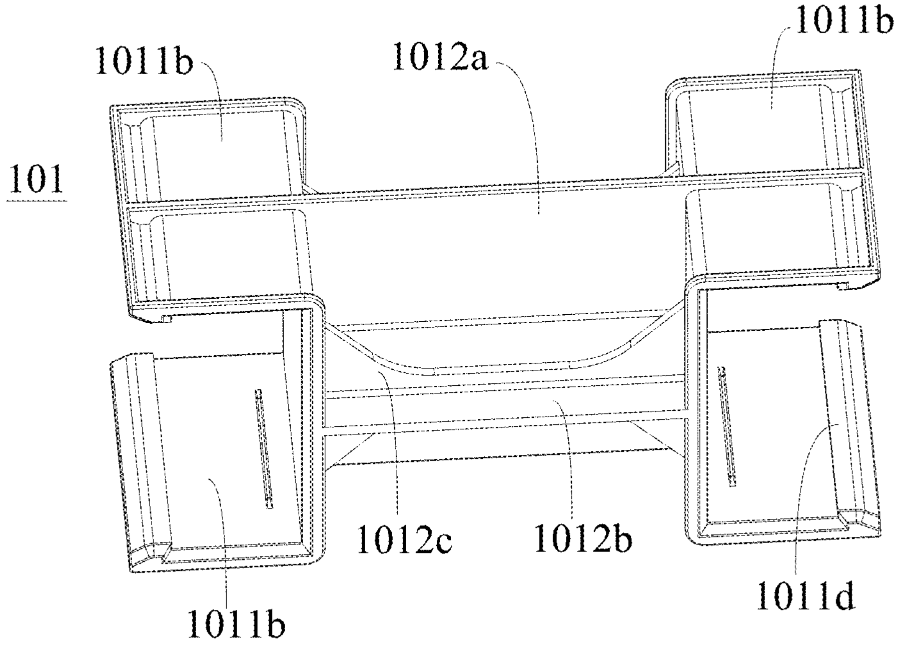
FIG. 49 is a perspective view of the installation component of FIG. 48.
Figure 50:
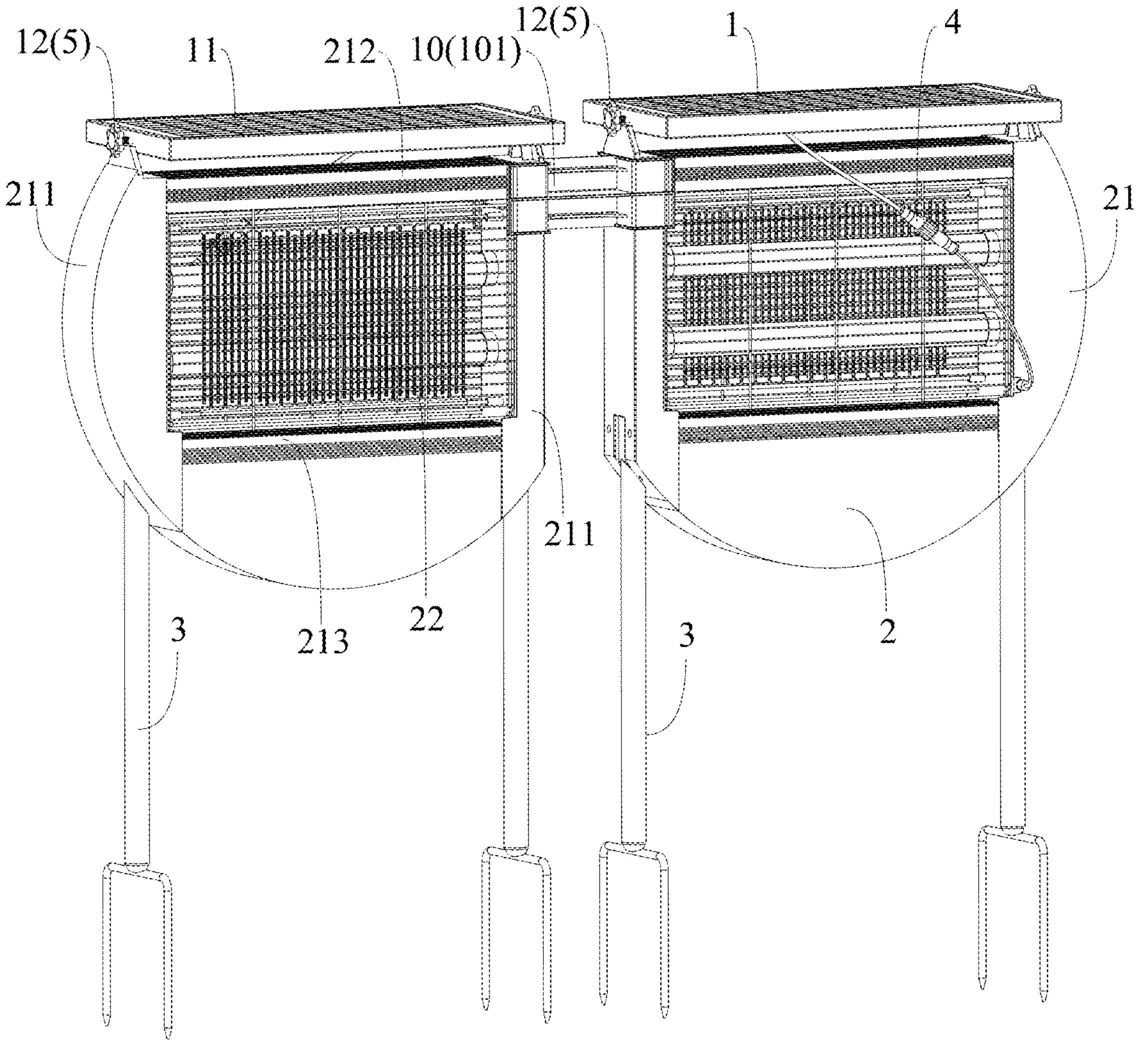
FIG. 50 is a seventh schematic view of the solar mosquito killer according to a first embodiment of present application.
Figure 51:
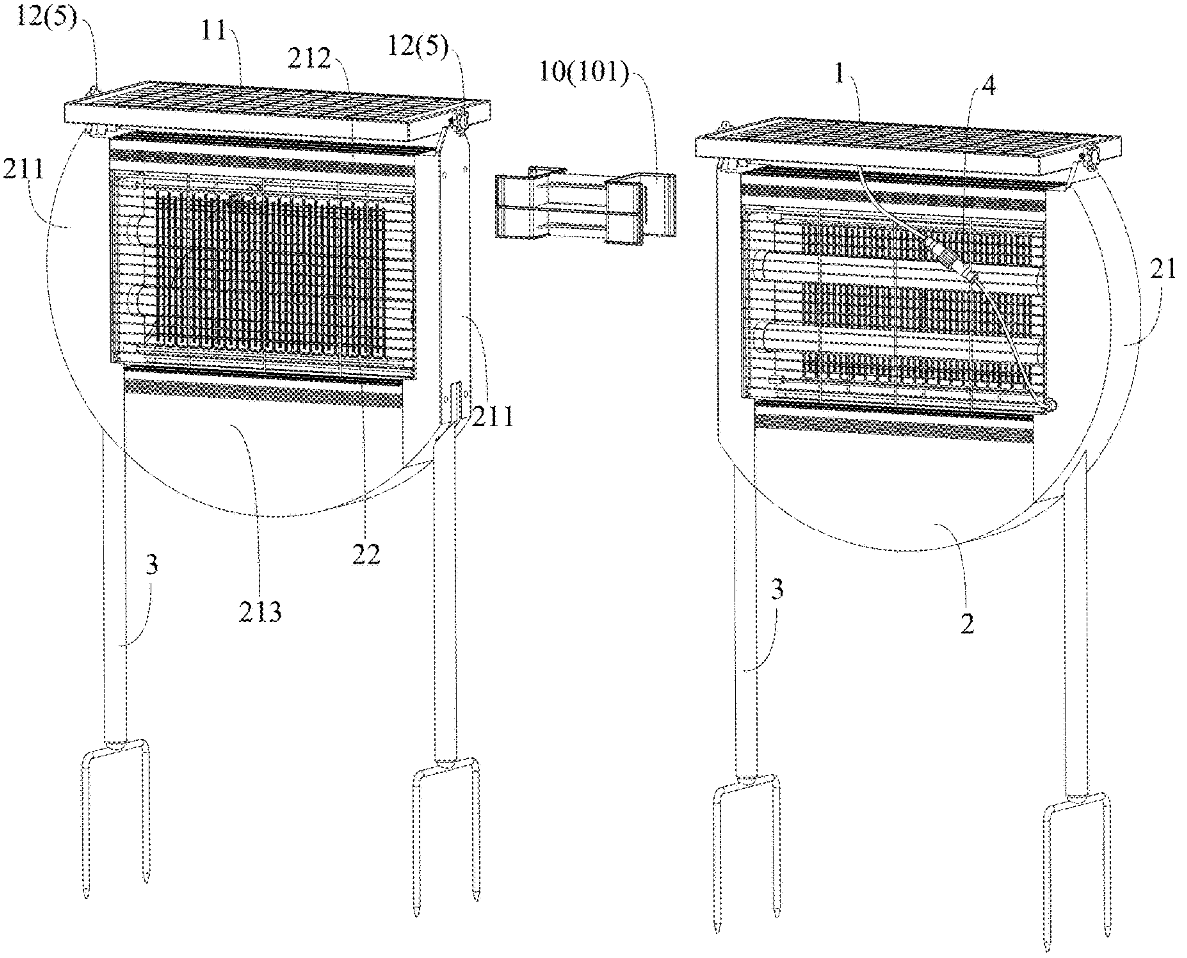
FIG. 51 is an exploded view of the solar mosquito killer of FIG. 50.
Figure 52:
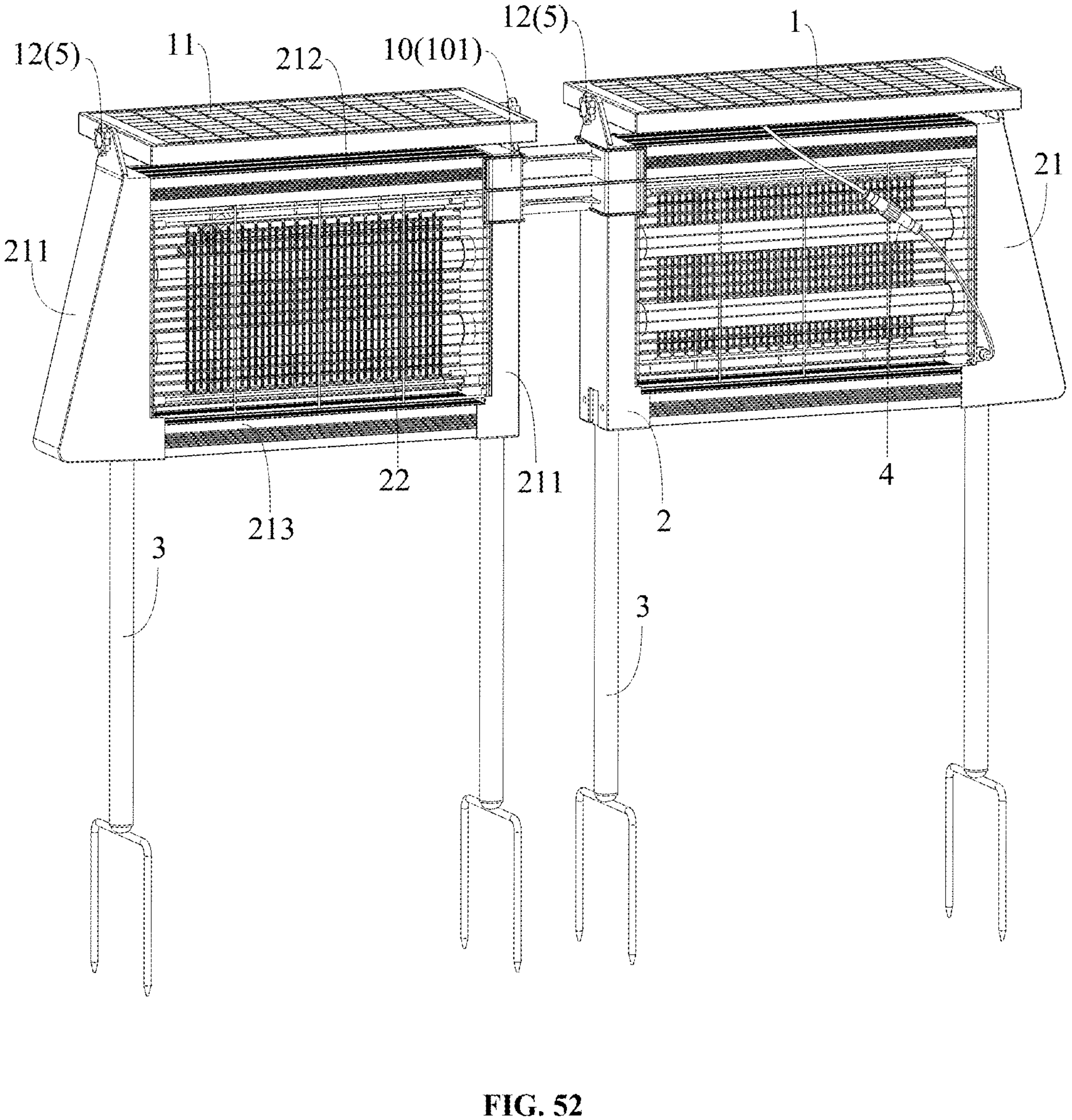
FIG. 52 is an eighth schematic view of the solar mosquito killer according to a first embodiment of present application.
Figure 53:
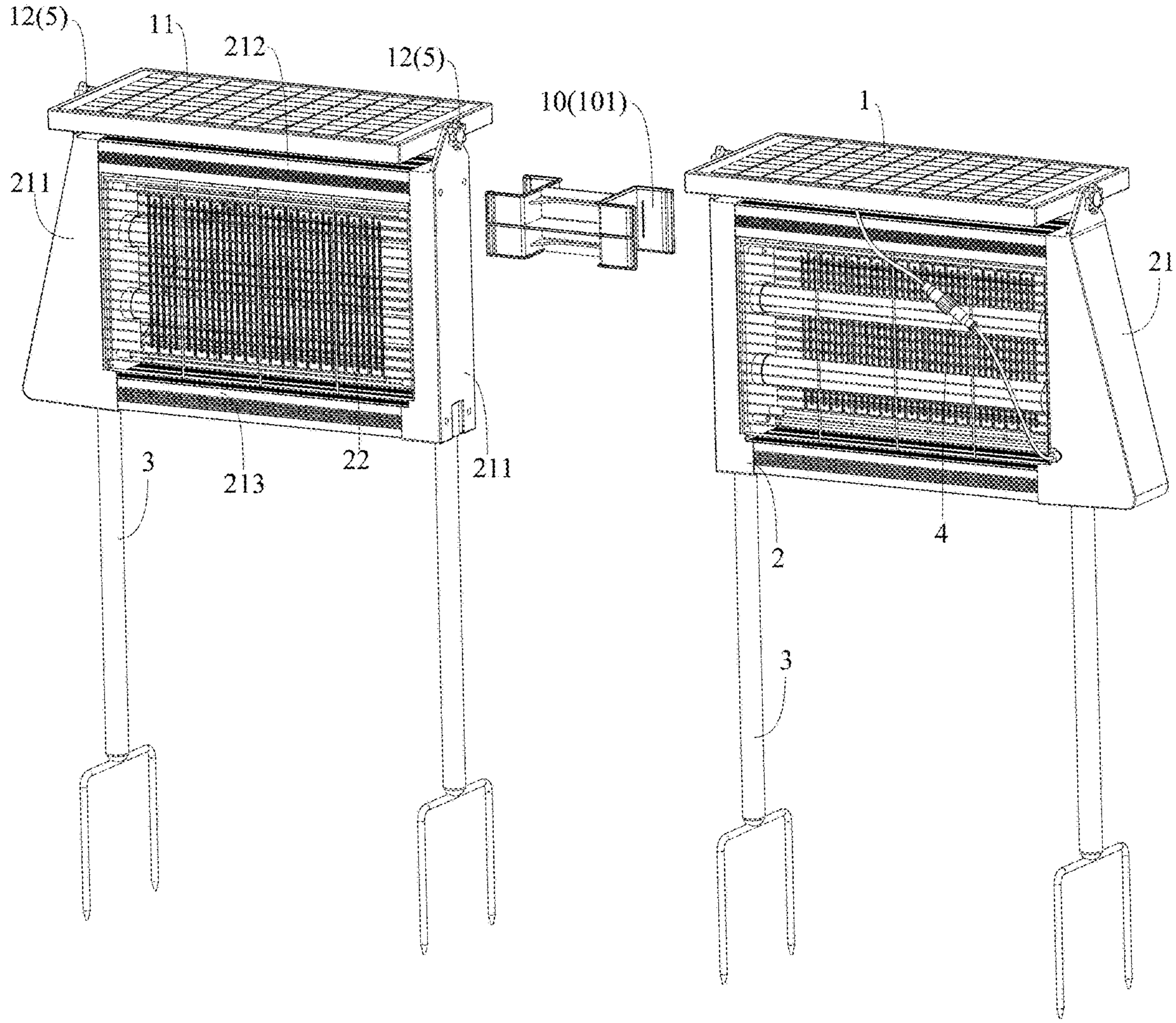
FIG. 53 is an exploded view of the solar mosquito killer of FIG. 52.
Figure 54:
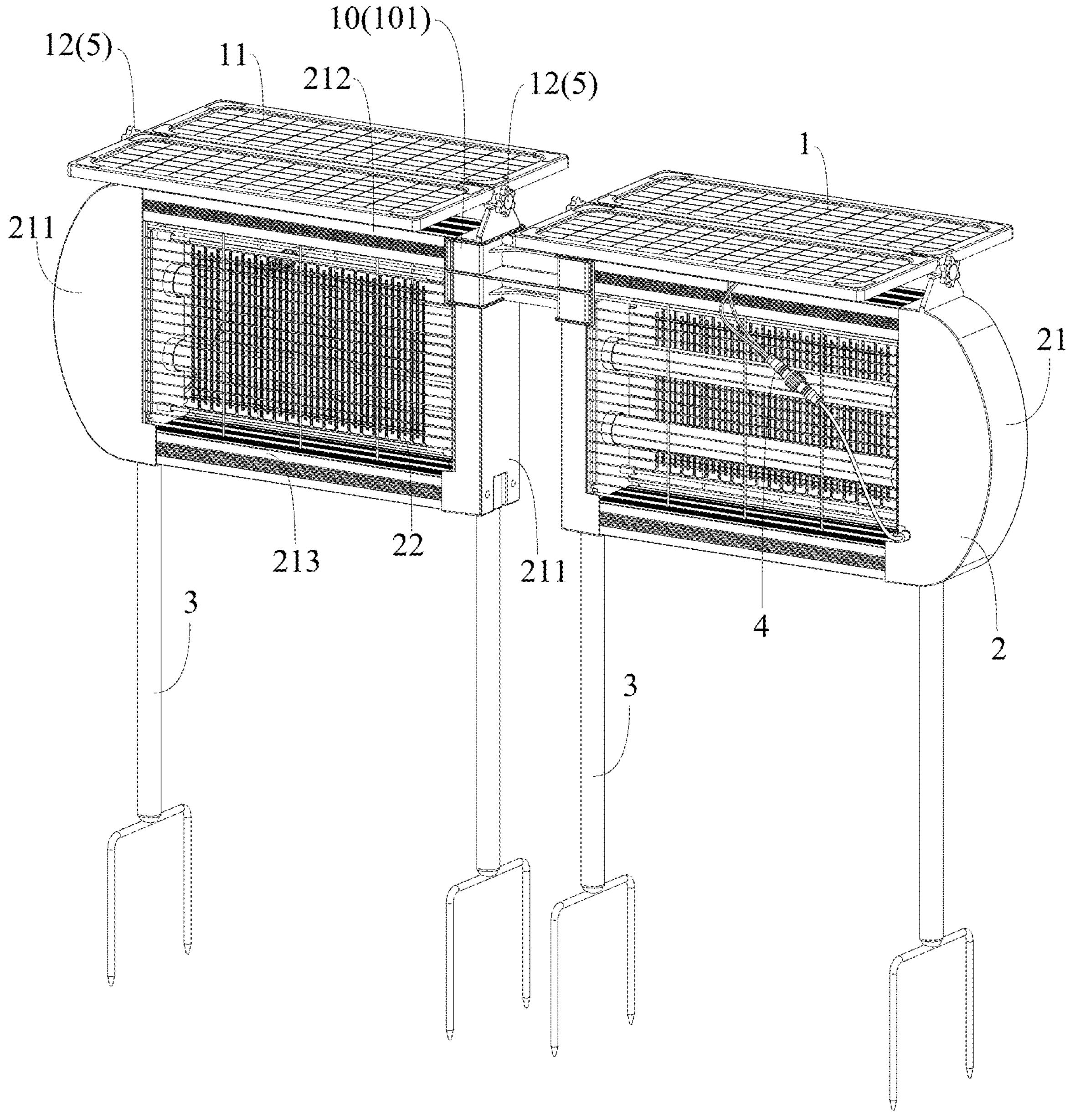
FIG. 54 is a ninth schematic view of the solar mosquito killer according to a first embodiment of present application.
Figure 55:
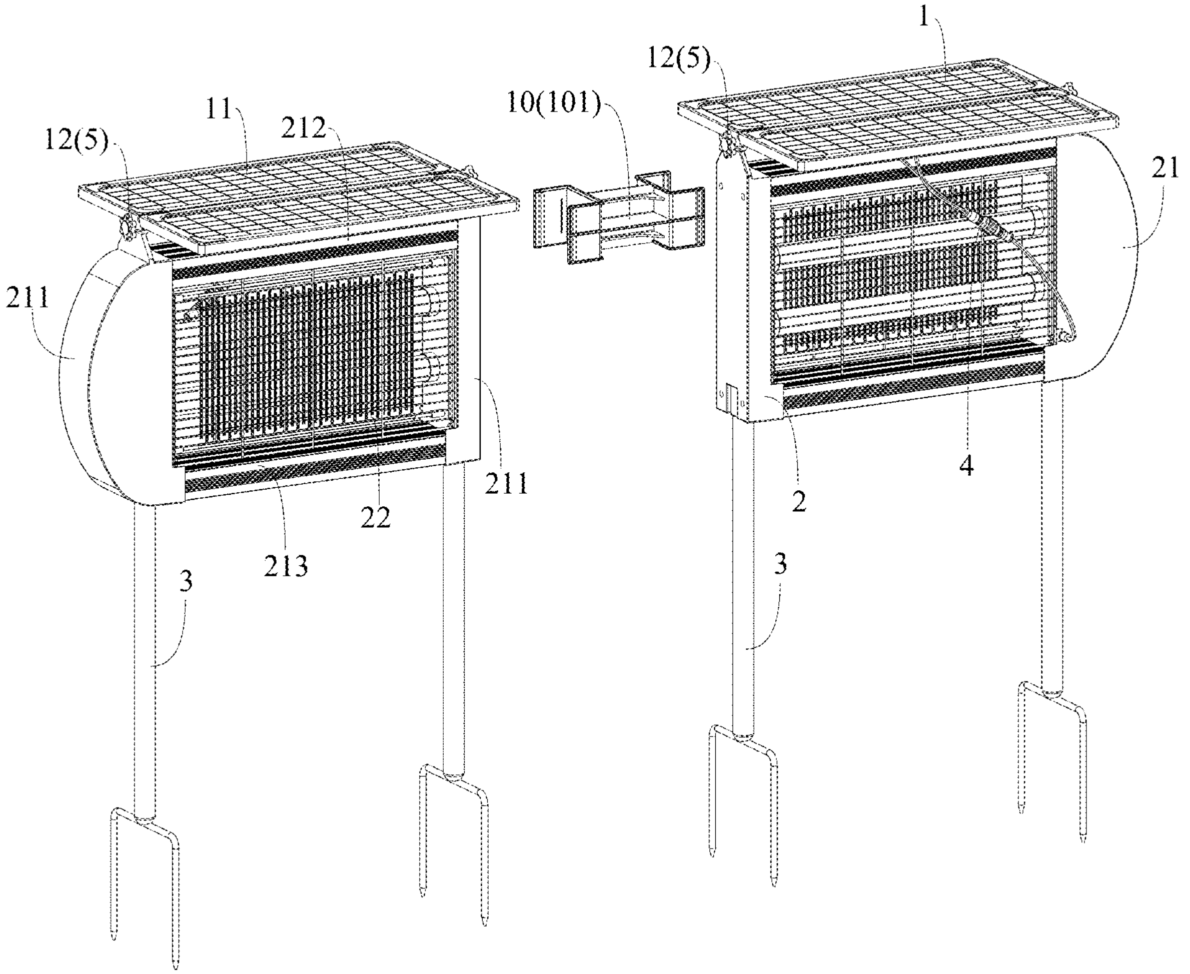
FIG. 55 is an exploded view of the solar mosquito killer of FIG. 52.
Figure 56:
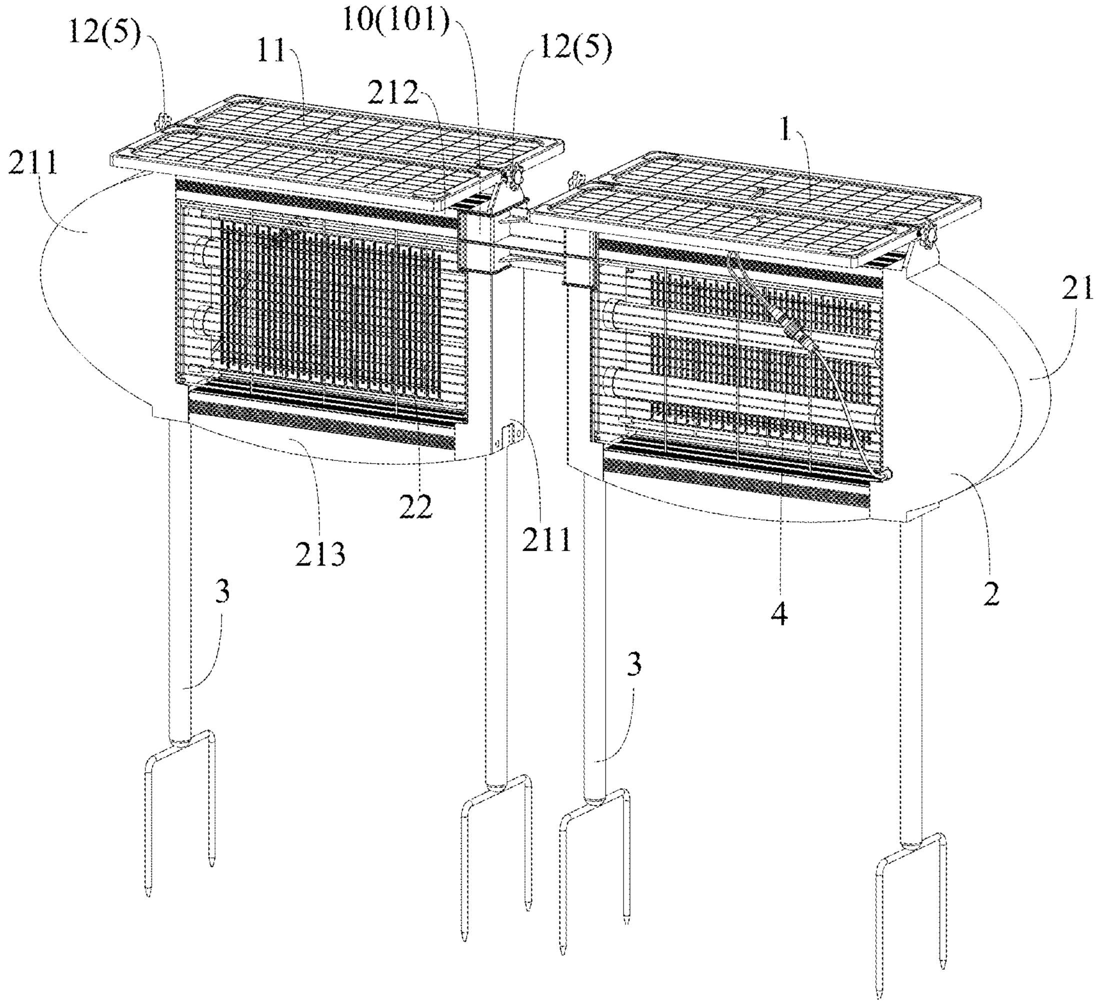
FIG. 56 is a tenth schematic view of the solar mosquito killer according to a first embodiment of present application.

In the second scenario, as shown in FIGS. 46 to 49, the connecting part 1012 includes a first connecting wall 1012*a*, a second connecting wall 1012*b*, and a reinforcing wall 1012*c*, the first connecting wall 1012*a* and the second connecting wall 1012*b* are arranged in a cross manner, and the first connecting wall 1012*a* and the second connecting wall 1012*b* are fixedly connected to the two first surrounding walls 1011*a* of the two installation parts 1011 on both sides along the length direction XX' of the mosquito killing module 2. The reinforcing wall 1012*c* connects at least two of the first connecting wall 1012*a*, the second connecting wall 1012*b*, and the first surrounding wall 1011*a*. Among them, the first connecting wall 1012*a*, the second connecting wall 1012*b*, and the reinforcing wall 1012*c* can be integrated with the two mounting parts 1011 through injection molding or 3D printing, but are not limited to. The number of reinforced walls 1012*c* can be one or multiple. The first connecting wall 1012*a* and the second connecting wall 1012*b* arranged in a cross manner are used to connect the two dispersed installation parts 1011 into a whole, simplifying the structure of the installation component 101 and facilitating its processing; the strengthening wall 1012*c* is equivalent to reinforcing ribs used to enhance the overall structural strength of installation component 101. It should be noted that, as shown in FIGS. 50 to 57, multiple mosquito killing modules 2 are assembled together through mounting components 101 as shown in FIGS. 48 and 49. It can be understood that the frame component 21 of the mosquito killing module 2 shown in FIGS. 50 to 57 only differs on the outer contour line of the frame formed by the connection of two mounting columns 211, a top beam 212, and a bottom beam 213.

Figure 60:
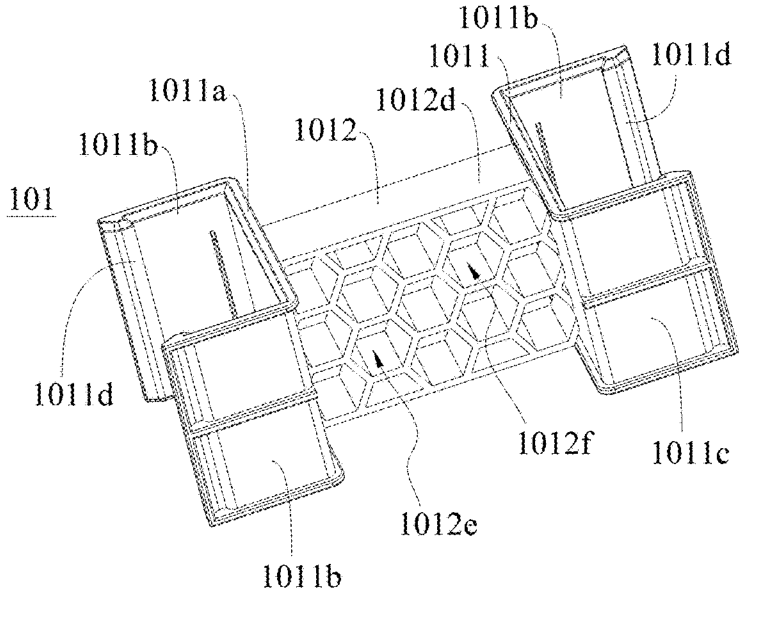
FIG. 60 is a perspective view of the installation component of FIG. 58.
Figure 61:
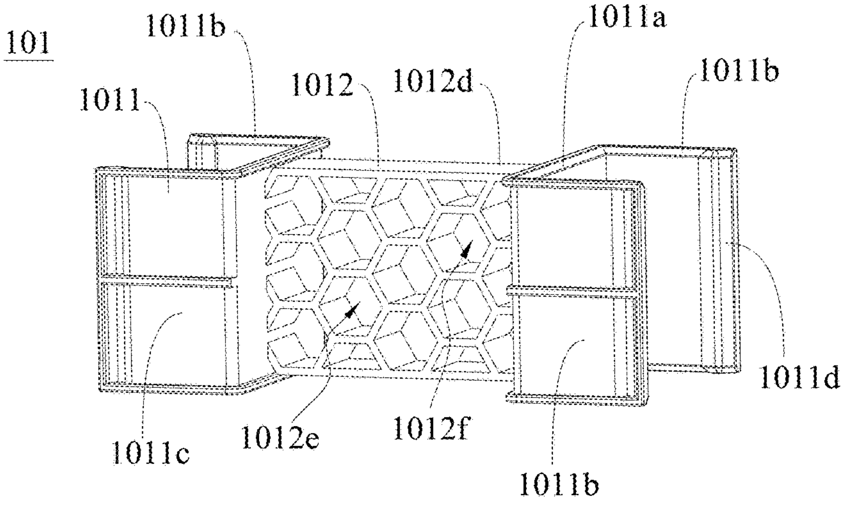
FIG. 61 is another perspective view of the installation component of FIG. 60.
Figure 62:
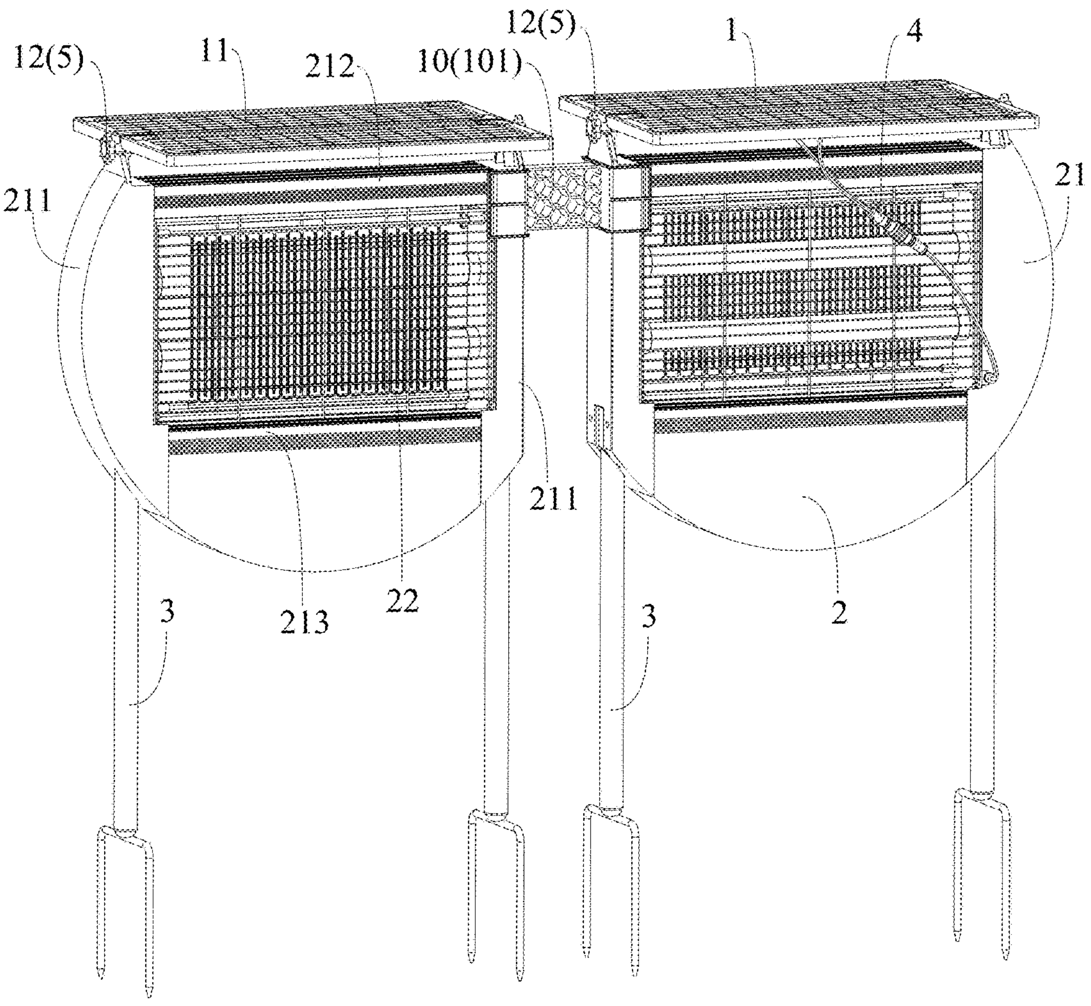
FIG. 62 is a twelfth schematic view of the solar mosquito killer according to a first embodiment of present application.
Figure 63:
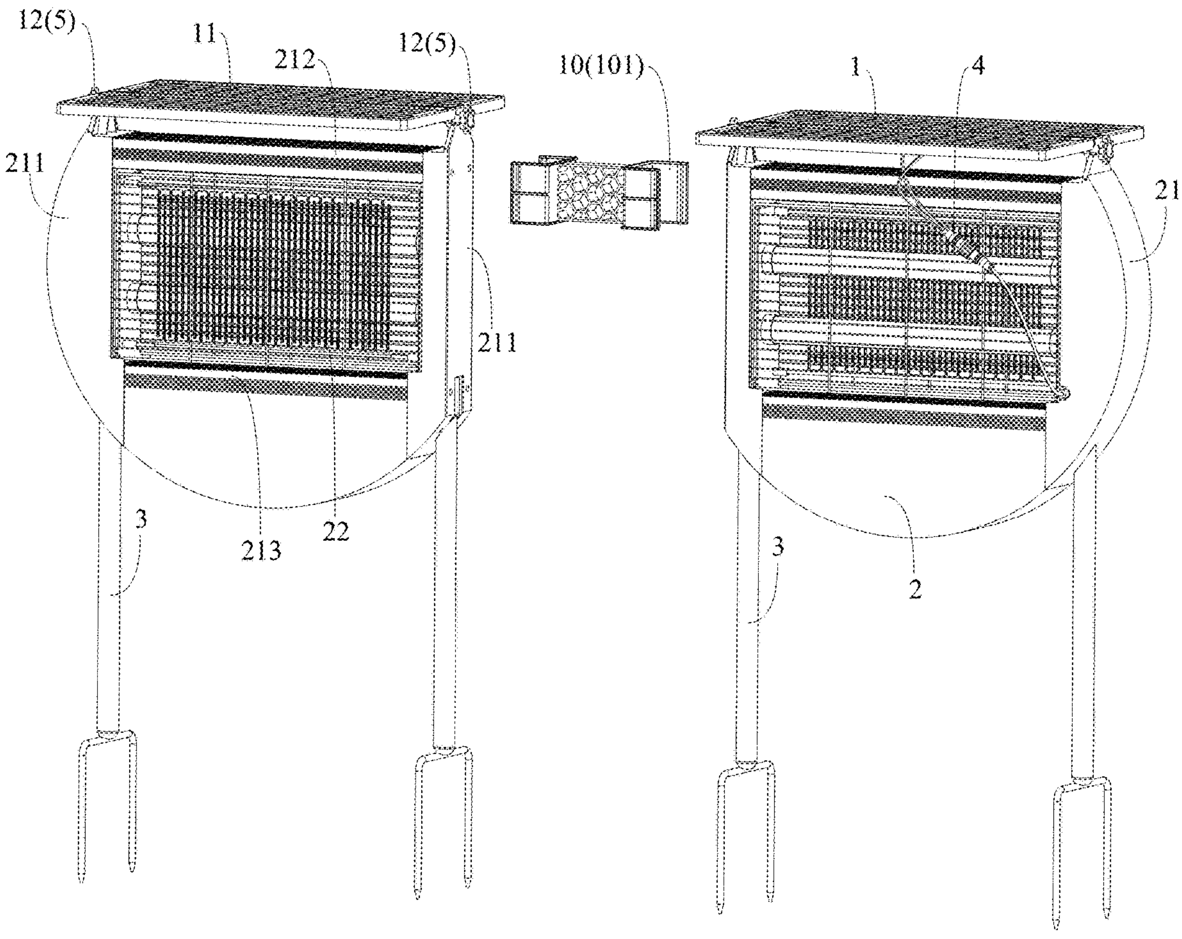
FIG. 63 is an exploded view of the solar mosquito killer of FIG. 62.
Figure 64:
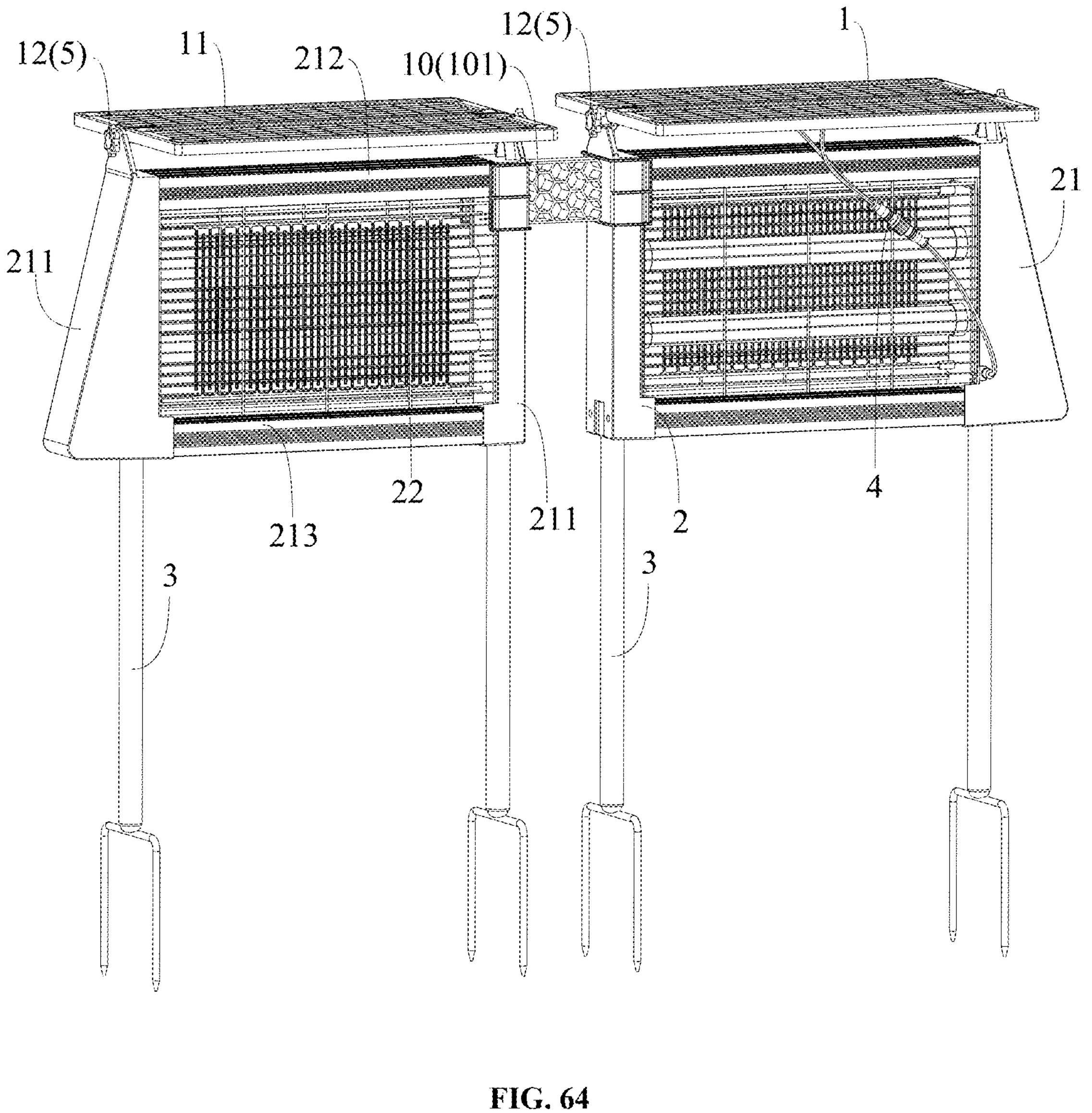
FIG. 64 is a thirteenth schematic view of the solar mosquito killer according to a first embodiment of present application.
Figure 65:
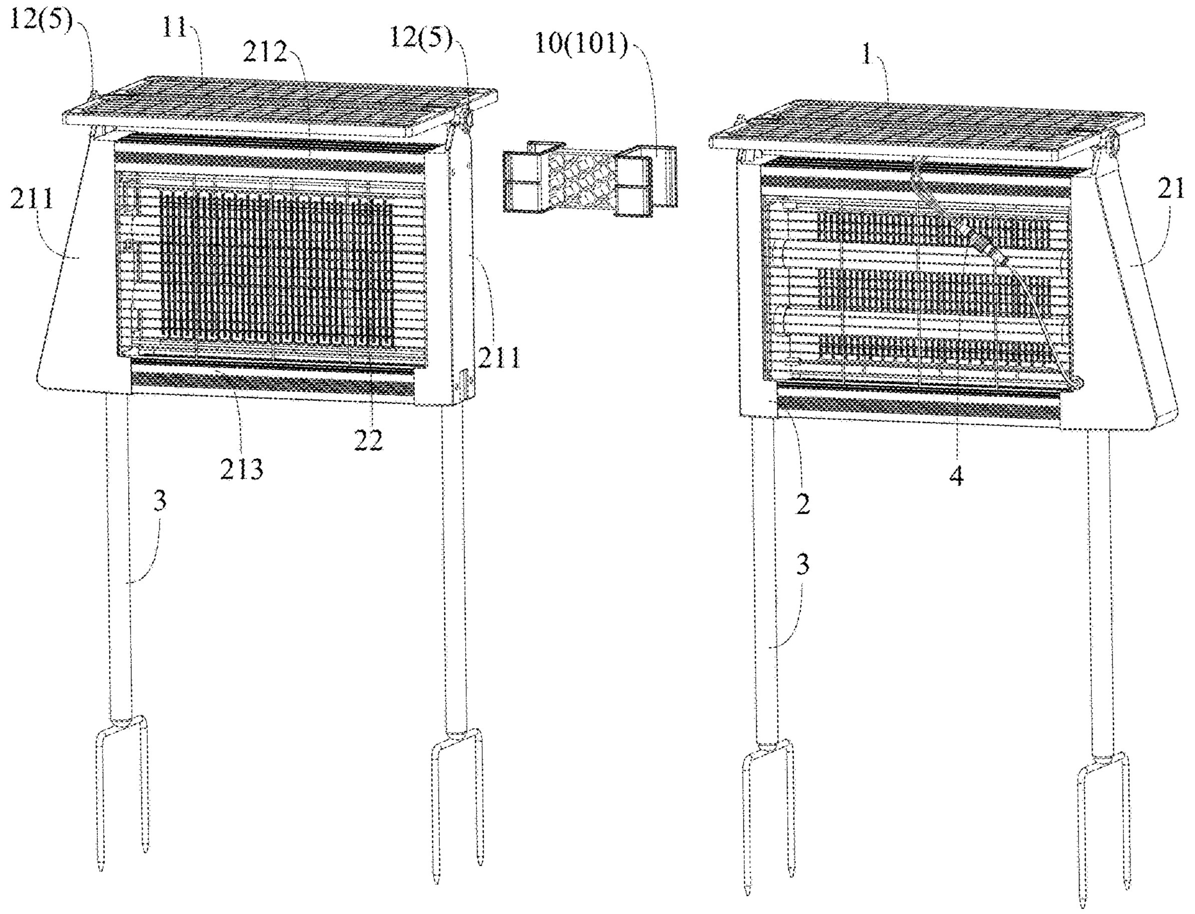
FIG. 65 is an exploded view of the solar mosquito killer of FIG. 64.
Figure 66:
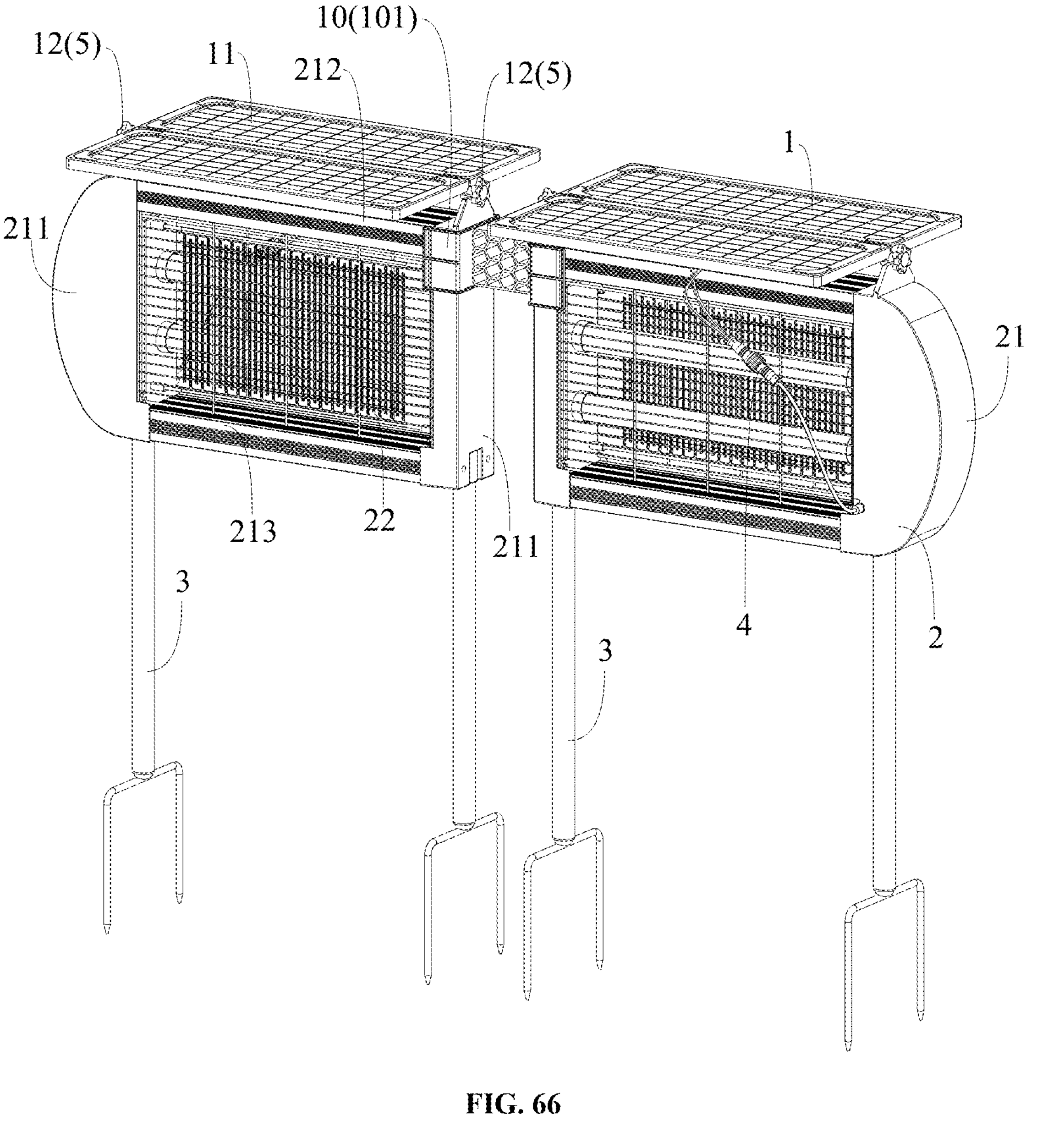
FIG. 66 is a fourteenth schematic view of the solar mosquito killer according to a first embodiment of present application.
Figure 67:
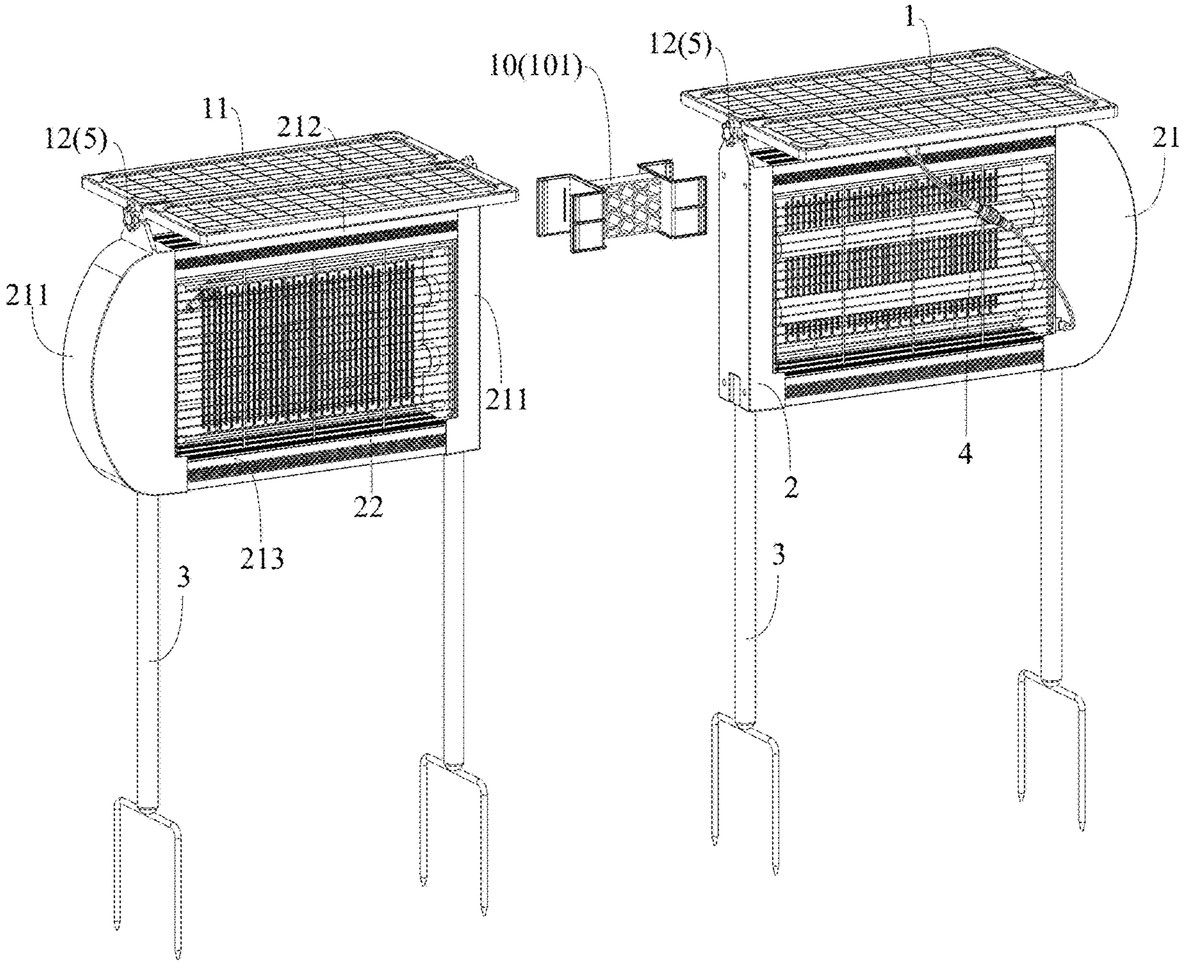
FIG. 67 is an exploded view of the solar mosquito killer of FIG. 66.

In the third scenario, as shown in FIGS. 58 to 61, the connecting part 1012 includes a third connecting wall 1012*d* extending along the length direction XX' of the mosquito killing module 2, and the third connecting wall 1012*d* is fixedly connected to the two first surrounding walls 1011*a* of the two mounting parts 1011 on both sides along the length direction XX' of the mosquito killing module 2. The third connecting wall 1012*d* is provided with a hollow area 1012*e*, which includes a hollow hole 1012*f* that runs through the third connecting wall 1012*d* along the width direction YY' of the mosquito killing module 2, and the cross-section of the hollow hole 1012*f* is polygonal. Among them, the third connecting wall 1012*d* can be integrated with the two mounting parts 1011 through injection molding or 3D printing, but is not limited to. The third connecting wall 1012*d* is used to connect two dispersed installation parts 1011 into a whole, simplifying the structure of the installation component 101 and facilitating its processing. By designing a hollow area 1012*e* on the third connecting wall 1012*d* and designing the hollow area 1012*e* as a polygonal hollow hole 1012*f*, the structural strength of the third connecting wall 1012*d* can be enhanced. It should be noted that, as shown in FIGS. 62 to 69, multiple mosquito killing modules 2 are assembled together through mounting components 101 as shown in FIGS. 60 and 61. It can be understood that the frame component 21 of the mosquito killing module 2 shown in FIGS. 62 to 69 only differs on the outer contour line of the frame formed by connecting two mounting columns 211, a top beam 212, and a bottom beam 213.

In this embodiment, as shown in FIGS. 3, 4, 70, and 71, for each mosquito killing module 2, the mosquito killing module 2 further includes a control component 23 electrically connected to the electric grid 22, a button 24 set on the frame component 21 and electrically connected to the control component 23, and a flexible waterproof cover 25 covering the button 24.

In this embodiment, as shown in FIGS. 2 and 3, both mounting columns 211 are box bodies and each include a box body 201 and a cover 202, the cover 202 detachably covers the box body 201, and the control component 23 is located between the box body 201 and the cover 202. Among them, the cover 202 can be, but is not limited to, detachably connected to the box body 202 through at least one of screw connection, card connection, or plug-in connection. By designing both mounting columns 211 as detachable box bodies 201 and cover bodies 202, it facilitates later equipment maintenance personnel to inspect and repair control components 23 and other components installed inside the mounting column 211 by disassembling the cover 202.

The button 24 can be the on/off button of the solar mosquito killer or the strength button of the electric grid 22, etc, here, button 24 is preferably the on/off button of the solar mosquito killer.

Figure 71:
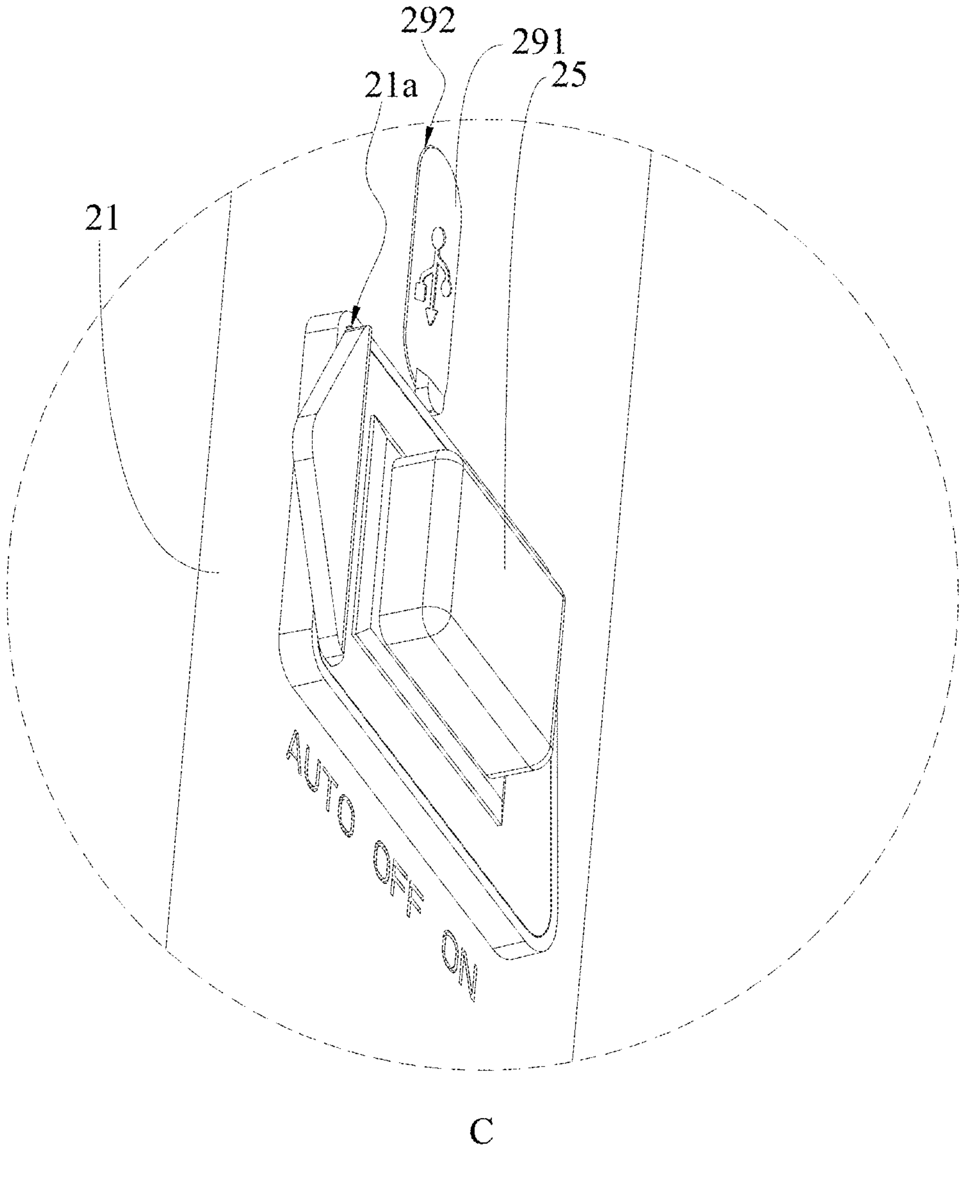
FIG. 71 shows an enlarged view of the C part of FIG. 70.

In present embodiment, as shown in FIG. 71, the button 24 can have multiple gears, which correspond to different states of the mosquito killing module 2, specifically, the multiple gears can be AUTO, OFF, and ON, respectively corresponding to the automatic working state, normally closed state, and normally open state.

In the automatic working state, the mosquito killing module 2 can automatically enter the off mosquito killing state or on mosquito killing state according to the working state of the solar module 1. Specifically, during the day, when the solar module 1 receives light and converts it into electrical energy (i.e., the solar module 1 is in normal working state), the mosquito killing module 2 can obtain a detection signal to determine that the solar module 1 is in normal working state based on the detection signal, at this time, the mosquito killing module 2 enters the off mosquito killing state, that is, the mosquito killing module 2 does not turn on the mosquito trap lamp 26 and the electric grid 22, but can receive electrical energy to charge the internal battery 8 (described as below). When it is evening or night, the solar module 1 cannot obtain enough light and enters an abnormal working state, at this time, the mosquito killing module 2 detects that the solar module 1 is in an abnormal working state based on the detection signal, and enters the on mosquito killing state, and at this time, the battery 8 supplies power to the mosquito trap lamp 26 and the electric grid 22, and the mosquito trap lamp 26 and the electric grid 22 are turned on to carry out mosquito killing.

Furthermore, as shown in FIGS. 3-4 and 70-71, the mosquito control module 2 can also have a power supply interface component 29, which is electrically connected to the main circuit board 28 of the control component 23. The power supply interface component 29 can be placed above the button 24 and can be a USB interface, and the power supply interface component 29 can be exposed through another opening 292 on the housing component 21 to connect to an external power source. A protective cap 291 can also be detachably connected to the power supply interface component 29, which can have an identification pattern on it to display the type of power supply interface component, such as a USB type interface component, such as a Type-C interface component.

Figure 72:
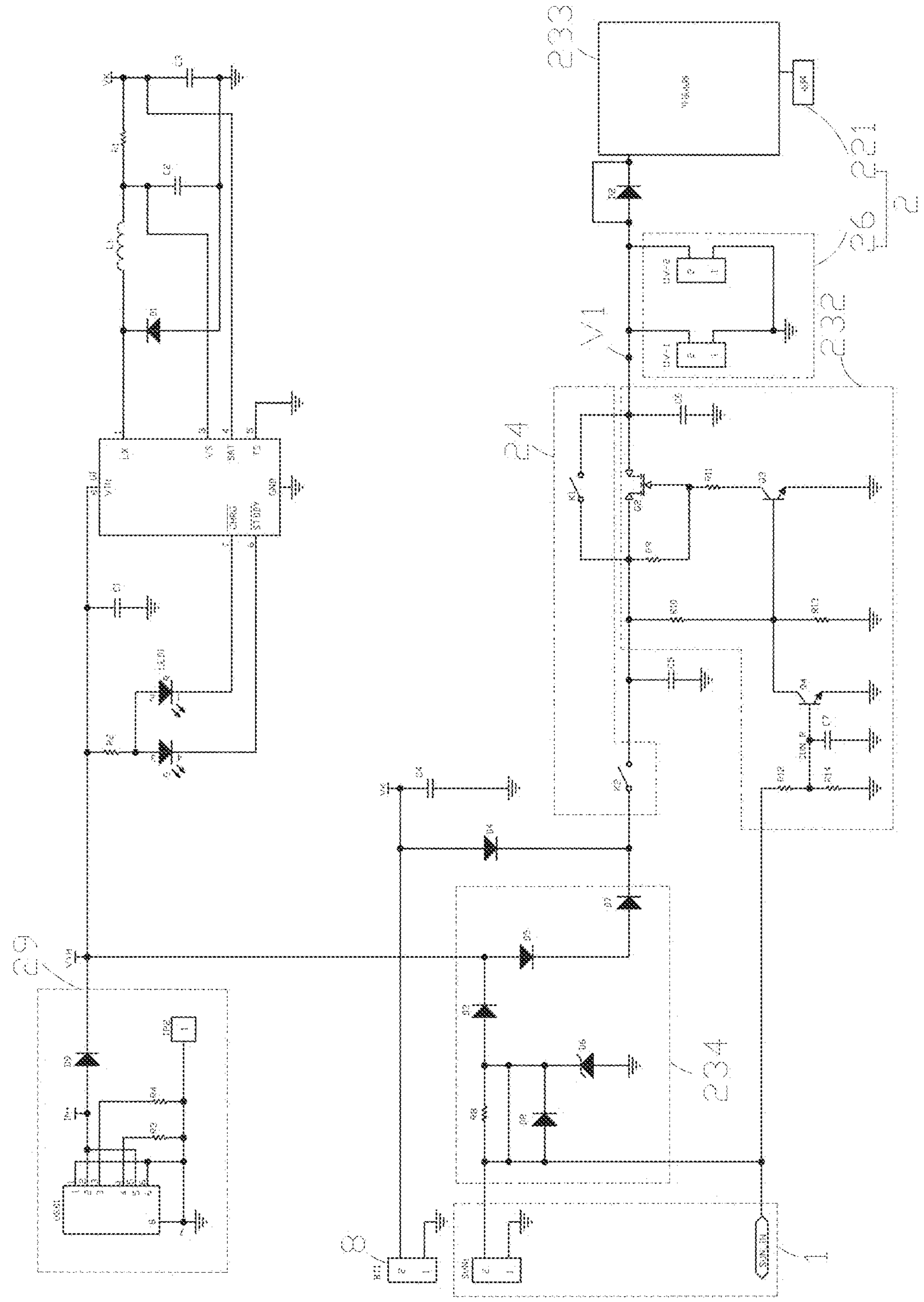
FIG. 72 shows electrical working principle of the solar mosquito killer according to a first embodiment of present application.

As shown in FIG. 72, the control component 23 of the mosquito killing module 2 may include a control chip U1, and a power supply terminal VIN of the control chip U1 is electrically connected to the power supply interface component 29 and the solar module 1 through node VYH. The output terminal LX of the control chip U1 is electrically connected to the battery 8 through node VK, specifically, the control chip U1 obtains electrical energy from at least one of the power supply interface component 29 and the solar module 1 to work and charge the battery 8.

In one embodiment, the output terminal LX of the control chip U1 can provide charging voltage to the battery 8, and at this time, the supply current of the battery 8 is preferably less than the predetermined value (such as 1A). In another embodiment, an output terminal LX of control chip U1 provides charging voltage to battery 8 through inductor L1, and the oscillation of inductor L1 can improve the charging and heating situation of control chip U1. In addition, the control chip U1 can also control the charging signal output by the output terminal LX based on the real-time voltage of the battery 8. For example, during the initial charging stage of the battery 8, if the voltage of the battery 8 is within the first voltage range (such as less than 2.5V), the control chip U1 can control the charging signal of the output terminal LX to charge the battery 8 at the first working current; if during the middle charging stage of battery 8, the voltage of battery 8 is within the second voltage range (such as greater than or equal to 2.5V and less than or equal to 4.1V), the control chip U1 can control the charging signal of output terminal LX to charge battery 8 at the second operating current (such as greater than the first operating current); if in the later charging stage of battery 8, the voltage of battery 8 is within the third voltage range (such as greater than 4.1V), the control chip U1 can control the charging signal of output terminal LX to charge battery 8 at the preset working voltage (such as 4.2V)

As shown in the circuit schematic in FIG. 72, button 24 can include (or be equivalent to) a first switch K1 and a second switch K2, through the first switch K1 and the second switch K2, as well as the switch control circuit 232, it is possible to switch the mosquito killing module 1 between the automatic working state, the normally off state, and the normally on state (i.e., working state), and control the mosquito killing module 2 to automatically enter the turning off mosquito killing state or turning on mosquito killing state according to the working state of the solar module 1 during the automatic working state.

Specifically, the second switch K2 is connected between solar module 1 and switch Q2 (as well as battery 8 and switch Q2), and the first switch K1 is connected in parallel with switch Q2.

It can be understood that the switch control circuit 232 is electrically connected to the solar module 1, and is electrically connected between the battery 8 and the electric grid 22 and/or the mosquito trap lamp 26 of the mosquito killing module 1. Under the control of the switch control circuit 232, the mosquito killing module 2 can automatically enter the turning off mosquito killing state or turning on mosquito killing state according to the working state of the solar module 1. Specifically, the switch control circuit 232 may include switch Q2, switch Q3, and switch Q4, and the two conducting terminals of the switch Q2 are respectively connected between button 24 and mosquito control module 2. The control terminal of the switch Q2 is grounded through the two conducting terminals of the switch Q3, and the control terminal of the switch Q3 is grounded through the two conducting terminals of the switch Q4, and the control terminal of the switch Q4 is electrically connected to the solar module 1. The switch Q2 can be a field-effect transistor, while the switches Q3 and Q4 can be bipolar transistors.

In the normally off state, the second switch K2 is disconnected, the first switch K1 is disconnected, the solar module 1 and battery 8 cannot supply power to the mosquito killing module 2, and the mosquito killing module 2 is in the off state. In the normally on state, the second switch K2 is conductive, the first switch K1 is conductive, and at least one of the solar module 1 and the battery 8 supplies power to the mosquito killing module 2, which is in the on state.

In the automatic working state, the second switch K2 is turned on and the first switch K1 is turned off, the voltage of the output terminal SUN IN of the solar module 1 controls the switches Q4, Q3, and Q2, thereby further controlling the conduction and turning off the switch Q2. During the day, when the output terminal SUN IN of solar module 1 has sufficient voltage to control switch Q2 to be turned off through switches Q4 and Q3 (at this time, switch Q4 is conductive, switch Q3 is turned off, and switch Q2 is turned off), the solar module 1 supplies power to mosquito control module 2 through the first switch K1; in the evening or at night, the output terminal SUN IN of solar module 1 does not have enough voltage to control switch Q4 to be turned off, causing switch Q3 to conduct and switch Q2 to conduct, and the battery 8 supplies power to mosquito control module 2 through switch Q2.

In addition, the power supply voltage V1 output by solar module 1 or battery 8 can be a DC low voltage, such as a DC voltage between 3V-4.2V. An isolation circuit 234 can also be installed between solar module 1 and button 24, which can include multiple unidirectional conducting diodes (such as D3, D5, and D7). A unidirectional component D4 can also be set between battery 8 and button 24.

Figure 73:
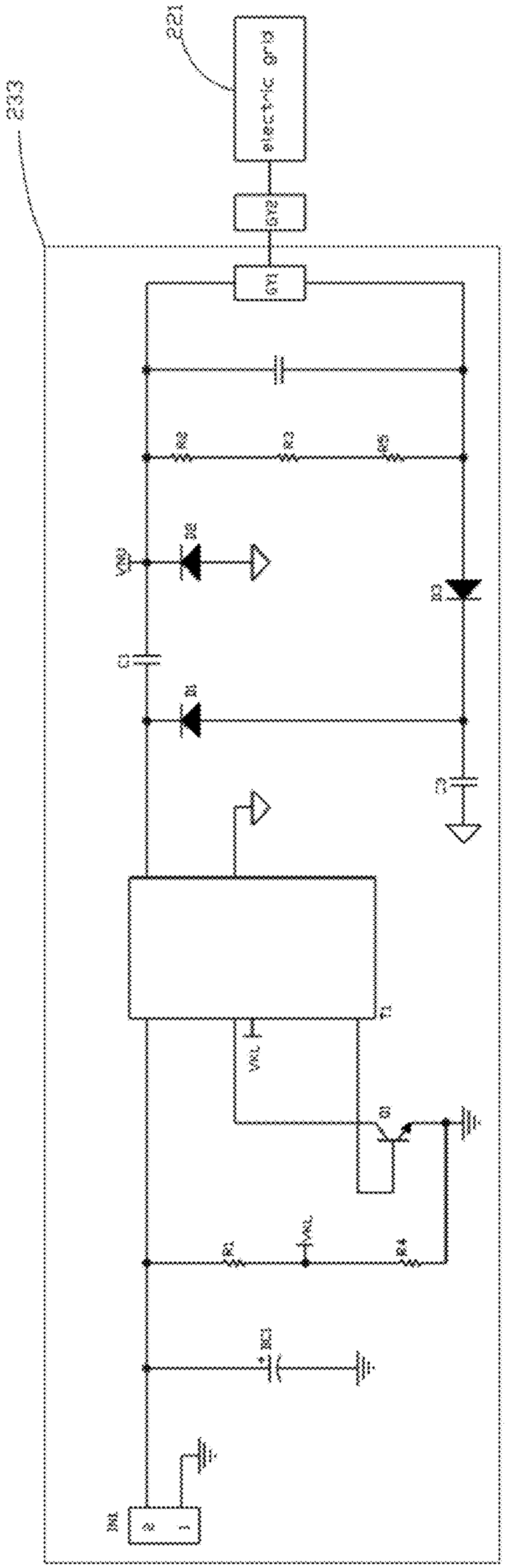
FIG. 73 shows a boost circuit of the solar mosquito killer according to a first embodiment of present application.
Figure 74:
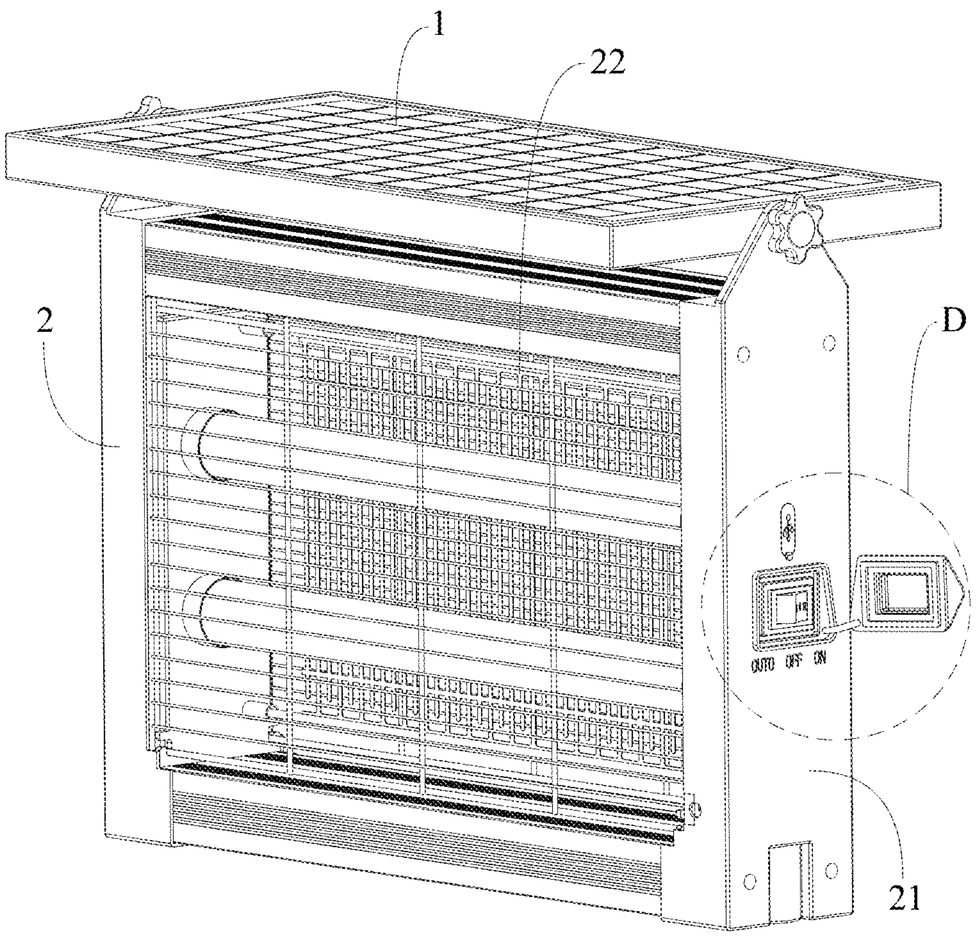
FIG. 74 a first perspective view of the solar module and the mosquito killing module assembled together.

As shown in FIGS. 72 and 73, the control module 23 may further include a boost circuit 233, and the supply voltage V1 may be further provided to the input terminal IN of the boost circuit 233. The boost circuit 233 includes a boost device T1 (such as a winding) to boost the supply voltage V1, and outputs a driving voltage from the first output terminal VNU and the second output terminal VU1. The two ends of the first output terminal VNU and the second output terminal VU1 are respectively used to connect the positive component 221 and the negative component 222 of the electric grid 22. Specifically, the first output terminal VNU and the second output terminal VU1 can be connected to a first connector joint, and the positive component 221 and the negative component 222 of the electric grid 22 can be connected to a second connector joint, and the first connector joint and the second connector joint are plugged together to achieve electrical connection between the first output terminal VNU and the second output terminal VU1 and the electric grid 22.

Referring to 70-71 and 74-77, the material of the flexible waterproof cover 25 can be a single material with waterproofing property and adhesion or shrinkage ductility, such as a rubber material, or composite materials such as polyethylene polypropylene composite material. By designing a flexible waterproof cover 25 that covers the button 24 to provide waterproofing, the solar mosquito killer in this embodiment of the present application effectively prevents liquids such as rainwater from seeping into the interior of the solar mosquito killer through the gap at the button 24, compared to the existing technology that does not have a waterproof design for the external leakage switch of the solar mosquito killer, the solar mosquito killer in this embodiment of the application has a good waterproof effect on the external leakage button 24 through a flexible waterproof cover 25, which can effectively prevent liquids such as rainwater from seeping into the interior of the solar mosquito killer through the gaps at the button 24, and avoid the solar mosquito killer from burning out.

It can be understood that the flexible waterproof cover 25 is used to effectively waterproof the exposed button 24. The specific manifestations of the flexible waterproof cover 25 can include, but are not limited to, the following two situations.

In a first scenario, as shown in FIGS. 70-71 and 74-75, the flexible waterproof cover 25 is made of a non-transparent material, and the outer surface of the frame component 21 (specifically the box body 201 described below) is provided with a circular groove 21*a* surrounding the button 24 at the position corresponding to the button 24. At this time, the non-transparent flexible waterproof cover 25 includes a main body portion 251 that can cover the button 24 and a connecting portion 252 that connects the main body portion 251. The connecting portion 252 is arranged around the circumference of the main body portion 251 and is fixed to the frame component 21. Specifically, the non-transparent flexible waterproof cover 25 also includes a connecting head 253, which is connected to the connecting portion 252, and the main body portion 251, the connecting portion 252, and the connecting head 253 are integrally formed by injection molding or 3D printing. The outer surface of the frame component 21 (specifically the box body 201 described below) is also provided with a socket 21*b* for inserting the connecting head 253, and the connecting head 253 is inserted into the socket 21*b* to achieve the connection between the non-transparent flexible waterproof cover 25 and the frame component 21. When the non-transparent flexible waterproof cover 25 covers the button 24, the connecting portion 252 is embedded in the annular groove 21*a*, and the outer surface of the connecting portion 252 is connected to the annular groove 21*a*. The static friction force between the groove walls is used to locate the non-transparent flexible waterproof cover 25, avoiding it from detaching from the frame component 21, thus enabling the non-transparent flexible waterproof cover 25 to provide good waterproof effect on the button 24. When the user needs to trigger the button 24, they can directly apply force to the non-transparent flexible waterproof cover 25 to detach the connecting portion 252 from the annular groove 21. The non-transparent flexible waterproof cover 25 in this design can be flexibly covered on the button 24 to prevent liquids such as rainwater from seeping into the interior of the solar mosquito killer through an assembly gap of the button 24.

The flexible waterproof cover 25 also includes an operating part 254 that connects the connecting portion 252. At least a portion of the operating part 254 extends to an outside of the annular groove 21, making it convenient for users to remove the flexible waterproof cover 25 from the annular groove 21. One end of the connecting head 253 is connected to the connecting portion 252, and the other end of the connecting head 253 extends into and is fixed in the frame component 21 through the insertion hole 12*b* to prevent the flexible waterproof cover 25 from detaching from the frame component 21 after being removed from the annular groove 21*a*, which can effectively prevent the loss of the flexible waterproof cover 25.

Figure 75:
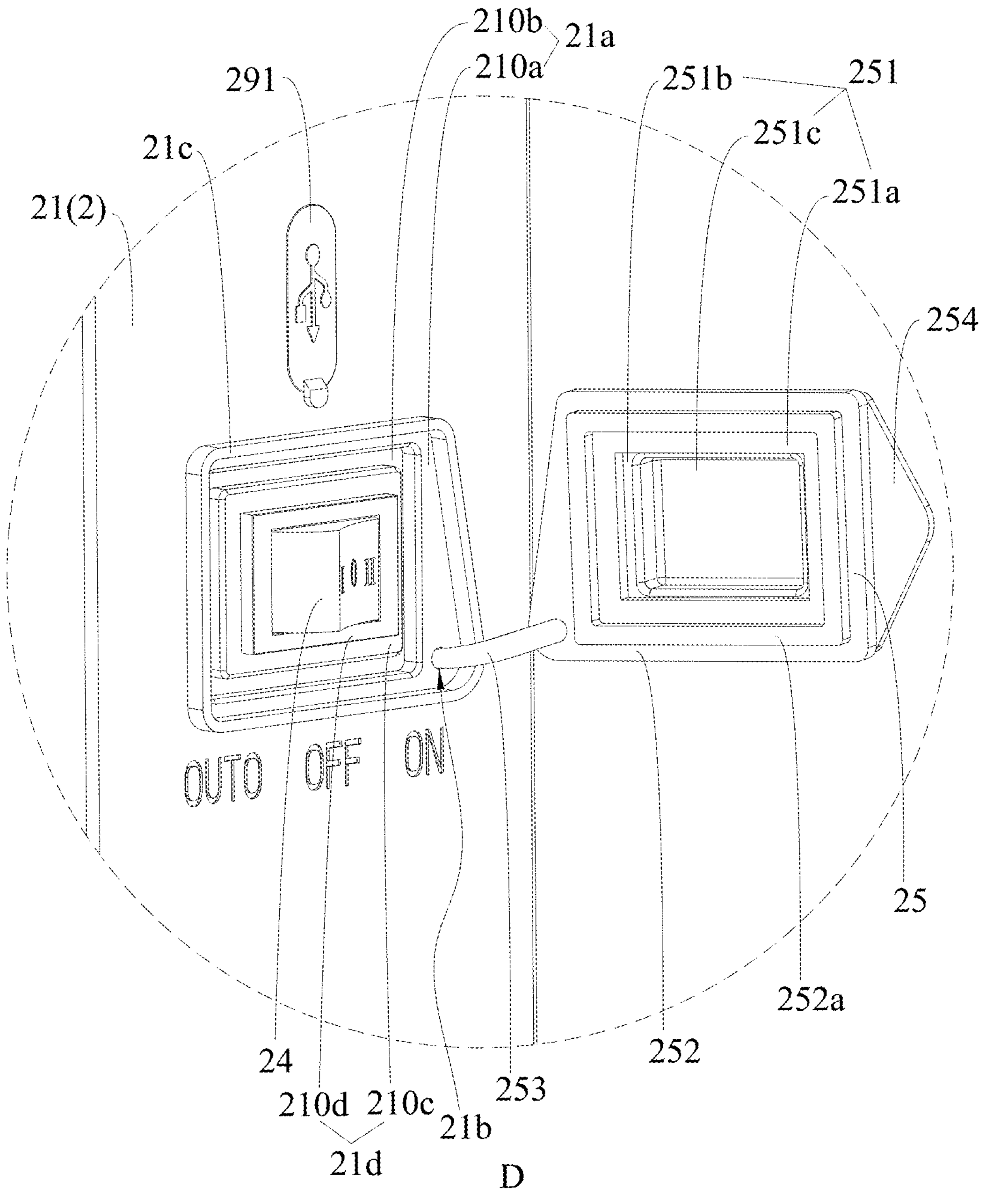
FIG. 75 shows an enlarged view of the D part of FIG. 74.

Specifically, as shown in FIG. 75, the frame component 21 also has a convex platform structure 21*d*, with a button 24 arranged on the convex platform structure 21*d*, and an annular groove 21*a* arranged around a periphery of the convex platform structure 21*d*. Due to the fact that the button 24 is located on the convex platform structure 21*d*, even if moisture enters the annular groove 21*a*, it is difficult for it to enter the button 24 on the convex platform structure 21*d*, which can achieve better waterproof effect.

In this embodiment, the frame component 21 also has an annular convex edge 21*c* that surrounds the annular groove 21*a*, and the annular convex edge 21*c* has a good water vapor blocking effect. Furthermore, the annular groove 21*a* includes a first sub-groove 210*a* and a second sub-groove 210*b*, and the first sub-groove 210*a* is located around a periphery of the second sub-groove 210*b*, and the second sub-groove 210*b* is located between the first sub-groove 210*a* and the convex platform structure 21*d*, with a depth of the second sub-groove 210*b* greater than a depth of the first sub-groove 210*a*. By setting the second sub-groove 210*b* with a depth greater than that of the first sub-groove 210*a*, it is more difficult for water vapor to enter the button 24 on the convex platform structure 21*d*, thus further improving the waterproof effect.

Furthermore, the convex platform structure 21*d* includes a first step portion 210*c* and a second step portion 210*d*. The first step portion 210*c* is arranged around a periphery of the second step portion 210*d*, and the step surface of the first step portion 210*c* is lower than that of the second step portion 210*d*, and the button 24 is provided on the step surface of the second step portion 210*d*. When viewed from a direction from the flexible waterproof cover 25 to the button 24, a planar area corresponding to an outer contour of the button 24 is less than a planar area corresponding to an outer contour of the second step portion 210*d*, and a planar area corresponding to an outer contour of the first sub-groove 210*a*, a planar area corresponding to an outer contour of the second sub-groove 210*b*, a planar area corresponding to an outer contour of the first step portion 210*c*, a planar area corresponding to an outer contour of the second step portion 210*d*, and a planar area corresponding to an outer contour of the button 24 decrease in sequence.

A side of the connecting portion 252 near the button 24 is provided with an annular protrusion 252*a*, and the connecting portion 252 is used to contact the groove side of the first sub-groove 210*a*. The annular protrusion 252*a* is adapted to the size of the second sub-groove 210*b* and is stored in the second sub-groove 210*b*.

The main body portion 251 has a first receiving portion 251*a*, a second receiving portion 251*b*, and a third receiving portion 251*c* on a side thereof near the button 24. The second receiving portion 251*b* and the first receiving portion 251*a* are annular, and the second receiving portion 251*b* is connected between the first receiving portion 251*a* and the third receiving portion 251*c*. The first step portion 210*c*, the second step portion 210*d*, and the button 24 are respectively received and pressed in the first receiving portion 251*a*, the second receiving portion 251*b*, and the third receiving portion 251*c* to achieve good waterproof and assembly effects.

Figure 76:
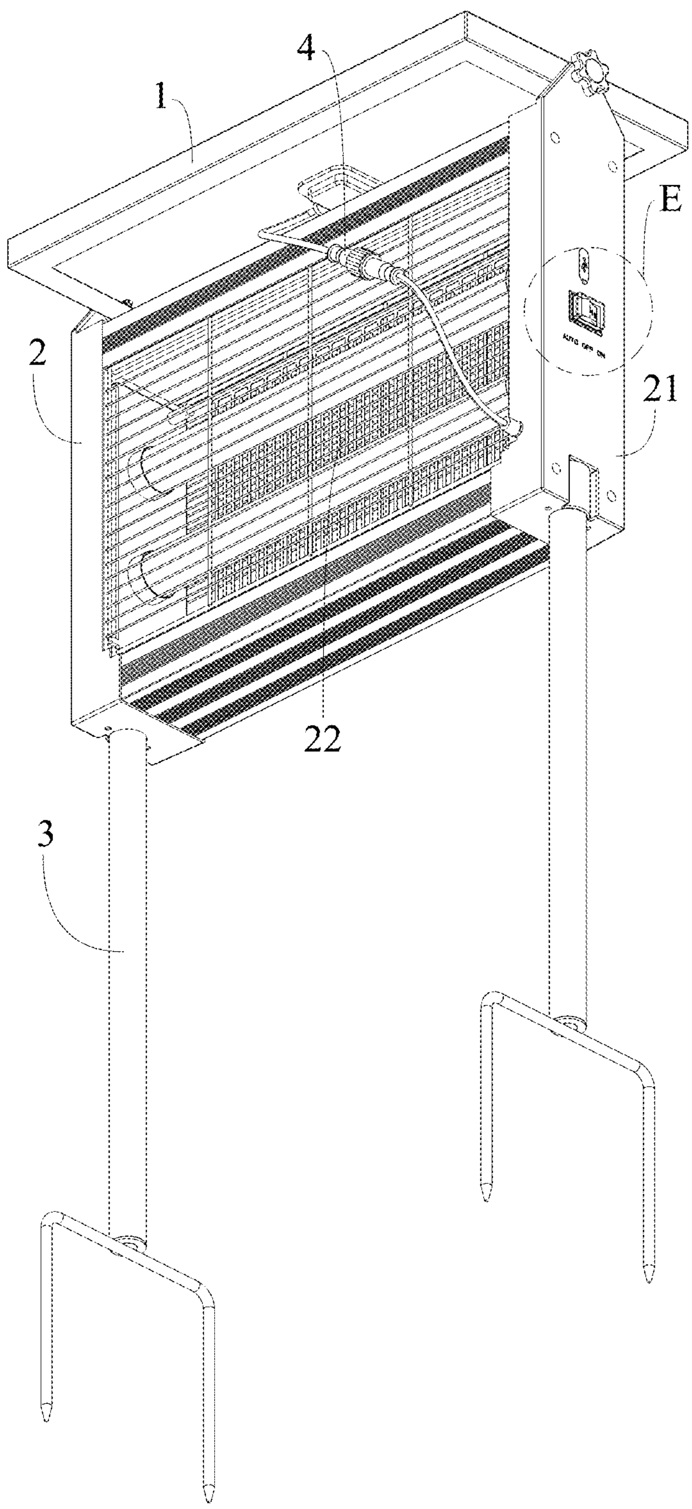
FIG. 76 a second perspective view of one mosquito killing unit including the solar module, the mosquito killing module and the supporting module assembled together.
Figure 77:
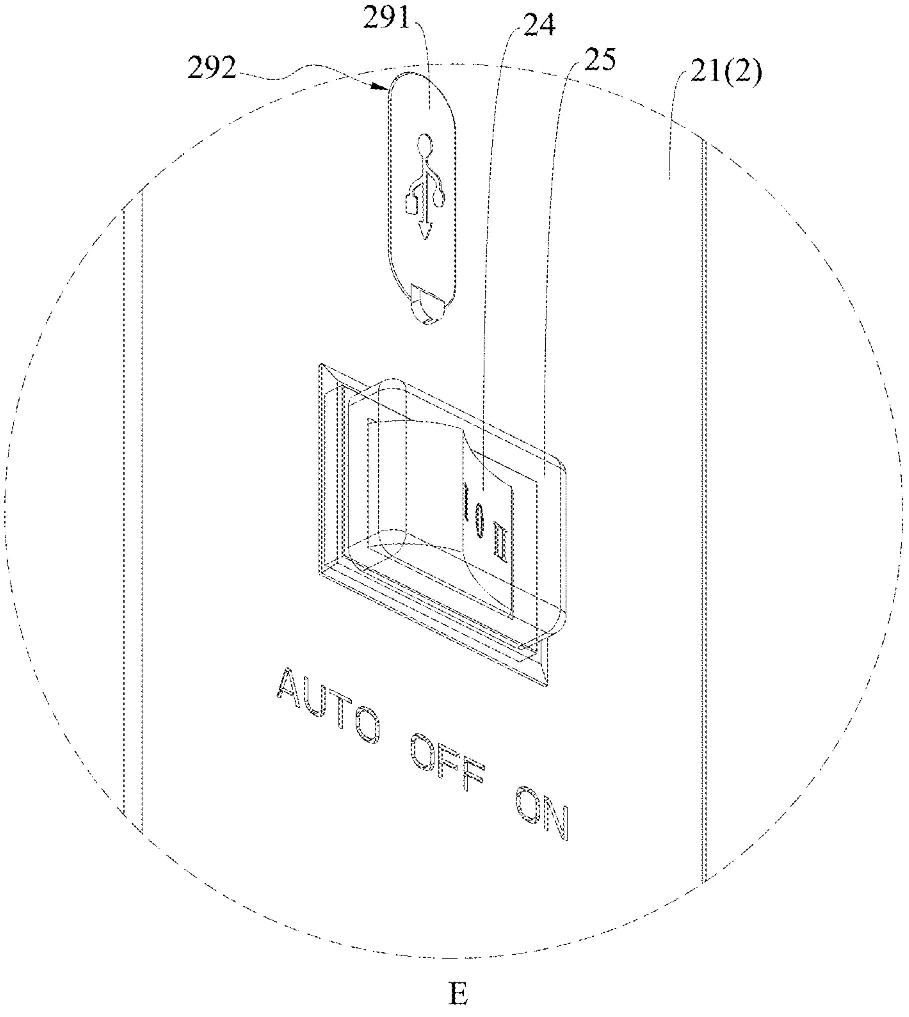
FIG. 77 shows an enlarged view of the E part of FIG. 76.
Figure 78:
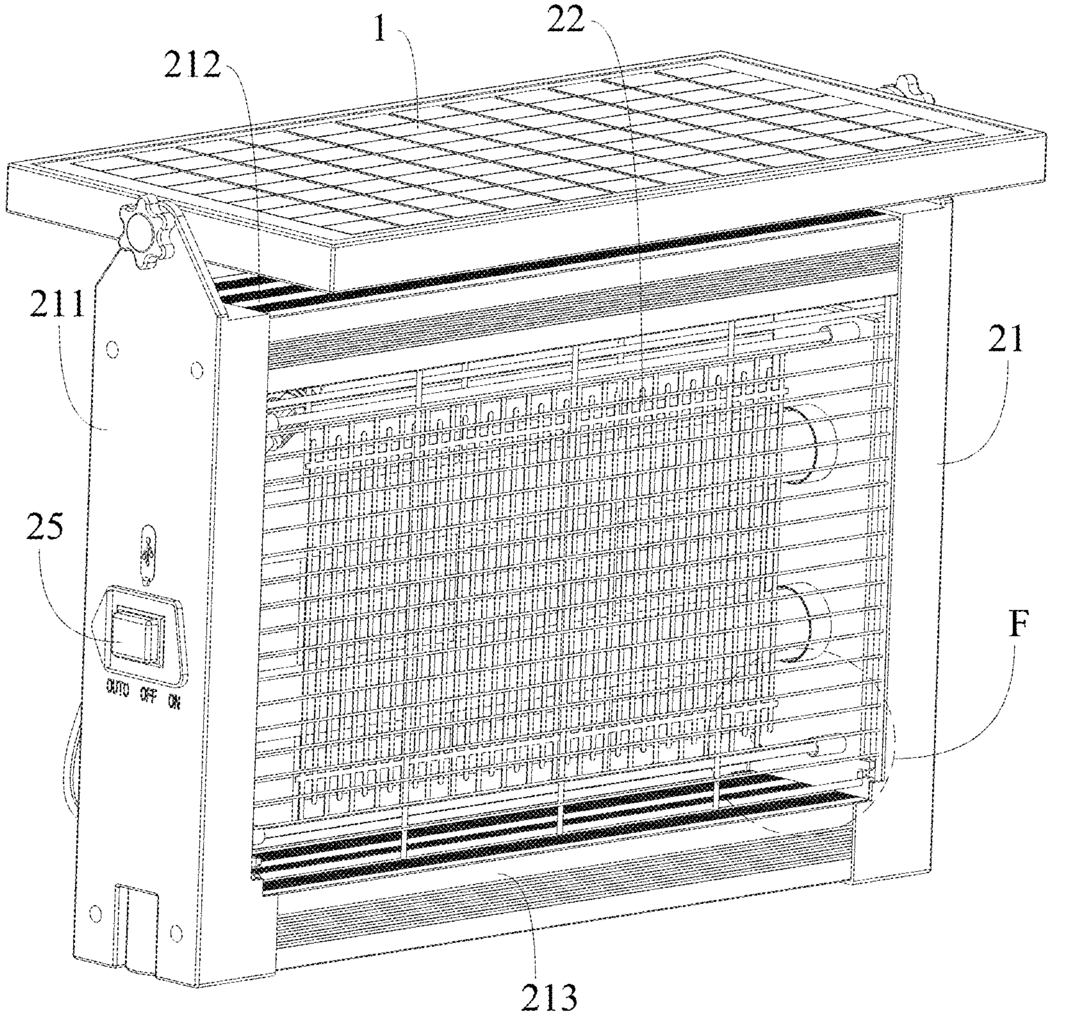
FIG. 78 a second perspective view of the solar module and the mosquito killing module assembled together.
Figure 79:
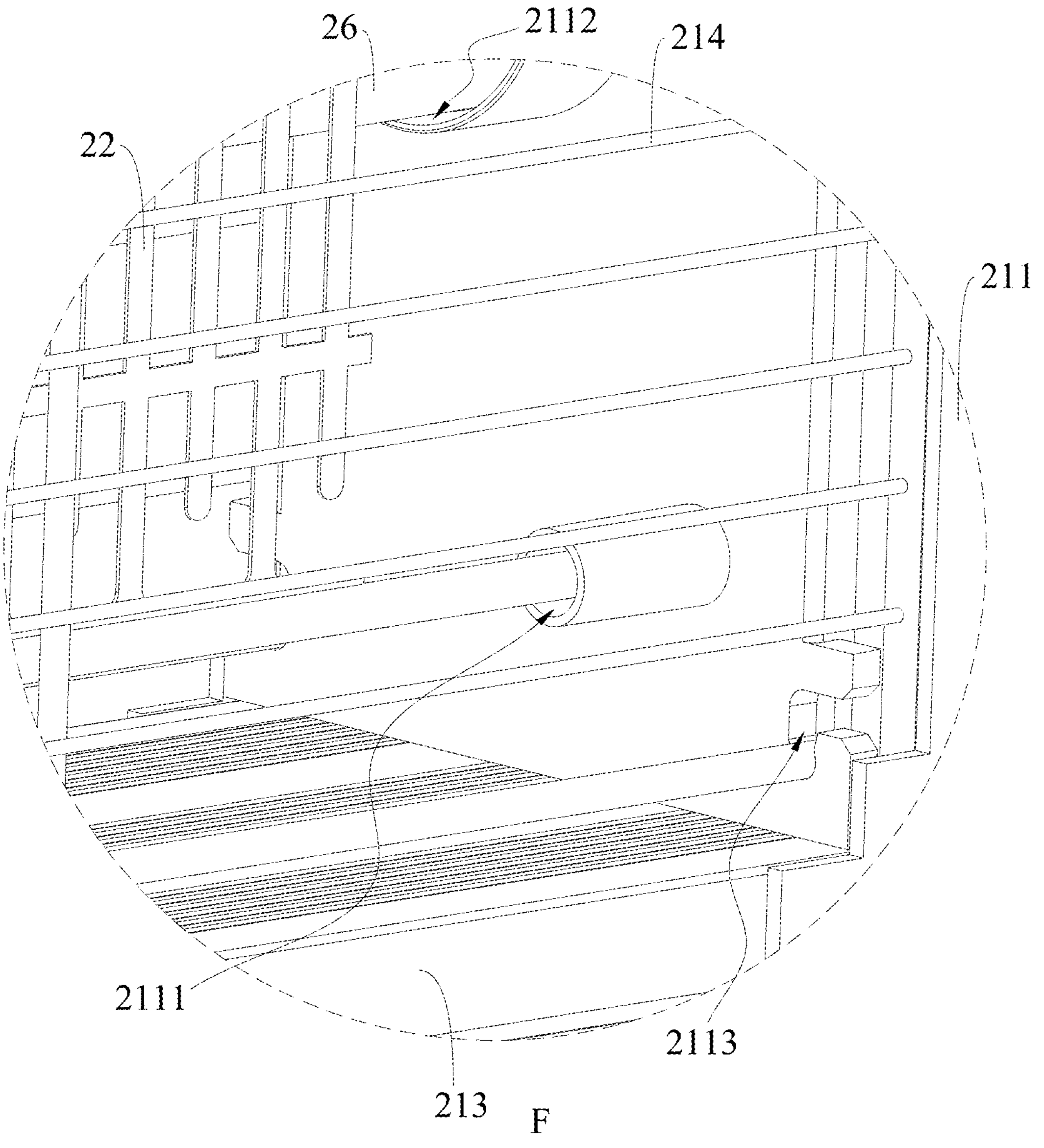
FIG. 79 shows an enlarged view of the F part of FIG. 78.
Figure 80:
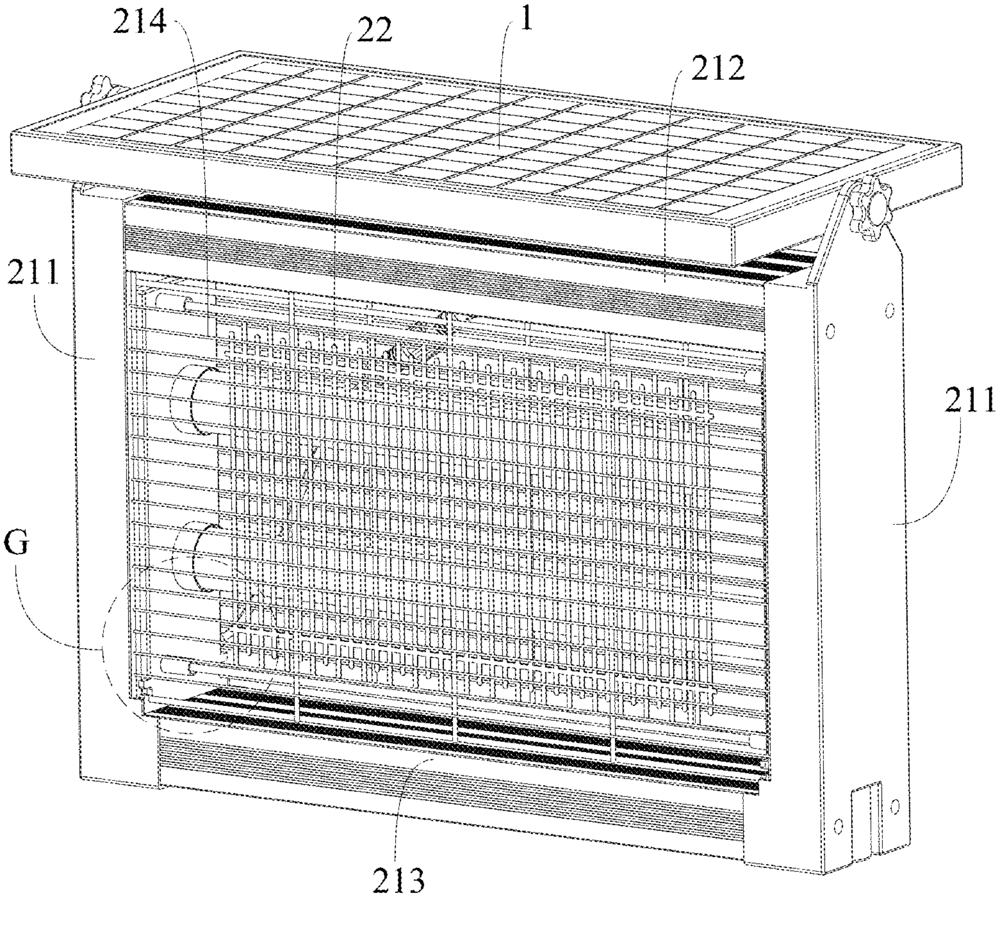
FIG. 80 a third perspective view of the solar module and the mosquito killing module assembled together.
Figure 81:
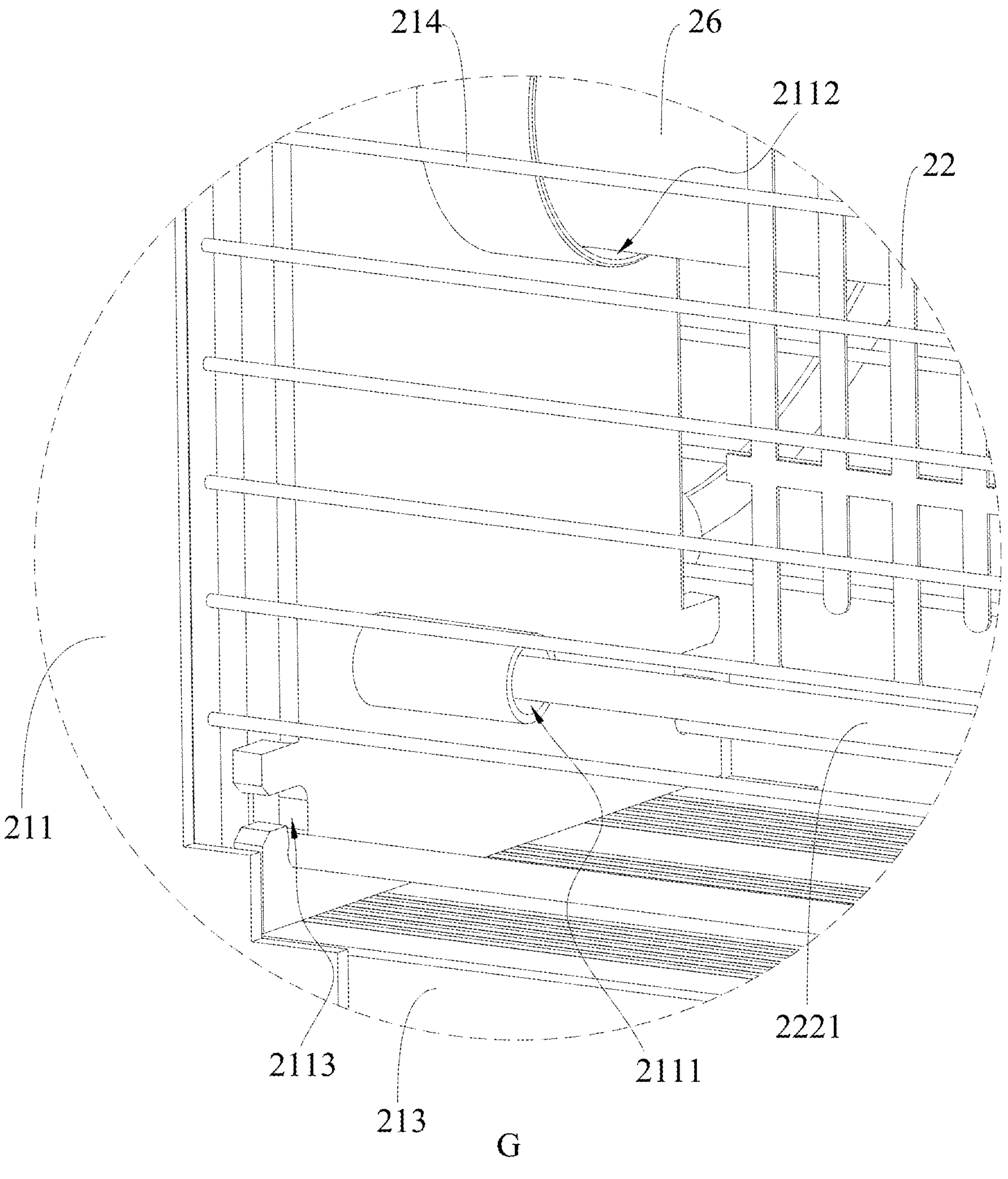
FIG. 81 shows an enlarged view of the G part of FIG. 80.

In a second scenario, as shown in FIGS. 76 to 77, the flexible waterproof cover 25 is made of a transparent material, the transparent flexible waterproof cover 25 can be fixed to the frame component 21 using glue and cover a periphery of the button 24. The glue used here is transparent glue. The transparent flexible waterproof cover 25 has flexibility and is directly fixed on the frame component 21 by glue, which facilitates the connection between the transparent flexible waterproof cover 25 and the frame component 21. Users can directly press the transparent flexible waterproof cover 25 to deform and press the button 24, thereby triggering the button 24, this not only provides good waterproof effect on the button 24, but also effectively improves the safety of triggering the button 24 when the surface of the transparent flexible waterproof cover 25 or the user's hand has water.

In present embodiment, referring to FIGS. 3-4 and 78-81, the frame component 21 further includes two protective nets 214, and the two protective nets 214 are arranged opposite to each other. Both mounting columns 211 are equipped with first insertion holes 2111 for installation at both ends of the electric grid 22; the control component 23 and button 24 are both installed on one of the mounting columns 211. By designing the mounting column 211, top beam 212, bottom beam 213, and protective nets 214, such the mounting column 211, the top beam 212, the bottom beam 213, and the protective nets 214 are assembled and connected to form a frame, which facilitates the installation and disassembly of various components in the frame assembly 21. By designing the first insertion holes 2111 at both ends of the electric grids 22 on the two mounting columns 211, the electric grids 22 can be fixed without the need for screws or other components, which facilitates the installation between the electric grids 22 and the frame component 21, making assembly more convenient and efficient, and saving processes.

In present embodiment, referring to FIGS. 3-4 and 78-81, the mosquito killing module 2 further comprises at least one mosquito trap lamp 26, which is electrically connected to the control component 23, and the mosquito trap lamp 26 introduces mosquitoes into the frame component 21 by emitting light; both mounting columns 211 are equipped with second insertion holes 2112 for installing at least one mosquito trap lamp 26 at both ends. Among them, the mosquito trap light 26 can be an LED light, and the button 24 mentioned above can also be the brightness adjustment button of the mosquito trap light 26. By setting a second insertion hole 2112 on the two mounting columns 211, the mosquito trap lamp 26 is installed between the mosquito trap lamp 26 and the two mounting columns 211 by inserting it into the second insertion hole 2112. This eliminates the need for screws or other components to fix the mosquito trap lamp 26, making assembly more convenient and efficient, and saving processes. Fixing slots 2113 are provided on both sides of the two mounting columns 211 near the protective net 214, and the two ends of the protective net 214 are installed in the fixing slots 2113. By designing a fixing groove 2113 on the mounting column 211, the protective net 214 can be installed by inserting it into the fixing groove 2113, this eliminates the need for screws or other components to fix the protective nets 214, making assembly more convenient and efficient, and saving process time.

Figure 82:
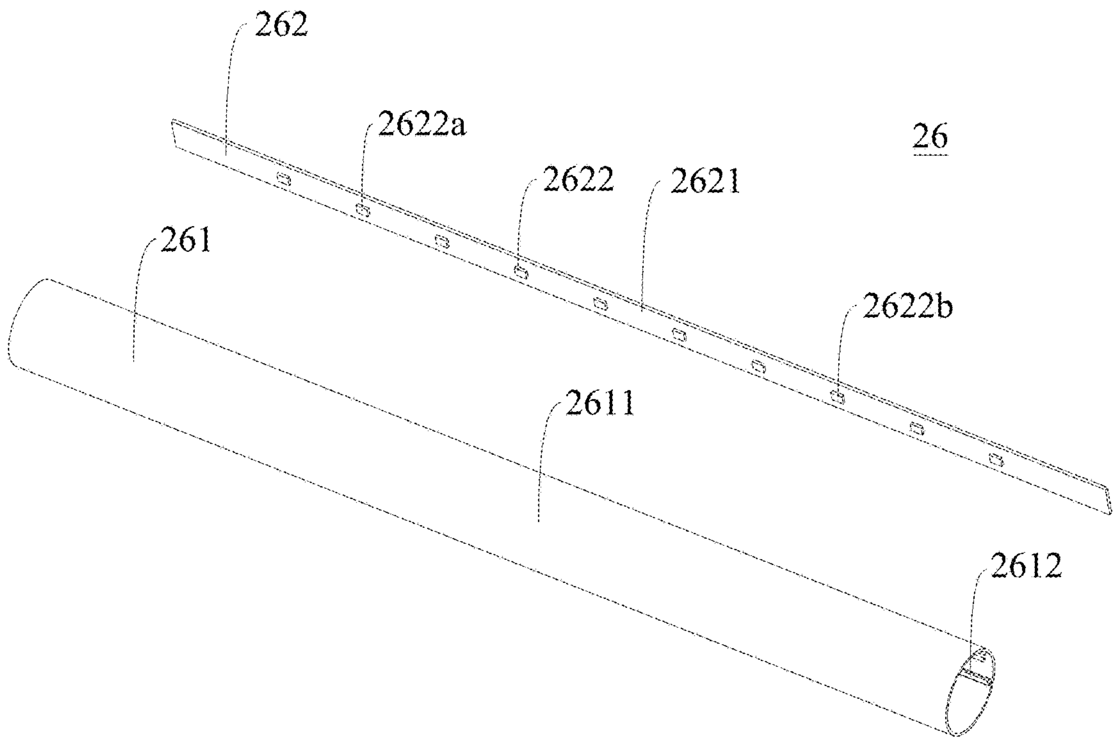
FIG. 82 is an exploded view of the mosquito trap lamp of the solar mosquito killer according to a first embodiment of present application.
Figure 83:
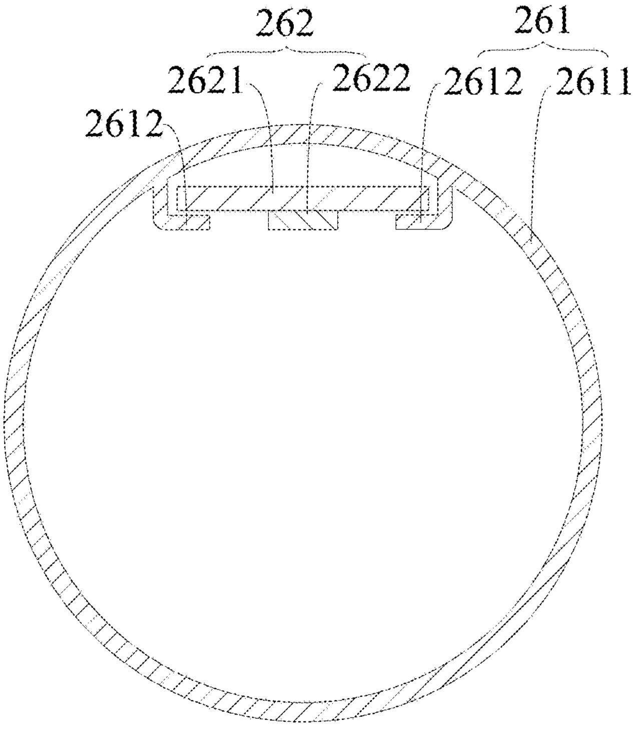
FIG. 83 is a cross sectional view of the mosquito trap lamp of the solar mosquito killer according to a first embodiment of present application.

Specifically, as shown in FIGS. 82 and 83, the mosquito trap lamp 26 includes a lampshade 261 and a circuit board assembly 262, the lampshade 261 includes a shade body 2611 and a fixing portion 2612. The end of the shade body 2611 is plugged into the second insertion hole 2112, and the fixing portion 2612 is fixedly connected to the inner surface of the shade body 2611, and the fixing portion 2612 and the shade body 2611 may be integrally formed structures made of the same material. The circuit board component 262 includes a circuit board 2621 and multiple light emitting elements 2622, and the circuit board 2621 is in the shape of a strip extending along the length direction of the mosquito killing module 2, and the circuit board 2621 is fixed to the fixing portion 2621, and multiple light emitting elements 2622 can be fixed to the circuit board 2621. Specifically, the fixing part 2612 may include two L-shaped fixing components arranged opposite to each other, so that the fixing part 2612 and the shade body 2611 can enclose a storage slot, and the circuit board component 262 can slide into the storage slot from one end of the lampshade 261 to be fixed on the fixing part 2621 and in the storage slot. The circuit board 2621 is electrically connected to the control component 23, and the light emitting element 2622 is mounted on and electrically connected to the circuit board 2621. The light emitting element 2622 can be an LED.

The light emitting element 2622 can be a UV LED, and the peak wavelengths of the light emitted can fall within the range of 360 nm to 405 μm. In addition, the peak wavelengths of the light emitted by multiple light emitting elements 2622 can be slightly different, such as 365 nm, 370 nm, 395 nm, 397 μm, 400 nm, etc.

In one embodiment, for multiple light emitting elements 2622, the difference in peak wavelength between the light emitting element 2622 with the highest peak wavelength and the light emitting element 2622 with the lowest peak wavelength is generally within 5 nm, specifically within the range of 3 nm (where the error value of the data endpoint in the data range does not exceed plus or minus 0.5 nm). It can be understood that the peak wavelength refers to the wavelength point at which the spectral radiation energy or intensity reaches its maximum value. In other words, it is the wavelength of the point with the highest light intensity on the spectral curve.

Figures 84, 85:
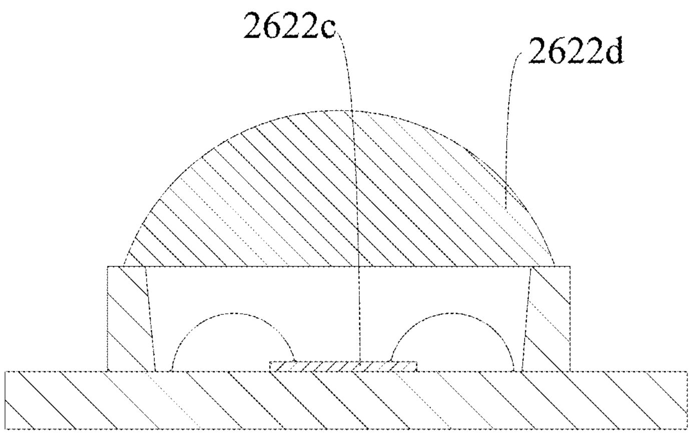
FIG. 84 shows the peak wavelengths of the light emitting elements of the mosquito trap lamp.
FIG. 85 is a cross sectional view of the light emitting elements of the mosquito trap lamp.

As shown in FIG. 84, in some embodiments, the peak wavelength range of multiple light emitting elements 2622 can be set according to actual needs, such as between 369 nm-372 nm for the first peak wavelength range, 395 nm-400 nm for the second peak wavelength range, 397 nm-400 nm for the third peak wavelength range, or 400 nm-403 nm for the fourth peak wavelength range (with an error value of no more than plus or minus 0.5 nm for each data endpoint), these peak wavelength settings can make the radiation energy of multiple light emitting elements 2622 more concentrated and have a good mosquito attraction effect.

Of course, in other embodiments, the multiple light emitting elements 2622 may also include multiple first light emitting elements 2622*a* and multiple second light emitting elements 2622*b*, which may be alternately arranged on the circuit board 2621. The peak wavelength range of the multiple first light emitting elements 2622*a* may be different from that of the multiple second light emitting elements 2622*b*, such as the peak wavelength range of the multiple first light emitting elements 2622*a* being between 369 nm and 372 nm, and the peak wavelength range of the multiple second light emitting elements 2622*b* being between 395 nm and 400 nm. Through the above settings, the mosquito lure lamp 26 can not only attract mosquitoes, but also moths, flies, and other insects, achieving better mosquito and fly killing effects.

As shown in FIG. 85, in one embodiment, the light emitting element 2622 may further include a light emitting chip 2622*c* and a convex lens structure 2622*d* arranged above the light emitting chip 2622*c*. The convex lens structure 2622*d* is used to converge the light emitted by the light emitting chip 2622*c*, especially in conjunction with the light emitting element 2622 with a peak wavelength between 369 nm-372 nm, which can better converge the energy of low wavelength light and achieve better mosquito attraction effect.

In this embodiment, as shown in FIGS. 3-4, and 78-81, the inner surfaces of the two mounting columns 211 are provided with first placement slots 2131 for placing two ends of the bottom beam 213 and second placement slots 2121 for placing two ends of the top beam 212. By setting a first placement slot 2131 at the bottom of the inner side of each of the two mounting columns 211, the two ends of the bottom beam 213 are respectively inserted into the first placement slots 2131 of the two mounting columns 211, and the bottom beam 213 is plugged into the first placement slots 2131 to achieve the installation between the bottom beam 213 and the two mounting columns 211, in this way, screws or other components are not required to fix the bottom beam 213, making assembly more convenient and efficient, and saving processes. By setting a second placement slot 2121 at the top of the inner side of each of the two mounting columns 211, the two ends of the top beam 212 are respectively inserted into the second placement slots 2121 of the two mounting columns 211, and the top beam 212 is plugged into the second placement slots 2121 to achieve the installation between the top beam 212 and the two mounting columns 211, in this way, screws or other components are not required to fix the top beam 212, making assembly more convenient and efficient, and saving processes.

In this embodiment, as shown in FIGS. 76, and 86-88, the solar mosquito killer further includes an electrical connection component 4, and the solar module 1 is electrically connected to the mosquito killing module 2 through the electrical connection component 4. The electrical connection component 4 includes a first electrical connector 41 and a second electrical connector 42, the first electrical connector 41 is connected to the solar module 1 through a first wire 41*a*, and the second electrical connector 42 is connected to the mosquito killing module 2 through a second wire 42*a*. The first electrical connector 41 and the second electrical connector 42 are detachably electrically connected, in this way, the solar module 1 is detachably connected to the mosquito killing module 2 through the second electrical connector 42 and the first electrical connector 41. The solar module 1, the mosquito killing module 2, and the electrical connection component 4 are designed to be independent of each other and modular, making it easy for users to disassemble, handle, and repair parts separately.

One of the first electrical connector 41 and the second electrical connector 42 includes a hole end connector 401, and the other of the first electrical connector 41 and the second electrical connector 42 includes a pin end connector 402. A pin 4022 of the pin end connector 402 is used to be inserted into a hole 4012 of the hole end connector 401 to make contact and electrically connect with the pin in the hole end connector 401. The pin 4022 of the pin end connector 402 has a surrounding wall 4023, which wraps around the outer surface of the hole end connector 401, and a waterproof sealing ring 43 is also provided between the inner surface of the surrounding wall 4023 of the pin end connector 402 and the outer surface of the hole end connector 401, among them, the material of waterproof sealing ring 43 can be, but is not limited to, elastic materials such as rubber and silicone. When the pin end connector 402 is inserted into the hole end connector 401, the inner surface of the surrounding wall 4023 of the pin end connector 402 and the outer surface of the hole end connector 401 will press the waterproof sealing ring 43, and the waterproof sealing ring 43 is deformed under force to fit with the inner surface of the surrounding wall 4023 of the pin end connector 402 and the outer surface of the hole end connector 401, thereby achieving the function of waterproof sealing, this structure is simple and easy to implement.

Figure 86:
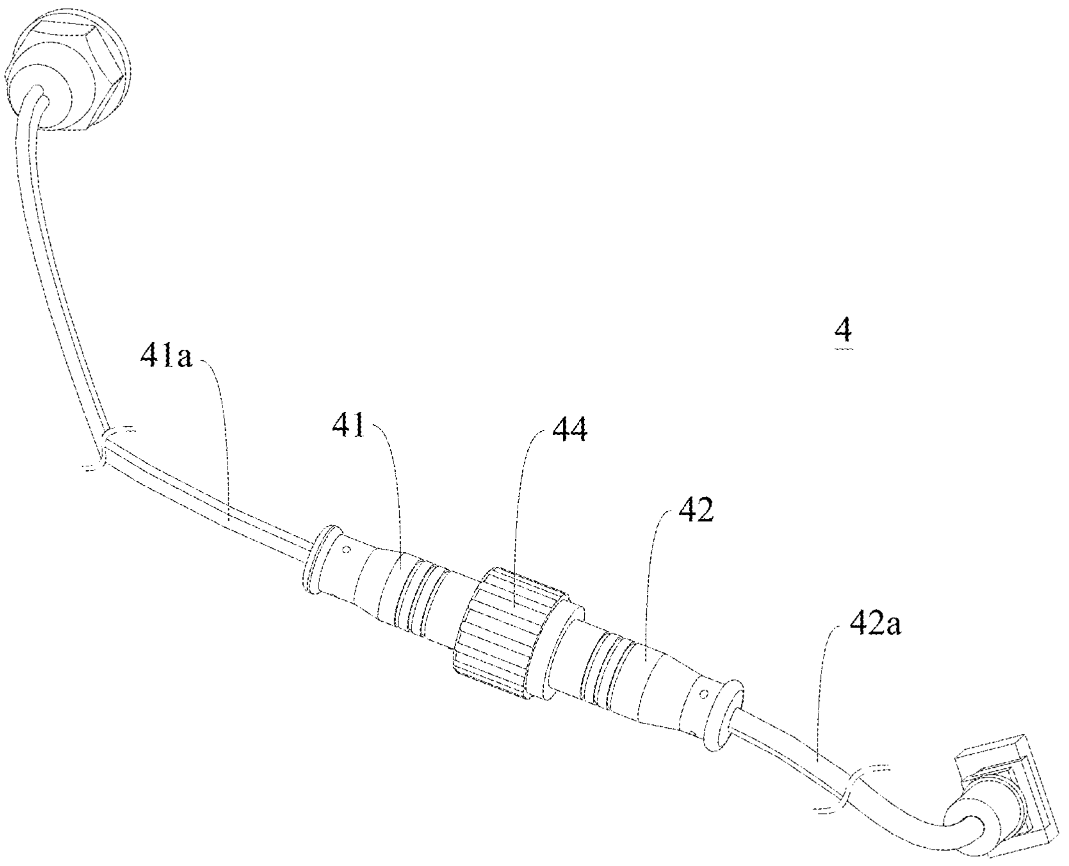
FIG. 86 is a schematic view of the electrical connection component of the solar mosquito killer according to a first embodiment of present application.
Figure 87:
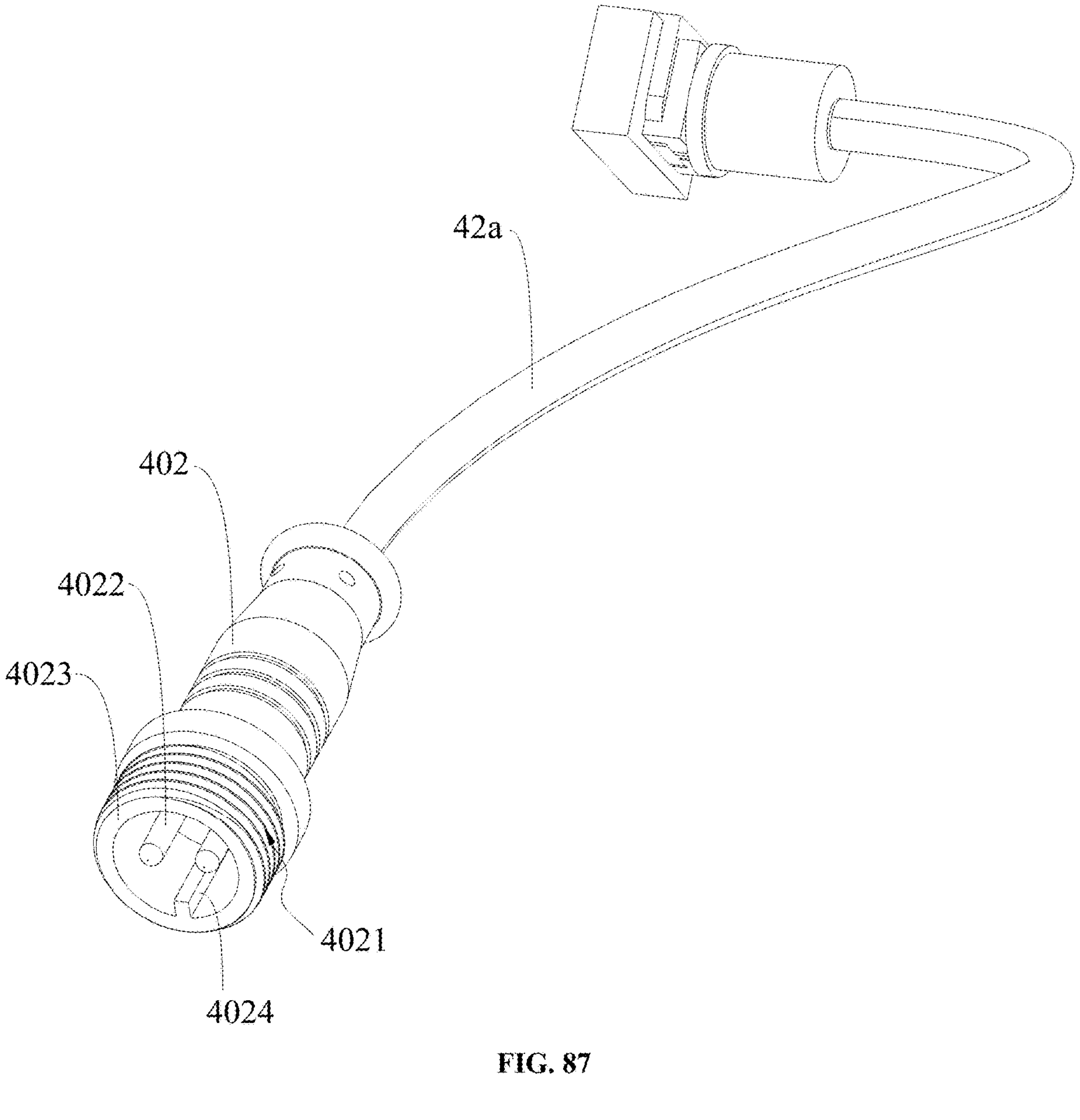
FIG. 87 is a schematic view of the pin end connector of the electrical connection component of FIG. 86.
Figure 88:
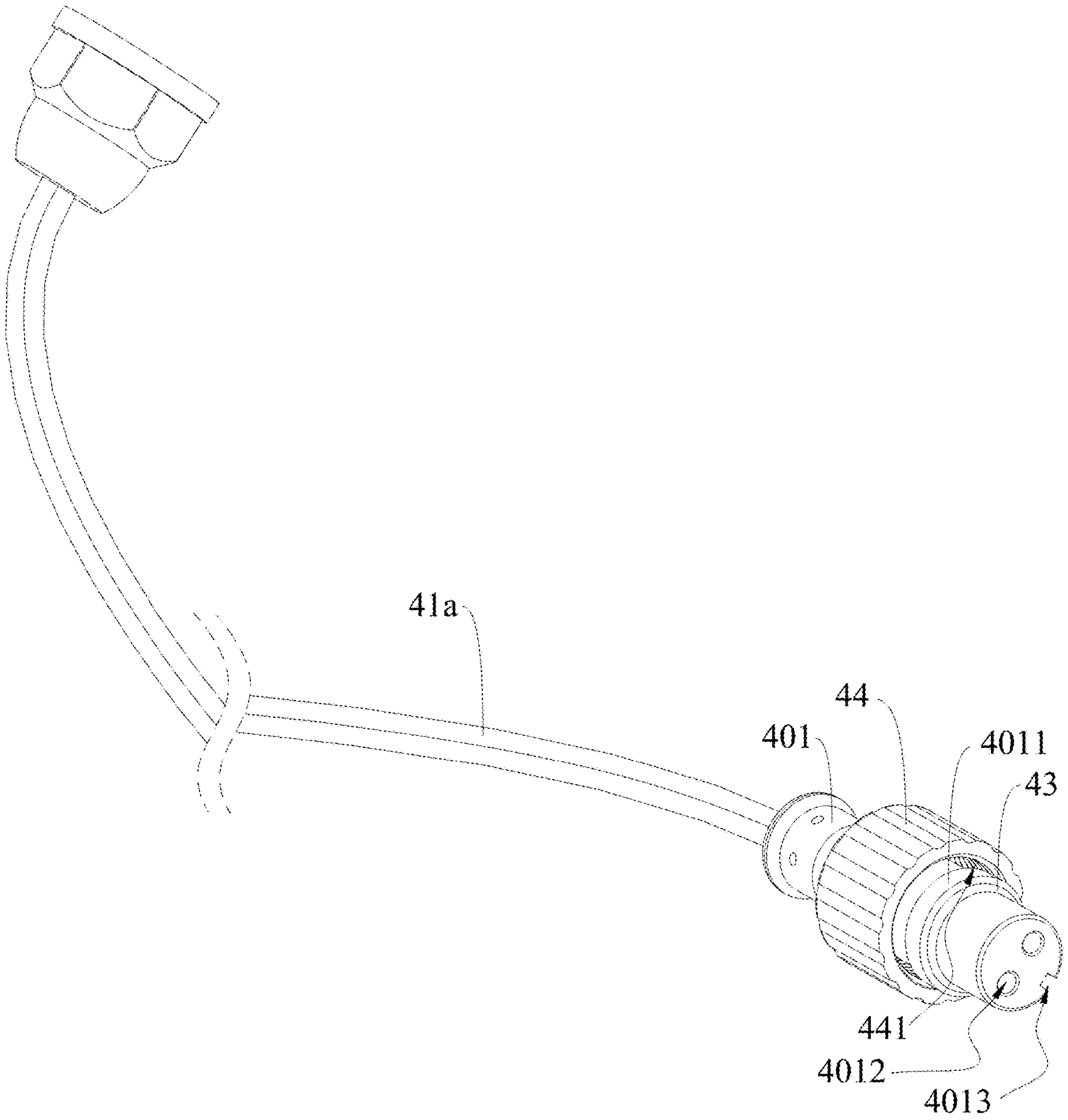
FIG. 88 is a schematic view of the hole end connector of the electrical connection component of FIG. 86.
Figure 89:
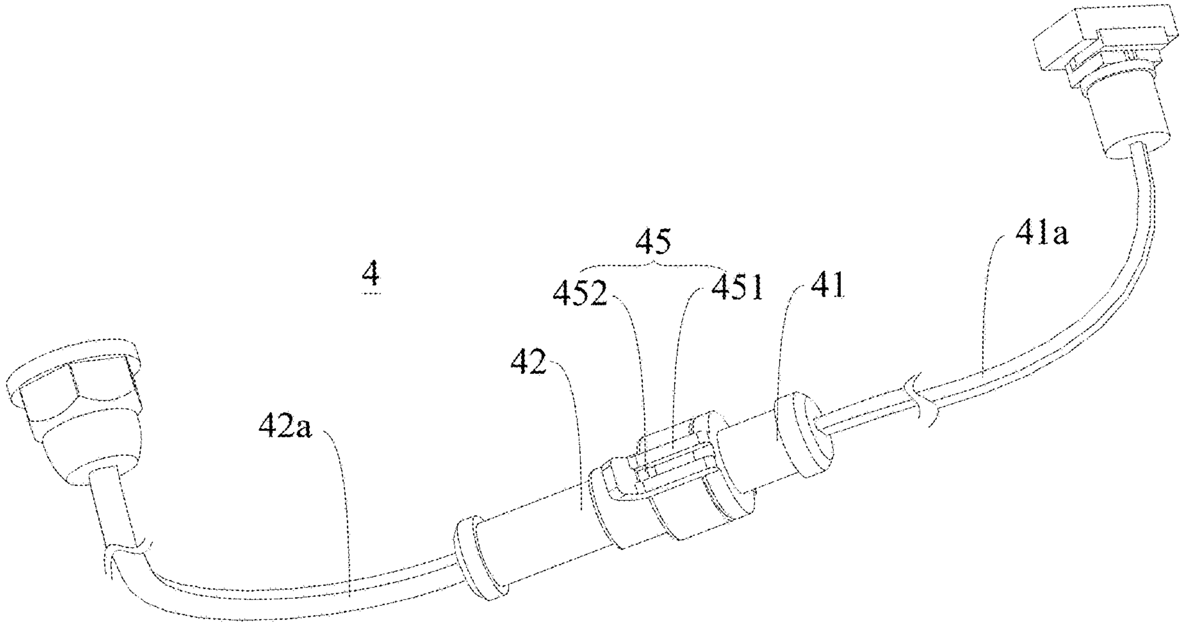
FIG. 89 shows the pin end connector and the hole end connector are connected by a buckle structure according to a first embodiment of present application.
Figure 90:
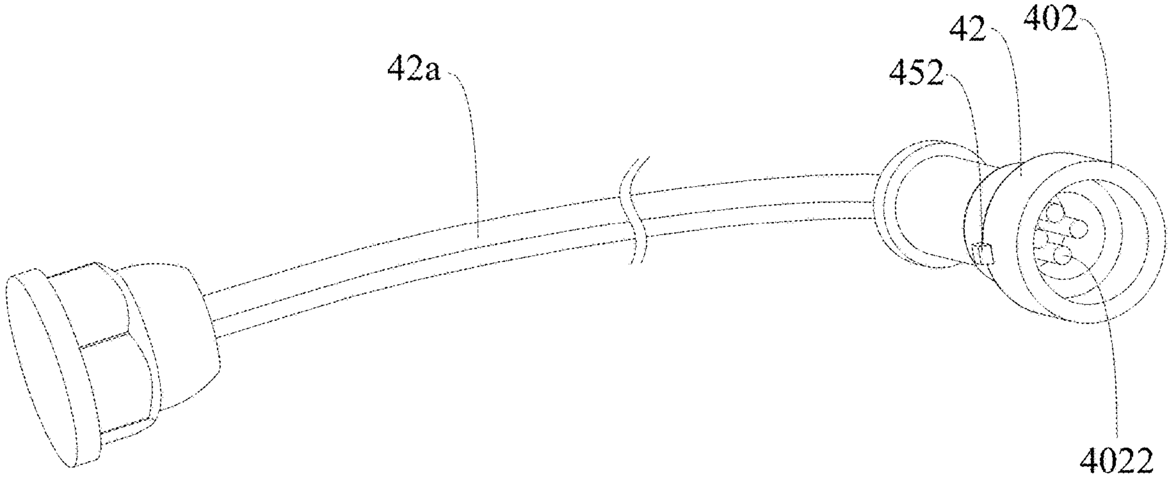
FIG. 90 is a schematic view of the pin end connector of the electrical connection component of FIG. 89.
Figure 91:
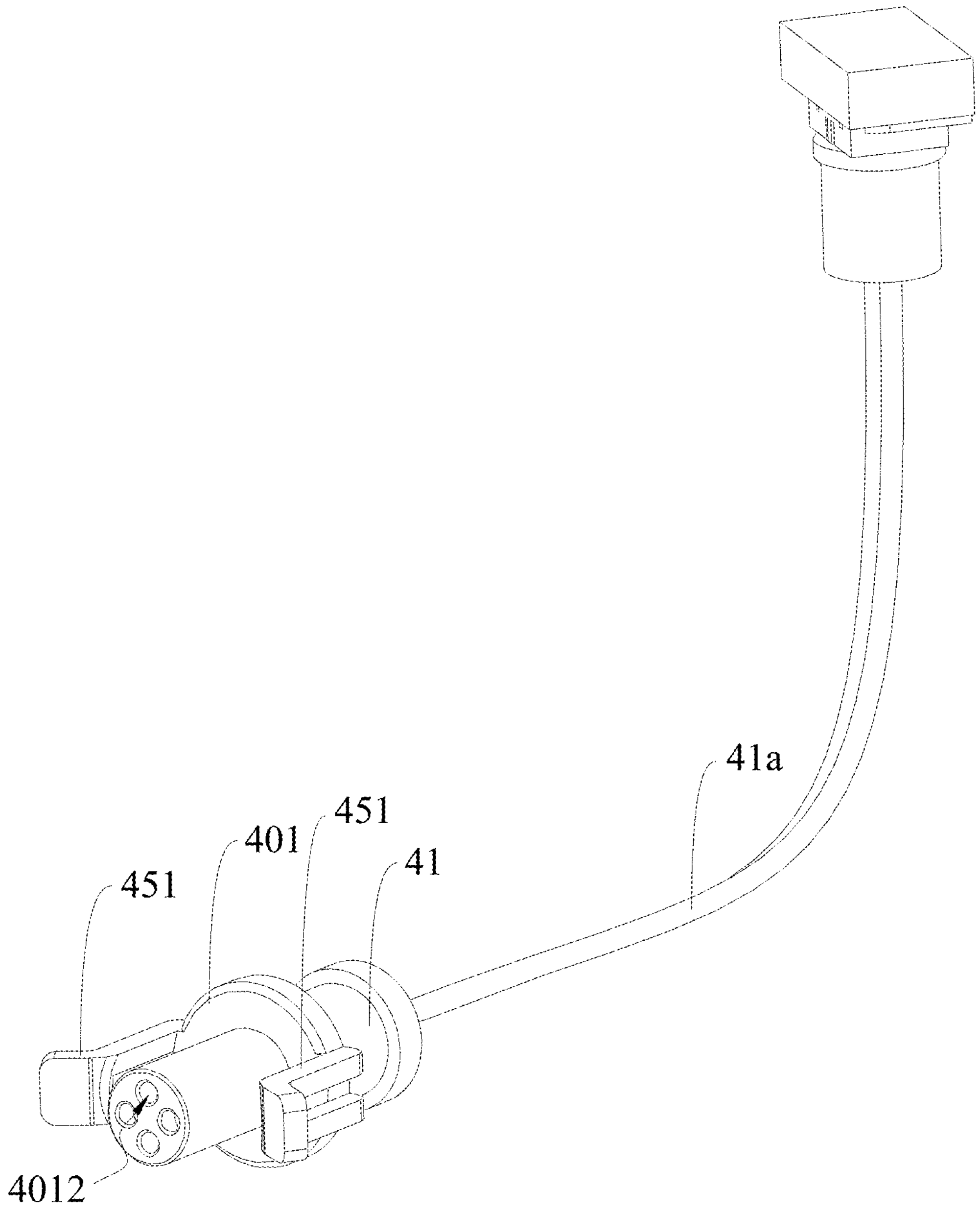
FIG. 91 is a schematic view of the hole end connector of the electrical connection component of FIG. 89.

In this embodiment, as shown in FIGS. 86 to 88, the outer surface of the surrounding wall 4023 of the pin end connector 402 is provided with external threads 4021, the electrical connection component 4 also includes a connecting cover 44, which is sleeved on a periphery of the hole end connector 401, and the inner wall surface of the connecting cover 44 is provided with internal threads 441. After the pin end connector 402 is inserted into the hole end connector 401, the internal threads 441 of the connecting cover 44 are used to connect with the external threads 4021 of the pin end connector 402 to fix the first electrical connector 41 and the second electrical connector 42. After the pin end connector 402 is inserted into the hole end connector 401, a user can rotate the connecting cover 44 fitted on the hole end connector 401 to connect the internal thread 441 on the inner wall surface of the connecting cover 44 with the external thread 4021 on the outer surface of the surrounding wall 4023 of the pin end connector 402, in this way, a threaded connection can be used to achieve relative fixation between the pin end connector 402 and the hole end connector 401. The structure is simple and the connection is firm, the operation is simple and easy for the user to use, in addition, the threaded connection of the connecting cover 44 is matched with the setting of the waterproof sealing ring 43, which not only enables stable electrical connection between the pin end connector 402 and the hole end connector 401, but also plays a good waterproof sealing role, effectively preventing liquid from penetrating into the pin 4022 of the pin end connector 402 and the hole 4012 of the hole end connector 401.

A limiting protrusion 4011 is provided on the outer side of the hole end connector 401, and a waterproof sealing ring 43 is provided on the hole end connector 401 and near to the limiting protrusion 4011. When the pin end connector 402 is inserted into the hole end connector 401, the end face of the pin end connector 402 presses against the waterproof sealing ring 43, and the connecting cover 44 covers the waterproof sealing ring 43. By designing the limiting protrusion 4011, on one hand, it provides support for the waterproof sealing ring 43, when the pin end connector 402 is inserted into the hole end connector 401, the inner surface of the surrounding wall 4023 of the pin end connector 402 presses against the outer surface of the hole end connector 401, causing the waterproof sealing ring 43 to deform under force and come into contact with the limiting protrusion 4011; on the other hand, the limiting protrusion 4011 prevents the waterproof sealing ring 43 from loosening due to force compression, providing a good limiting effect on the waterproof sealing ring 43.

A guide shaft 411 is provided on the pin end connector 402, and a guide groove 421 is provided on the hole end connector 401, and the guide shaft 411 is used for insertion into the guide groove 421. When the pin 4022 of the pin end connector 402 is inserted into the hole 4012 of the hole end connector 401 in a hurry by the user, if the pin 4022 of the pin end connector 402 is not correctly inserted into the hole 4012 of the hole end connector 401, and the pin end connector 402 includes the pin end connector body and the pin 4022, the end of the pin 4022 connected to the pin end connector body is prone to loosening, causing damage to the pin end connector 402. By setting the guide shaft 411 and the guide groove 421, the guide shaft 411 and the guide groove 421 play a role in calibration and positioning, after aligning the guide shaft 411 with the guide groove 421, the user inserts the pin end connector 402 to the hole end connector 401, which can protect the pin end connector 402 and extend its service life. Of course, it can also be that the pin end connector 402 is equipped with a guide groove 421, and the hole end connector 401 is equipped with a guide shaft 411, which is used to be inserted into the guide groove 421.

Figure 31:
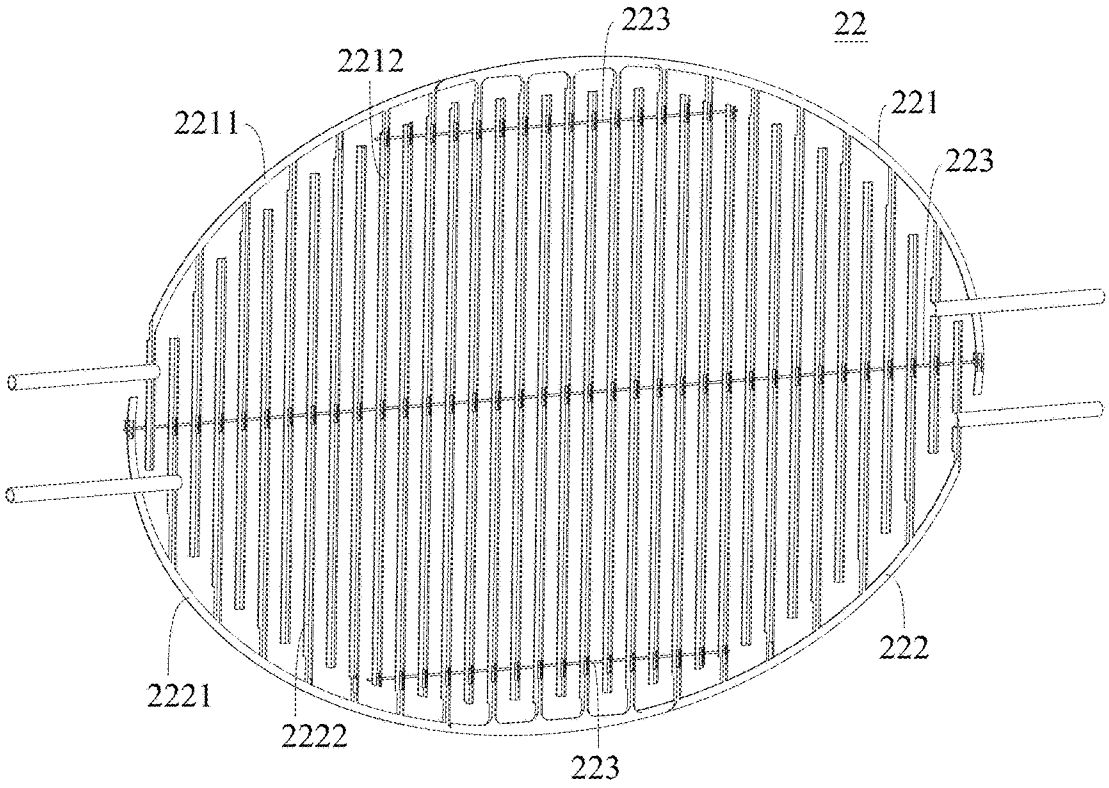
FIG. 31 shows another view of the electric grid of FIG. 30.
Figure 32:
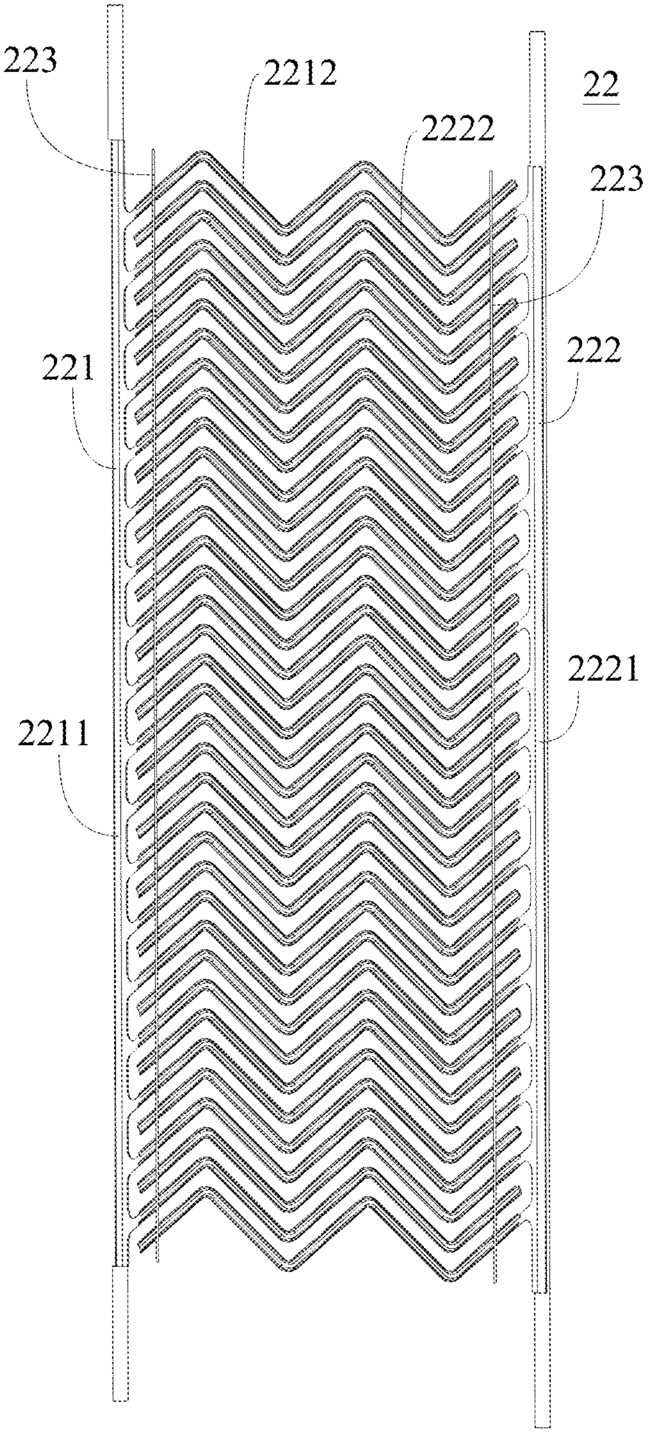
FIG. 32 is an eighth schematic view of the electric grid of the solar mosquito killer according to a first embodiment of present application.
Figure 33:
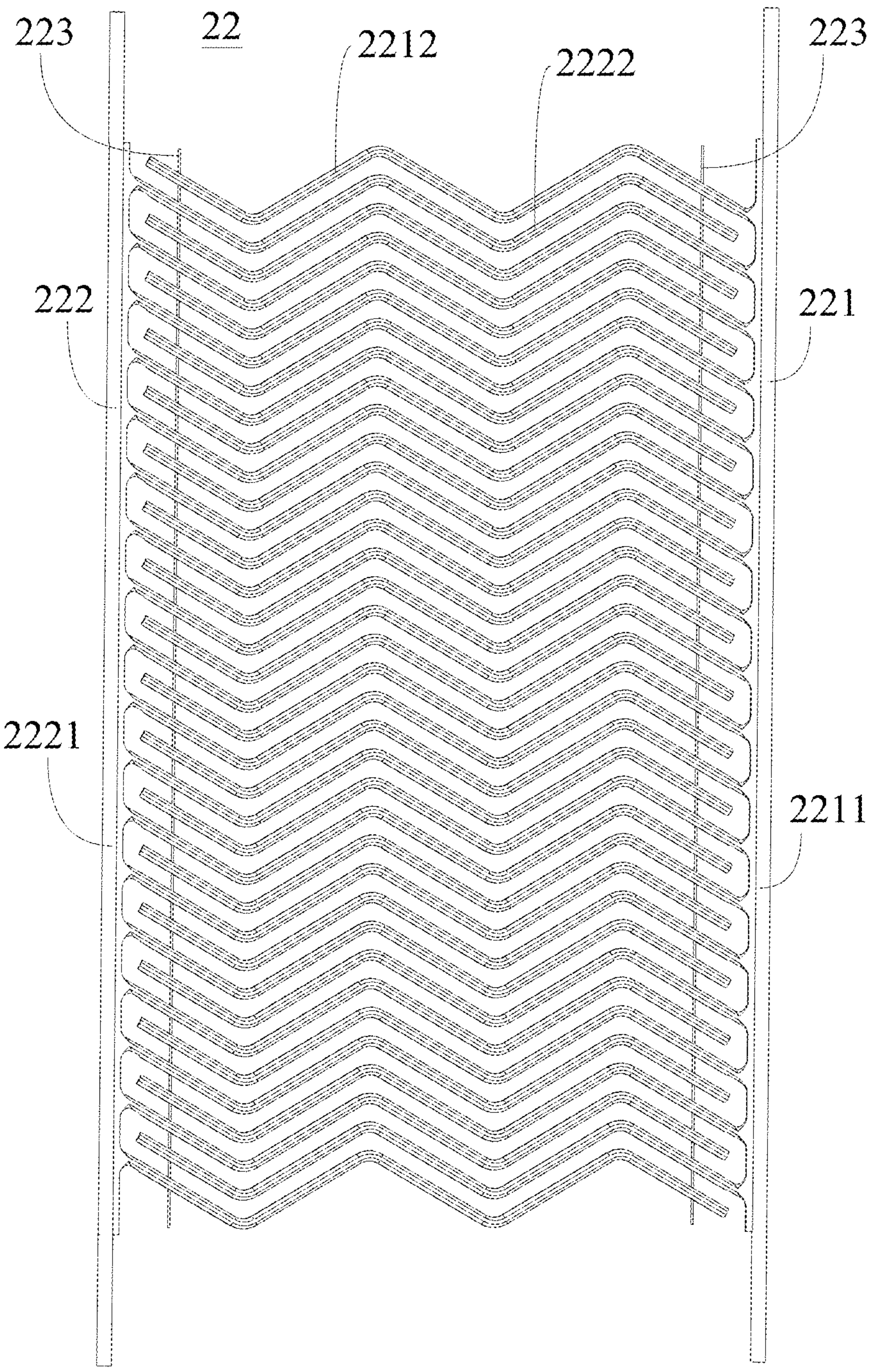
FIG. 33 shows another view of the electric grid of FIG. 32.
Figure 34:
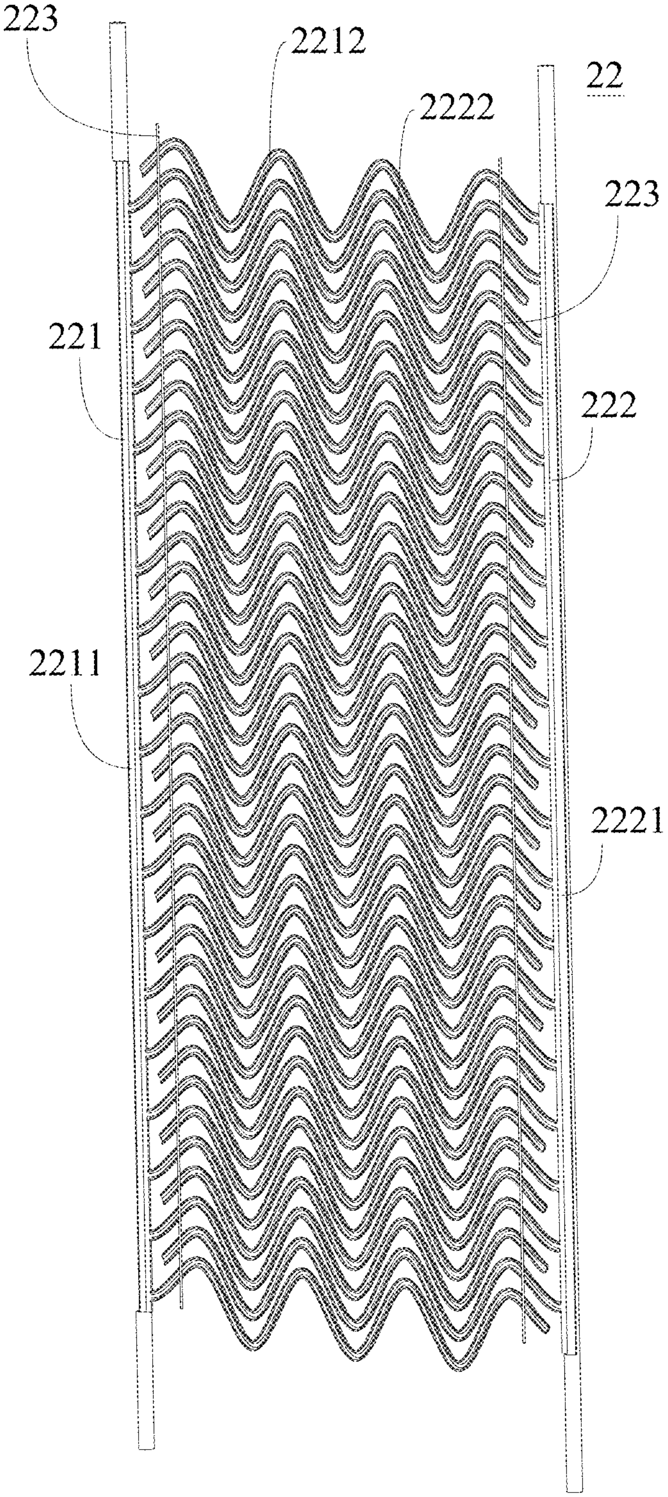
FIG. 34 is a ninth schematic view of the electric grid of the solar mosquito killer according to a first embodiment of present application.
Figure 35:
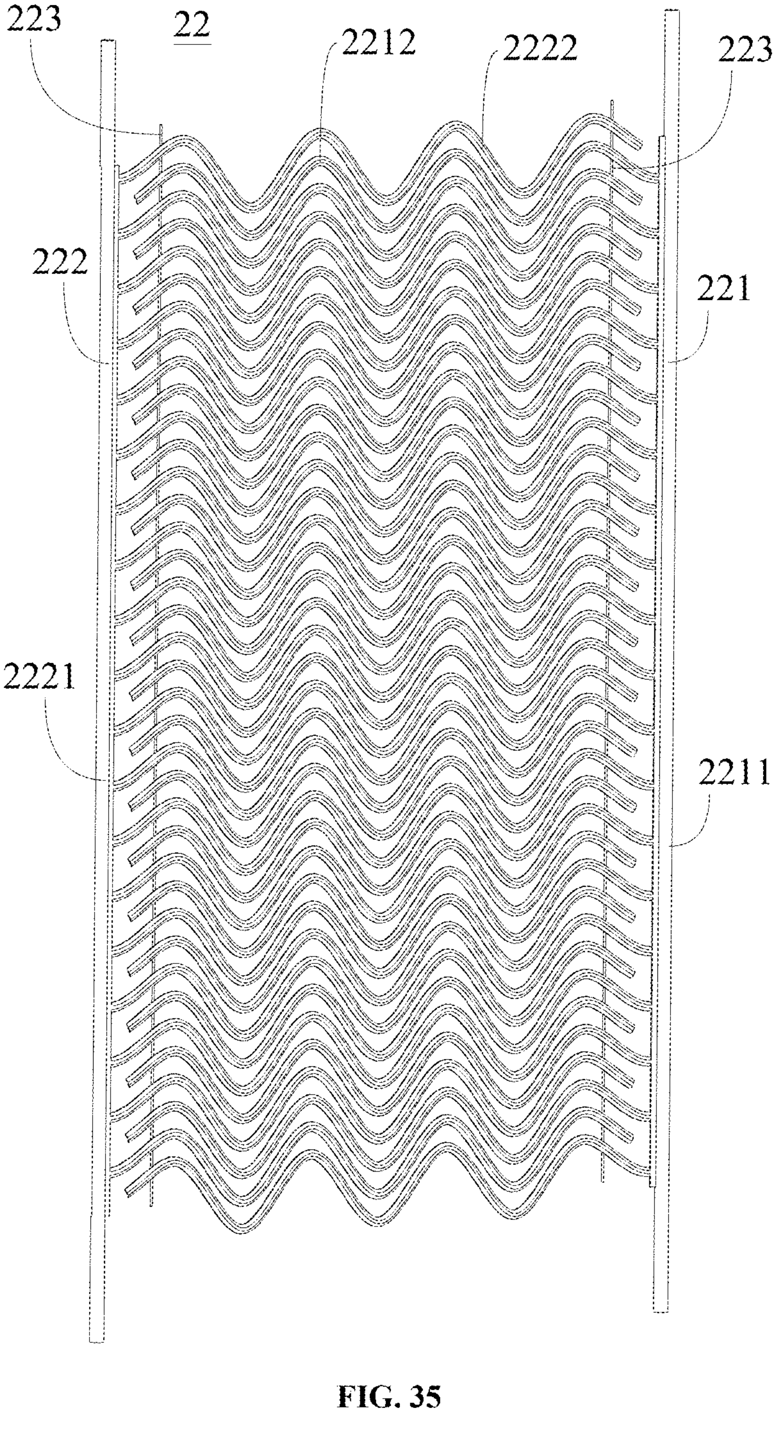
FIG. 35 shows another view of the electric grid of FIG. 34.

Of course, in the embodiments shown in FIGS. 86-88, the electrical connection component 4 includes a connecting cover 44 for locking the connection between the hole end connector 401 and the pin end connector 40. Alternatively, in other embodiments, as shown in FIGS. 31 to 33, the electrical connection component 4 may not include the above-mentioned connecting cover 44, but may also include a buckle structure 45, which includes a buckle 451 and a hook 452. At least one of the buckle 451 and the hook 452 is provided on the pin end connector 402, and at least the other of the buckle 451 and the hook 452 is provided on the outer surface of the hole end connector 401. After inserting the pin end connector 402 into the hole end connector 401, the user connects the buckle 451 with the hook 452 to achieve relative fixation between the pin end connector 402 and the hole end connector 401 through the buckle connection method, the structure is simple and the connection is firm, and the operation is simple and easy for the user to use.

Figure 92:
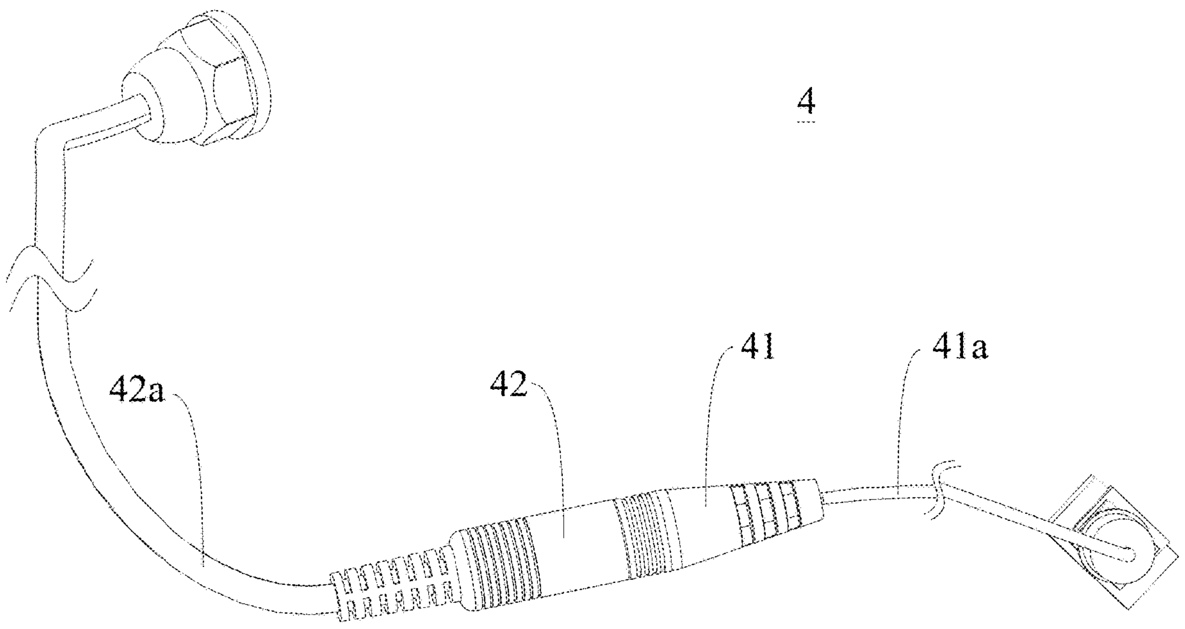
FIG. 92 shows the pin end connector and the hole end connector are connected by plug-in connection manner according to a first embodiment of present application.
Figure 93:
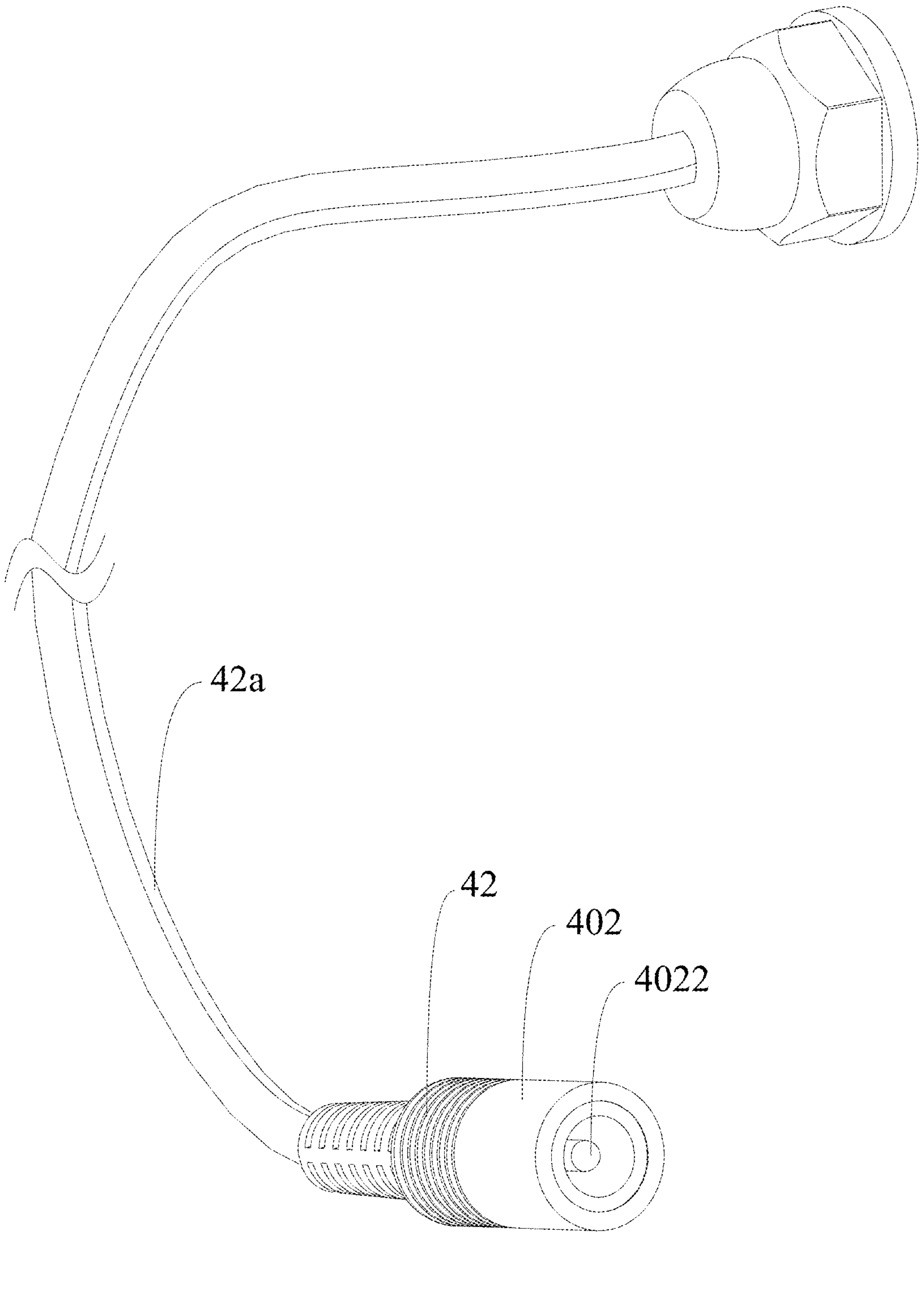
FIG. 93 is a schematic view of the pin end connector of the electrical connection component of FIG. 92.
Figure 94:
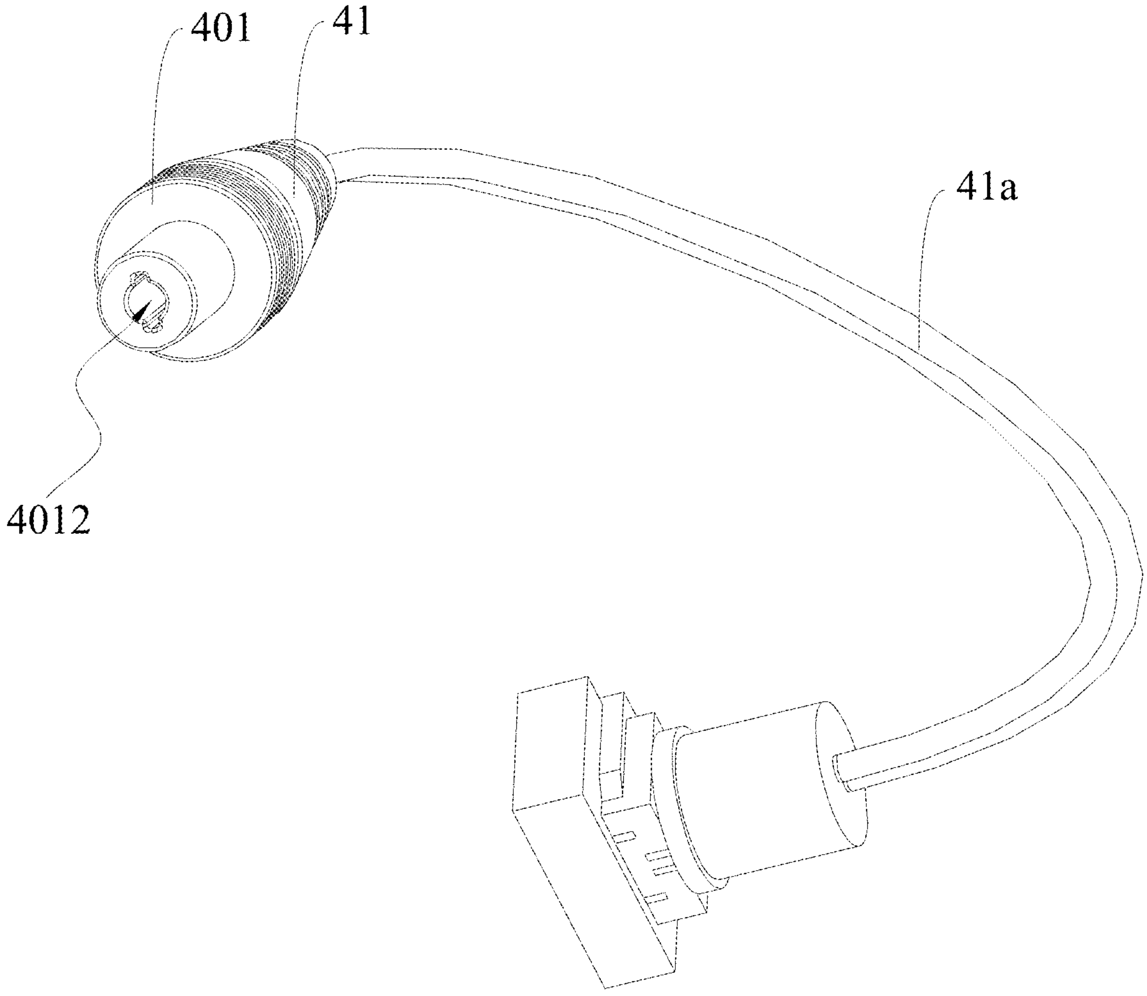
FIG. 94 is a schematic view of the hole end connector of the electrical connection component of FIG. 92.

Of course, as shown in FIGS. 92 to 94, the pin end connector 402 and the hole end connector 401 can also be connected by plug-in connection to achieve relative fixation of their positions, the structure is simple, the connection is firm, the operation is simple, and it is easy for users to use.

Figure 95:
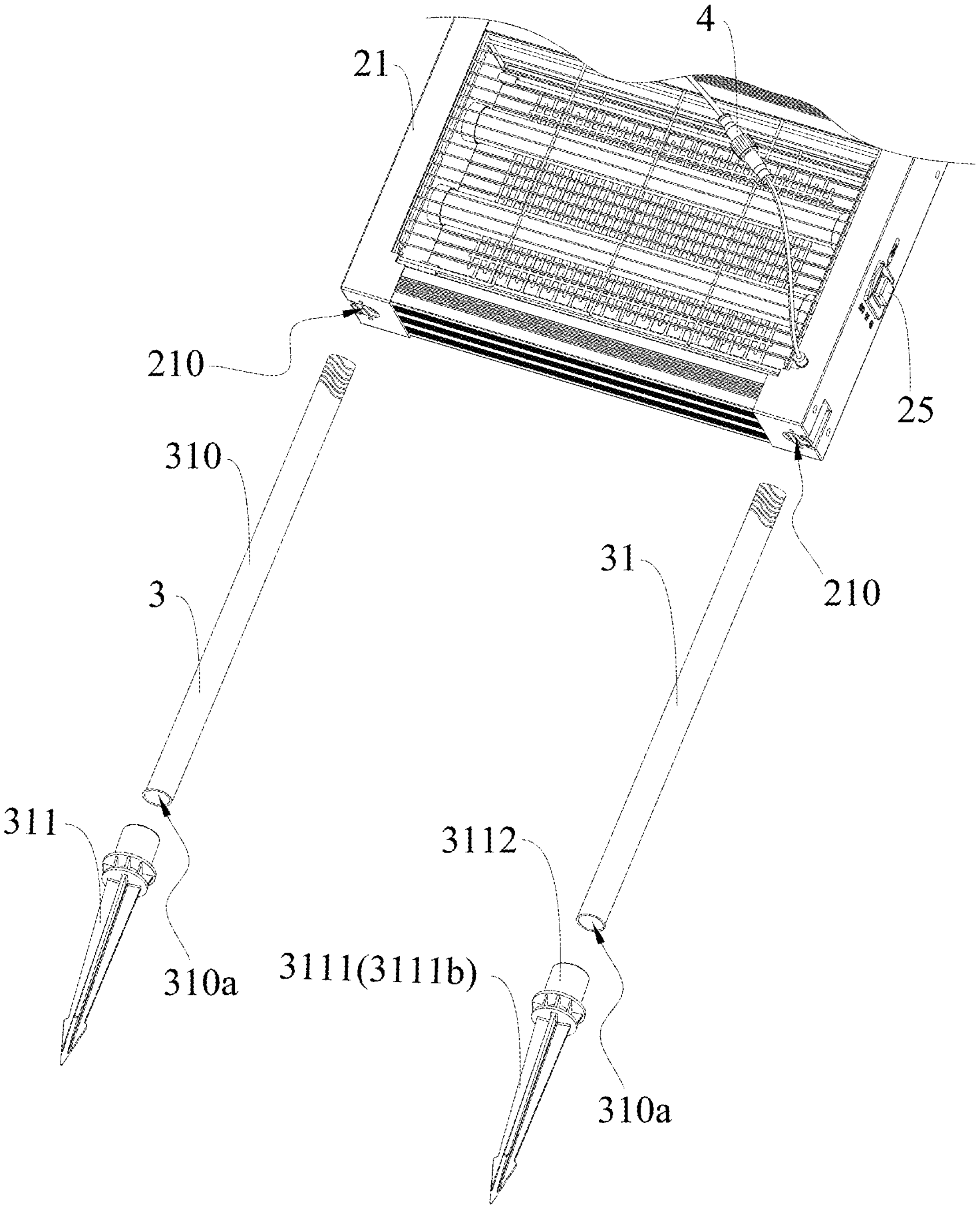
FIG. 95 is a first partial exploded view of the solar mosquito killer according to a first embodiment of present application.
Figure 96:
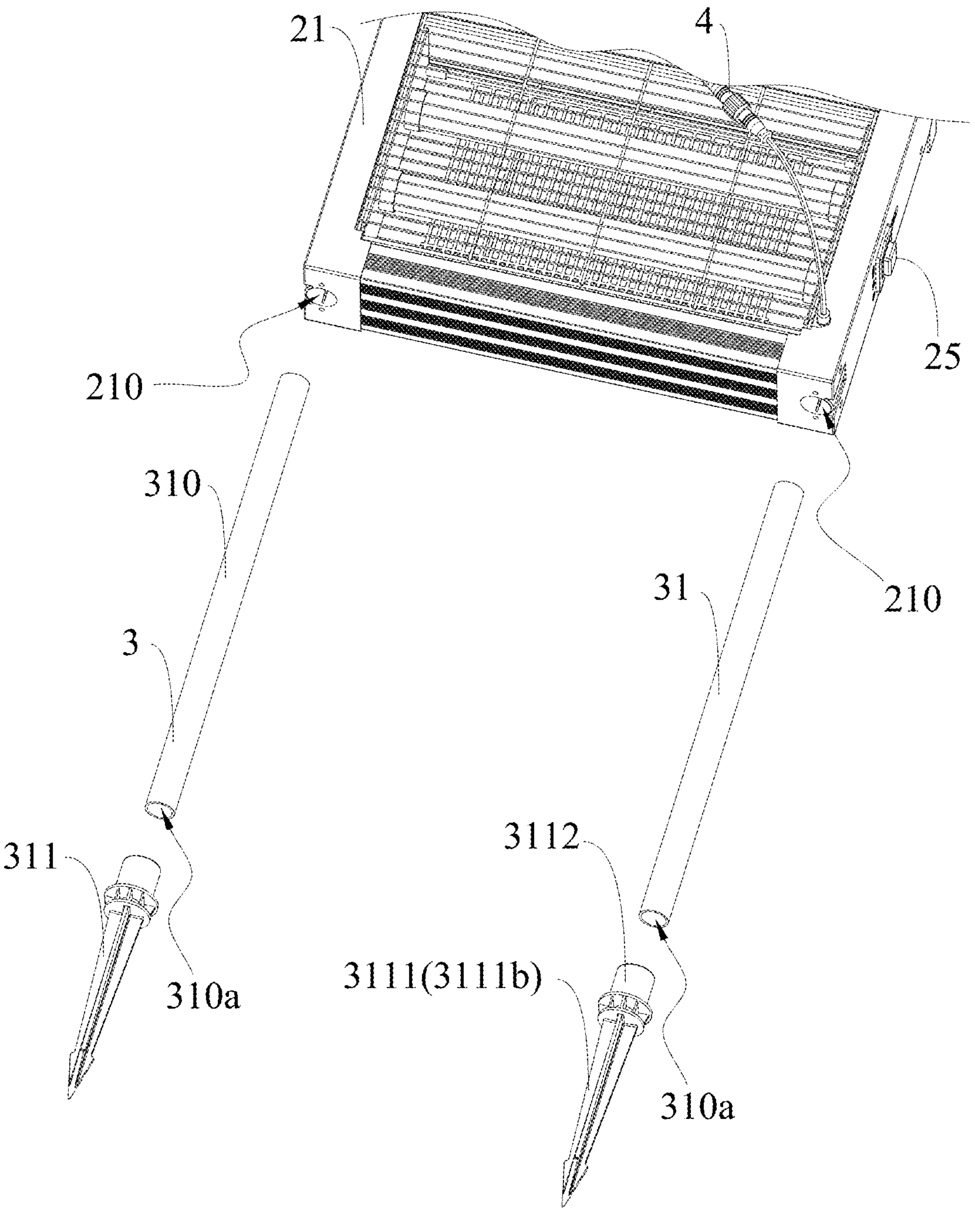
FIG. 96 is a second partial exploded view of the solar mosquito killer according to a first embodiment of present application.
Figure 97:
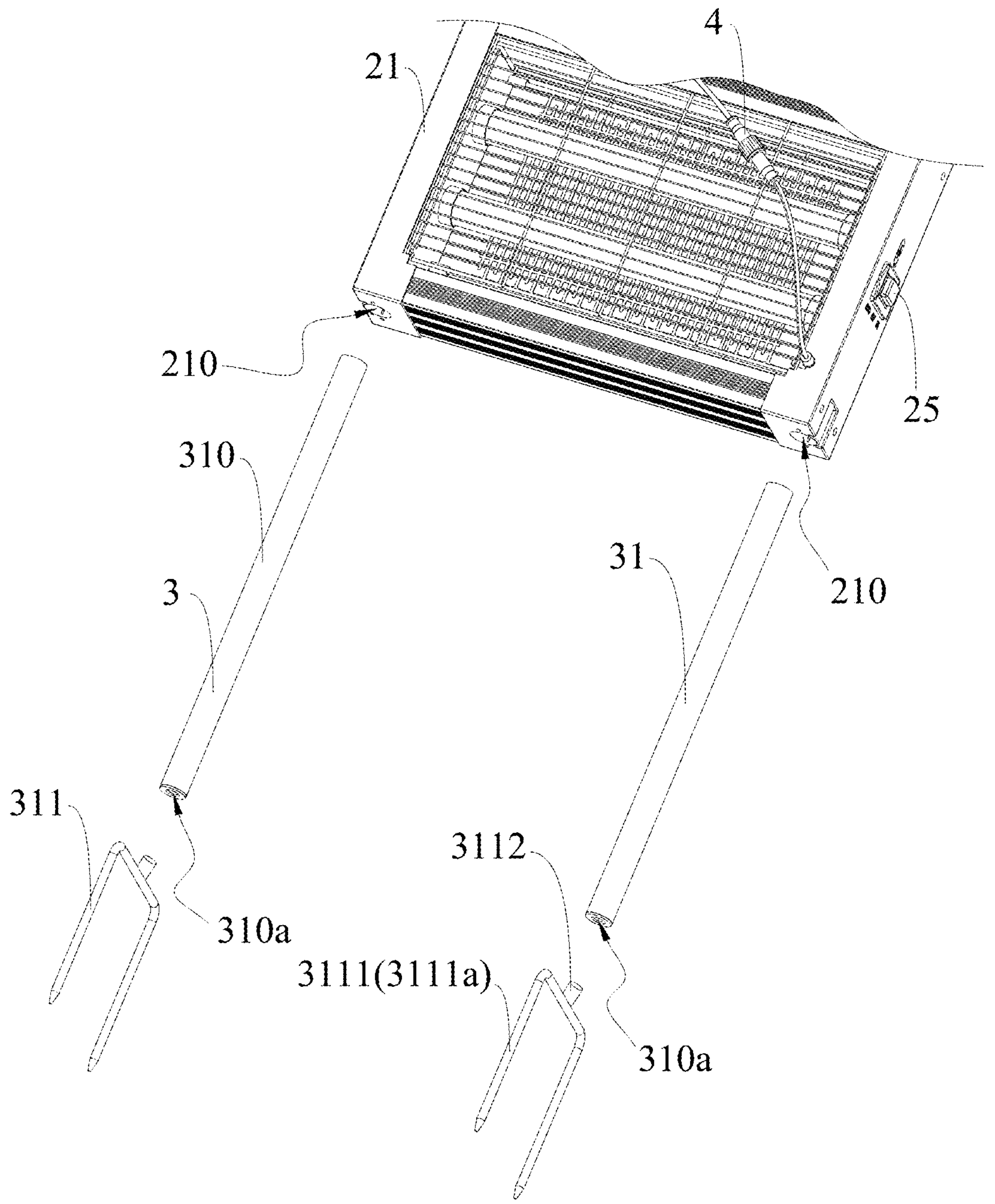
FIG. 97 is a third partial exploded view of the solar mosquito killer according to a first embodiment of present application.

In this embodiment, as shown in FIGS. 95 to 97, the solar mosquito killer further includes a supporting module 3 connected to the frame component 21 to support the mosquito killing module. The bottom of the frame component 21 (specifically the bottom end of the mounting column 211 described above) of each mosquito killing module 2 is provided with an mounting hole 210 for detachable connection with one end of the supporting module 3, and the other end of the supporting module 3 is used to be set on an external carrier. Among them, external carriers can include but are not limited to soil or cement floors in outdoor environments. By designing mounting holes 210 on the frame component 21 for the mounting of the supporting module 3, a detachable connection between the supporting module 3 and the frame component 21 can be achieved. When the solar powered mosquito killing device is used in indoor environments, users can remove the supporting module 3 from the frame component 21 according to actual needs to reduce the overall space occupancy of the solar powered mosquito killing device. When the solar mosquito killing device is used in an outdoor environment, users can assemble the supporting module 3 onto the frame component 21 through the mounting hole 210 according to actual needs, so that the supporting module 3 can effectively support the mosquito killing module 2, thereby facilitating the fixation of the solar mosquito killing device in outdoor environments. In addition, during transportation, the supporting module 3 can also be removed from the frame component 21 to further reduce the space occupation of the solar mosquito killing device.

Specifically, as shown in FIG. 95, the number of mounting holes 210 at the bottom of the frame component 21 of each mosquito killing module 2 is at least one, and at least one mounting hole 210 is a threaded hole. The supporting module 3 includes multiple insertion components 31, and the ends of the multiple insertion components 31 are connected to the multiple threaded holes of the frame components 21 of multiple mosquito killing modules 2 by corresponding threads. Among them, the insertion component 31 includes a supporting column 310 connected to the threaded hole at the top, and a ground plug 311 set at the bottom of the supporting column 310. The connection between the insertion component 31 and the frame component 21 is achieved through threaded connection, which facilitates the installation and disassembly between the insertion component 31 and the frame component 21. Alternatively, as shown in FIGS. 96 and 97, each mosquito killing module 2 has at least one installation hole 210 at the bottom of the frame component 21, and at least one installation hole 210 is a snap fit hole, the supporting module 3 includes multiple insertion components 31, and the ends of the multiple insertion components 31 are correspondingly connected to the multiple snap fit holes of the frame component 21 of multiple mosquito killing modules 2. Among them, the insertion component 31 includes a supporting column 310 connected to the snap fit hole at the top, and a ground plug 311 set at the bottom of the supporting column 310. In this way, the connection between the insertion component 31 and the frame component 21 is achieved through a snap fit connection, which facilitates the installation and removal of the insertion component 31 and the frame component 21.

Specially, as shown in FIGS. 95-97, the ground plug 311 includes a grounding structure 3111 and a connecting column 3112 that extends into the opening **310*a* at the bottom of the supporting column 310. The connecting column 3112 is interference fit or threaded with the opening 310*a* at the bottom of the supporting column 310. Among them, the connecting column 3112 and the grounding structure 3111 can be detachable or non detachable connections; for example, when there is a detachable connection between the connecting column 3112 and the grounding structure 3111, the connecting column 3112 can be fixedly connected to the grounding structure 3111 through methods such as screwing, clamping, or plugging, but not limited to; for example, when the connecting column 3112 is non detachable from the grounding structure 3111, the connecting column 3112 can be fixedly connected to the grounding structure 3111 through but not limited to riveting or welding. When the connecting column 3112 is in interference fit with the opening 310*a* at the bottom of the supporting column 310, the opening 310*a* at the bottom of the supporting column 310 is a snap fit hole, at this time, the connecting column 3112 is a snap fit column, and the snap fit column is inserted into the snap fit hole at the bottom of the supporting column 310, the outer surface of the snap fit column is in interference fit with the wall surface of the snap fit hole, so that the ground plug 311 and the supporting column 310 are connected to each other through the snap fit column and the snap fit hole. When the connecting column 3112 is threaded with the opening 310***a* at the bottom of the supporting column 310, the opening 310*a* at the bottom of the supporting column 310 is a threaded hole, at this time, the connecting column 3112 is a threaded column, and the threaded column is connected to the threaded hole, so that the ground plug 311 and the supporting column 310 are connected to each other through the threaded fit between the threaded column and the threaded hole.

Figure 68:
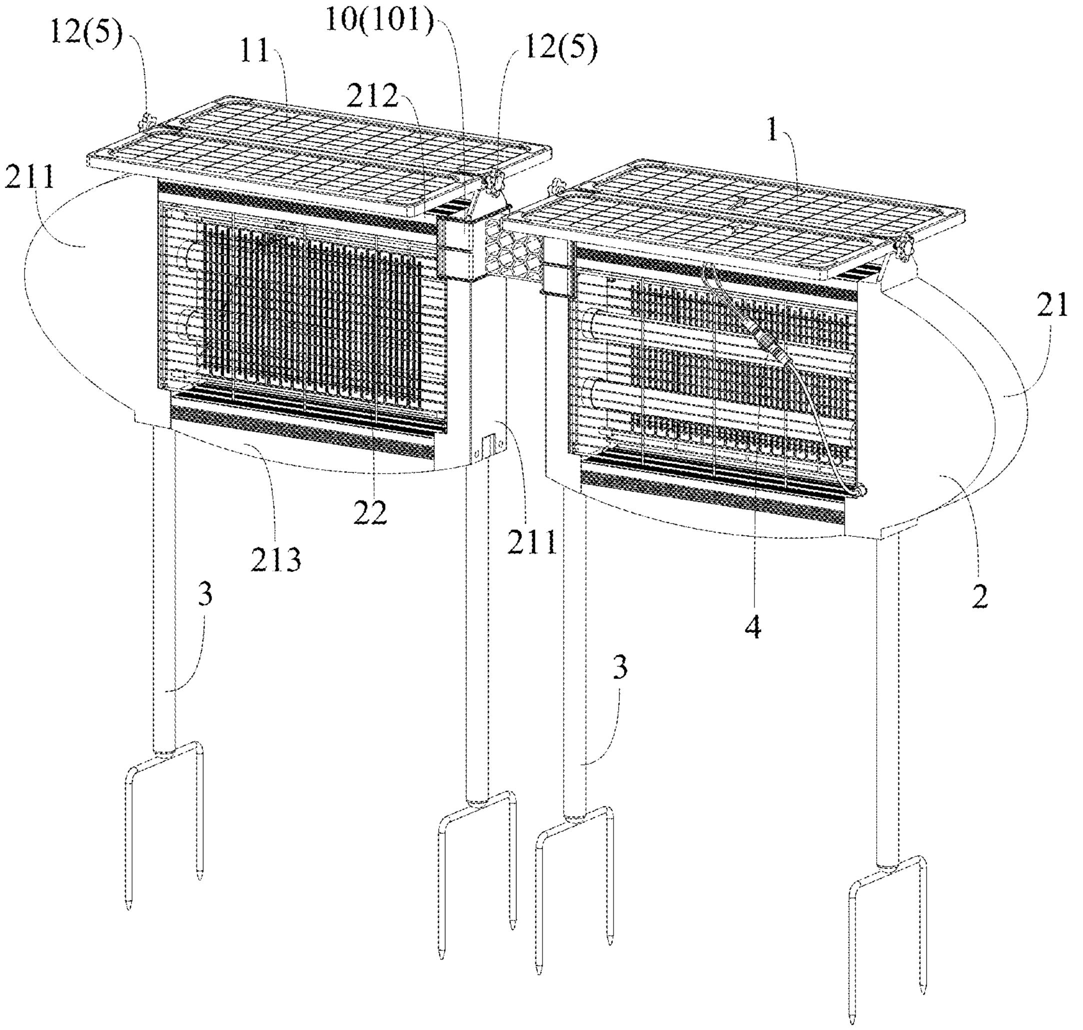
FIG. 68 is a fifteenth schematic view of the solar mosquito killer according to a first embodiment of present application.
Figure 69:
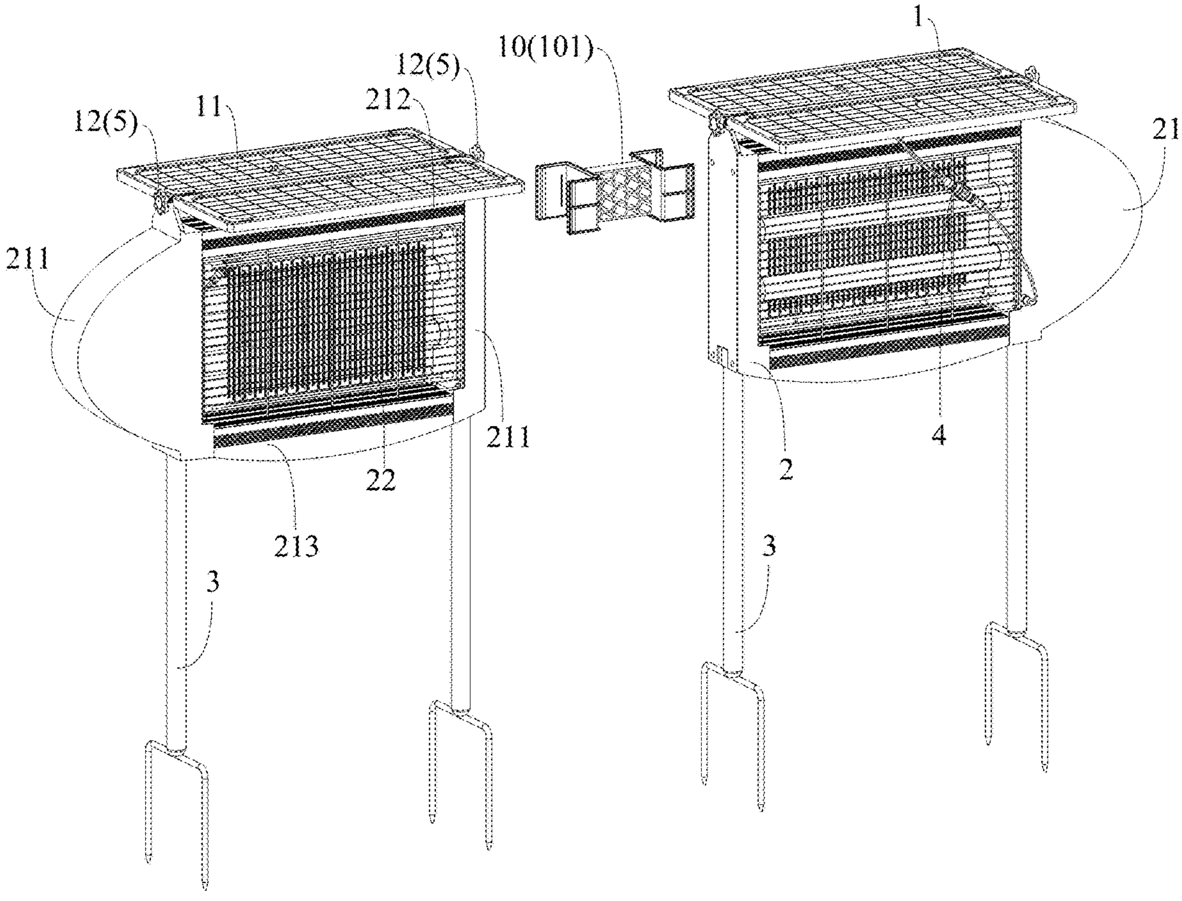
FIG. 69 is an exploded view of the solar mosquito killer of FIG. 68.
Figure 70:
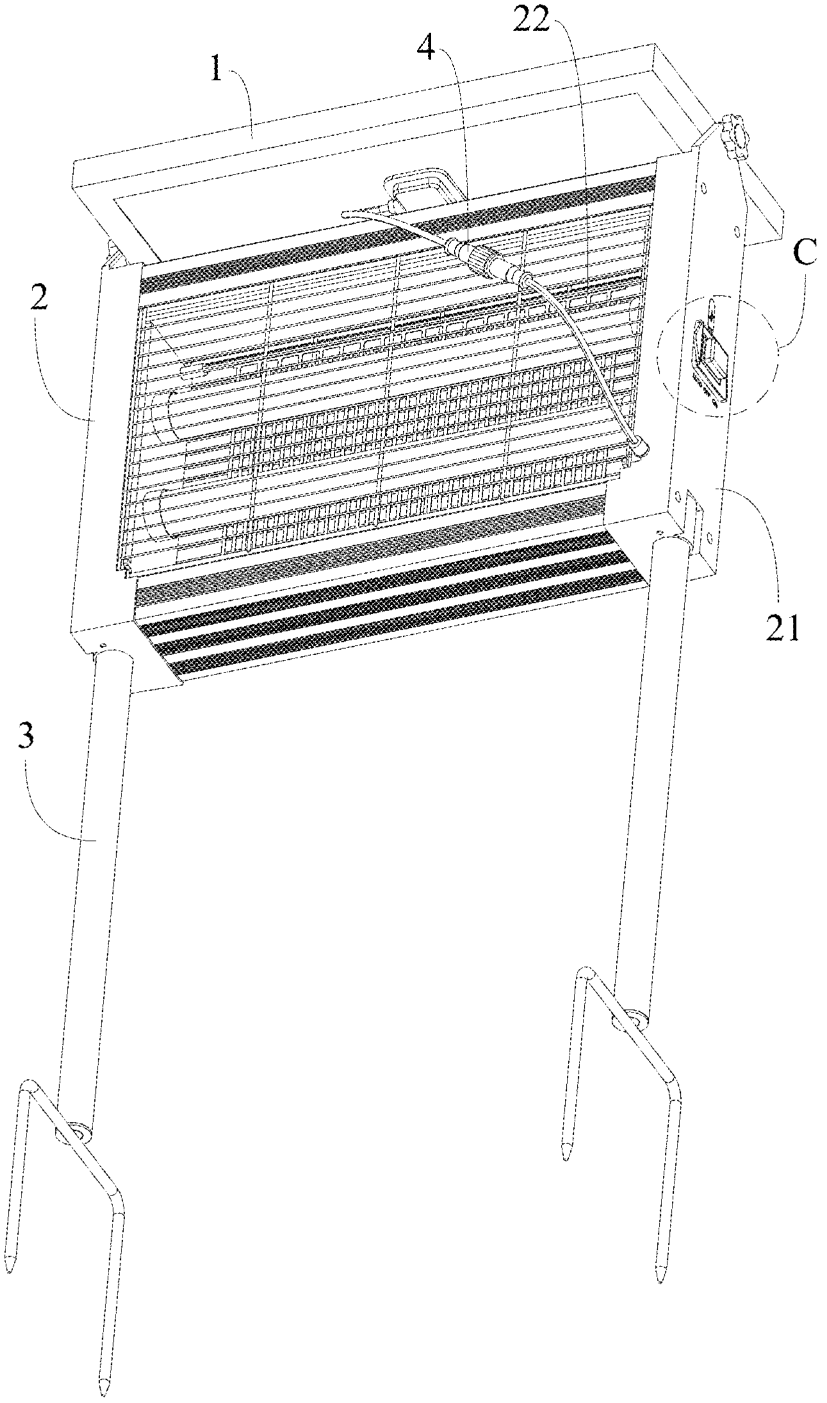
FIG. 70 is a perspective view of one mosquito killing unit including the solar module, the mosquito killing module and the supporting module assembled together.

In this embodiment, as shown in FIGS. 95 and 96, the grounding structure 3111 includes multiple grounding strips 3111*b* that are arranged in a periphery thereof, and each of the grounding strips 3111*b* has a reverse hook structure at a distal end thereof. By designing the grounding structure 3111 to include the grounding strips 3111*b* with a reverse hook structure as shown in FIG. 68, it is convenient for the grounding structure 3111 to be inserted into the soil or cement ground in the outdoor environment, so that the supporting module 3 can effectively support the mosquito killing module 2, thereby facilitating the fixation of the solar mosquito killing device in the outdoor environment.

Figure 98:
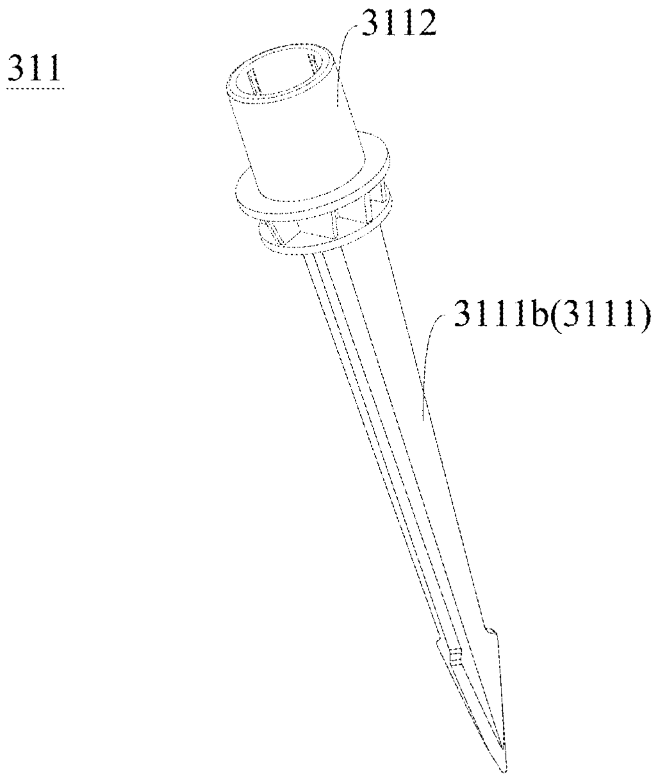
FIG. 98 is a first schematic view of grounding structure with the ground plug having grounding strip according to a first embodiment of present application.
Figure 99:
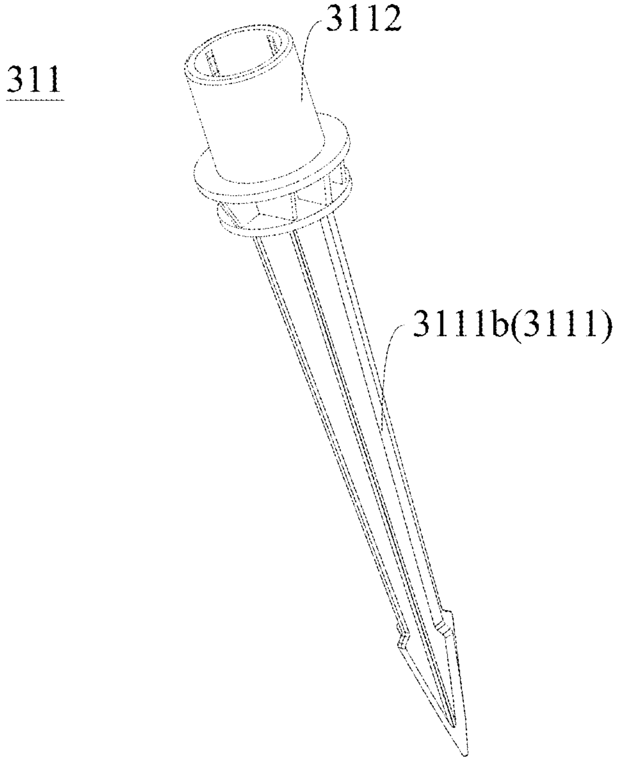
FIG. 99 is a second schematic view of grounding structure with the ground plug having grounding strip according to a first embodiment of present application.
Figure 100:
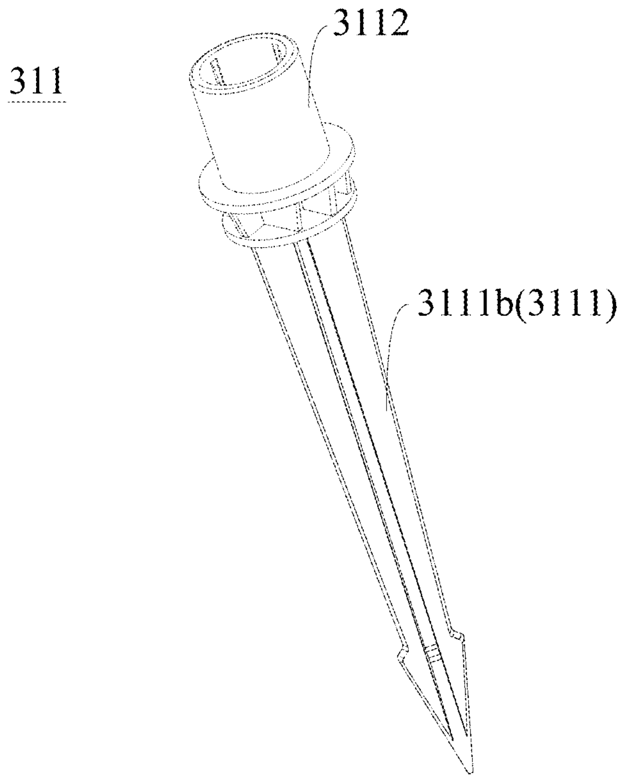
FIG. 100 is a third schematic view of grounding structure with the ground plug having grounding strip according to a first embodiment of present application.

It can be understood that when the grounding structure 3111 includes a grounding strip 3111*b*, the ground plug 311 can exist in several forms as shown in FIGS. 98 to 100, but not limited to. In FIG. 98, the number of grounding strip 3111*b* is three, and the three grounding strip 3111*b* are spaced 120 degrees apart; in FIG. 99, the number of grounding strip 3111*b* is four, and the four grounding strip 3111*b* are spaced 90 degrees apart; in FIG. 100, the number of grounding strip 3111*b* is five, and the five grounding strip 3111*b* are spaced 60 degrees apart. It can be understood that more ground strip boards 3111*b* can increase the stability of fixation.

Figure 57:
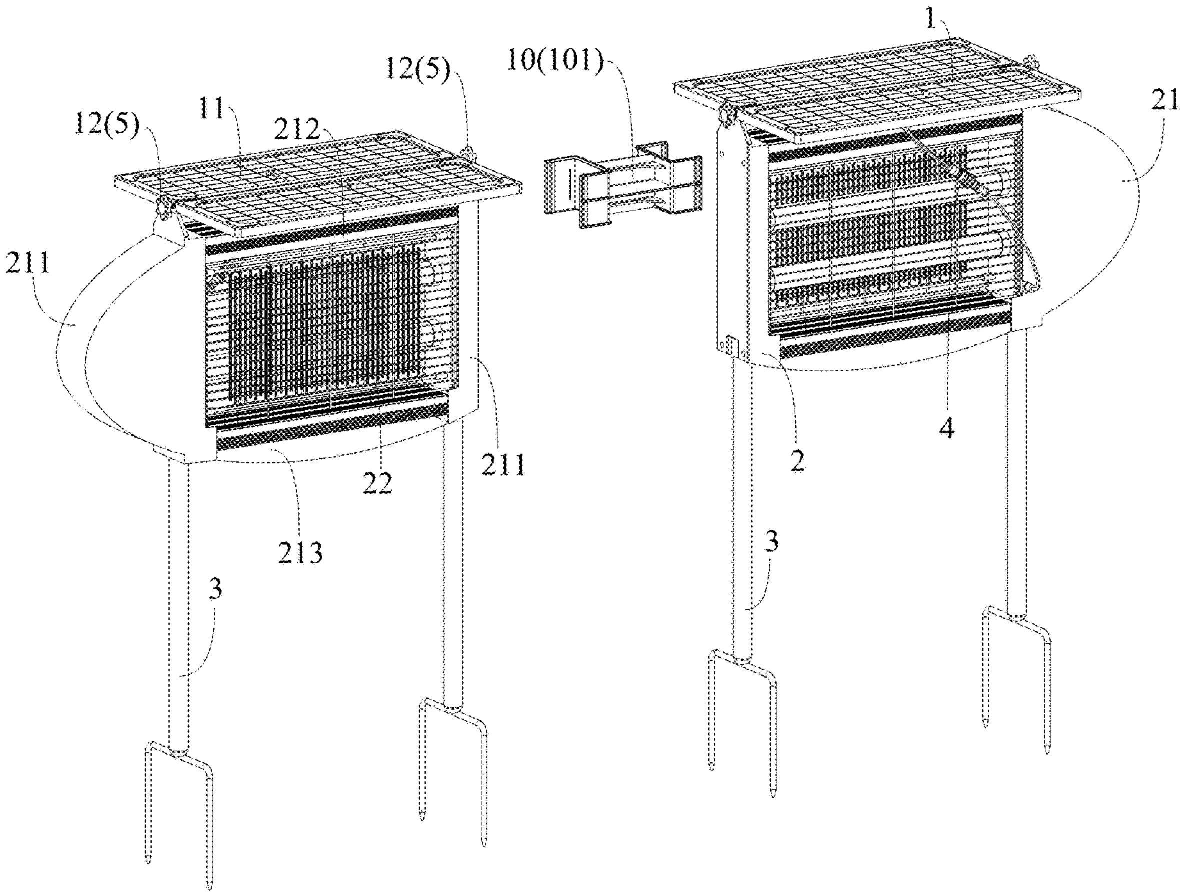
FIG. 57 is an exploded view of the solar mosquito killer of FIG. 56.
Figure 58:
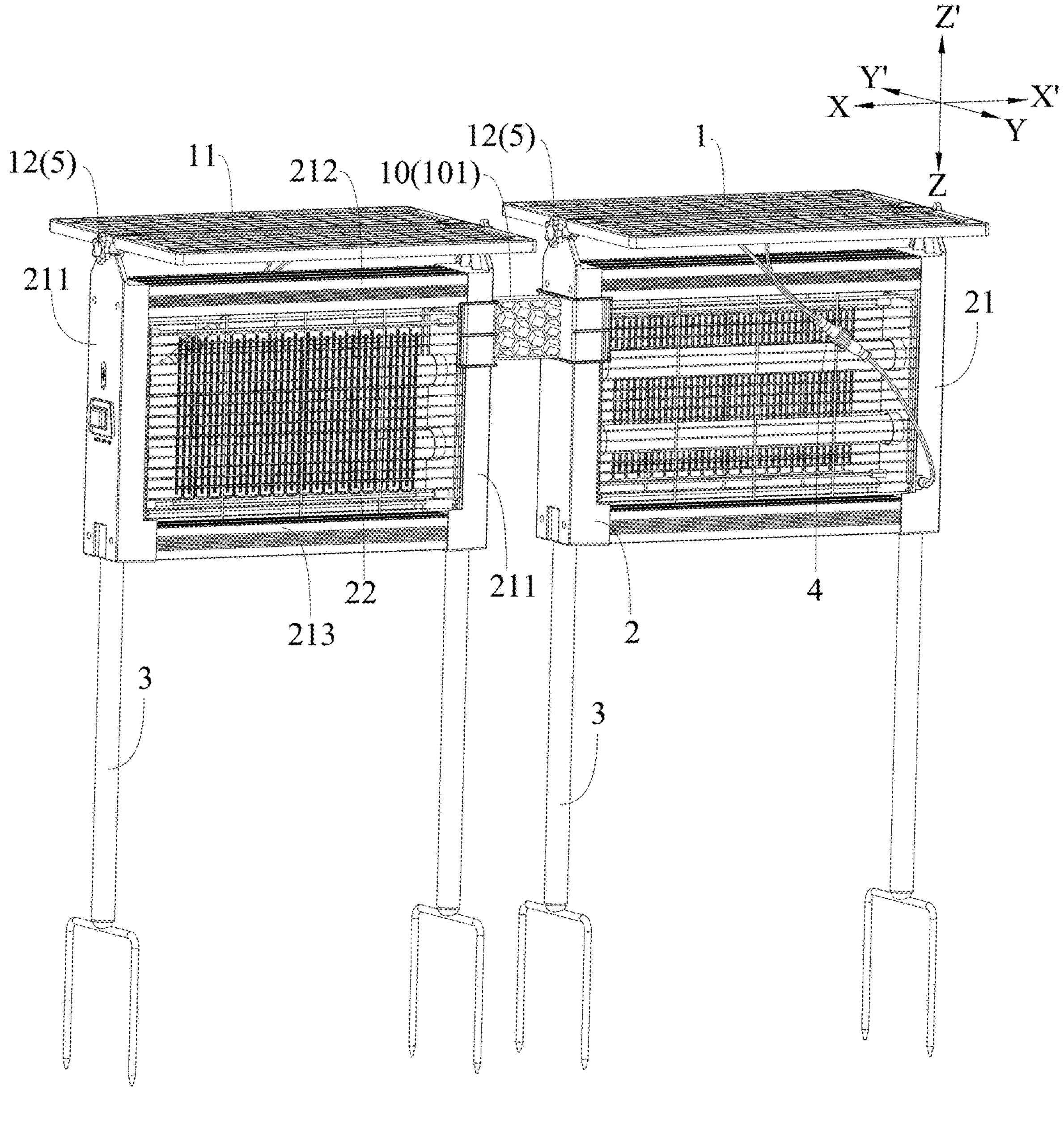
FIG. 58 is an eleventh schematic view of the solar mosquito killer according to a first embodiment of present application.
Figure 59:
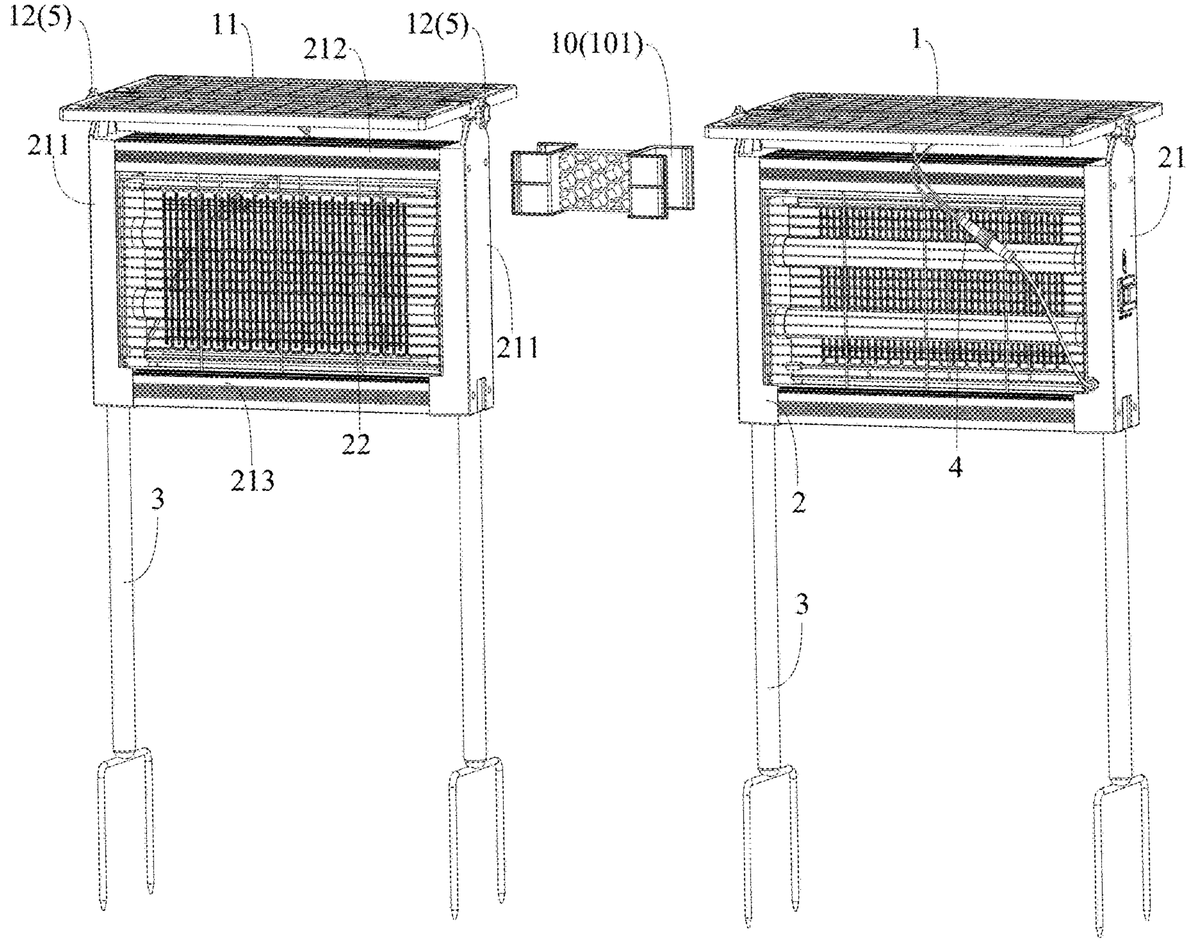
FIG. 59 is an exploded view of the solar mosquito killer of FIG. 58.

In this embodiment, as shown in FIG. 97, the grounding structure 3111 includes a U-shaped structure 3111*a*, by designing the grounding structure to include the U-shaped structure 3111*a* as shown in FIG. 57, it is easy to insert the grounding structure 3111 into the soil or cement ground in the outdoor environment, so that the supporting module 3 can effectively support the mosquito killing module 2, thereby facilitating the fixation of the solar mosquito killing device in the outdoor environment.

Figure 101:
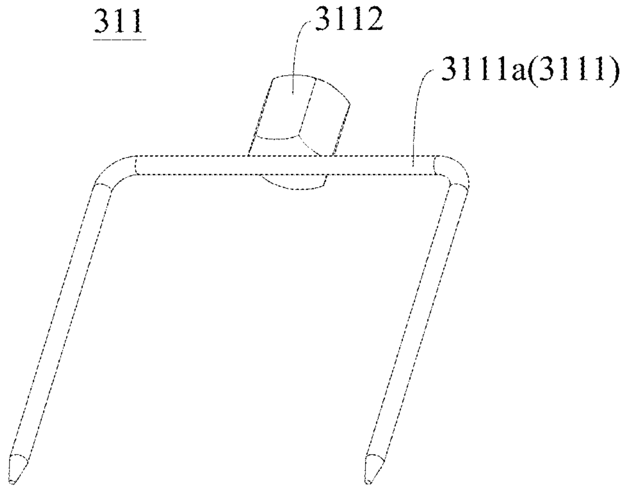
FIG. 101 is a first schematic view of grounding structure with the ground plug having U-shaped structure according to a first embodiment of present application.
Figure 102:
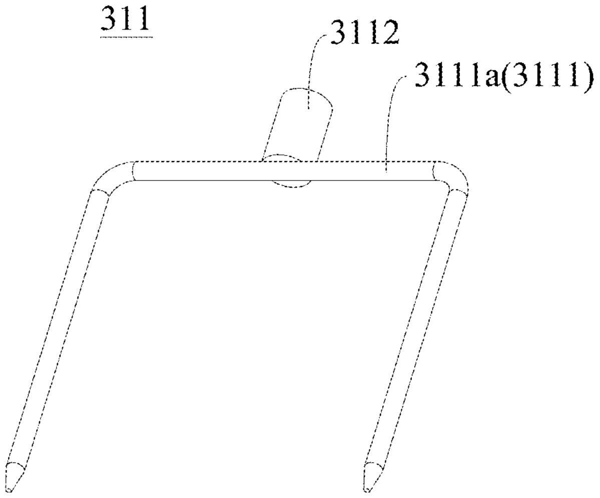
FIG. 102 is a second schematic view of grounding structure with the ground plug having U-shaped structure according to a first embodiment of present application.
Figure 103:
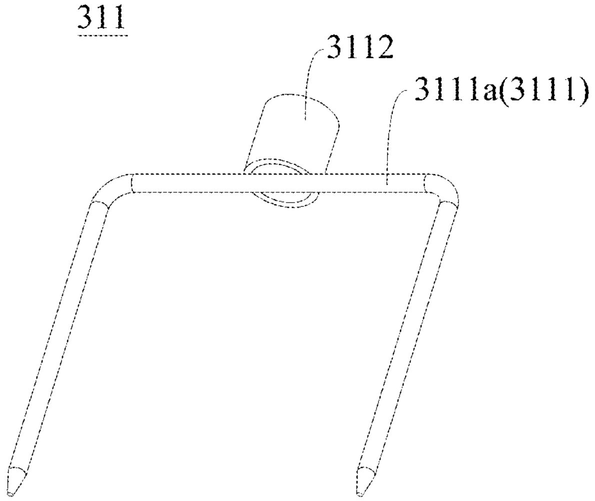
FIG. 103 is a third schematic view of grounding structure with the ground plug having U-shaped structure according to a first embodiment of present application.
Figure 104:
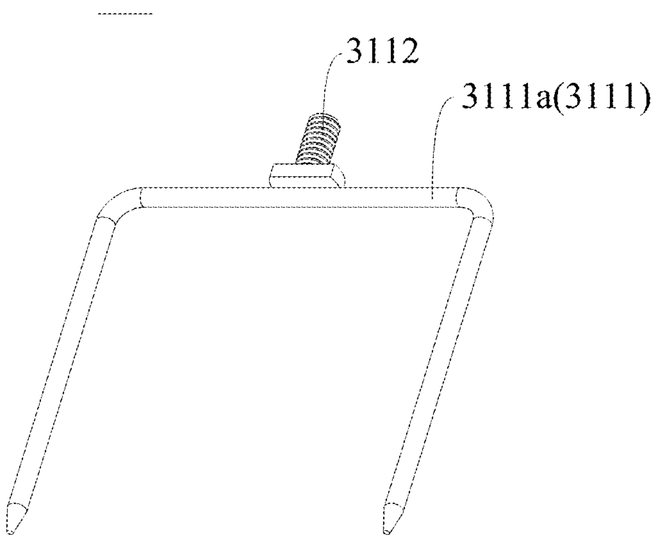
FIG. 104 is a fourth schematic view of grounding structure with the ground plug having U-shaped structure according to a first embodiment of present application.
Figure 105:
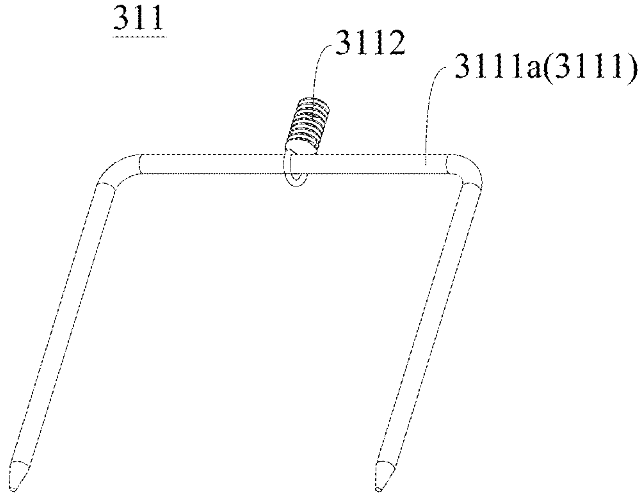
FIG. 105 is a fifth schematic view of grounding structure with the ground plug having U-shaped structure according to a first embodiment of present application.
Figure 106:
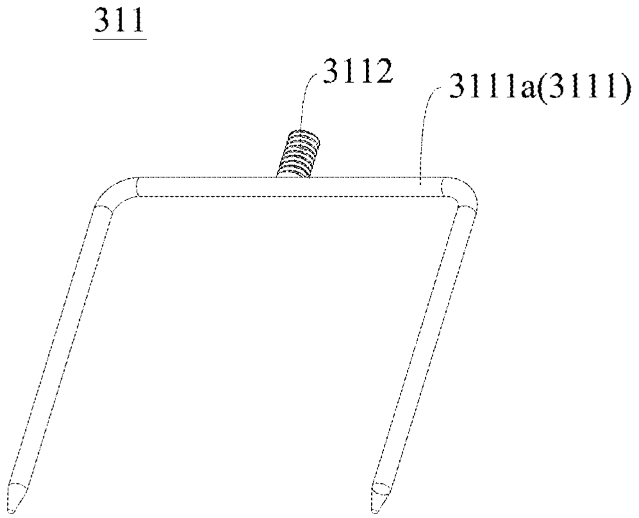
FIG. 106 is a sixth schematic view of grounding structure with the ground plug having U-shaped structure according to a first embodiment of present application.
Figure 107:
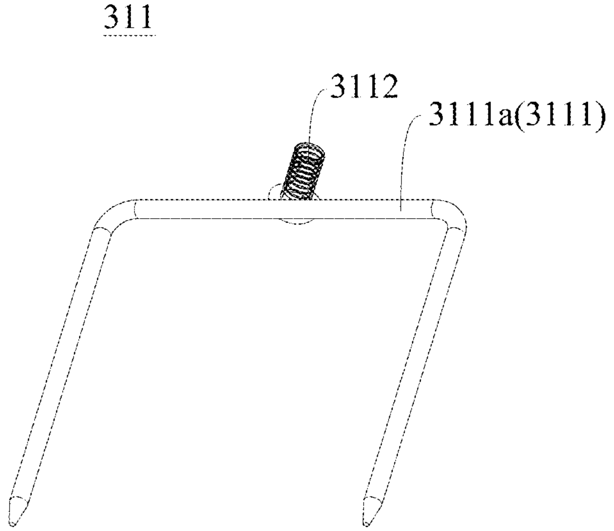
FIG. 107 is a seventh schematic view of grounding structure with the ground plug having U-shaped structure according to a first embodiment of present application.
Figure 108:
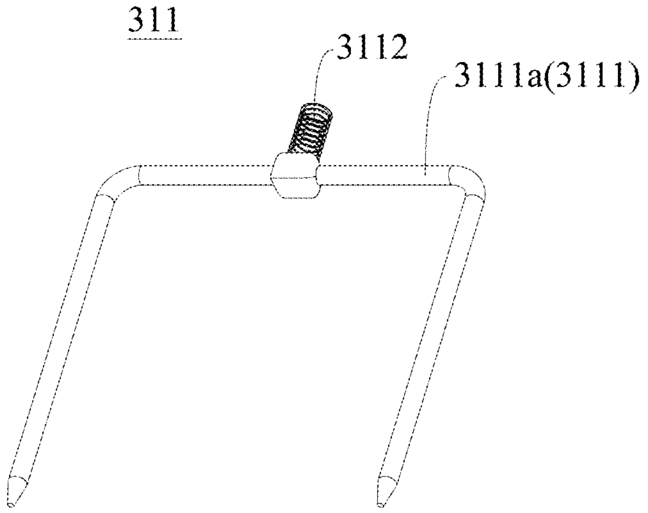
FIG. 108 is an eighth schematic view of grounding structure with the ground plug having U-shaped structure according to a first embodiment of present application.
Figure 109:
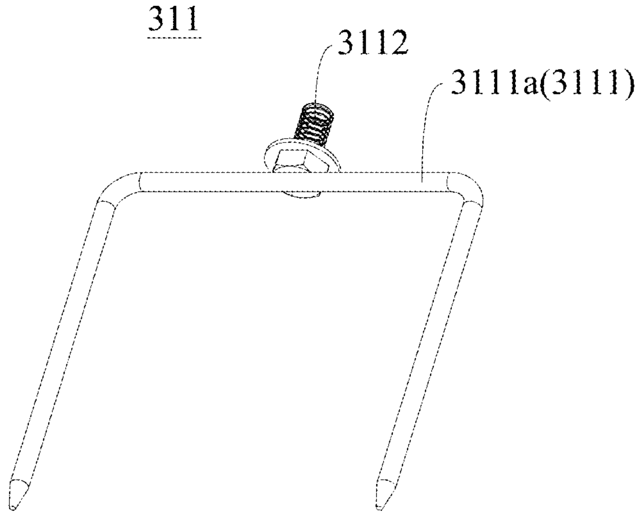
FIG. 109 is a ninth schematic view of grounding structure with the ground plug having U-shaped structure according to a first embodiment of present application.
Figure 110:
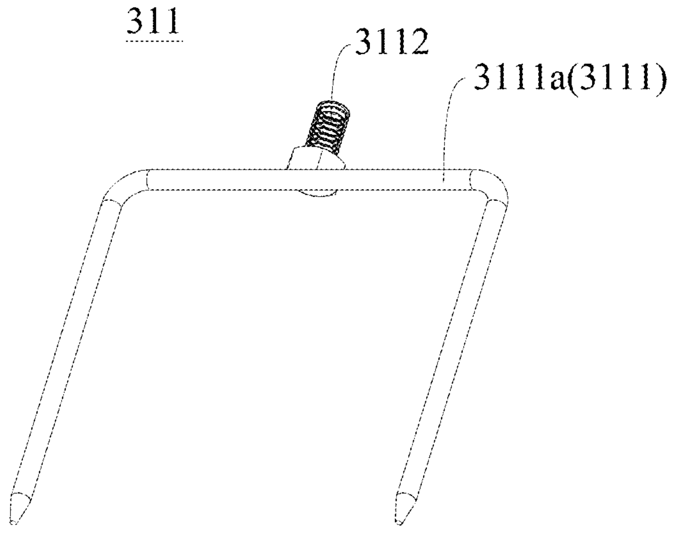
FIG. 110 is a tenth schematic view of grounding structure with the ground plug having U-shaped structure according to a first embodiment of present application.
Figure 111:
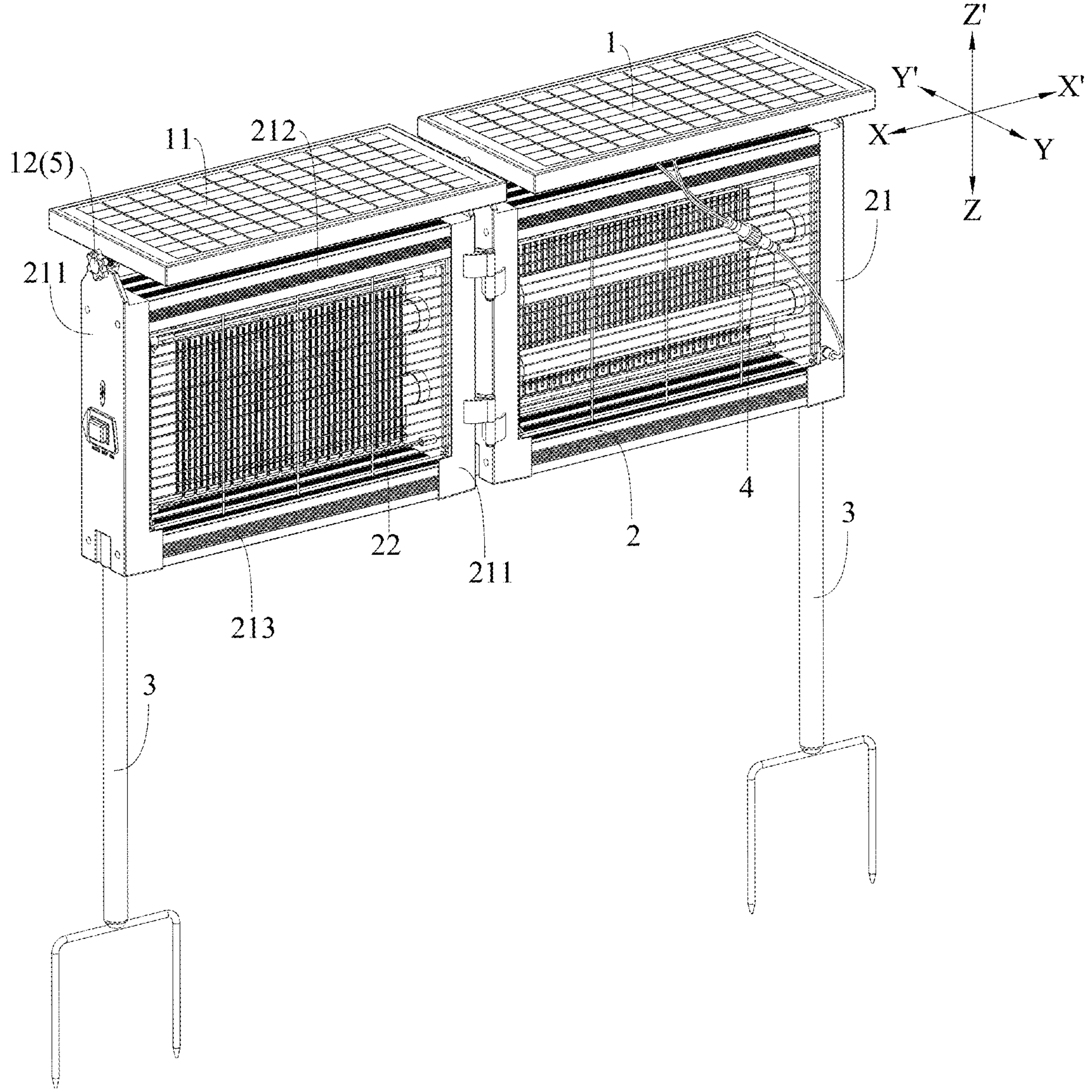
FIG. 111 is a first schematic view of the solar mosquito killer in an unfolded state according to a second embodiment of present application.
Figure 112:
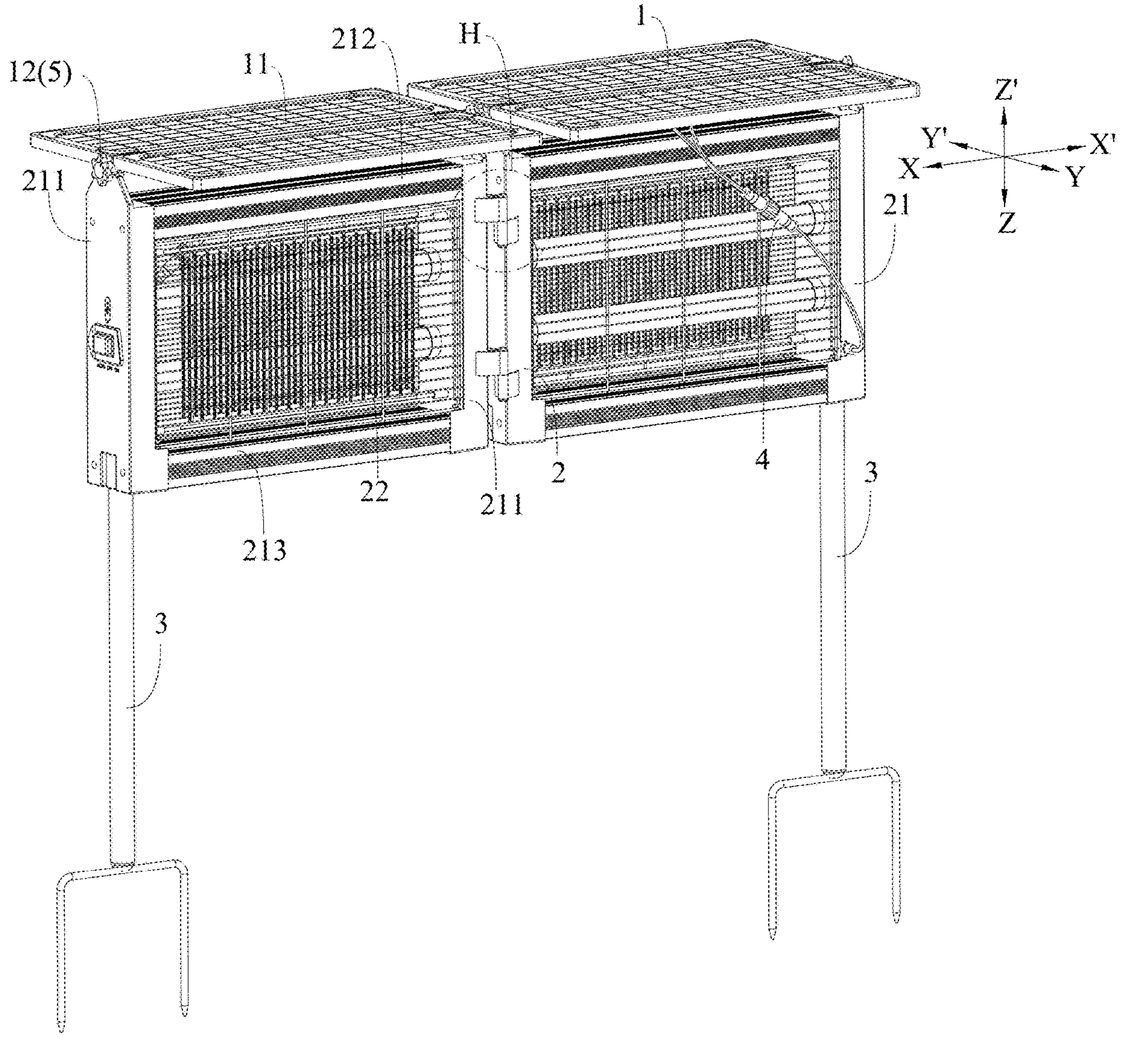
FIG. 112 is a second schematic view of the solar mosquito killer in an unfolded state according to a second embodiment of present application.
Figure 113:
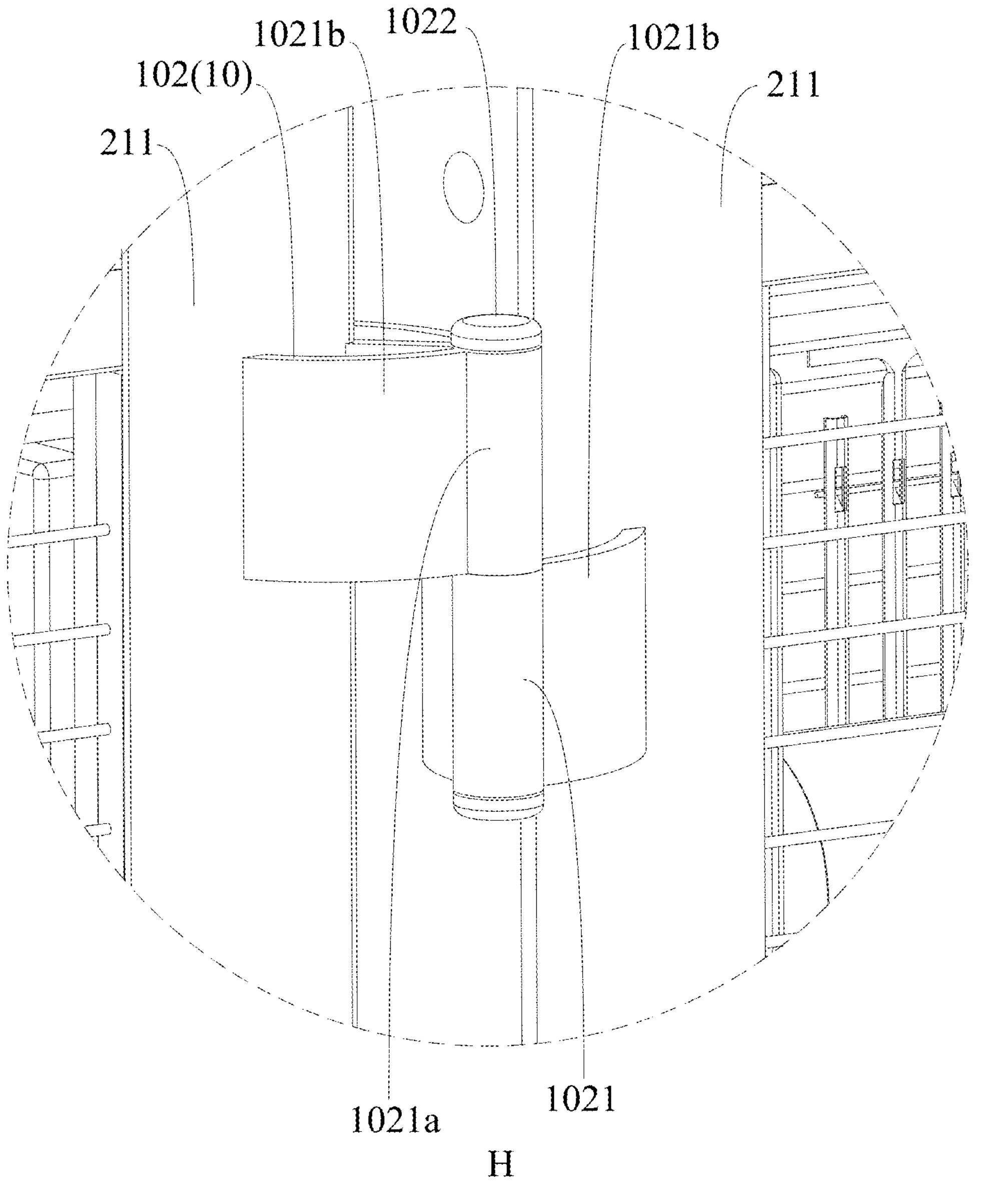
FIG. 113 shows an enlarged view of the H part of FIG. 112.
Figure 114:
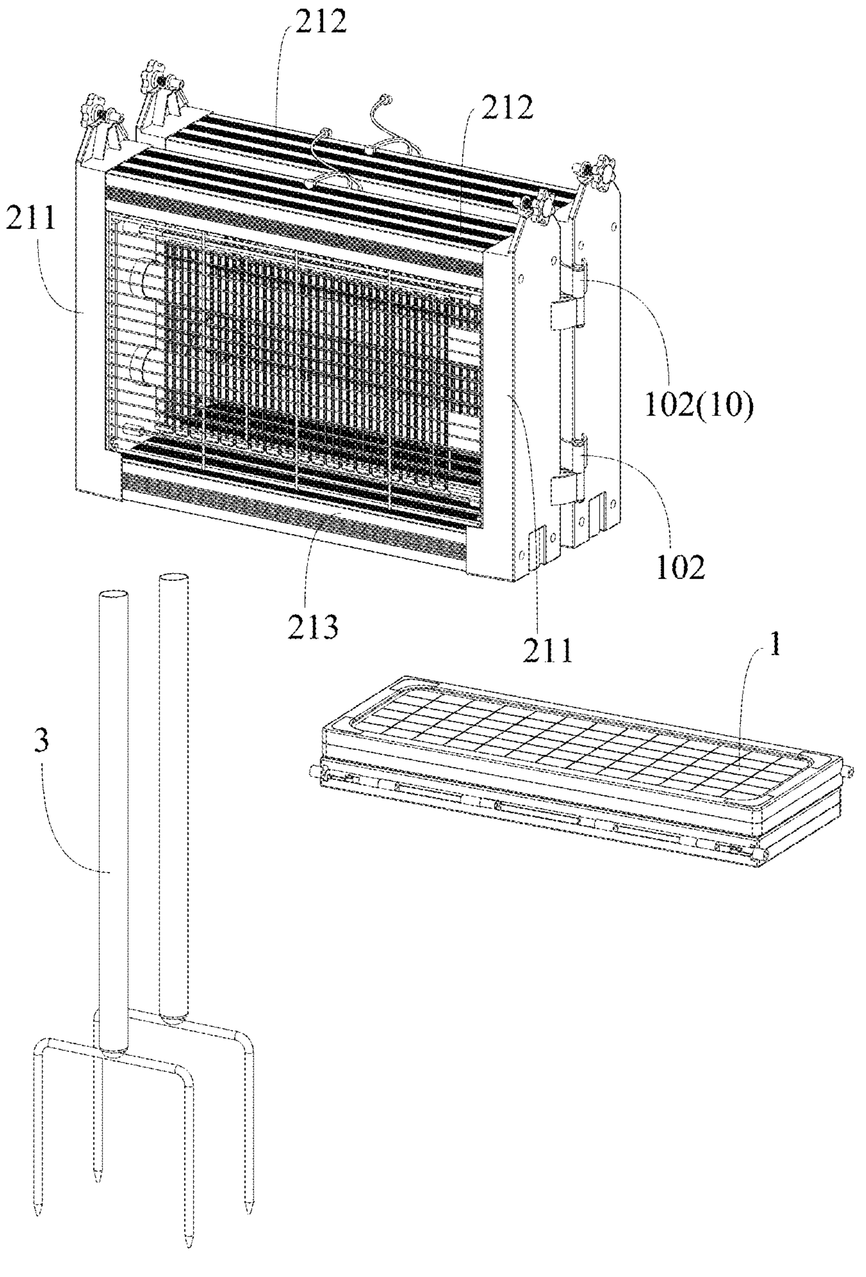
FIG. 114 is a partially exploded view showing the solar mosquito killer of FIG. 112 changes to be a folded state.
Figure 115:
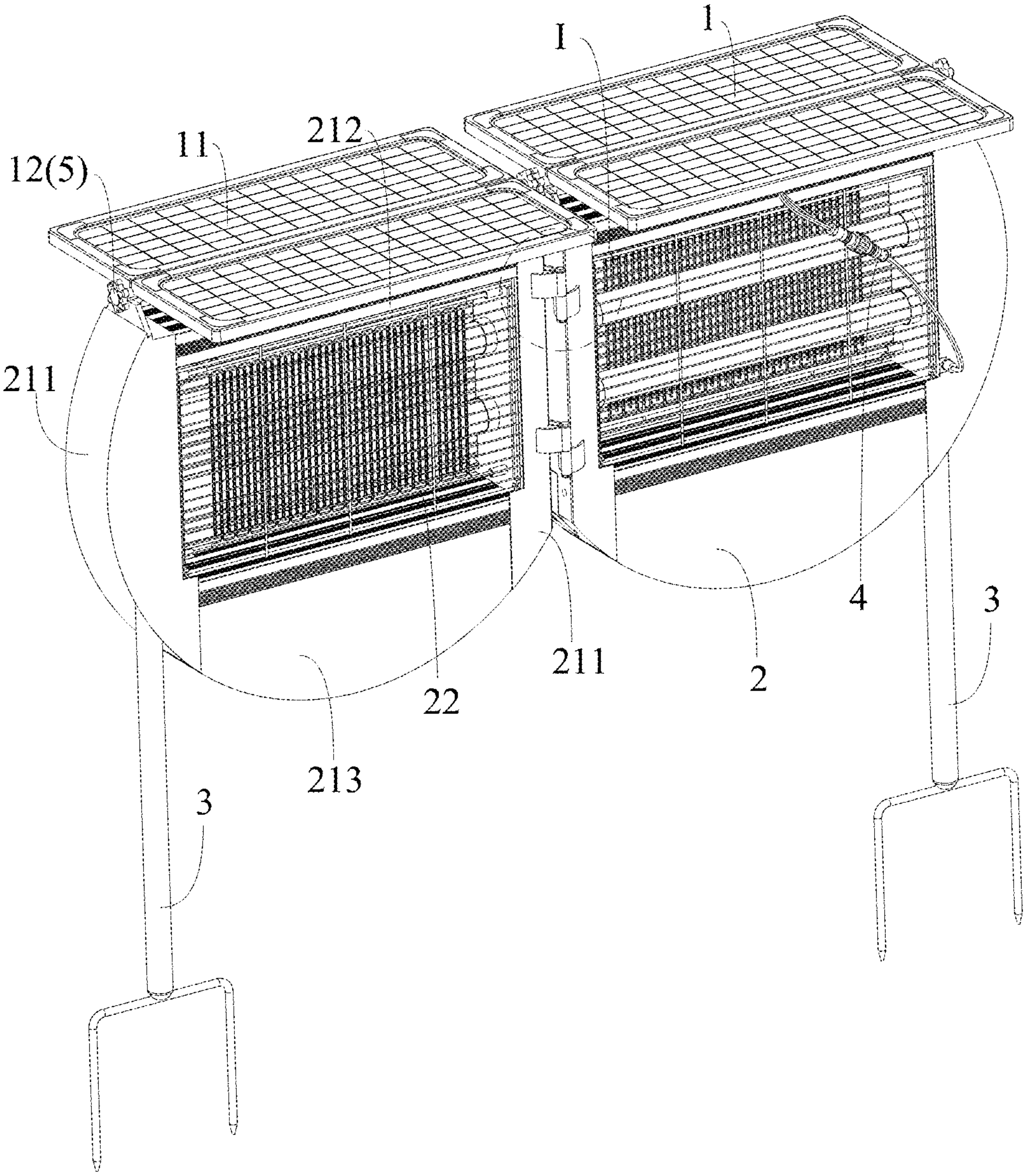
FIG. 115 is a third schematic view of the solar mosquito killer in an unfolded state according to a second embodiment of present application.
Figure 116:
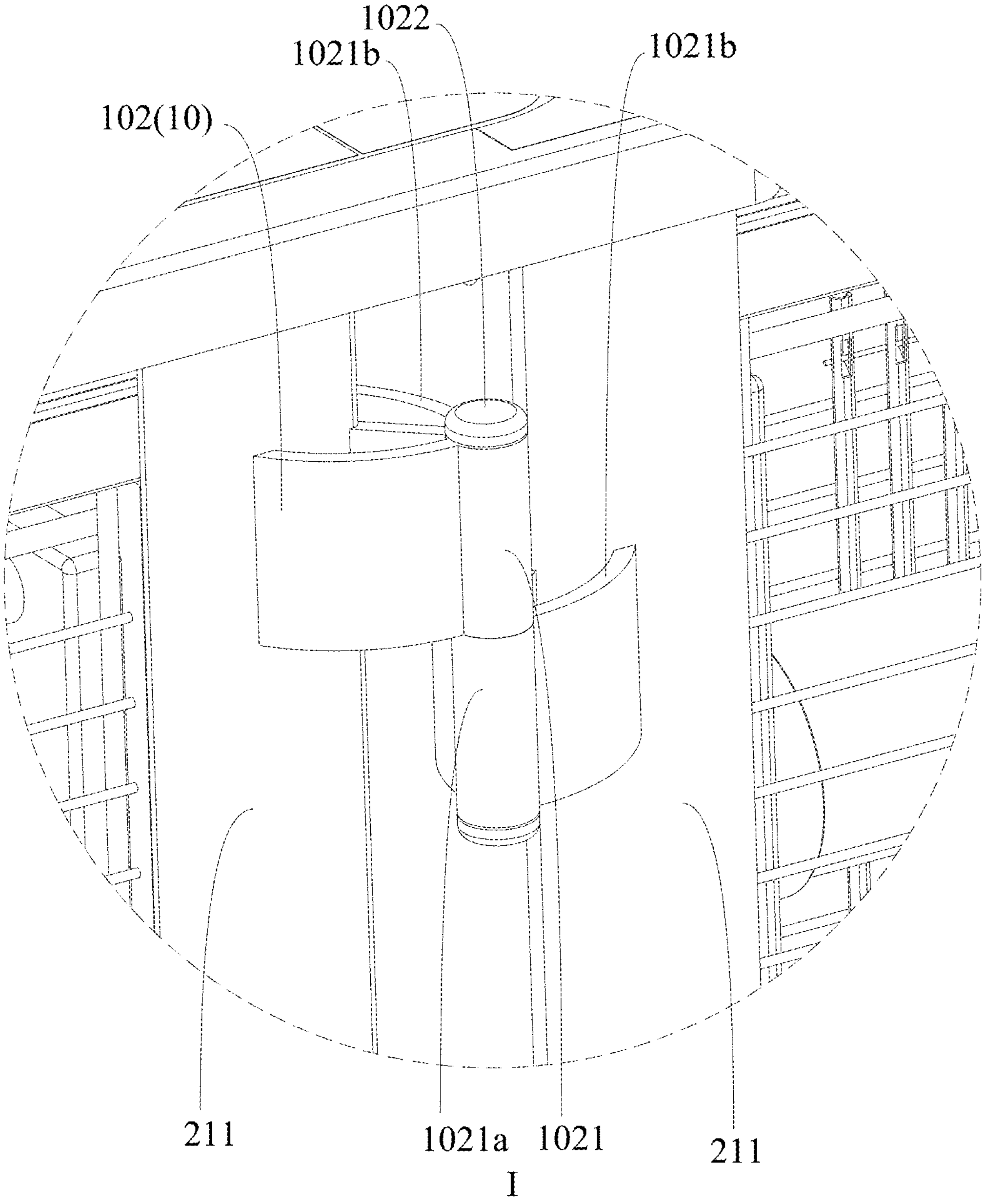
FIG. 116 shows an enlarged view of the I part of FIG. 115.
Figure 117:
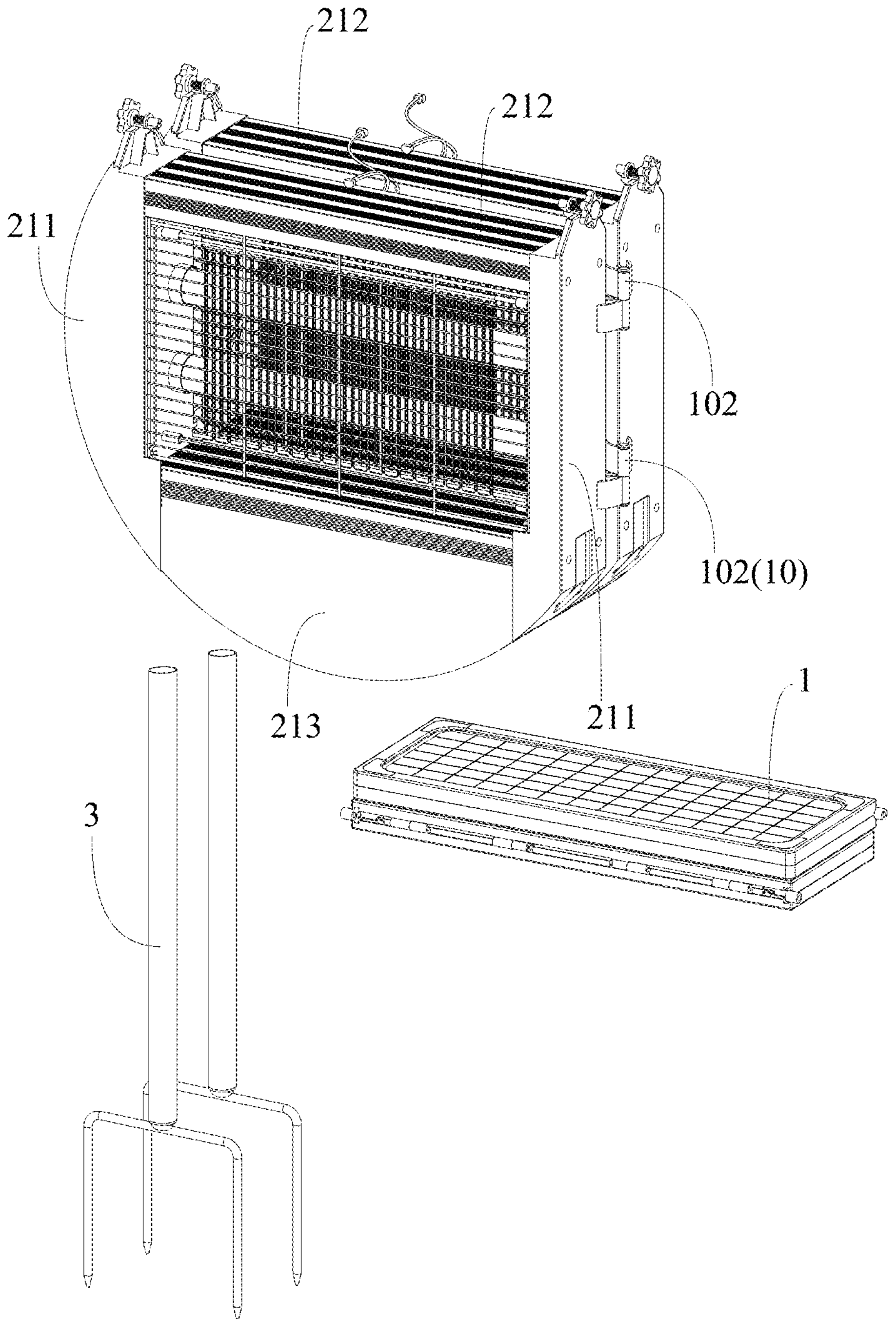
FIG. 117 is a partially exploded view showing the solar mosquito killer of FIG. 115 changes to be a folded state.
Figure 118:
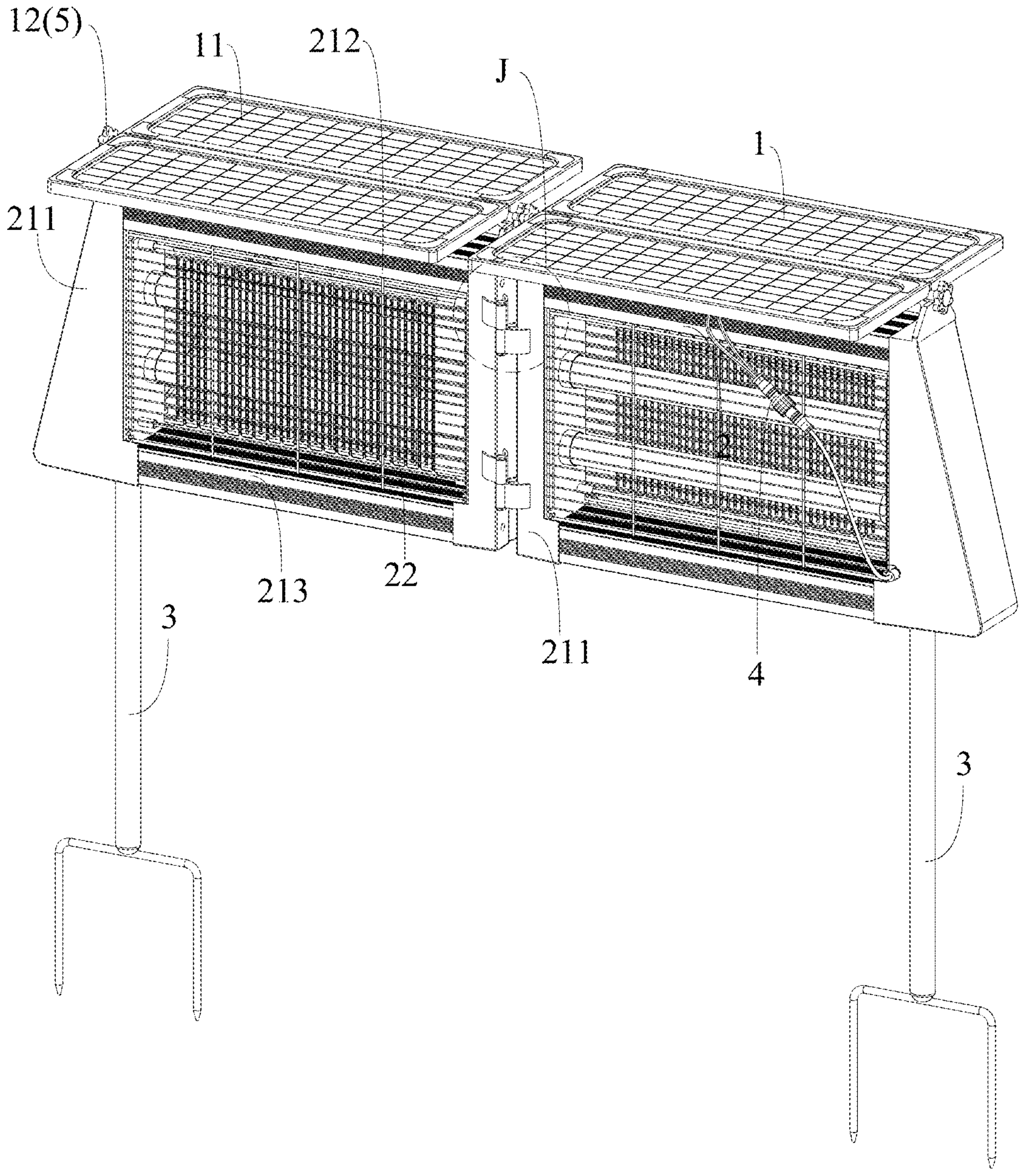
FIG. 118 is a fourth schematic view of the solar mosquito killer in an unfolded state according to a second embodiment of present application.
Figure 119:
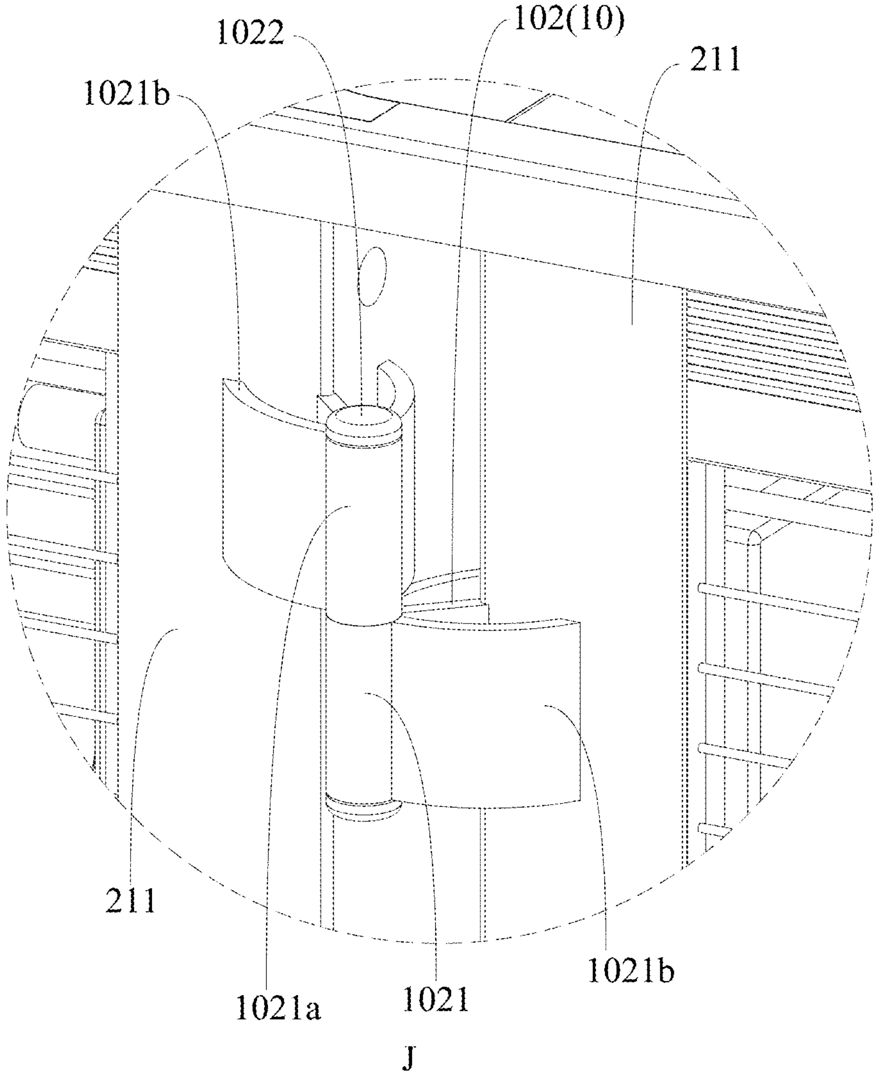
Figure 120:
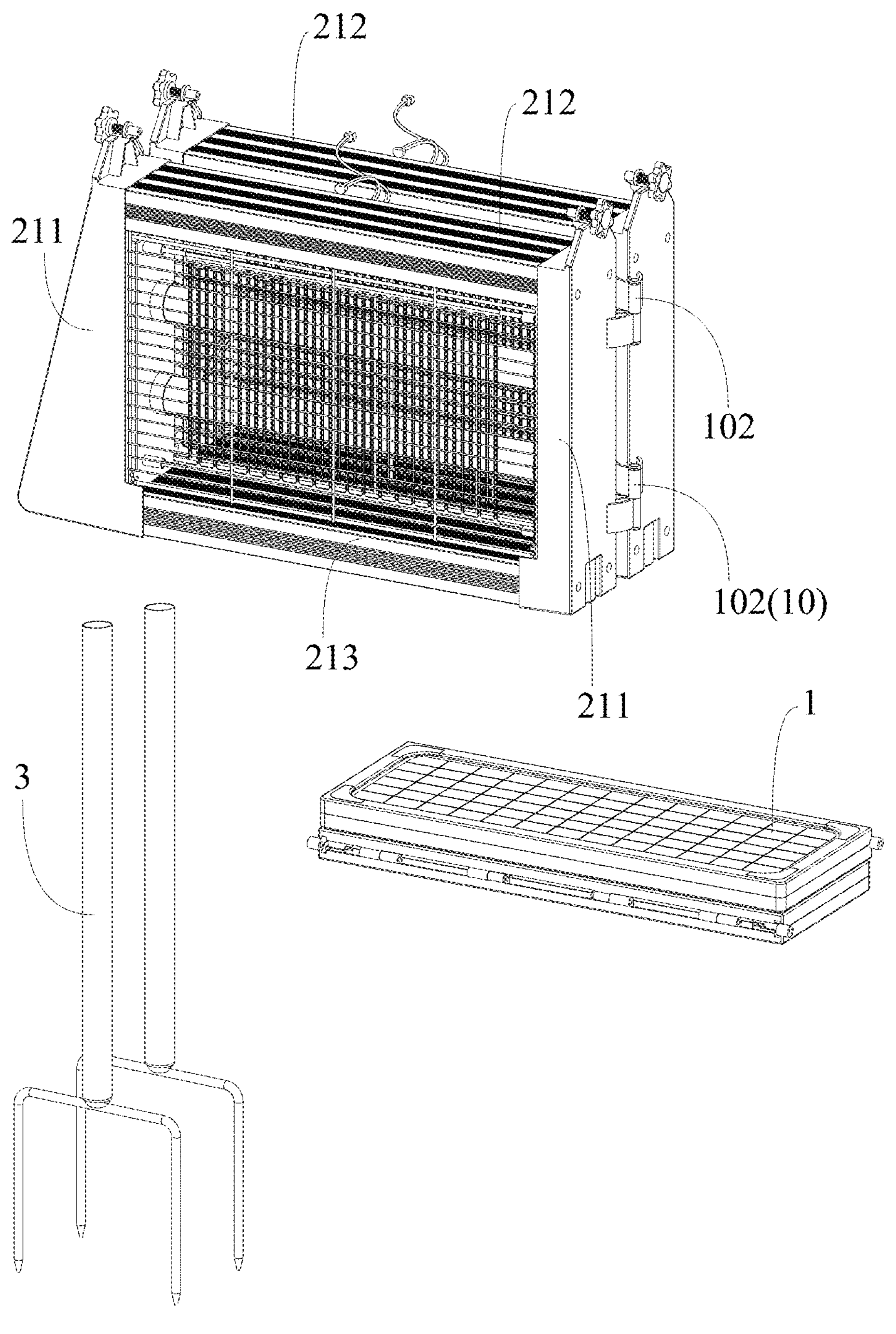
Figure 121:
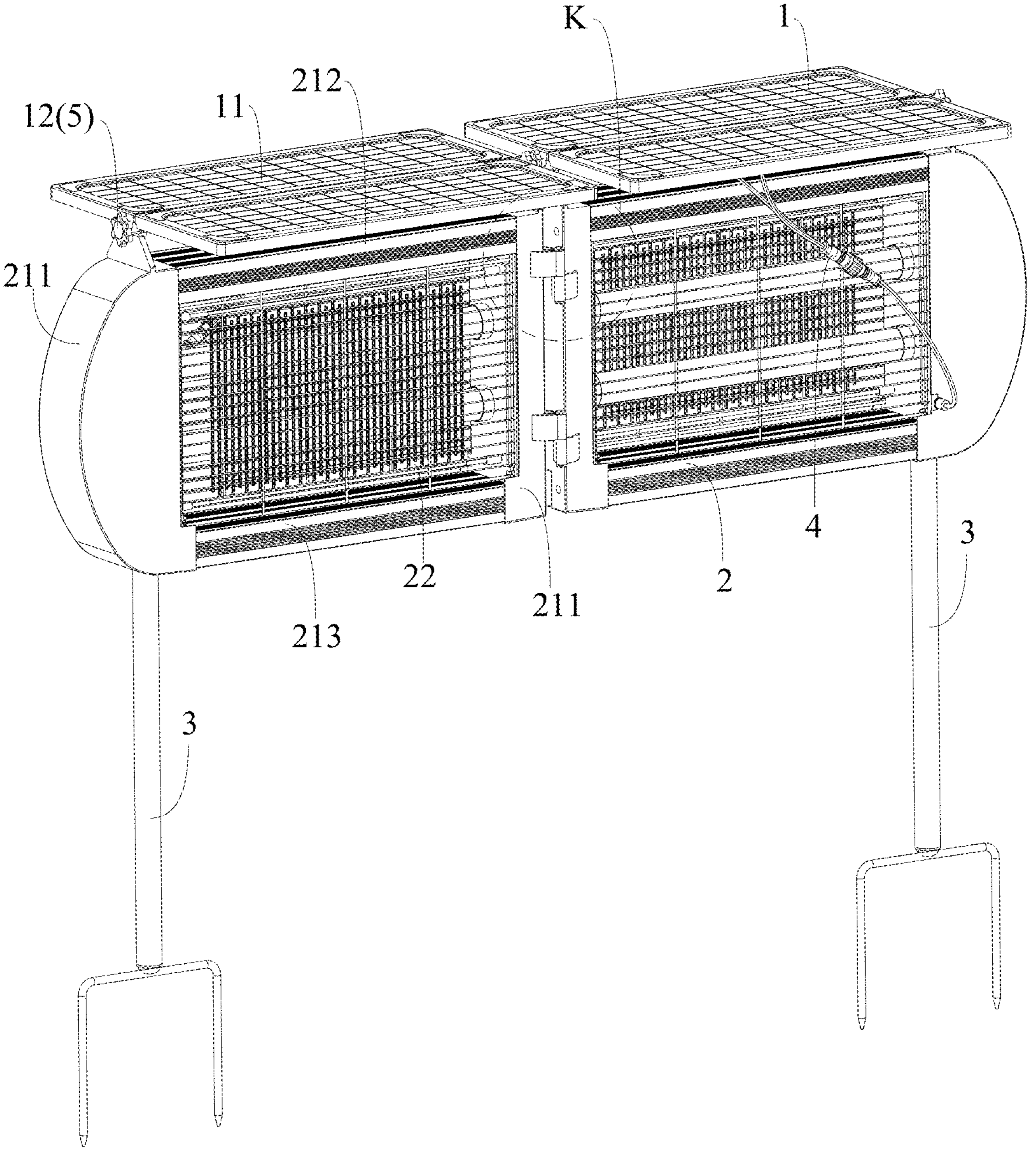
Figure 122:
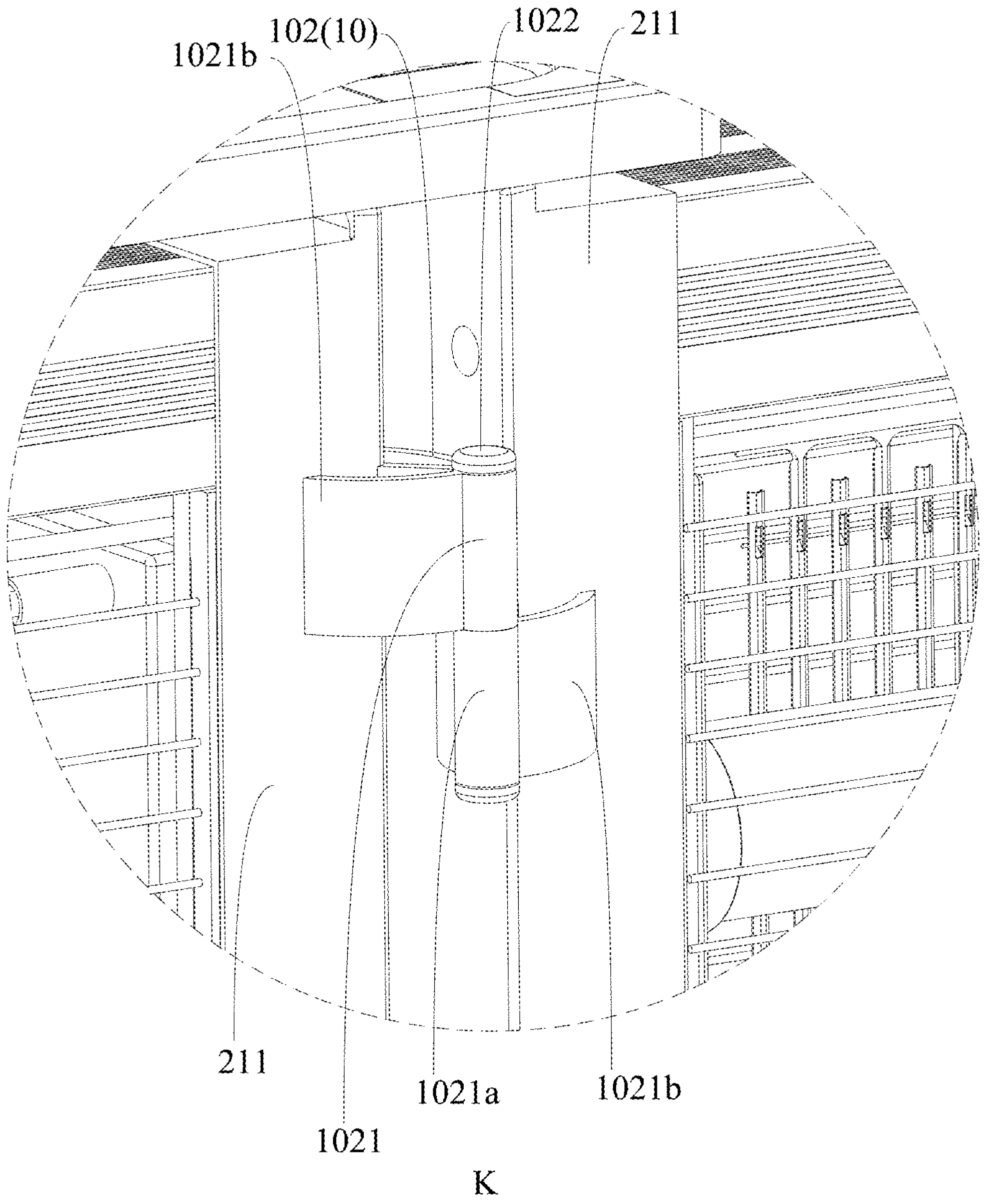
Figure 123:
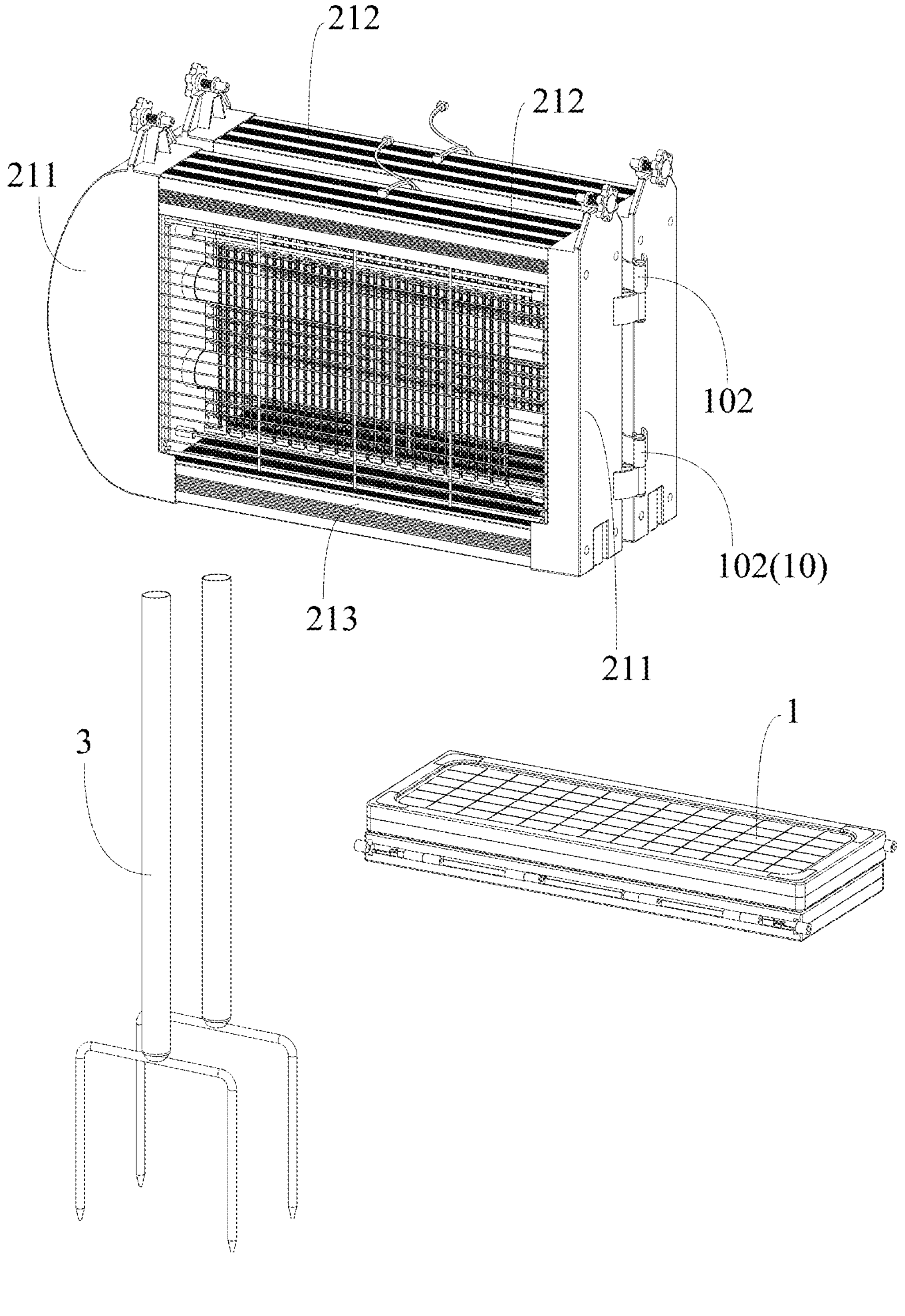
Figure 124:
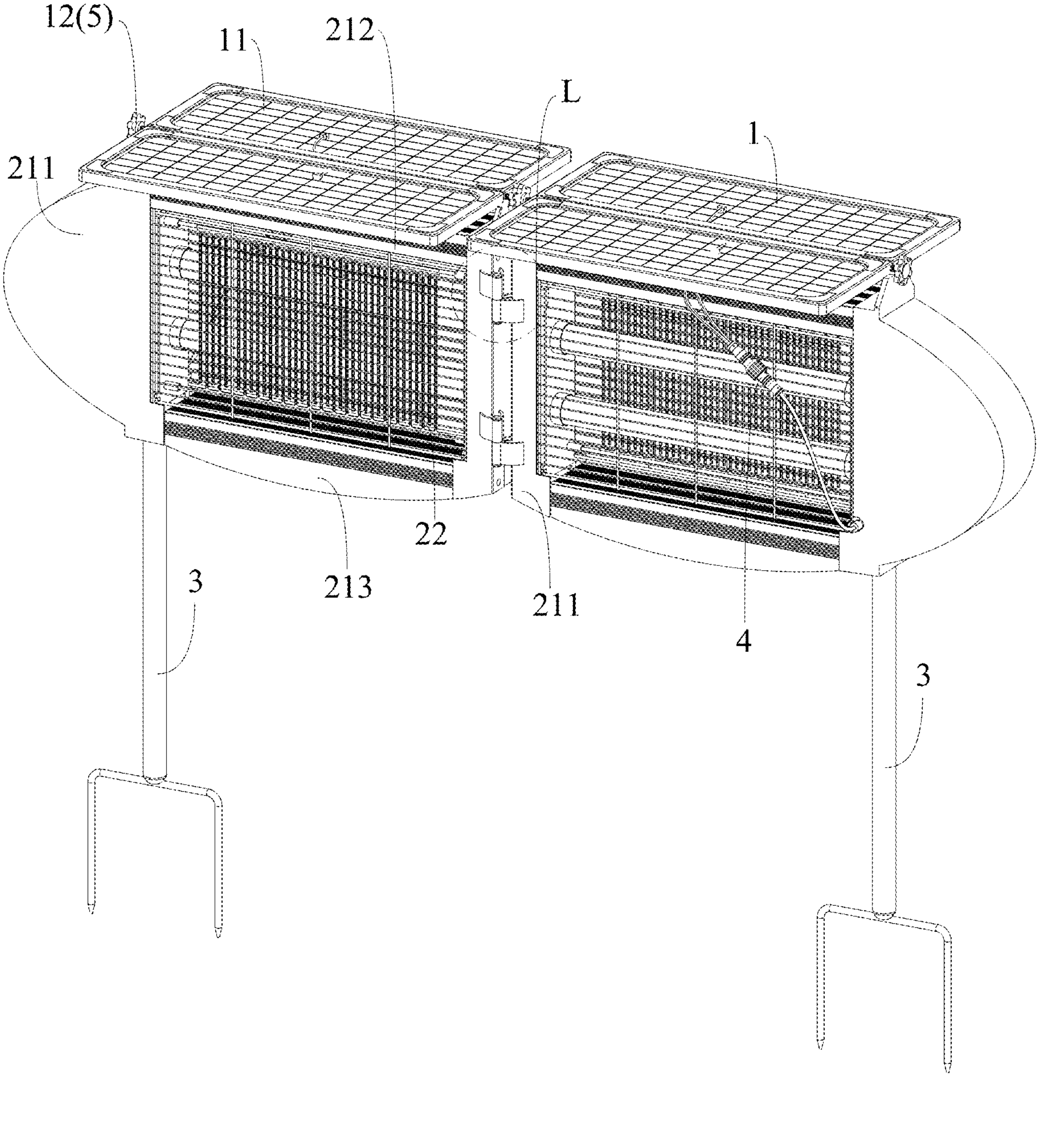
Figure 125:
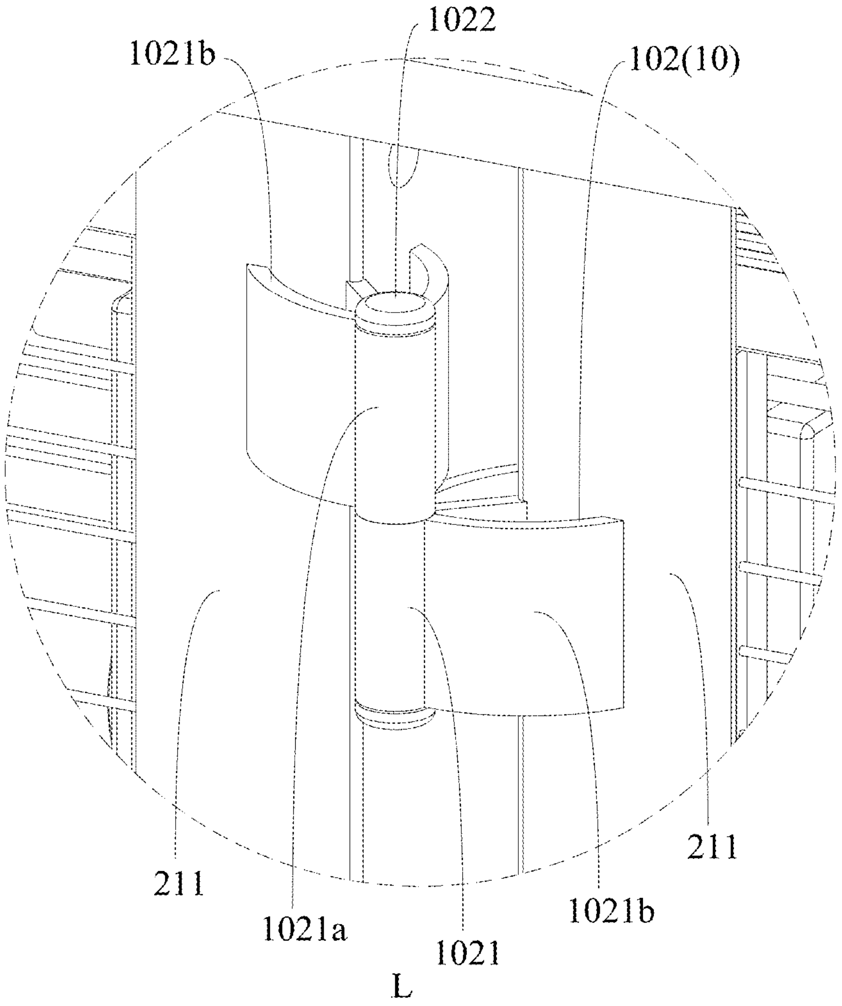
Figure 126:
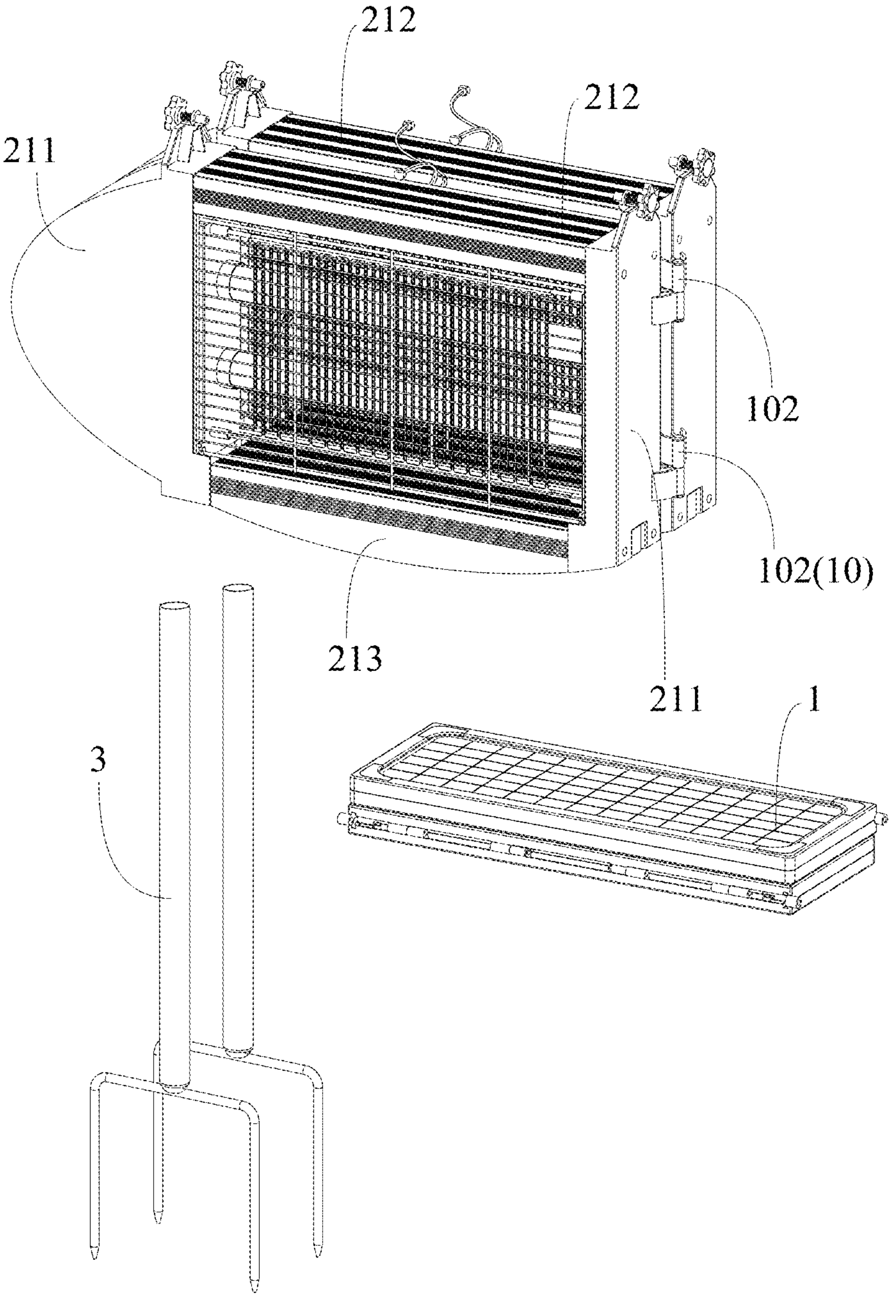
Figure 127:
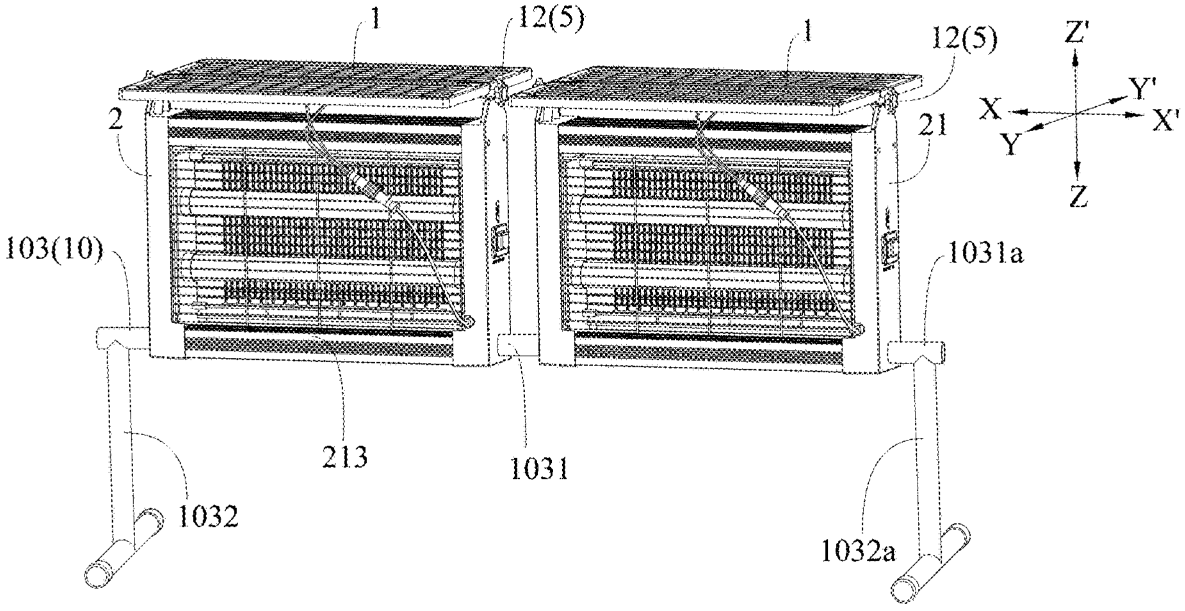
Figure 128:
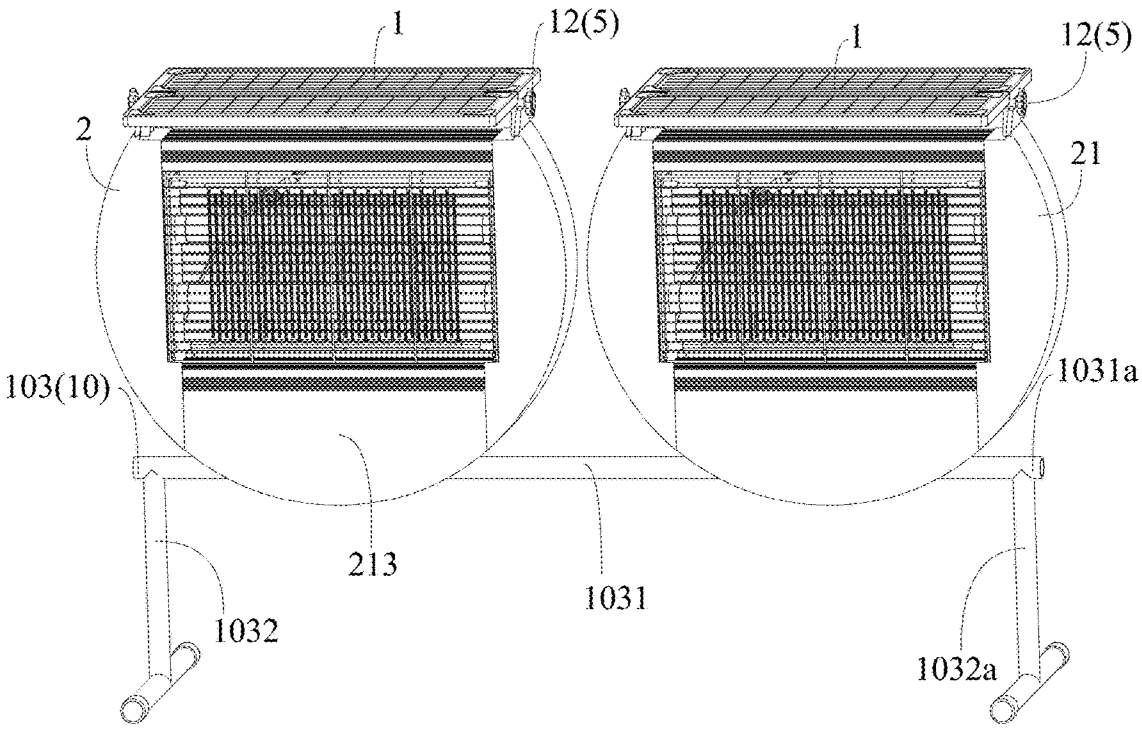
Figure 129:
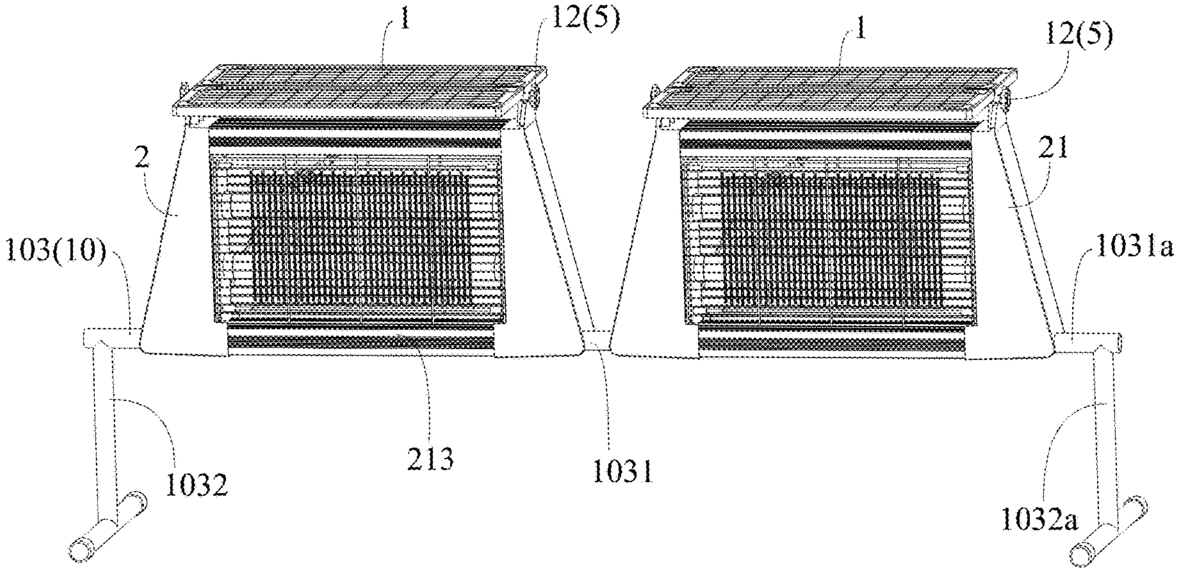
Figure 130:
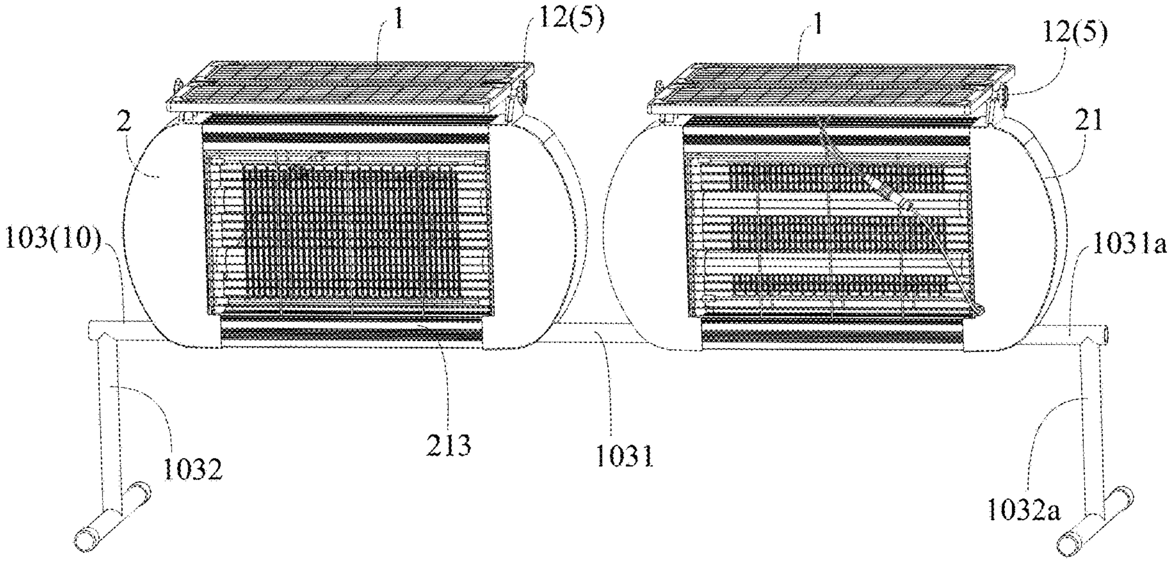

It can be understood that when the grounding structure 3111 includes a U-shaped structure 3111*a*, the ground plug 311 can, but is not limited to, exist in several forms as shown in FIGS. 101 to 103, at this time, the bottom of the supporting column 310 is connected to the connecting column 3112 by interlocking, and the relative position between the ground plug 311 and the supporting column 310 is fixed through interference fit. Of course, when the grounding structure 3111 includes a U-shaped structure 3111*a*, the ground plug 311 can also, but is not limited to, exist in several forms as shown in FIGS. 43 to 49, at this time, the opening 310*a* at the bottom of the supporting column 310 is a threaded hole, the connecting column 3112 is a threaded column, and the threaded column is connected to the threaded hole. The ground plug 311 and the supporting column 310 are connected to each other through the threaded fit of the threaded column and the threaded hole.

Embodiment 2

Please refer to FIGS. 111 to 126, the second embodiment of the present application also provides a solar mosquito killer, it should be noted that the solar mosquito killer in the second embodiment of the present application is structurally similar to the solar mosquito killer in the first embodiment of the present application (and can refer to the introduction in the first embodiment). The following only focuses on the differences between the solar mosquito killer in the second embodiment and the solar mosquito killer in the first embodiment.

In this embodiment, as shown in FIGS. 111 to 126, the installation structure 10 includes at least one adapter 102, and the two frame components 21 of adjacent mosquito killing modules 2 are rotatably connected through at least one adapter 102. Among them, the assembly between two adjacent mosquito killing modules 2 can be achieved through one adapter 102, or the assembly between two adjacent mosquito killing modules 2 can be achieved through multiple adapters 102. By designing adapter 102, adapter 102 is used to achieve assembly between adjacent mosquito killing modules 2, allowing multiple mosquito killing modules 2 to be assembled together through adapter 102, which can effectively improve the mosquito killing range of the solar mosquito killing device.

Each adapter 102 includes two adapter parts 1021 arranged along the height direction ZZ' of the mosquito killing module 2, and a rotating shaft 1022 rotatably connected to the two adapter parts 1021. The two adapter parts 1021 of each adapter 102 are used for one-to-one corresponding fixed connection with the frame components 21 of adjacent two mosquito killing modules 2.

The adapter 1021 includes an adapter sleeve 1021*a* and at least one adapter wall 1021*b*. The adapter sleeve 1021*a* is rotatably connected to the rotating shaft 1022. One end of at least one adapter wall 1021*b* is fixedly connected to the outer surface of the adapter sleeve 1021*a*, and the other end of at least one adapter wall 1021*b* is fixedly connected to the frame component 21 (specifically the mounting column 211 introduced earlier) of the corresponding mosquito killing module 2. Among them, the adapter sleeve 1021*a* and the adapter wall 1021*b* can be integrally formed through injection molding or 3D printing, but are not limited to. The adapter wall 1021*b* can be, but is not limited to, fixedly connected to the corresponding frame component 21 of the mosquito killing module 2 through screw, snap fit, or plug-in connections in a detachable manner. The adapter wall 1021*b* can also be, but is not limited to, fixedly connected to the corresponding frame component 21 of the mosquito killing module 2 through riveting, welding, or adhesive bonding in a non detachable manner.

It should be noted that the adapter 102 can also achieve angle adjustment between adjacent two mosquito killing modules 2, so that the solar mosquito killing device can have unfolded (i.e., deployed) and folded (i.e., stacked) states; in the unfolded state, multiple mosquito killing modules 2 can be arranged in a horizontal row or enclosed to form a circle; in the folded state, adjacent two mosquito killing modules 2 are rotated to be stacked together in the width direction YY' of the mosquito killing module 2. When the solar mosquito killing device is in normal use, it is in the deployed state as described above, so that multiple mosquito killing modules 2 will not form mutual obstruction, ensuring the mosquito killing range of the solar mosquito killing device. During transportation, the solar mosquito killing device is in the above-mentioned stacked state, causing multiple mosquito killing modules 2 to rotate and stack together along the width direction YY' of the mosquito killing module 2, reducing the space occupation rate of the solar mosquito killing device.

Embodiment 3

Please refer to FIGS. 127 to 131, the third embodiment of the present application also provides a solar mosquito killer, it should be noted that the solar mosquito killer in the third embodiment of the present application is structurally similar to the solar mosquito killer in the first embodiment of the present application (and can refer to the introduction in the first embodiment). The following only focuses on the differences between the solar mosquito killer in the third embodiment and the solar mosquito killer in the first embodiment.

In this embodiment, as shown in FIGS. 127 to 131, the installation structure 10 includes an installation frame 103, which is located on the side of the mosquito killing module 2 away from the solar module 1. The installation frame 103 is connected to the frame components 21 of all mosquito killing modules 2 to provide support for all mosquito killing modules 2. Among them, the frame components 21 of each mosquito killing module 2 can be, but are not limited to, fixedly connected to the installation frame 103 in a detachable manner through at least one of screwing, clamping, or plugging. The frame components 21 of each mosquito killing module 2 can also be, but are not limited to, fixedly connected to the installation frame 103 in a non detachable manner through riveting or welding. By designing the installation frame 103, it is used on one hand to assemble all mosquito killing modules 2 together, and on the other hand, it serves as a support foot (similar to the supporting module 3 in the first embodiment above) to provide support for all mosquito killing modules 2.

The installation frame 103 includes an installation body 1031 and an installation foot 1032 connected to the installation body 1031. All frame components 21 of the mosquito killing module 2 are fixedly connected to the installation body 1031. Among them, the installation body 1031 can be a rod-shaped structure or a plate-shaped structure. The specific connection method between the installation foot 1032 and the installation body 1031 is not limited here, and designers can make reasonable designs according to actual needs; for example, the installation foot 1032 can be, but is not limited to, fixedly connected to the installation body 1031 in a detachable manner through at least one of screw connection, snap fit connection, or plug-in connection; in other situations, the mounting foot 1032 can also be fixedly connected to the mounting body 1031 in a non detachable manner, but not limited to, by riveting or welding.

As shown in FIGS. 127 to 131, the installation body 1031 includes an installation rod 1031*a*, and the installation foot 1032 includes multiple T-shaped supporting rods 1032*a*, which are arranged at intervals along the length direction XX' of the installation rod 1031*a* and fixedly connected to the installation rod 1031*a*. The frame components 21 of all mosquito killing modules 2 are fixedly connected to the installation rod 1031*a*, and all mosquito killing modules 2 are arranged at intervals along the length direction XX' of the installation rod 1031*a*, and the length direction XX' of all mosquito killing modules 2 is coplanar and parallel to the length direction XX' of the installation rod 1031*a*. All mosquito killing modules 2 are arranged in a row along the length direction XX' of the installation rod 1031*a*, so that multiple mosquito killing modules 2 will not obstruct each other, ensuring the mosquito killing range of the solar module 1.

It should be noted that in the third embodiment of the present application, the solar mosquito killing device does not include the supporting module 3 in the first embodiment mentioned above. The installation frame 103 is equivalent to the supporting module 3 introduced above, which is used to provide support for all mosquito killing modules 2. The T-shaped supporting rod 1032*a* is different from the grounding structure 3111 of the supporting module 3 in the first embodiment mentioned above. The T-shaped supporting rod 1032*a* does not have sharp points and does not need to be inserted below the cement surface. The T-shaped supporting rod 1032*a* only needs to be placed on the cement surface to effectively support the mosquito killing module 2.

Embodiment 4

Please refer to FIG. 132, the fourth embodiment of the present application also provides a solar mosquito killer, and it should be noted that the solar mosquito killer in the fourth embodiment of the present application is structurally similar to the solar mosquito killer in the first embodiment of the present application (and can refer to the introduction in the first embodiment). The following only focuses on the differences between the solar mosquito killer in the fourth embodiment and the solar mosquito killer in the first embodiment.

In this embodiment, as shown in FIG. 132, the installation structure 10 includes an installation frame 103, which is located on the side of the mosquito killing module 2 away from the solar module 1. The installation frame 103 is connected to the frame components 21 of all mosquito killing modules 2 to provide support for all mosquito killing modules 2. Among them, the frame components 21 of each mosquito killing module 2 can be, but are not limited to, fixedly connected to the installation frame 103 in a detachable manner through at least one of screwing, clamping, or plugging. The frame components 21 of each mosquito killing module 2 can also be, but are not limited to, fixedly connected to the installation frame 103 in a non detachable manner through riveting or welding. By designing the installation frame 103, it is used on one hand to assemble all mosquito killing modules 2 together, and on the other hand, it serves as a support foot (similar to the supporting module 3 in the first embodiment above) to provide support for all mosquito killing modules 2.

The installation frame 103 includes an installation body 1031 and an installation foot 1032 connected to the installation body 1031. All frame components 21 of the mosquito killing module 2 are fixedly connected to the installation body 1031. Among them, the installation body 1031 can be a rod-shaped structure or a plate-shaped structure. The specific connection method between the installation foot 1032 and the installation body 1031 is not limited here, and designers can make reasonable designs according to actual needs; for example, the installation foot 1032 can be, but is not limited to, fixedly connected to the installation body 1031 in a detachable manner through at least one of screw connection, card connection, or plug connection; in other situations, the mounting foot 1032 can also be fixedly connected to the mounting body 1031 in a non detachable manner, but not limited to, by riveting or welding.

As shown in FIG. 132, the installation body 1031 includes multiple rotating installation sub-rods 1031*b*, and the installation feet 1032 include multiple T-shaped supporting rods 1032*a*, which are fixedly connected to the ends of multiple installation sub-rods 1031*b*. The frame components 21 of each mosquito killing module 2 are fixedly connected to one installation sub-rod 1031*b*, and the length direction XX' of each mosquito killing module 2 is coplanar and parallel to the corresponding length direction XX' of the installation sub-rod 1031*b*. By designing multiple installation sub-rods 1031*b* with rotating connections, multiple mosquito killing modules 2 can be assembled into one through the installation sub-rods 1031*b* with multiple rotating connections, which can effectively improve the mosquito killing range of the solar mosquito killing device.

It should be noted that in the fourth embodiment of the present application, the solar mosquito killing device does not include the supporting module 3 in the first embodiment mentioned above. The installation frame 103 is equivalent to the supporting module 3 introduced above, which is used to provide support for all mosquito killing modules 2. The T-shaped supporting rod 1032*a* is different from the grounding structure 3111 of the supporting module 3 in the first embodiment mentioned above. The T-shaped supporting rod 1032*a* does not have sharp points and does not need to be inserted below the cement surface. The T-shaped supporting rod 1032*a* only needs to be placed on the cement surface to effectively support the mosquito killing module 2.

It should be noted that the installation sub-rod 1031*b* of the rotating connection can also achieve angle adjustment between adjacent two mosquito killing modules 2, so that the solar mosquito killing device has an unfolded (deployed) state and a folded (stacked) state; in the unfolded state, multiple mosquito killing modules 2 can be arranged in a horizontal row or enclosed to form a circle; in the folded state, adjacent two mosquito killing modules 2 are rotated to be stacked together in the width direction YY' of the mosquito killing module 2. When the solar mosquito killing device is in normal use, it is in the deployed state as described above, so that multiple mosquito killing modules 2 will not form mutual obstruction, ensuring the mosquito killing range of the solar mosquito killing device; During transportation, the solar mosquito killing device is in the above-mentioned stacked state, causing multiple mosquito killing modules 2 to rotate and stack together along the width direction YY' of the mosquito killing module 2, reducing the space occupation rate of the solar mosquito killing device.

Embodiment 5

Please refer to FIG. 133-147, the fifth embodiment of the present application also provides a solar mosquito killer, and it should be noted that the solar mosquito killer in the fifth embodiment of the present application is structurally similar to the solar mosquito killer in the first embodiment of the present application (and can refer to the introduction in the first embodiment). The following only focuses on the differences between the solar mosquito killer in the fifth embodiment and the solar mosquito killer in the first embodiment.

In this embodiment, as shown in FIGS. 133 to 147, multiple mosquito killing modules 2 are used to form at least one mosquito killing unit 2*a*. Each mosquito killing unit 2*a* includes a first mosquito killing module 2*b* and a second mosquito killing module 2*c*. The solar module 1 is located on one side of the first mosquito killing module 2*b* and is connected to the frame component 21 of the first mosquito killing module 2*b*. The installation structure 10 includes an installation frame 103 and at least one adapter 102. The frame component 21 of the first mosquito killing module 2*b* is fixedly connected to the installation frame 103, and the second mosquito killing module 2*c* is located on the side of the first mosquito killing module 2*b* away from the solar module 1. The frame component 21 of the second mosquito killing module 2*c* is rotatably connected to the frame component 21 of the first mosquito killing module 2*b* through at least one adapter 102. Among them, the frame component 21 of the first mosquito killing module 2*b* can be, but is not limited to, fixedly connected to the installation frame 103 in a detachable manner through at least one of screwing, snap fit, or plug-in connection manner. The frame component 21 of the first mosquito killing module 2*b* can also be, but is not limited to, fixedly connected to the installation frame 103 in a non detachable manner through riveting or welding. By designing the installation frame 103, it is used on one hand to assemble the first mosquito killing module 2*b* and the second mosquito killing module 2*c* in at least one mosquito killing unit 2*a* together, and on the other hand, it serves as a supporting foot (similar to the supporting module 3 in the first embodiment above) to provide support for the first mosquito killing module 2*b* and the second mosquito killing module 2*c* in at least one mosquito killing unit 2*a*. By designing adapter 102, adapter 102 is used to assemble the second mosquito killing module 2*c* and the first mosquito killing module 2*b* in each mosquito killing unit 2*a*, so that the second mosquito killing module 2*c* can be assembled with the first mosquito killing module 2*b* through adapter 102, effectively improving the mosquito killing range of the solar mosquito killing device.

The installation frame 103 includes an installation body 1031 and an installation foot 1032 connected to the installation body 1031. The frame component 21 of the first mosquito killing module 2*b* is fixedly connected to the installation body 1031. Among them, the installation body 1031 can be a rod-shaped structure or a plate-shaped structure. The specific connection method between the installation foot 1032 and the installation body 1031 is not limited here, and designers can make reasonable designs according to actual needs; for example, the installation foot 1032 can be, but is not limited to, fixedly connected to the installation body 1031 in a detachable manner through at least one of screw connection, card connection, or plug connection; in other situations, the mounting foot 1032 can also be fixedly connected to the mounting body 1031 in a non detachable manner, but not limited to, by riveting or welding.

As shown in FIGS. 133 to 147, the installation body 1031 includes an installation rod 1031*a*, and the installation foot 1032 includes multiple U-shaped ground plugs 1032*b*, which are arranged at intervals along the length direction XX' of the installation rod 1031*a* and fixedly connected to the installation rod 1031*a*. The frame component 21 of the first mosquito killing module 2*b* is fixedly connected to the installation rod 1031*a*, and the length direction XX' of the first mosquito killing module 2*b* is coplanar and parallel to the length direction XX' of the installation rod 1031*a*. For each mosquito killing unit 2*a*, the first mosquito killing module 2*b* and the second mosquito killing module 2*c* are designed in an up and down distributed manner, so that there is no mutual obstruction between the first mosquito killing module 2*b* and the second mosquito killing module 2*c*, ensuring the mosquito killing range of the solar module 1

It should be noted that in the fifth embodiment of the present application, the solar mosquito killing device does not include the supporting module 3 in the first embodiment. The installation frame 103 is equivalent to the supporting module 3 introduced above, which is used to provide support for the first mosquito killing module 2*b* and the second mosquito killing module 2*c* of the mosquito killing unit 2*a*. The U-shaped plug 1032*b* has a pointed part and can be inserted below the surface of cement or sand.

As shown in FIGS. 133 to 147, each adapter 102 includes two adapter parts 1021 arranged along the length direction XX' of the first mosquito killing module 2*b*, and a rotating shaft 1022 that is rotatably connected to the two adapter parts 1021. The two adapter parts 1021 of each adapter 102 are used to fixedly connect with the frame components 21 of the first mosquito killing module 2*b* and the second mosquito killing module 2*c* in one-to-one correspondence.

The adapter 1021 includes an adapter sleeve 1021*a* and at least one adapter wall 1021*b*. The adapter sleeve 1021*a* is rotatably connected to the rotating shaft 1022, and one end of at least one adapter wall 1021*b* is fixedly connected to the outer surface of the adapter sleeve 1021*a*. The other end of at least one adapter wall 1021*b* is fixedly connected to the frame component 21 (specifically the bottom beam 213 introduced earlier) of the corresponding first mosquito killing module 2*b*/second mosquito killing module 2*c*. Among them, the adapter sleeve 1021*a* and the adapter wall 1021*b* can be integrally formed through injection molding or 3D printing, but are not limited to. The adapter wall 1021*b* can be, but is not limited to, fixedly connected to the frame components 21 of the corresponding first mosquito killing module 2*b*/second mosquito killing module 2*c* in a detachable manner through screwing, snap fit, or plug-in connection. The adapter wall 1021*b* can also be, but is not limited to, fixedly connected to the frame components 21 of the corresponding first mosquito killing module 2*b*/second mosquito killing module 2*c* in a non detachable manner through riveting, welding, or adhesive bonding.

It should be noted that the adapter 102 can also adjust the angle of the second mosquito killing module 2*c* relative to the first mosquito killing module 2*b* in the mosquito killing unit 2*a*, so that the solar mosquito killing device can have unfolded (i.e., deployed) and folded (i.e., stacked) states; in the unfolded state, the first mosquito killing module 2*b* and the second mosquito killing module 2*c* in the mosquito killing unit 2*a* are arranged in an up and down distributed manner; in the stacked state, the second mosquito killing module 2*c* in the mosquito killing unit 2*a* rotates relative to the first mosquito killing module 2*b* to be stacked together in the width direction YY' of the first mosquito killing module 2*b*. When the solar mosquito killing device is in normal use, it is in the deployed state as described above, so that the first mosquito killing module 2*b* and the second mosquito killing module 2*c* in the mosquito killing unit 2*a* will not form mutual obstruction, ensuring the mosquito killing range of the solar mosquito killing device. During transportation, the solar mosquito killing device is in the above-mentioned stacked state, causing the second mosquito killing module 2*c* in the mosquito killing unit 2*a* to rotate relative to the first mosquito killing module 2*b* and stack together in the width direction YY' of the first mosquito killing module 2*b*, reducing the space occupation rate of the solar mosquito killing device.

Embodiment 6

Please refer to FIG. 148-153, the sixth embodiment of the present application also provides a solar mosquito killer, and it should be noted that the solar mosquito killer in the sixth embodiment of the present application is structurally similar to the solar mosquito killer in the first embodiment of the present application (and can refer to the introduction in the first embodiment). The following only focuses on the differences between the solar mosquito killer in the sixth embodiment and the solar mosquito killer in the first embodiment.

In this embodiment, as shown in FIGS. 148 to 153, the installation structure 10 includes at least one adapter 102, and the two frame components 21 of adjacent mosquito killing modules 2 are rotatably connected through at least one adapter 102. Among them, the assembly between two adjacent mosquito killing modules 2 can be achieved through one adapter 102, or the assembly between two adjacent mosquito killing modules 2 can be achieved through multiple adapters 102. By designing adapter 102, adapter 102 is used to achieve assembly between adjacent mosquito killing modules 2, allowing multiple mosquito killing modules 2 to be assembled together through adapter 102, which can effectively improve the mosquito killing range of the solar mosquito killing device.

Each adapter 102 includes hinges 1023, which are fixedly connected to the frame components 21 (specifically the mounting columns 211 introduced earlier) of adjacent two mosquito killing modules 2 by locking screws.

It should be noted that the hinge 1023 can also achieve angle adjustment between adjacent two mosquito killing modules 2, so that the solar mosquito killing device has an unfolded state and a folded (i.e., stacked) state; in the unfolded state, multiple mosquito killing modules 2 can be arranged in a horizontal row or enclosed to form a circle; in the folded state, adjacent two mosquito killing modules 2 are rotated to be stacked together in the width direction YY' of the mosquito killing module 2. When the solar mosquito killing device is in normal use, it is in the deployed state as described above, so that multiple mosquito killing modules 2 will not form mutual obstruction, ensuring the mosquito killing range of the solar mosquito killing device. During transportation, the solar mosquito killing device is in the above-mentioned stacked state, causing multiple mosquito killing modules 2 to rotate and stack together along the width direction YY' of the mosquito killing module 2, reducing the space occupation rate of the solar mosquito killing device.

Embodiment 7

Please refer to FIG. 154-161, the seventh embodiment of the present application also provides a solar mosquito killer, and it should be noted that the solar mosquito killer in the seventh embodiment of the present application is structurally similar to the solar mosquito killer in the first embodiment of the present application (and can refer to the introduction in the first embodiment). The following only focuses on the differences between the solar mosquito killer in the seventh embodiment and the solar mosquito killer in the first embodiment.

In this embodiment, as shown in FIGS. 154 to 161, the installation structure 10 includes at least one installation component 101, and the two frame components 21 of adjacent mosquito killing modules 2 are fixedly connected by at least one installation component 101. Among them, the assembly between two adjacent mosquito killing modules 2 can be achieved through one installation component 101, or the assembly between two adjacent mosquito killing modules 2 can be achieved through multiple installation components 101. By designing installation component 101, it is used to assemble two adjacent mosquito killing modules 2, so that multiple mosquito killing modules 2 can be assembled together through installation component 101, which can effectively improve the mosquito killing range of the solar mosquito killing device.

Each installation component 101 includes two installation parts 1011 spaced along the length direction XX' of the mosquito killing module 2, and a second hinge 1013 connected to the two installation parts 1011. The two installation parts 1011 of each installation component 101 are used to fixedly connect with the two frame components 21 of adjacent mosquito killing modules 2 one by one, and the two ends of the second hinge 1013 are fixedly connected to the two installation parts 1011 by locking screws. It should be noted that the specific structure of the installation part 1011 in this embodiment can refer to the installation part 1011 in embodiment one, and will not be repeated here.

It should be noted that the second hinge 1013 connects the two mounting parts 1011 together and can also achieve angle adjustment between adjacent mosquito killing modules 2, so that the solar mosquito killing device can have unfolded (i.e., deployed) and folded (i.e., stacked) states; in the unfolded state, multiple mosquito killing modules 2 can be arranged in a horizontal row or enclosed to form a circle; in the stacked state, adjacent two mosquito killing modules 2 are rotated to be stacked together in the width direction YY' of the mosquito killing module 2. When the solar mosquito killing device is in normal use, it is in the deployed state as described above, so that multiple mosquito killing modules 2 will not form mutual obstruction, ensuring the mosquito killing range of the solar mosquito killing device. During transportation, the solar mosquito killing device is in the above-mentioned stacked state, causing multiple mosquito killing modules 2 to rotate and stack together along the width direction YY' of the mosquito killing module 2, reducing the space occupation rate of the solar mosquito killing device.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A solar mosquito killer, comprising:

a mosquito killing module (2); and at least one solar module (1), wherein the at least one solar module (1) is electrically connected to the mosquito killing module (2) to power the mosquito killing module (2);

wherein the mosquito killing module (2) comprises a frame component (21), an electric grid (22) located in the frame component (21), a control component (23) electrically connected to the electric grid (22), and a button (24) set on the frame component (21) and electrically connected to the control component (23); and wherein the frame component (21) comprises two mounting columns (211), a top beam (212), a bottom beam (213), and two protective nets (214), the two mounting columns (211), the top beam (212), and the bottom beam (213), and the two protective nets (214) are connected to each other to form a frame; the two mounting columns (211) are arranged opposite to each other, and the top beam (212) is arranged opposite to the bottom beam (213); the two protective nets (214) are arranged opposite to each other; both of the mounting columns (211) are provided with first insertion holes (2111) for installation at both ends of the electric grid (22); and the control component (23) and the button (24) are both installed on one of the mounting columns (211); and wherein both of the mounting columns (211) are further provided with fixing slots (2113), and two ends of each of the protective nets (214) are installed in the fixing slots (2113).

2. A solar mosquito killer, comprising:

a mosquito killing module (2); and at least one solar module (1), wherein the at least one solar module (1) is electrically connected to the mosquito killing module (2) to power the mosquito killing module (2);

wherein the mosquito killing module (2) comprises a frame component (21), an electric grid (22) located in the frame component (21), a control component (23) electrically connected to the electric grid (22), and a button (24) set on the frame component (21) and electrically connected to the control component (23); and wherein the frame component (21) comprises two mounting columns (211), the mounting columns (211) are box bodies and each include a box body (201) and a cover (202), the electric grid (22) is located between the mounting columns (211) and mounted to the box body (201) of each of the mounting columns (211); the cover (202) detachably covers the box body (201), and the control component (23) is located between the box body (201) and the cover (202);

wherein the frame component (21) further comprises a top beam (212), a bottom beam (213), and two protective nets (214), the two mounting columns (211), the top beam (212), the bottom beam (213), and the two protective nets (214) are connected to each other to form a frame; the two mounting columns (211) are arranged opposite to each other, and the top beam (212) is arranged opposite to the bottom beam (213); the two protective nets (214) are arranged opposite to each other; and wherein both of the mounting columns (211) are further provided with fixing slots (2113), and two ends of each of the protective nets (214) are installed in the fixing slots (2113).

3. A solar mosquito killer, comprising:

a plurality of mosquito killing modules (2);

at least one solar module (1), wherein the at least one solar module (1) is electrically connected to the plurality of mosquito killing modules (2) to power the plurality of mosquito killing modules (2);

at least one installation structure (10) configured for connecting the plurality of mosquito killing modules (2) as a whole;

wherein each mosquito killing module (2) comprises a frame component (21) and an electric grid (22) arranged in the frame component (21), wherein the at least one solar module (1) is located on one side of each mosquito killing module (2) and connected to the frame component (21);

wherein the at least one installation structure (10) comprises at least one installation component (101), and adjacent mosquito killing modules (2) of the plurality of mosquito killing modules (2) are fixedly connected by the at least one installation component (101) connected to the frame component (21) of each of the adjacent mosquito killing modules (2);

wherein each installation component (101) comprises two installation parts (1011) spaced apart along a length direction (XX') of the plurality of mosquito killing modules (2), and a connecting part (1012) connected between the two installation parts (1011), the two installation parts (1011) of each installation component (101) are used for fixed connection with the frame components (21) of the adjacent mosquito killing modules (2) in a one-to-one correspondence; and wherein at least one of the two installation parts (1011) of each installation component (101) is connected to the corresponding frame component (21) of one of the adjacent mosquito killing modules (2) through a snap fit;

each installation part (1011) comprises a first surrounding wall (1011*a*) and two second surrounding walls (1011*b*); the two second surrounding walls (1011*b*) are arranged opposite to each other along a width direction (YY') of each of the mosquito killing modules (2) and connected to two distinct edges at opposite ends of the first surrounding wall (1011*a*); the two second surrounding walls (1011*b*) and the first surrounding wall (1011*a*) cooperatively enclose an area to form a clamp structure (1011*c*) with one side opening; the one side opening of the clamp structure (1011*c*) is oriented towards the corresponding frame component (21) of one of the adjacent mosquito killing modules (2), and the clamp structure (1011*c*) used for clamping the corresponding frame component (21) of one of the adjacent mosquito killing modules (2).

4. The solar mosquito killer according to claim 3, wherein the installation part (1011) further comprises limiting flanges (1011*d*), which are located at ends of the two second surrounding walls (1011*b*) away from the first surrounding wall (1011*a*); when the clamping structure (1011*c*) clamps the corresponding frame component (21) of one of the adjacent mosquito killing modules (2), the limiting flanges (1011*d*) contact surfaces of the frame component (21) facing away from the first surrounding wall (1011*a*).

5. The solar mosquito killer according to claim 4, wherein the connecting part (1012) comprises a first connecting wall (1012*a*) and a second connecting wall (1012*b*) arranged in a cross manner; the first connecting wall (1012*a*) and the second connecting wall (1012*b*) are fixedly connected to the two first surrounding walls (1011*a*) of the two installation parts (1011) on both sides along the length direction (XX') of the plurality of mosquito killing modules (2).

6. The solar mosquito killer according to claim 4, wherein the connecting part (1012) comprises a first connecting wall (1012*a*) and a second connecting wall (1012*b*) arranged in a cross manner; the first connecting wall (1012*a*) and the second connecting wall (1012*b*) are one-to-one connected to the two first surrounding walls (1011*a*) of the two installation parts (1011) on both sides along the length direction (XX') of the plurality of mosquito killing modules (2);

the connecting part (1012) further comprises a reinforcing wall (1012*c*), which connects at least two of the first connecting wall (1012*a*), the second connecting wall (1012*b*), and the first surrounding wall (1011*a*).

7. The solar mosquito killer according to claim 4, wherein the connecting part (1012) comprises a third connecting wall (1012*d*) extending along the length direction (XX') of the plurality of mosquito killing modules (2), and the third connecting wall (1012*d*) is fixedly connected to the two first surrounding walls (1011*a*) of the two mounting parts (1011) on both sides along the length direction (XX') of the plurality of mosquito killing modules (2) in a one-to-one correspondence;

the third connecting wall (1012*d*) is provided with a hollow area (1012*e*), which includes hollow holes (1012*f*) that penetrate the third connecting wall (1012*d*) along the width direction (YY') of each of the mosquito killing modules (2), and a cross-section of the hollow holes (1012*f*) is polygonal.

8. The solar mosquito killer according to claim 3, wherein each of the mosquito killing modules (2) comprises a control component (23) electrically connected to the electric grid (22), a button (24) set on the frame component (21) and electrically connected to the control component (23), and a flexible waterproof cover (25) covering the button (24).

9. The solar mosquito killer according to claim 8, wherein the electric grid (22) comprises a positive electrode component (221), a negative electrode component (222), and at least one connecting strip (223), the positive electrode component (221) comprises a positive electrode connecting part (2211) and multiple positive electrode strips (2212) sequentially connected to the positive electrode connecting part (2211); the negative electrode component (222) comprises a negative electrode connecting part (2221) and multiple negative electrode strips (2222) sequentially connected to the negative electrode connecting part (2221); the multiple positive electrode strips (2212) and the multiple negative electrode strips (2222) are alternately arranged at intervals and located between the positive electrode connecting part (2211) and the negative electrode connecting part (2221), the at least one connecting strip (223) connects the multiple positive electrode strips (2212) and the multiple negative electrode strips (2222) as a whole.

10. The solar mosquito killer according to claim 8, wherein the button (4) has multiple gears, corresponding to an automatic working state, a normally off state, and a normally on state of the mosquito killing module; in the automatic working state, the mosquito killing module is capable of automatically turning off a mosquito killing state or turning on a mosquito killing state according to a working state of the solar module.

11. The solar mosquito killer according to claim 8, wherein the solar module (1) is electrically connected to the mosquito killing module (2) through an electrical connection component (4), the electrical connection component (4) includes a first electrical connector (41) and a second electrical connector (42); the first electrical connector (41) is connected to the solar module (1) through a first wire (41*a*), and the second electrical connector (42) is connected to the mosquito killing module (2) through a second wire (42*a*), and the first electrical connector (41) is detachably electrically connected to the second electrical connector (42).

12. The solar mosquito killer according to claim 8, wherein the frame component (21) comprises two mounting columns (211), a top beam (212), a bottom beam (213), and two protective nets (214), the two mounting columns (211), the top beam (212), the bottom beam (213), and the two protective nets (214) are connected to each other to form a frame; the two mounting columns (211) are arranged opposite to each other, and the top beam (212) is arranged opposite to the bottom beam (213); the two protective nets (214) are arranged opposite to each other; both mounting columns (211) are provided with first insertion holes (2111) for installation at both ends of the electric grid (22); and the control component (23) and the button (24) are both installed on one of the mounting columns (211).

13. The solar mosquito killer according to claim 8, wherein a bottom of the frame component (21) is provided with at least one mounting hole (210) for inserting one end of a supporting module (3), and an other end of the supporting module (3) is used to be set on an external carrier; the supporting module (3) comprises multiple insert components (31) capable of being installed on a ground surface; a number of the at least one mounting hole (210) corresponds to a number of the multiple insert components (31).

* * * * *